(12) United States Patent
Beshai

(10) Patent No.: US 9,219,697 B2
(45) Date of Patent: Dec. 22, 2015

(54) MULTIPLE PETABIT-PER-SECOND SWITCHING SYSTEM EMPLOYING LATENT SWITCHES

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 0 days.

(21) Appl. No.: 14/633,023

(22) Filed: Feb. 26, 2015

(65) Prior Publication Data

US 2015/0172218 A1 Jun. 18, 2015

Related U.S. Application Data

(63) Continuation-in-part of application No. 13/526,488, filed on Jun. 18, 2012, now Pat. No. 8,971,340.

(51) Int. Cl.

| H04L 29/06 | (2006.01) |
|---|---|
| H04L 12/933 | (2013.01) |
| H04L 12/935 | (2013.01) |
| H04J 14/02 | (2006.01) |
| H04Q 11/00 | (2006.01) |

(52) U.S. Cl.
CPC ............ *H04L 49/15* (2013.01); *H04J 14/0209* (2013.01); *H04J 14/0212* (2013.01); *H04J 14/0217* (2013.01); *H04J 14/0227* (2013.01); *H04J 14/0267* (2013.01); *H04L 49/30* (2013.01); *H04Q 11/0005* (2013.01); *H04J 14/0256* (2013.01); *H04Q 2011/0024* (2013.01); *H04Q 2011/0032* (2013.01); *H04Q 2011/0033* (2013.01); *H04Q 2011/0039* (2013.01); *H04Q 2011/0052* (2013.01)

(58) Field of Classification Search
CPC .................................................... H04J 14/0212
See application file for complete search history.

(56) References Cited

U.S. PATENT DOCUMENTS

| 5,168,492 | A | 12/1992 | Beshai et al. |
|---|---|---|---|
| 5,745,486 | A | 4/1998 | Beshai et al. |
| 7,519,053 | B2 | 4/2009 | Beshai |
| 7,567,556 | B2 | 7/2009 | Beshai |
| 7,630,362 | B1 | 12/2009 | Jeffrey et al. |
| 7,639,678 | B2 | 12/2009 | Beshai |
| 8,139,570 | B2 | 3/2012 | Beshai |
| 8,204,050 | B2 | 6/2012 | Beshai |
| 8,774,200 | B2 | 7/2014 | Beshai |
| 8,934,347 | B1 | 1/2015 | Bratt et al. |
| 8,971,340 | B2 | 3/2015 | Beshai |
| 2011/0038371 | A1 | 2/2011 | Lin |
| 2013/0201994 | A1 | 8/2013 | Beshai |
| 2014/0086239 | A1 | 3/2014 | Beshai |
| 2014/0321324 | A1 | 10/2014 | Beshai |

*Primary Examiner* — Maharishi Khirodhar

(57) ABSTRACT

Access switches of moderate dimensions are interconnected through central switches of large dimensions to form a large-scale switching system. The central switches are configured as latent switches which scale easily to large dimensions. Each access switch has asymmetric connections to the ingress sides and egress sides of the central switches so that paths from an originating access switch to a destination access switch through the central switches are subject to staggered switching delays permitting an access controller of any access switch to select an available path of minimum switching delay for a given flow. Using access switches of 128 dual ports each and central switches of 4096 dual ports each, a switching system of 524288 dual ports is realized. At a port capacity of 10 Gigabits/second, the access capacity exceeds five petabits per second and the bulk of traffic experiences a switching delay below two microseconds.

20 Claims, 92 Drawing Sheets

| Switch Configuration | 1000 FIG. 10 (state 0) | 1000 FIG. 10 (state 1) |
|---|---|---|
| Static connection from switch elements to rotator | Ordinary | Transposed |
| Static connection from rotator to switch elements | Transposed | Ordinary |
| Index of rotator inlet } To Intermediate switch element | $j$ | $L-j$ |
| Index of rotator outlet | $j+t_1$ $\Big\}$ Modulo $N$ | $L-j+t_1$ $\Big\}$ Modulo $N$ |
| Index of transit switch element | $L-(j+t_1)$ | $L-j+t_1$ |
| Index of rotator inlet } From Intermediate switch element | $L-(j+t_1)$ | $j-t_1$ |
| Index of rotator outlet | $L-k$ | $k$ |
| Transit time $t_2$ | $\{j-k+t_1\}_{modulo\ N}$ | $\{k-j+t_1\}_{modulo\ N}$ |
| Transit delay $(t_2-t_1)$ | $\{j-k\}_{modulo\ N}$ | $\{k-j\}_{modulo\ N}$ |

*FIG. 14*

| Switch Configuration | 1820, 2020, 2220 Figures 18, 20, 22 | 1920, 2120, 2320 Figures 19, 21, 23 |
|---|---|---|
| Static connection from first rotator to transit-memory devices | Transposed | Direct |
| Static connection from transit-memory devices to second rotator | Direct | Transposed |
| Index of first-rotator inlet | $j$ | $j$ |
| Index of first-rotator outlet | $j+t_1$ | $\{j+t_1\}\, modulo\, N$ |
| Index of transit-memory device | $\{L-(j+t_1)\}\, modulo\, N$ | $L-j-t_1$ |
| Index of second-rotator inlet | $\{L-(j+t_1)\}\, modulo\, N$ | $k$ |
| Index of second-rotator outlet | $k$ | $\{j+k-L\}\, modulo\, N$ |
| Transit time $t_2$ | $\{j+k-L+t_1\}_{modulo\, N}$ | $\{j+k-L+t_1\}_{modulo\, N}$ |
| Transit delay $(t_2-t_1)$ | $\{j+k-L\}_{modulo\, N}$ | $\{j+k-L\}_{modulo\, N}$ |

*FIG. 24*

| Switch Configuration | 2520 FIG. 25 | 2720, 2920 FIG. 27, FIG. 29 |
|---|---|---|
| Static connection from transit-memory devices to rotator | Transposed | Ordinary |
| Static connection from rotator to transit-memory devices | Ordinary | Transposed |
| Index of rotator inlet — State(0) | $j$ | $j$ |
| Index of rotator outlet — State(0) | $\{j + t_1\}_{\text{modulo } N}$ | $\{j + t_1\}_{\text{modulo } N}$ |
| Index of transit-memory device | $L - (j + t_1)$ | $L - (j + t_1)$ |
| Index of rotator inlet — State(1) | $\{j + t_1\}_{\text{modulo } N}$... wait | |

| Switch Configuration | 3020 FIG. 30 (transposed egress) | 3120 FIG. 31 (transposed egress) |
|---|---|---|
| Static connection from transit-memory devices to rotator | Transposed | Ordinary |
| Static connection from rotator to transit-memory devices | Ordinary | Transposed |
| Index of rotator inlet } State(0) | $j$ | $j$ |
| Index of rotator outlet | $\{j + t_1\}_{modulo\ N}$ | $\{j + t_1\}_{modulo\ N}$ |
| Index of transit-memory device | $L - (j + t_1)$ | $L - (j + t_1)$ |
| Index of rotator inlet } State(1) | $L - k$ | $L - k$ |
| Index of rotator outlet | $\{j - k + t_1\}_{modulo\ N}$ | $\{j - k + t_1\}_{modulo\ N}$ |
| Transit time $t_2$ | $\{j - k\}_{modulo\ N}$ | $\{j - k\}_{modulo\ N}$ |
| Transit delay ($t_2 - t_1$) | | |

*FIG. 35*

| Switch Configuration | FIG. 25 with a descending rotator | Figures 27-29 with descending rotator |
|---|---|---|
| Static connection from transit-memory devices to rotator | Transposed | Ordinary |
| Static connection from rotator to transit-memory devices | Ordinary | Transposed |
| Index of rotator inlet ⎱ State(0) | $j$ | $j$ |
| Index of rotator outlet ⎰ | $j - t_1$ | $j - t_1$ |
| Index of transit-memory device | $\{j - t_1\}$ modulo $N$ | $L-(j-t_1)$ |
| Index of rotator inlet ⎱ State(1) | $L-(j-t_1)$ | $L-(j-t_1)$ |
| Index of rotator outlet ⎰ | $k$ | $k$ |
| Transit time $t_2$ | $\{L-j-k+t_1\}$ modulo N | $\{L-j-k+t_1\}$ modulo N |
| Transit delay $(t_2 - t_1)$ | $\{L-j-k\}$ modulo N | $\{L-j-k\}$ modulo N |

*FIG. 36*

| Switch Configuration | FIG. 30 with a descending rotator (transposed egress) | FIG. 31 with a descending rotator (transposed egress) |
|---|---|---|
| Static connection from transit-memory devices to rotator | Transposed | Ordinary |
| Static connection from rotator to transit-memory devices | Ordinary | Transposed |
| Index of rotator inlet ⎫ State(0) | $j$ | $j$ |
| Index of rotator outlet ⎭ | $\underbrace{j - t_1}_{modulo\ N}$ | $\underbrace{j - t_1}_{} $ |
| Index of transit-memory device ⎫ State(1) | $L - (j - t_1)$ | $L - (j - t_1)$ modulo $N$ |
| Index of rotator inlet ⎭ | $\boxed{L - k}$ | $\boxed{L - k}$ |
| Index of rotator outlet | $\{k - j + t_1\}_{modulo\ N}$ | $\{k - j + t_1\}_{modulo\ N}$ |
| Transit time $t_2$ | $\{k - j\}_{modulo\ N}$ | $\{k - j\}_{modulo\ N}$ |
| Transit delay $(t_2 - t_1)$ | | |

*FIG. 37*

| Switch Configuration | Ascending single rotator | Descending single rotator |
|---|---|---|
| Static connection from transit-memory devices to rotator | Ordinary | Ordinary |
| Static connection from rotator to transit-memory devices | Ordinary | Ordinary |
| Index of rotator inlet ⎱ State(0) | $j$ | $j$ |
| Index of rotator outlet ⎰ | $\{j+t_1\}\ \text{modulo}\ N$ | $\{j-t_1\}\ \text{modulo}\ N$ |
| Index of transit-memory device | $m = j + t_1$ | $m = j - t_1$ |
| Index of rotator inlet ⎱ State(1) | $m$ | $m$ |
| Index of rotator outlet ⎰ | $k$ | $k$ |
| Transit time $t_2$ | $\{k - m\}_{\text{modulo } N}$ | $\{m - k\}_{\text{modulo } N}$ |
| Transit delay $(t_2 - t_1)$ | $\{j + k - 2 \times m\}_{\text{modulo } N}$ | $\{2 \times m - j - k\}_{\text{modulo } N}$ |

*FIG. 43*

| Counter | | |
|---|---|---|
| Up | FIG. 30 $E(0) = m$ $\Delta = (k-j)_{\text{modulo } N}$ | FIG. 25 $E(0) = (L-m)_{\text{modulo } N}$ $\Delta = (j+k-L)_{\text{modulo } N}$ |
| Down | FIG. 25 $E(0) = (L-m)_{\text{modulo } N}$ $\Delta = (L-j-k)_{\text{modulo } N}$ | FIG. 30 $E(0) = m$ $\Delta = (j-k)_{\text{modulo } N}$ |
| | Descending | Ascending |
| | Rotator direction | |

$E(0)$: index of memory section at t=0, of transit memory of index m, $0 \leq m < N$ $\Delta$: Systematic switching delay, ingress port 2540(j) to egress port 2560(k), $0 \leq j < N$, $0 \leq k < N$ $L$: transposition order, $0 \leq L < N$

*FIG. 56*

Index of upstream control time slot corresponding to control port $K_0$
$\{K_0 - j\}_{modulo\ N}$  $\{K_1 - j\}_{modulo\ N}$

⋮

Index of upstream control time slot corresponding to control port $K_{(\Omega-1)}$
$\{K_{\Omega-2} - j\}_{modulo\ N}$  $\{K_{\Omega-1} - j\}_{modulo\ N}$ $N = 2048,\ \Omega = 4,\ K_0 = 0,\ K_1 = 512,\ K_2 = 1024,\ K_3 = 1536$

| | | | | | |
|---|---|---|---|---|---|
| j=2000 | 48 $K_0$ | 560 $K_1$ | ⋯ | 1072 $K_2$ | 1584 $K_3$ |
| j=1500 | 36 $K_3$ | 548 $K_0$ | ⋯ | 1060 $K_1$ | 1572 $K_2$ |
| j=1000 | 24 $K_2$ | 536 $K_3$ | ⋯ | 1048 $K_0$ | 1560 $K_1$ |
| j=500  | 12 $K_1$ | 524 $K_2$ | ⋯ | 1036 $K_3$ | 1548 $K_0$ |
| j=0    | 0 $K_0$  | 512 $K_1$ | ⋯ | 1024 $K_2$ | 1536 $K_3$ |

*FIG. 58*

| Switch Configuration | FIG. 64 or FIG. 65 with a descending transposing rotator | FIG. 64 or FIG. 65 with an ascending transposing rotator |
|---|---|---|
| Index of rotator inlet ⎫ State(0) | $j$ | $j$ |
| Index of rotator outlet ⎭ | $L - j - t_1$ | $L - j + t_1$ |
| Index of transit-memory device | $m = \{L - j - t_1\}\, modulo\, N$ | $m = \{L - j + t_1\}\, modulo\, N$ |
| Index of rotator inlet ⎫ State(1) | $m$ | $m$ |
| Index of rotator outlet ⎭ | $k = \{L - m - t_2\}_{modulo\, N}$ | $k = \{L - m + t_2\}_{modulo\, N}$ |
| Transit delay $(t_2 - t_1)$ | $\{j - k\}_{modulo\, N}$ | $\{k - j\}_{modulo\, N}$ |

*FIG. 66*

Second connectivity scheme

| Indices of access Switches 6710 | Indices of Ingress ports (all Central switches 6720(0) to 6720(3)) | Central switch 2222(0) | Central switch 2222(1) | Central switch 2222(2) | Central switch 2222(3) |
|---|---|---|---|---|---|
| | | | Indices of Egress ports | | |
| Q3: 1536–2047 | A3: 1536–2047 | B3: 1536–2047 | B0: 0000–0511 | B1: 0512–1023 | B2: 1024–1535 |
| Q2: 1024–1535 | A2: 1024–1535 | B2: 1024–1535 | B3: 1536–2047 | B0: 0000–0511 | B1: 0512–1023 |
| Q1: 0512–1023 | A1: 0512–1023 | B1: 0512–1023 | B2: 1024–1535 | B3: 1536–2047 | B0: 0000–0511 |
| Q0: 0000–0511 | A0: 0000–0511 | B0: 0000–0511 | B1: 0512–1023 | B2: 1024–1535 | B3: 1536–2047 |

Access switches 6710(0) to 6710(511)

Ingress ports 7440(0) to 7440(511)

Egress ports 7460(1536) to 7460(2047)

FIG. 82

| From access switch | Central switch | To access switches 6710 of indices: | | | | | | | |
|---|---|---|---|---|---|---|---|---|---|
| | | 0 | 1 | 2 | 3 | 4 | 5 | 6 | 7 |
| 6710(0) | 6720(0) | 8 | 1 | 2 | 3 | 4 | 5 | 6 | 7 |
| | 6720(1) | 6 | 7 | 8 | 1 | 2 | 3 | 4 | 7 |
| | 6720(2) | 4 | 5 | 6 | 7 | 8 | 1 | 2 | 5 |
| | 6720(3) | 2 | 3 | 4 | 5 | 6 | 7 | 8 | 1 |
| 6710(1) | 6720(0) | 7 | 8 | 1 | 2 | 3 | 4 | 5 | 6 |
| | 6720(1) | 5 | 6 | 7 | 8 | 1 | 2 | 3 | 4 |
| | 6720(2) | 3 | 4 | 5 | 6 | 7 | 8 | 1 | 2 |
| | 6720(3) | 1 | 2 | 3 | 4 | 5 | 6 | 7 | 8 |
| 6710(2) | 6720(0) | 6 | 7 | 8 | 1 | 2 | 3 | 4 | 5 |
| | 6720(1) | 4 | 5 | 6 | 7 | 8 | 1 | 2 | 3 |
| | 6720(2) | 2 | 3 | 4 | 5 | 6 | 7 | 8 | 1 |
| | 6720(3) | 8 | 1 | 2 | 3 | 4 | 5 | 6 | 7 |
| 6710(3) | 6720(0) | 5 | 6 | 7 | 8 | 1 | 2 | 3 | 4 |
| | 6720(1) | 3 | 4 | 5 | 6 | 7 | 8 | 1 | 2 |
| | 6720(2) | 1 | 2 | 3 | 4 | 5 | 6 | 7 | 8 |
| | 6720(3) | 7 | 8 | 1 | 2 | 3 | 4 | 5 | 6 |

8980 Normalized delay

FIG. 89

| From access switch | Central switch | To access switches 6710 of indices: | | | | | | | |
|---|---|---|---|---|---|---|---|---|---|
| | | 0 | 1 | 2 | 3 | 4 | 5 | 6 | 7 |
| 6710(4) | 6720(0) | 4 | 5 | 6 | 7 | 8 | 1 | 2 | 3 |
| | 6720(1) | 2 | 3 | 4 | 5 | 6 | 7 | 8 | 1 |
| | 6720(2) | 8 | 1 | 2 | 3 | 4 | 5 | 6 | 7 |
| | 6720(3) | 6 | 7 | 8 | 1 | 2 | 3 | 4 | 5 |
| 6710(5) | 6720(0) | 3 | 4 | 5 | 6 | 7 | 8 | 1 | 2 |
| | 6720(1) | 1 | 2 | 3 | 4 | 5 | 6 | 7 | 8 |
| | 6720(2) | 7 | 8 | 1 | 2 | 3 | 4 | 5 | 6 |
| | 6720(3) | 5 | 6 | 7 | 8 | 1 | 2 | 3 | 4 |
| 6710(6) | 6720(0) | 2 | 3 | 4 | 5 | 6 | 7 | 8 | 1 |
| | 6720(1) | 8 | 1 | 2 | 3 | 4 | 5 | 6 | 7 |
| | 6720(2) | 6 | 7 | 8 | 1 | 2 | 3 | 4 | 5 |
| | 6720(3) | 4 | 5 | 6 | 7 | 8 | 1 | 2 | 3 |
| 6710(7) | 6720(0) | 1 | 2 | 3 | 4 | 5 | 6 | 7 | 8 |
| | 6720(1) | 7 | 8 | 1 | 2 | 3 | 4 | 5 | 6 |
| | 6720(2) | 5 | 6 | 7 | 8 | 1 | 2 | 3 | 4 |
| | 6720(3) | 3 | 4 | 5 | 6 | 7 | 8 | 1 | 2 |

8980 Normalized delay

First connectivity scheme

$\pi = \lfloor |k-j-1|_N / H \rfloor$ y=k=20, Δ=|y−x|_N

| p | x | Δ |
|---|---|---|
| 23 | 1836 | 232 |
| 24 | 1868 | 200 |
| 25 | 1900 | 168 |
| 26 | 1932 | 136 |
| 27 | 1964 | 104 |
| 28 | 1996 | 72 |
| 29 | 2028 | 40 |
| 30 | 12 | 8 |
| 31 | 44 | 2024 |
| 32 | 76 | 1992 |
| 33 | 108 | 1960 |
| 34 | 140 | 1928 |

$\pi = (G - \lfloor |j-k-1|_N / H \rfloor)_{\text{modulo } G}$ y=k=20, Δ=|x−y|_N

| p | x | Δ |
|---|---|---|
| 27 | 1964 | 1944 |
| 28 | 1996 | 1976 |
| 29 | 2028 | 2008 |
| 30 | 12 | 2040 |
| 31 | 44 | 24 |
| 32 | 76 | 56 |
| 33 | 108 | 88 |
| 34 | 140 | 120 |
| 35 | 172 | 152 |
| 36 | 204 | 184 |
| 37 | 236 | 216 |
| 38 | 268 | 248 |

Second connectivity scheme

$\pi = (G - \lfloor |k-j-1|_N / H \rfloor)_{\text{modulo } G}$ x=j=1100, Δ=|y−x|_N

| p | y | Δ |
|---|---|---|
| 30 | 980 | 1928 |
| 31 | 1012 | 1960 |
| 32 | 1044 | 1992 |
| 33 | 1076 | 2024 |
| 34 | 1108 | 8 |
| 35 | 1140 | 40 |
| 36 | 1172 | 72 |
| 37 | 1204 | 104 |
| 38 | 1236 | 136 |
| 39 | 1268 | 168 |
| 40 | 1300 | 200 |
| 41 | 1332 | 232 |

$\pi = \lfloor |j-k-1|_N / H \rfloor$ x=j=1100, Δ=|x−y|_N

| p | y | Δ |
|---|---|---|
| 26 | 852 | 248 |
| 27 | 884 | 216 |
| 28 | 916 | 184 |
| 29 | 948 | 152 |
| 30 | 980 | 120 |
| 31 | 1012 | 88 |
| 32 | 1044 | 56 |
| 33 | 1076 | 24 |
| 34 | 1108 | 2040 |
| 35 | 1140 | 2008 |
| 36 | 1172 | 1976 |
| 37 | 1204 | 1944 |

FIG. 92

MULTIPLE PETABIT-PER-SECOND SWITCHING SYSTEM EMPLOYING LATENT SWITCHES

CROSS-REFERENCE TO RELATED APPLICATIONS

The present application is a continuation-in-part of U.S. patent application Ser. No. 13/526,488 filed on Jun. 18, 2012 which is a continuation-in-part of U.S. patent application Ser. No. 12/549,000, filed on Aug. 27, 2009, the contents of both applications being incorporated herein by reference.

FIELD OF THE INVENTION

The present invention relates to large-scale switching systems for data centers and high-capacity wide-coverage networks.

BACKGROUND

The need for an improved telecommunications network with a much higher capacity and much simpler control is widely recognized. The art of telecommunication networking in general require fundamental changes.

It is well known that structural simplicity reduces network cost and improves network performance. In order to facilitate the introduction of high-quality broadband services, the network structure need be simplified and the network diameter need be reduced. It is desirable that a path from one edge node to another traverse a small number of intermediate nodes. Realization of such a network is greatly facilitated by employing switching nodes of large dimensions and simple structures.

There is a need to explore simpler and more powerful data switches, and new network structures for efficiently deploying such data switches.

SUMMARY

The invention provides a large-scale switching system where access switches of moderate dimensions are interconnected through central switches of large dimensions. The central switches are configured as latent switches which scale easily to large dimensions. The access switches may be configured as instantaneous space switches or rotating-access switches.

To realize low switching delay through the latent switches, the connectivity of access switches to the central switches is devised so that each access switch has asymmetric connections to the ingress sides and egress sides of the latent switches resulting in paths from an originating access switch to a destination access switch through the central switches encountering staggered switching delays. This permits an access controller of any access switch to select an available path of minimum switching delay for a given flow. Using access switches of 128 dual ports each and central switches of 4096 dual ports each, for example, a switching system of 524288 dual ports is realized. At a port capacity of 10 Gigabits/second, for example, the access capacity exceeds five petabits per second and a large proportion of data flows experiences a switching delay of the order of a few microseconds.

In accordance with an aspect, the present invention provides switching system having a plurality of central switches and a plurality of access switches. Each central switch is configured as a latent switch having N ingress ports and N egress ports, N>2. With the ingress ports indexed as 0 to (N−1) and the egress ports indexed as 0 to (N−1), a path through any central switch from an ingress port of an index x to an egress port of index y, $0 \le x < N$, $0 \le y < N$, encounters a same delay.

Each access switch connects to an upstream channel to a respective ingress port and a down stream channel from a respective egress port of each central switch. The egress ports to which an access switch connects have a same index, but the ingress ports to which an access switch connects are staggered so that a circular difference between indices of successive ingress ports equals a predetermined constant. The predetermined constant, denoted H, is preferably determined as $H = \lfloor (2 \times N + G)/(2 \times G) \rfloor$, G being a number of central switches of the switching system.

Preferably, each central switch is configured as a latent space switch. Any of the scalable latent switches disclosed in U.S. application Ser. No. 13/526,488 may be used.

The switching system supports up to N access switches. With the access switches indexed as 0 to (N−1), and the central switches indexed as 0 to (G−1), an access switch of index j, $0 \le j < N$, connects to an egress port of index j in each central switch and connects to an ingress port of index $(j + p \times H)_{modulo\ N}$, in a central switch of index p, $0 \le p < G$, H being the predetermined constant.

A latent switch employing an ascending transposing rotator incurs a normalized systematic delay of $(y-x)_{modulo\ N}$ for a path from an ingress port of index x to an egress port of index y, $0 \le x < N$, $0 \le y < N$, as indicated in FIG. 66. With each central switch configured as a latent switch with an ascending transposing rotator, a path from an access switch of index j to an access switch of index k, $0 \le j < N$, $0 \le k < N$, is preferably routed through a central switch incurring the minimum systematic delay, which is the central switch of an index π determined as $\pi = \lfloor (k-j-1)_{modulo\ N}/H \rfloor$. An access controller coupled to an access switch of index j is configured to select a central switch of index π for establishing a path to an access switch of index k. If the path does not have sufficient free capacity, central switches of indices $(\pi - q)_{modulo\ G}$, $1 \le q < G$, may be considered in the order $(\pi - 1)_{modulo\ G}$, $(\pi - 2)_{modulo\ G}$, ... $(\pi - G + 1)_{modulo\ G}$, for establishing the path.

A latent switch employing a descending transposing rotator incurs a normalized systematic delay of $(x-y)_{modulo\ N}$ for a path from an ingress port of index x to an egress port of index y, $0 \le x < N$, $0 \le y < N$, as indicated in FIG. 66. With each central switch configured as a latent switch having a descending transposing rotator, a path from an access switch of index j to an access switch of index k, $0 \le j < N$, $0 \le k < N$, is preferably routed through a central switch incurring the minimum systematic delay, which is the central switch of an index π determined as: $\pi = (G - \lfloor (j-k-1)_{modulo\ N}/H \rfloor)_{modulo\ G}$. An access controller coupled to an access switch of index j is configured to select a central switch of index π for establishing a path to an access switch of index k. If the path of least systematic delay does not have sufficient free capacity, central switches of indices $(\pi + q)_{modulo\ G}$, $1 \le q < G$, may be considered in the order $(\pi + 1)_{modulo\ G}$, $(\pi + 2)_{modulo\ G}$, ... $(\pi + G - 1)_{modulo\ G}$, for establishing the path.

Each access switch comprises an ingress switching mechanism having ν input ports and G output ports, G>1, ν≥1, and an egress switching mechanism having G input ports and ν output ports. An ingress switching mechanism may be configured as an instantaneous space switch or a rotating-access switch. Likewise, an egress switching mechanism may be configured as an instantaneous space switch or a rotating-access switch.

Each central switch is coupled to a respective master controller configured to receive routing requests from access switches, schedule data transfer through the central switch, and communicate data-transfer schedules to respective access switches initiating the requests. In a central switch implemented as a latent switch using a single rotator, the master controller may alternately connects to multiple outlets and multiple inlets of the single rotator for receiving upstream control data from the access switches and sending downstream control data to the access switches.

In accordance with another aspect, the invention provides a switching system having a plurality of central switches and a plurality of access switches, each central switch configured as a latent switch having N ingress ports indexed as 0 to (N−1) and N egress ports indexed as 0 to (N−1), N>2, where ingress ports of a same index connect to a respective access switch while the respective access switch connects to egress ports of different indices in different central switches. A circular difference between indices of successive egress ports to which an access switch connects preferably equals a predetermined constant. A path through any central switch from an ingress port of an index x to an egress port of index y, 0≤x<N, 0≤y<N, encounters a same delay. The switching system supports up to N access switches, indexed as 0 to (N−1). An access switch of index j, 0≤j<N, may connect to an ingress port of index j in each central switch and an egress port of index $(j+p \times H)_{modulo\ N}$, in central switch of index p, 0≤p<G.

With each central switch configured as a latent switch employing a single ascending transposing rotator, the normalized systematic delay of a path from an ingress port of index x to an egress port of index y, 0≤x<N, 0≤y<N is $(y-x)_{modulo\ N}$, and a central switch of index $\pi=(G-\lfloor(k-j-1)_{modulo\ N}/H\rfloor)_{modulo\ G}$ incurs the least systematic delay. An access controller of an access switch of index j may be configured to select a central switch of index π for establishing a path to an access switch of index k, 0≤j<N, 0≤k<N. If a path through the central switch of index π does not have sufficient free capacity, central switches of indices $(\pi+q)_{modulo\ G}$, 1≤q<G may be considered.

If each central switch is configured as a latent switch employing a single descending transposing rotator, the normalized systematic delay of a path from an ingress port of index x to an egress port of index y, 0≤x<N, 0≤y<N is $(x-y)_{modulo\ N}$, and a central switch of index $\pi=\lfloor(j-k-1)_{modulo\ N}/H\rfloor$ incurs the least systematic delay. An access controller of an access switch of index j may be configured to select a central switch of index π for establishing a path to an access switch of index k, 0≤j<N, 0≤k<N. If a path through the central switch of index π does not have sufficient free capacity, central switches of indices $(\pi-q)_{modulo\ G}$, 1≤q<G may be considered.

In accordance with a further aspect, the present invention provides a switching system having a plurality of access switches and a plurality of central switches where each central switch configured as a latent switch. With ingress ports of each central switch indexed sequentially and egress ports of each central switch indexed sequentially, ingress ports, of the central switches, having a same index connect to different access switches while egress ports, of the central switches, having a same index connect to a same access switch. The latent switches are configured to be functionally identical. Thus, with N ingress ports indexed as 0 to (N−1) and N egress ports indexed as 0 to (N−1), N>2, a path through any central switch from an ingress port of an index x to an egress port of index y, 0≤x<N, 0≤y<N, encounters a same delay.

The plurality of access switches contains N access switches, indexed as 0 to (N−1) and, according to a first connectivity scheme, an ingress port of index x, 0≤x<N, in central switch of index p, 0≤p<G, connects to an access switch of index $(x=p \times H)_{modulo\ N}$, H being a predetermined constant and G being a number of central switches of the switching system. An egress port of index y, 0≤y<N, in any central switch connects to an access switch of index y.

In accordance with a further aspect, the present invention provides a switching system having a plurality of access switches and a plurality of central switches where each central switch is configured as a latent switch. With ingress ports of each central switch indexed sequentially and egress ports of each central switch indexed sequentially, ingress ports, of the central switches, having a same index connect to a same access switch while egress ports, of the central switches, having a same index connect to different access switches. The latent switches are configured to be functionally identical. Thus, with N ingress ports indexed as 0 to (N−1) and N egress ports indexed as 0 to (N−1), N>2, a path through any central switch from an ingress port of an index x to an egress port of index y, 0≤x<N, 0≤y<N, encounters a same delay.

The plurality of access switches contains N access switches, indexed as 0 to (N−1) and, according to a second connectivity scheme, an ingress port of index x, 0≤x<N, in any central switch connects to an access switch of index x. An egress port of index y, 0≤y<N, in central switch of index p, 0≤p<G, connects to an access switch of index $(y-p \times H)_{modulo\ N}$, H being a predetermined constant and G being a number of central switches of the switching system.

BRIEF DESCRIPTION OF THE DRAWINGS

Embodiments of the present invention will be further described with reference to the accompanying exemplary drawings, in which:

FIG. 14 tabulates data-transfer timing of the two-phase single-rotator circulating switch of FIG. 10;

FIG. 24 tabulates data-transfer timing of a latent space switch of the type illustrated in FIG. 18 to FIG. 23, with an arbitrary number of switch elements and an arbitrary value of the order of transposed connections, in accordance with an embodiment of the present invention;

FIG. 34 tabulates data-transfer timing of a single-rotator latent space switch of the type illustrated in FIG. 25, FIG. 27, and FIG. 29, with an arbitrary number of switch elements and an arbitrary value of the order of transposed connections, in accordance with an embodiment of the present invention;

FIG. 35 tabulates data-transfer timing of a single-rotator latent space switch of the type illustrated in FIG. 25, FIG. 27, FIG. 29, FIG. 30, and FIG. 31, with an arbitrary number of switch elements and an arbitrary value of the order of transposed connections, with transposed connections from the outlets of the single rotator to the output ports of the single-rotator latent space switch, in accordance with an embodiment of the present invention;

FIG. 36 tabulates data-transfer timing of a single-rotator latent space switch of the type illustrated in FIG. 25, FIG. 27, and FIG. 29, but using a descending rotator, in accordance with an embodiment of the present invention;

FIG. 37 tabulates data-transfer timing of a single-rotator latent space switch of the type illustrated in FIG. 30 and FIG. 31, using a descending rotator, in accordance with an embodiment of the present invention;

FIG. 43 tabulates data-transfer timing of a single-rotator latent space switch with each transit memory device connected to a peer inlet-outlet pair, using an ascending or a descending rotator;

FIG. 56 illustrates settings of initial states of counters used to provide sequential READ-addresses of transit-memory devices for switch configurations employing an ascending rotator or a descending rotator and an up-counter or a down-counter, in accordance with an embodiment of the present invention;

FIG. 58 illustrates indices of upstream control time slots of a time frame organized in 2048 time slots at selected ingress ports of the single rotator of FIG. 54, where the single rotator is an ascending rotator;

FIG. 66 tabulates data-transfer timing of a single-rotator latent space switch of FIG. 64;

FIG. 82 illustrates the connectivity of access groups, illustrated in FIG. 79 and FIG. 80, in a tabular form;

FIG. 89 and FIG. 90 illustrate, in tabular forms, systematic delays of paths traversing each of the latent switches according to the connectivity schemes of the switching system of FIG. 87;

FIG. 92 illustrates systematic delays in a switching system having 64 central switches each implemented as a latent switch employing a transposing rotator having 2048 ingress ports and 2048 egress ports in accordance with an embodiment of the present invention.

DETAILED DESCRIPTION

Terminology

Figure 1:
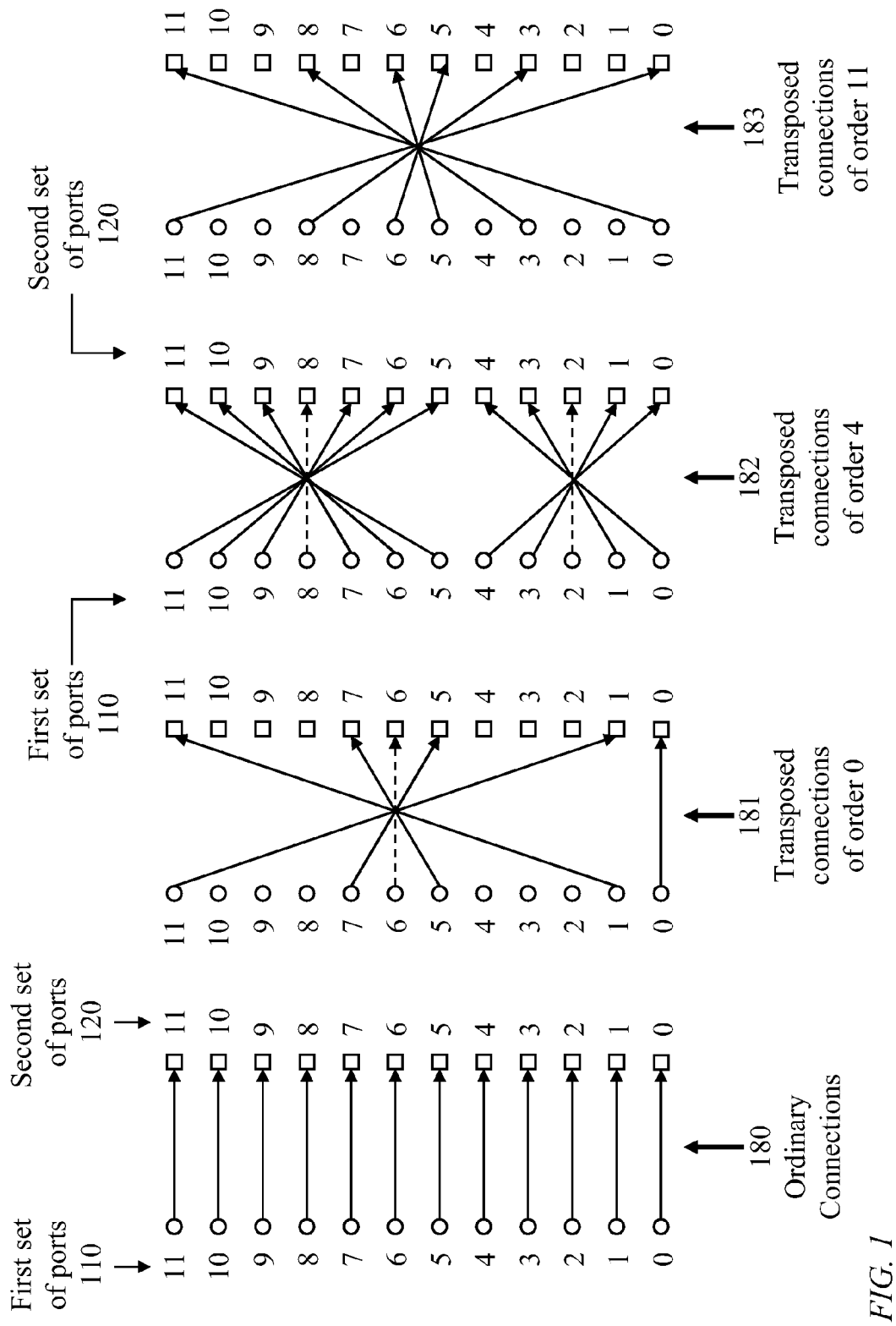
FIG. 1 illustrates ordinary and transposed connections used in switch configurations in accordance with an embodiment of the present invention.

Modulo operation: The operation X modulo W, herein denoted $X_{modulo\ W}$, or $|X|_W$, where X is any integer, which may be a positive integer or a negative integer, and W is a positive integer is a remainder determined as: $X_{modulo\ W} = X - W \times \lfloor X/W \rfloor$, where $\lfloor R \rfloor$ is the nearest integer that is less than R or equal to R if R is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$. Thus, $7_{modulo\ 8} = 7$, $(-7)_{modulo\ 8} = \{-7-(-1) \times 8\} = 1$, $8_{modulo\ 8} = 0$, $(-8)_{modulo\ 8} = 0$, $9_{modulo\ 8} = 1$, and $(-9)_{modulo\ 8} = 7$.

Circular sum: The circular sum of two arbitrary integers X and Y, with respect to a positive integer W, is defined as $(X+Y)_{modulo\ W}$ (i.e., $|X+Y|_W$). In the present application, a circular sum is determined with respect to a positive number N of inlets (or outlets) of a rotator. Thus, hereinafter, a circular sum is understood to be with respect to N. The circular sum is a non-negative integer between 0 and (N−1).

Circular difference: The circular difference between two arbitrary integers X and Y, with respect to a positive integer W, is defined as $(X-Y)_{modulo\ W}$ (i.e., $|X-Y|_W$). In the present application, a circular difference is determined with respect to a positive number N of inlets (or outlets) of a rotator. Thus, hereinafter, a circular difference is understood to be with respect to N and expressed simply in the form $|X-Y|$. Like the circular sum, a circular difference is a non-negative integer between 0 and (N−1).

Rotator: A rotator is a simple device having multiple inlets and multiple outlets. The rotator cyclically connects each inlet to each outlet during every rotation cycle. The rotator itself is not a switching device because it lacks the steering capability.

Uniform rotator: Consider a rotator having N inlets and N outlets with the N inlets indexed as inlets 0 to (N−1) and the N outlets indexed as outlets 0 to (N−1). During a rotation cycle of N time slots, each inlet connects to each outlet. A uniform rotator connects an inlet of index j to an outlet of index $k=(j+\beta \times t)_{modulo\ N}$, where β is either 1 or −1.

Transposing rotator: A transposing rotator connects an inlet of index j to an outlet of index k, $k=(L-j+\beta \times t)_{modulo\ N}$, where β is either 1 or −1, and L is a transposition order, 0≤L<N. Hereinafter, a rotator is considered uniform unless explicitly described as a transposing rotator.

Peer inlet-outlet pair: An inlet and an outlet of a same index are herein called a peer inlet-outlet pair or an aligned inlet-outlet pair.

Transposed inlet-outlet pair: Where the circular sum of indices of an inlet and an outlet equals a predefined transposition order L, 0≤L<N, the inlet and outlet are said to form a transposed inlet-outlet pair.

Instantaneous switch: An instantaneous switch is a space switch having a switching mechanism connecting multiple inputs to multiple outlets where any inlet may have a path of negligible delay to any outlet.

Latent Switch: A latent switch, also called a latent space switch, has a switching mechanism connecting multiple ingress ports to multiple egress ports where any ingress port may have a path incurring a systematic delay to any egress port. The systematic delay is independent of the intensity of data traffic and depends only on the configuration of the switching mechanism. The switching mechanism of the latent switch (latent space switch) considered in the present application comprises a single rotator coupled to a bank of transit memory devices and the systematic delay of a path from an ingress port to an egress port depends on the dimension of the rotator and the relative positions of a rotator inlet and a rotator outlet to which the ingress port and egress port connect. Hereinafter, the terms "latent switch" and "latent space switch" are used synonymously.

Normalized systematic delay: The systematic delay (also called "switching delay" or "systematic switching delay") of any of the latent switches disclosed in the present application depends on the number N of inlets or outlets of a respective rotator, and duration of a time slot which depends on memory access time. A normalized systematic delay is expressed as an integer representing a number of time slots. Hereinafter, whenever the systematic delay is expressed as an integer representing a number of time slots, it is understood to be a normalized systematic delay.

Time-Coherent switching: A process of switching signals from bufferless input ports of a switching device having bufferless input ports to output ports of the switching device is a time-coherent switching process. The signals may originate from geographically distributed sources and each source controls the timing of signal transmission so that a transmitted signal arrives at the switching device at an instant of time dictated by a controller of the switching device. A source need not be aware of the magnitude of the propagation delay along the path to the switching device. The controller of the switching device dictates the time at which signals are transmitted from respective distributed sources.

Time-coherent network: A network having a set of switching devices, each switching device in the set having bufferless input ports and enforcing time-coherent switching is herein referenced as a time-coherent network.

Edge node: A switching node connecting data sources and data sinks to external switching nodes is referenced as an edge node. An edge node may also switch data directly from a data source to a data sink.

Switch unit: A switching device having bufferless input ports receiving signals from a first group of edge nodes and output ports transmitting signals to a second group of edge nodes is hereinafter referenced as a switch unit. A switch unit may be implemented as a fast optical switch or an electronic space switch. The electronic space switch may have internal memory devices.

Upstream direction: The direction of signal flow from an edge node towards a switch unit is referenced as the upstream direction.

Downstream direction: The direction of signal flow from a switch unit towards an edge node is referenced as the downstream direction.

Master controller: A controller coupled to a switch unit is herein called a master controller. A master controller of a switch unit dictates the timing of transmission of signals from subtending edge nodes, hence the classification as a master controller.

Edge controller: A controller coupled to an edge node is herein referenced as an edge controller. An edge controller communicates with master controllers of switch units to which the edge node connects. The edge controller may also communicate with element controllers associated with switch elements of the edge node.

Master time indicator: A time indicator coupled to a master controller of a switch unit is herein referenced as a master time indicator. The master time indicator may be implemented as a cyclic C-bit-wide clock-driven time counter which resets to zero every $2^C$ clock intervals. The duration of a cycle of the time counter exceeds the round-trip propagation delay between any edge node and a switch unit to which the edge node connects. The master time indicators of all switch units in a time-coherent network are independent and functionally identical.

Edge time indicator: A time indicator coupled to an edge controller is herein referenced as an edge time indicator. An edge time indicator is functionally identical to a master time indicator.

Time locking: A process of adjusting sending times of signals from each outbound port of an edge node to a switch unit to which the each outbound port connects is a time-locking process.

Time-locked channel: A channel from an edge node to a switch unit, where the edge node is time-locked to the switch unit, is herein called a time-locked channel.

It is noted that a reference numeral may individually or collectively refer to items of a same type. A reference numeral may further be indexed to distinguish individual items of a same type.

Exemplary Edge-Node Structure

FIG. 1 illustrates ordinary and transposed connections of a first set of ports 110 having a number N>2 of ports and a second set of ports 120 having N ports; N equals 12 in the exemplary case of FIG. 1. The N ports of the first set are indexed as 0, 1, ..., (N−1), and the N ports of the second set are likewise indexed as 0, 1, ..., (N−1). Thus, the ports of the first set are individually identified as {110(0), 110(1), ..., (110(N−1)} and the ports of the second set are individually identified as {120(0), 120(1), ..., (120(N−1)}. The ports of the first set have one-to-one static connections to the ports of the second set. The first set of ports is said to have ordinary connections to the second set of ports if each port 110(j) is connected to a likewise indexed port 120(j), 0≤j<N. The first set of ports is said to have transposed connections of order L, 0≤L<N, to the second set of ports if each port 110(j) is connected to a port 120(k), k=|L−j|$_N$, 0≤j<N, 0≤L<N, where |X|$_N$ denotes $X_{modulo\ N}$, i.e., |X|$_N$=X, if X≥0, and |X|$_N$=(N+X), if X<0. Thus, |L−j|$_N$=L−j, if L≥j, and |L−j|$_N$=(N+L−j), if L<j.

Four connection patterns are illustrated in FIG. 1. In a first pattern 180, the first set of ports 110 has ordinary connections to the second set of ports 120. In a second pattern 181, the first set of ports 110 has transposed connections of order 0 to the second set of ports 120. In a third pattern 182, the first set of ports 110 has transposed connections of order 4 to the second set of ports 120. In a fourth pattern 183, the first set of ports 110 has transposed connections of order (N−1) to the second set of ports 120.

Single-Rotator Circulating Switch

Figure 2:
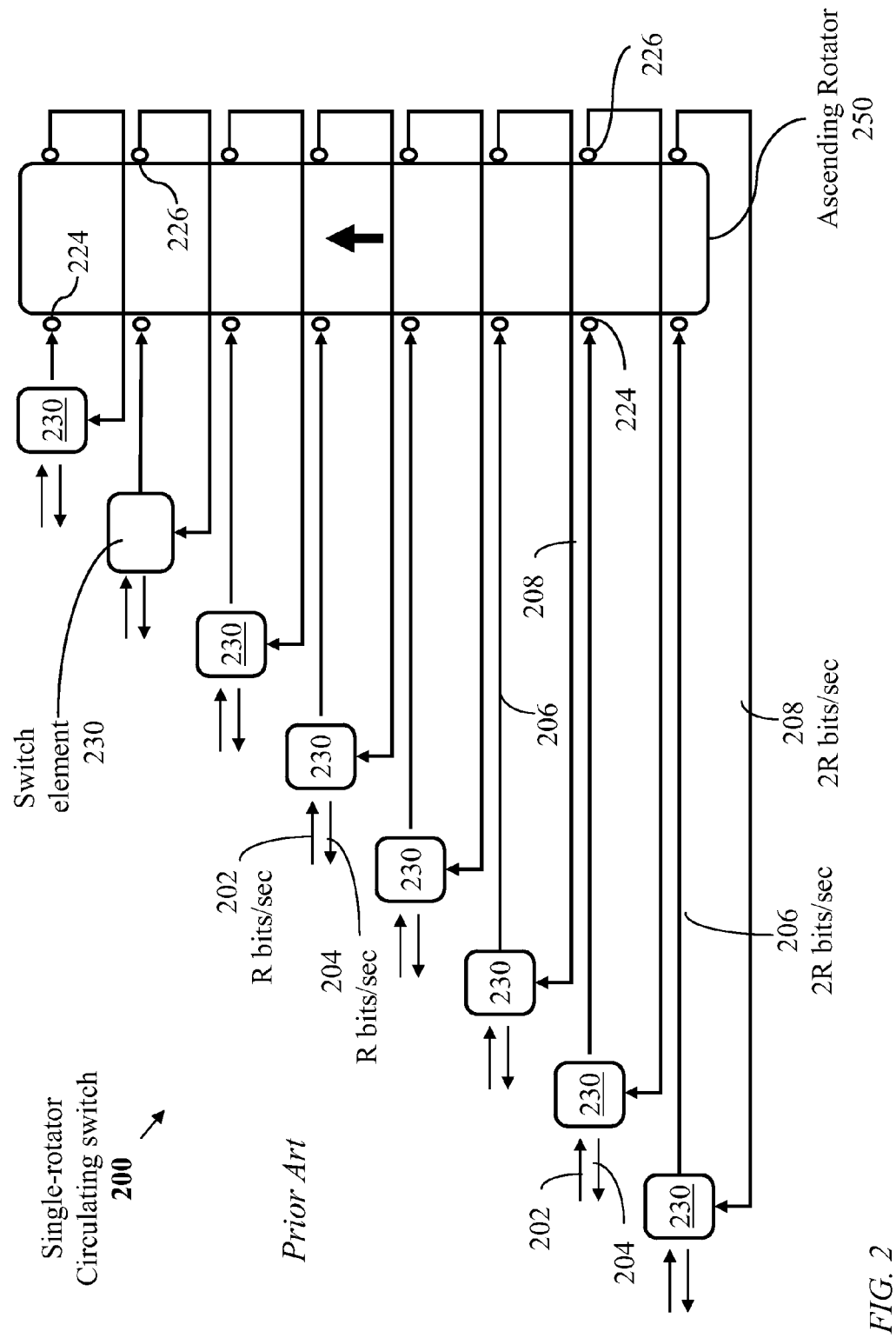
FIG. 2 illustrates a prior art single-rotator circulating switch which requires reordering of switched data segments of a data stream.

FIG. 2 illustrates an exemplary single-rotator circulating switch 200 disclosed in U.S. Pat. No. 7,567,556. Circulating switch 200 comprises eight switch elements 230 and a single rotator 250 having eight inlets 224 and eight outlets 226. Each switch element 230 receives data from data sources (not illustrated) through an ingress channel 202 and transmits data to data sinks (not illustrated) through an egress channel 204. Each switch element 230 connects to a respective inlet 224 of rotator 250 through an output channel 206 and connects to a respective outlet 226 of rotator 250 through an input channel 208. Each ingress channel 202 has a capacity R bits per second, each egress channel 204 has a capacity R, each output channel 206 has a capacity of 2R and each input channel 208 has a capacity of 2R. A typical value of R is 10 gigabits per second (Gb/s).

Switch elements 230 are individually identified by indices 0, 1, ..., (N−1), where N=8 in the exemplary circulating switch 200. An inlet 224 connecting to a switch element of index j, 0≤j<N is further identified by the index j as 224(j) and an outlet 226 connecting to a switch element of index j is further identified by the index j as 226(j). Thus the inlets 224 are referenced as 224(0) to 224(N−1) and the outlets 226 are referenced as 226(0) to 226(N−1). For brevity, a switch element 230 of index j may be referenced as switch element j, an inlet 224 of index j may be referenced as inlet j, and an outlet 226 of index j may be referenced as outlet j.

Rotator 250 may be an ascending rotator or a descending rotator. An ascending rotator 250 connects an inlet j to an outlet $\{j+t\}_{modulo\ N}$ during time slot t of a repetitive time frame organized into N time slots. A descending rotator 250 connects an inlet j to an outlet $\{j-t\}_{modulo\ N}$ during time slot t.

During time slot t, a switch element of index j may transfer data to a switch element $\chi=\{j+t\}_{modulo\ N}$ through an ascending rotator 250. Thus, $t=\{\chi-j\}_{modulo\ N}$. If the transferred data is destined to a switch element k, k≠χ, the data is held in switch element χ until inlet χ connects to outlet k. Thus, a data unit written in switch element χ during time slot t is transferred to switch element k during a time slot τ where $\tau=\{k-\chi\}_{modulo\ N}$, and the normalized delay D in transit switch element χ is determined as $D=\tau-t=(k+j-2\chi)_{modulo\ N}$. Thus, data transferred from switch element j to switch element k may be held in a transit switch element χ for a period of time determined by j, k, and χ. A transit switch element 230(χ) may be any switch element 230 other than the originating switch element 230(j) and the destination switch element 230(k). Data units of a data stream from switch element j to switch element k may use more than one transit switch element χ and because of the dependency of the delay D on the transit switch elements, the data units may not be received at switch element k in the order in which the data units were sent from switch element j. Thus, data reordering at a receiving switch element 230 is needed as described in the aforementioned U.S. Pat. No. 7,567,556.

Figure 3:
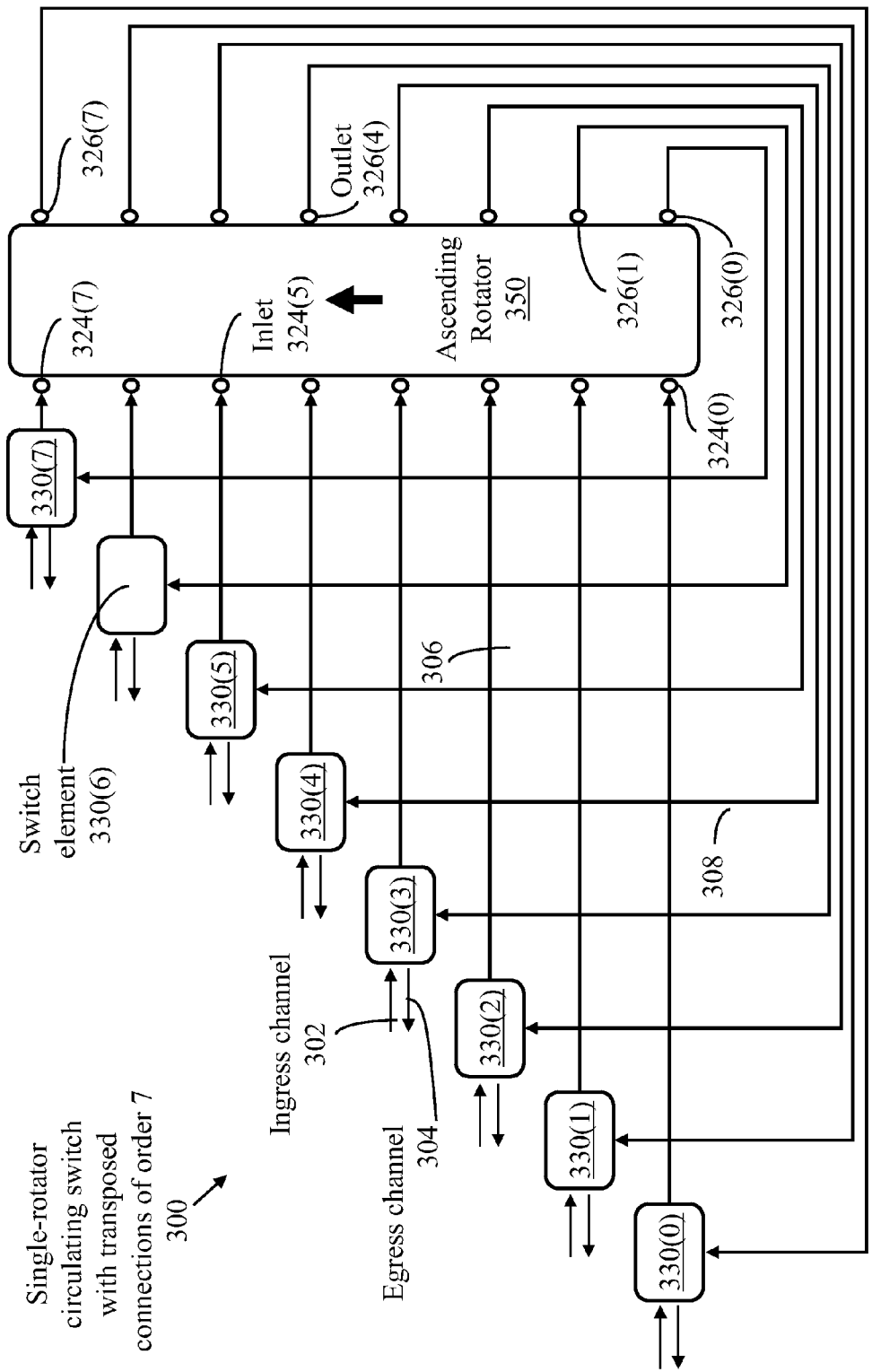
FIG. 3 illustrates a first configuration of a single-rotator circulating switch employing transposed connections for preserving sequential order of data segments of each data stream in accordance with an embodiment of the present invention.

FIG. 3 illustrates a first configuration 300 of a single-rotator circulating switch with transposed connections of switch elements 330 to a rotator 350 in order to preserve sequential order of data segments of each data stream. Circulating switch 300 comprises eight switch elements 330 and a single rotator 350 having eight inlets 324 and eight outlets 326. Each switch element 330 receives data from data sources (not illustrated) through an ingress channel 302 and transmits data to data sinks (not illustrated) through an egress channel 304. Each switch element 330 connects to a respective inlet 324 of rotator 250 through an output channel 306 and connects to a respective outlet 326 of rotator 350 through an input channel 308. Each ingress channel 302 has a capacity R, each egress channel 304 has a capacity R, each output channel 306 has a capacity of 2R and each input channel 308 has a capacity of 2R.

Switch elements 330 are individually identified by indices 0, 1, ..., (N−1), where N=8 in the exemplary circulating switch 300. An inlet 324 connecting to a switch element of index j, 0≤j<N is further identified by the index j as 324(j) and an outlet 326 connecting to a switch element of index j is further identified by the index j as 326(j). Thus the inlets 324 are referenced as 324(0) to 324(N−1) and the outlets 326 are referenced as 326(0) to 326(N−1).

Switch elements 330 have ordinary connections to inlets 324 where a switch element 330(j) connects to inlet 324(j), 0≤j<N. However, outlets 326 have transposed connections to switch elements 330 where an outlet 326(j) connects to switch element 330 of index $(L-j)_{modulo\ N}$, 0≤j<N, where L=7 in the exemplary network 300. The use of the transposed connections ensures proper sequential order of data segments of each data stream, where a data stream is defined according to an originating switch element 330 and a terminating switch element 330.

Figure 4:
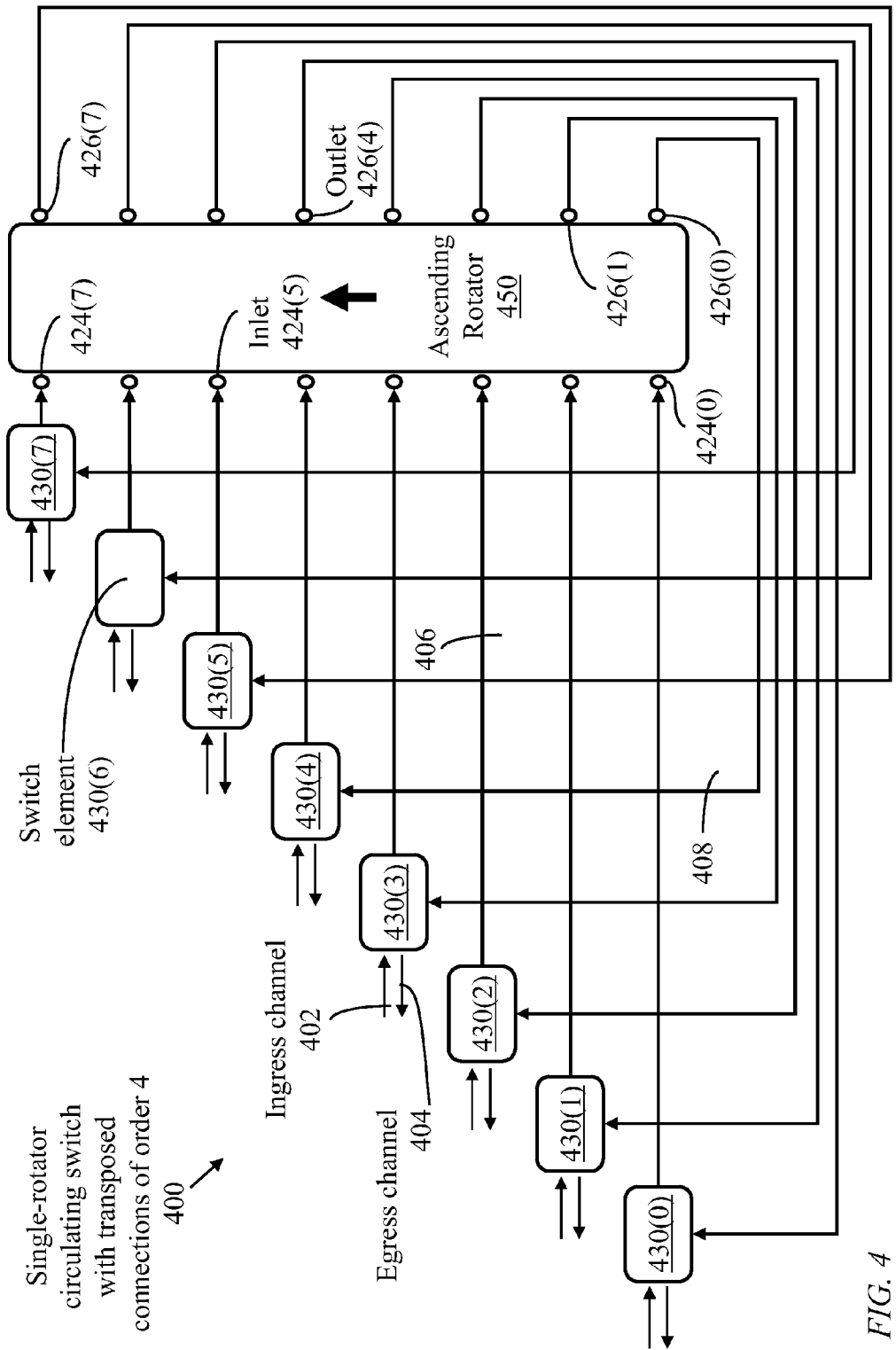
FIG. 4 illustrates a second configuration of a single-rotator circulating switch employing transposed connections for preserving sequential order of data segments of each data stream in accordance with an embodiment of the present invention.

FIG. 4 illustrates a configuration 400 of a single-rotator circulating switch in which switch elements 330 have ordinary connections to inlets 324 and transposed connections to outlets 326 of rotator 450. A switch element 330(j) connects to inlet 324 of index j, and connects to outlet 326 of index $(L-j)_{modulo\ N}$, 0≤j<N. N=8 and L=4 in configuration 400. Switch element 330(0) connects to inlets 324(0) and outlet 326(4). Switch element 330(7) connects to inlet 324(7) and outlet 326 of index $(4-7)_{modulo\ 8}$ which is index 5. The use of ordinary connections to inlets 324 and transposed connections to outlets 326 (or vice versa) ensures proper sequential order of data segments of each data stream.

Figure 5:
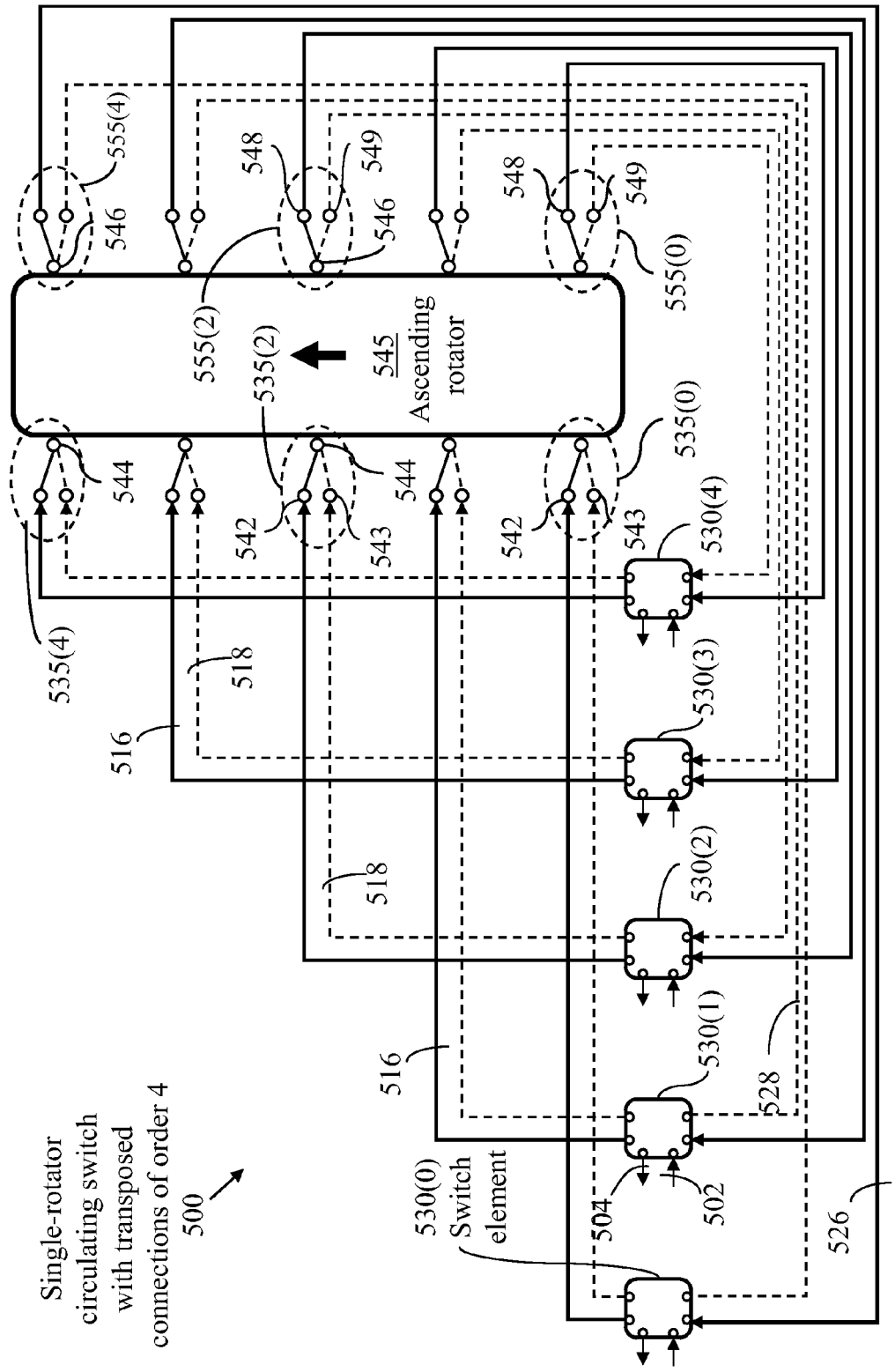
FIG. 5 illustrates a configuration of a single-rotator circulating switch employing transposed connections for preserving sequential order of data segments of each data stream, where switch elements connect to a single rotator through inlet selectors and outlet selectors, for use as an edge node, in accordance with an embodiment of the present invention.

FIG. 5 illustrates an exemplary single-rotator circulating switch 500 which comprises five switch elements 530 and a single rotator 545 having five inlets 544 and five outlets 546. Each switch element 530 receives data from data sources (not illustrated) through an external input channel 502 and transmits data to data sinks (not illustrated) through an external output channel 504. Each switch element 530 connects to a respective inlet 544 of rotator 545 through two internal output channels 516 and 518, and connects to a respective outlet 546 through two internal input channels 526 and 528. Each of external input channels 502, external output channels 504, internal output channels 516, 518, and internal input channels 526, 528 has the same capacity of R bits/second (for example R=10 Gb/s). Each switch unit 530 has an external input port for receiving data through external channel 502, an external output port for transmitting data through external channel 504, two internal output ports for transmitting data through internal output channels 516 and 518, and two internal input ports for receiving data through internal input channels 526 and 528. Each port of a switch unit may include a short buffer sufficient to hold one data unit (data segment).

An inlet selector 535 is provided at each inlet 544 and an output selector 555 is provided at each outlet 546. An inlet selector 535 has two inlet ports 542 and 543 alternately connecting one of two channels 516 and 518 originating from a respective switch element 530 to an inlet 544. An outlet selector 555 has two outlet ports 548 and 549 alternately connecting an outlet 546 to one of two channels 526 and 528 terminating on a respective switch element 530.

Switch elements 530 are individually identified by indices 0, 1, ..., (N−1), where N=8 in the exemplary circulating switch 500. In general, the number N of switch elements exceeds 2 and may have an upper bound dictated by transit delay. A practical upper bound of N would be of the order of 4000. An inlet 544 connecting to a switch element of index j, 0≤j<N is identified by the index j as 544(j) and an outlet 546 connecting to a switch element of index j is identified by the index j as 546(j).

The switch elements 530 have ordinary connections to the inlets 544 so that a switch element 530(j) connects to a selector 535 of inlet 544(j). The outlets 546 have transposed connections to the switch elements 530 so that a selector 555 of outlet $(L-j)_{modulo\ N}$ connects to switch element 530(j). In the exemplary configuration of FIG. 5, 0≤j<N, 0≤L<N, and L=4. For brevity, hereinafter, a switch element 530 of index j may be referenced as switch element j, an inlet 544 of index j may be referenced as inlet j, and an outlet 546 of index j may be referenced as outlet j.

Using an ascending rotator 545, inlet j connects to outlet $\chi$, where $\chi=\{j+t\}_{modulo\ N}$ during time slot t. Thus, $t=\{\chi-j\}_{modulo\ N}$. Outlet $\chi$ connects to switch element (L–$\chi$). During time slot t, switch element j may transfer data to a switch element (L–$\chi$). If the transferred data is destined to a switch element k, k≠$\chi$, the data is held in switch element (L–$\chi$) until inlet (L–$\chi$) connects to outlet (L–k), noting that outlet (L–k) connects to switch element k. Thus, a data unit written in switch element (L–$\chi$) during time slot t is transferred to outlet (L–k) during a time slot $\tau$ where $\tau=\{\chi-k\}_{modulo\ N}$. The normalized delay D in transit switch element $\chi$ is determined as $D=\tau-t=\{j-k\}_{modulo\ N}$. Thus, data transferred from switch element j to outlet k may be held in a transit switch element (L–$\chi$) for a period of time D which is independent of $\chi$ and determined only by j and k.

Data units of a data stream from switch element j to switch element k may use more than one transit switch element $\chi$ and because of the independence of the transit delay D of the transit switch element $\chi$ used, data units from switch element j are received at switch element k in the order in which the data units were sent from switch element j.

Notably, in the configuration of FIG. 5, switch element j connects to both inlet ports 542 and 543 of an inlet selector 535 of inlet j and switch element j connects to both outlet ports 548 and 549 of an outlet selector 555 of outlet (L–j). A data stream from switch element j to switch element k, 0≤j<N, 0≤k<N, k≠j, may be routed through either of two simple paths. A first simple path traverses a channel 516 to inlet j and a channel 526 from outlet (L–k) to switch element k. A second simple path traverses a channel 518 to inlet j and a channel 528 from outlet (L–k) to switch element k. The two simple connections take place during time slot $t=\{L-j-k\}_{modulo\ N}$. The data stream from switch element j to a switch element k may also be routed through either of two sets of compound paths. A path in the first set traverses a channel 516 from switch element j to inlet j, a channel 526 from an outlet $\chi$, 0≤$\chi$<N, $\chi$≠j, to switch element (L–$\chi$), a channel 516 from switch element (L–$\chi$) to inlet (L–$\chi$), and a channel 526 from outlet (L–k) to switch element k. A path in the second set traverses a channel 518 from switch element j to inlet j, a channel 528 from outlet $\chi$ to switch element (L–$\chi$), a channel 518 from switch element (L–$\chi$) to inlet (L–$\chi$), and a channel 528 from outlet (L–k) to switch element k. The transit delay D is determined as $D=\{j-k\}_{modulo\ N}$ for either of the two paths.

Figure 6:
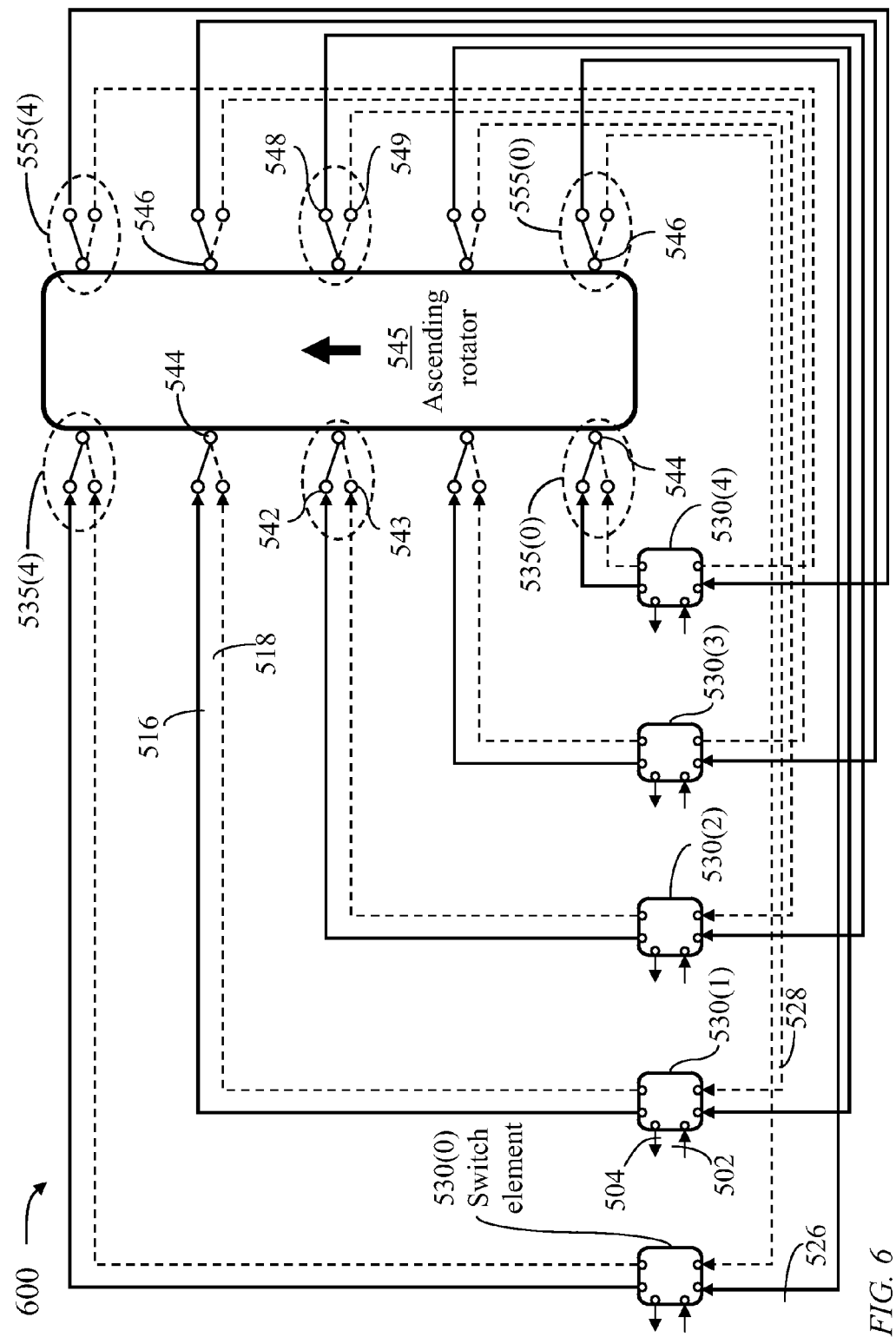
FIG. 6 illustrates an alternate configuration of the single-rotator circulating switch of FIG. 5, in accordance with an embodiment of the present invention.

FIG. 6 illustrates an alternate configuration 600 of the single-rotator circulating switch of FIG. 5 where the switch elements 530 have transposed connections to the inlets 544 so that a switch element 530(j) connects to a selector 535 of inlet 544 of index $(L-j)_{modulo\ N}$. In the exemplary configuration of FIG. 6, 0≤j<N, 0≤L<N, and L=4. The outlets 546 have ordinary connections to the switch elements 530 so that a selector 555 of outlet (j) connects to switch element 530(j).

Figure 7:
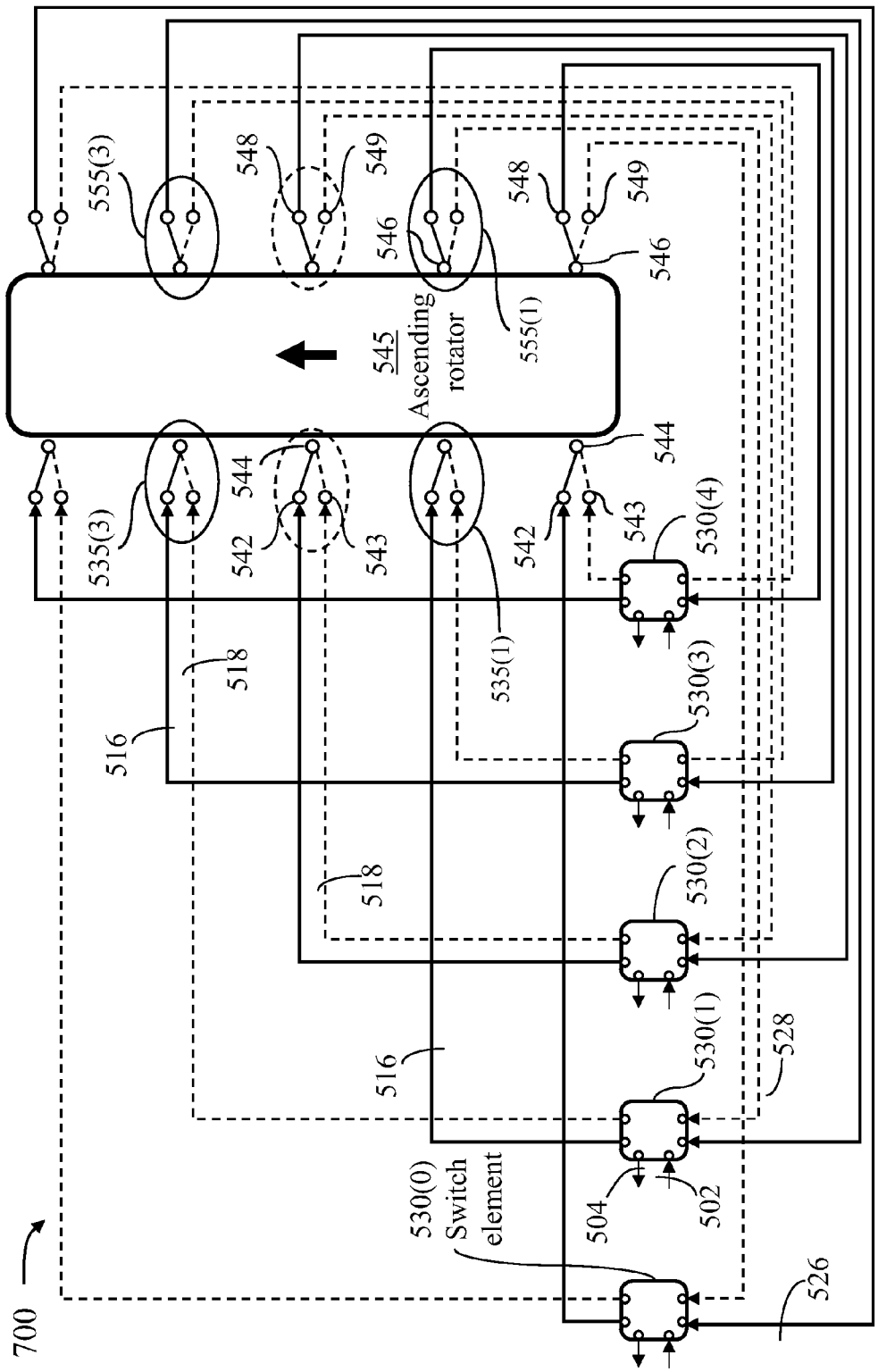
FIG. 7 illustrates a two-phase single-rotator circulating switch derived from the single-rotator circulating switch of FIG. 5 by rearranging switch-element connectivity to the inlet selectors and outlet selectors, in accordance with an embodiment of the present invention.

FIG. 7 illustrates a configuration 700 in which the switch elements 530 have ordinary connections to inlet ports 542 of inlet selectors 535 and transposed connections to inlet ports 543 of inlet selectors 535. Outlet ports 548 of outlet selectors 555 have transposed connections to the switch units 530 and outlet ports 549 of outlet selectors 555 have ordinary connections to the switch units 530. Thus, a switch element 530(j) connects to inlet port 542 of an inlet selector 535 of inlet 544(j) through a channel 516 and inlet port 543 of inlet selector 535 of inlet 544(j'), j'=|L−j|$_N$, where |L−j|$_N$ denotes $(L-j)_{modulo\ N}$, through a channel 518, 0≤j<N, N=5, L=4. Outlet port 548 of an outlet selector 555 of outlet 546(j) connects to switch element 530(j'), j'=|L−j|$_N$ through a channel 526 and outlet port 549 of an outlet selector of outlet 546(j) connects to switch element 530(j) through a channel 528.

A data stream from switch element j to switch element k, 0≤j<N, 0≤k<N, k≠j, may be routed through either of two simple paths. A first simple path traverses a channel 516 to inlet j and a channel 526 from outlet (L–k) to switch element k. A second simple path traverses a channel 518 to inlet (L–j) and a channel 528 from outlet k to switch element k. The first simple connection takes place during time slot $t=\{L-j-k\}_{modulo\ N}$ and the second simple connections takes place during time slot $t=\{j+k-L\}_{modulo\ N}$. The data stream from switch element j to a switch element k may also be routed through either of two sets of compound paths. A compound path in the first set traverses a channel 516 from switch element j to inlet j, a channel 526 from an outlet $\chi$, 0≤$\chi$<N, $\chi$≠j, to switch element (L–$\chi$), a channel 516 from switch element (L–$\chi$) to inlet (L–$\chi$), and a channel 526 from outlet (L–k) to switch element k. A compound path in the second set traverses a channel 518 from switch element j to inlet (L–j), a channel from an outlet $\chi$ to switch element (L–$\chi$), a channel 518 from switch element (L–$\chi$) to inlet $\chi$, and a channel 528 from outlet (L–k) to switch element k. The normalized transit delay is $D=\{j-k\}_{modulo\ N}$ for the first compound path and $D=\{k-j\}_{modulo\ N}$ for the second compound path. Thus configuration 700 provides two-phase paths for each pair of originating and destination switch units 530 and a controller of the originating switch element 530 may select a path of lower transit delay. The first set of compound path is preferred if $\{j-k\}_{modulo\ N}$ is less than $\lfloor(N+1)/2\rfloor$, where $\lfloor y \rfloor$ denotes the integer part of any real number y; otherwise the second set of compound paths is preferred. For example, with j=6 and k=0, any compound path in the first set of compound paths has a normalized transit delay $D_1=\{6-0\}_{modulo\ 8}$, i.e., 6 time slots, and any compound path in the second set of compound paths has a normalized transit delay $D_1=\{0-6\}_{modulo\ 8}$, i.e., 2 time slots.

Figure 8:
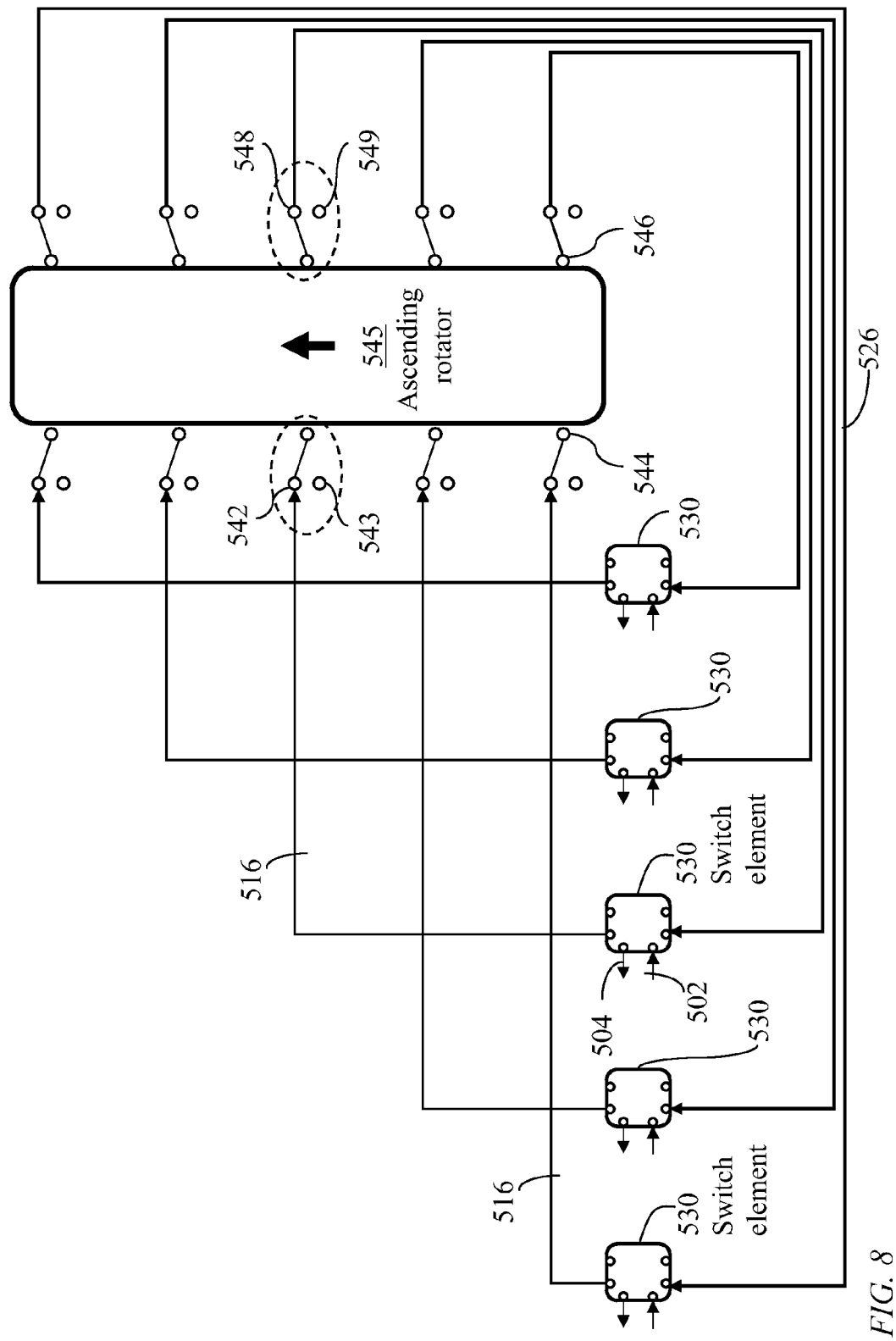
FIG. 8 illustrates connectivity of the two-phase single-rotator circulating switch of FIG. 7 during a first part of a time slot.

FIG. 8 illustrates a first connectivity pattern of the two-phase single-rotator circulating switch of FIG. 7 sustaining the first set of compound paths described above. The first connectivity pattern occurs during a first part of a time slot.

Figure 9:
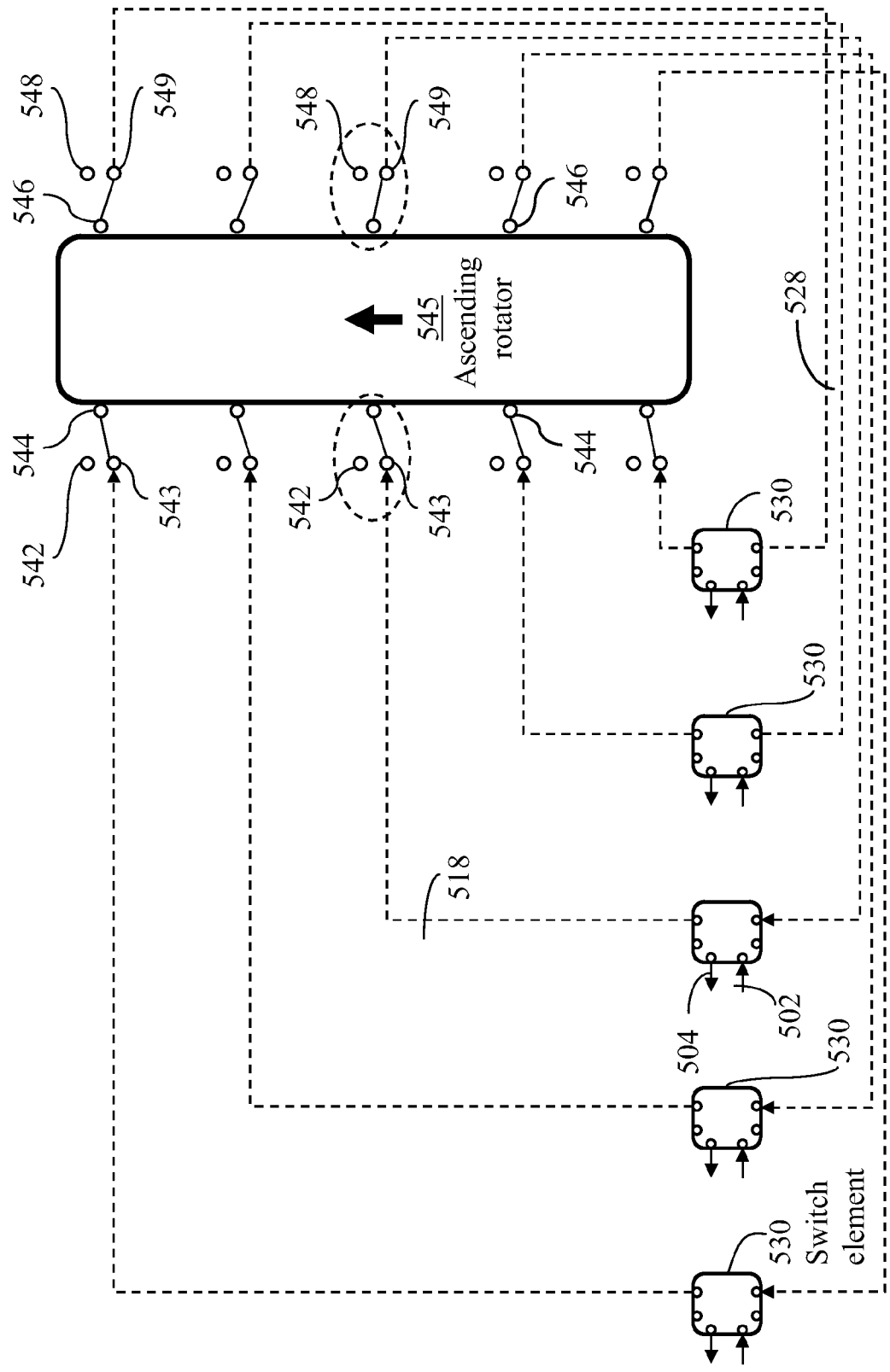
FIG. 9 illustrates connectivity of the two-phase single-rotator circulating switch of FIG. 7 during a second part of a time slot.

FIG. 9 illustrates a second connectivity pattern of the two-phase single-rotator circulating switch of FIG. 7 sustaining the second set of compound paths described above. The second connectivity pattern occurs during a second part of a time slot.

Figure 10:
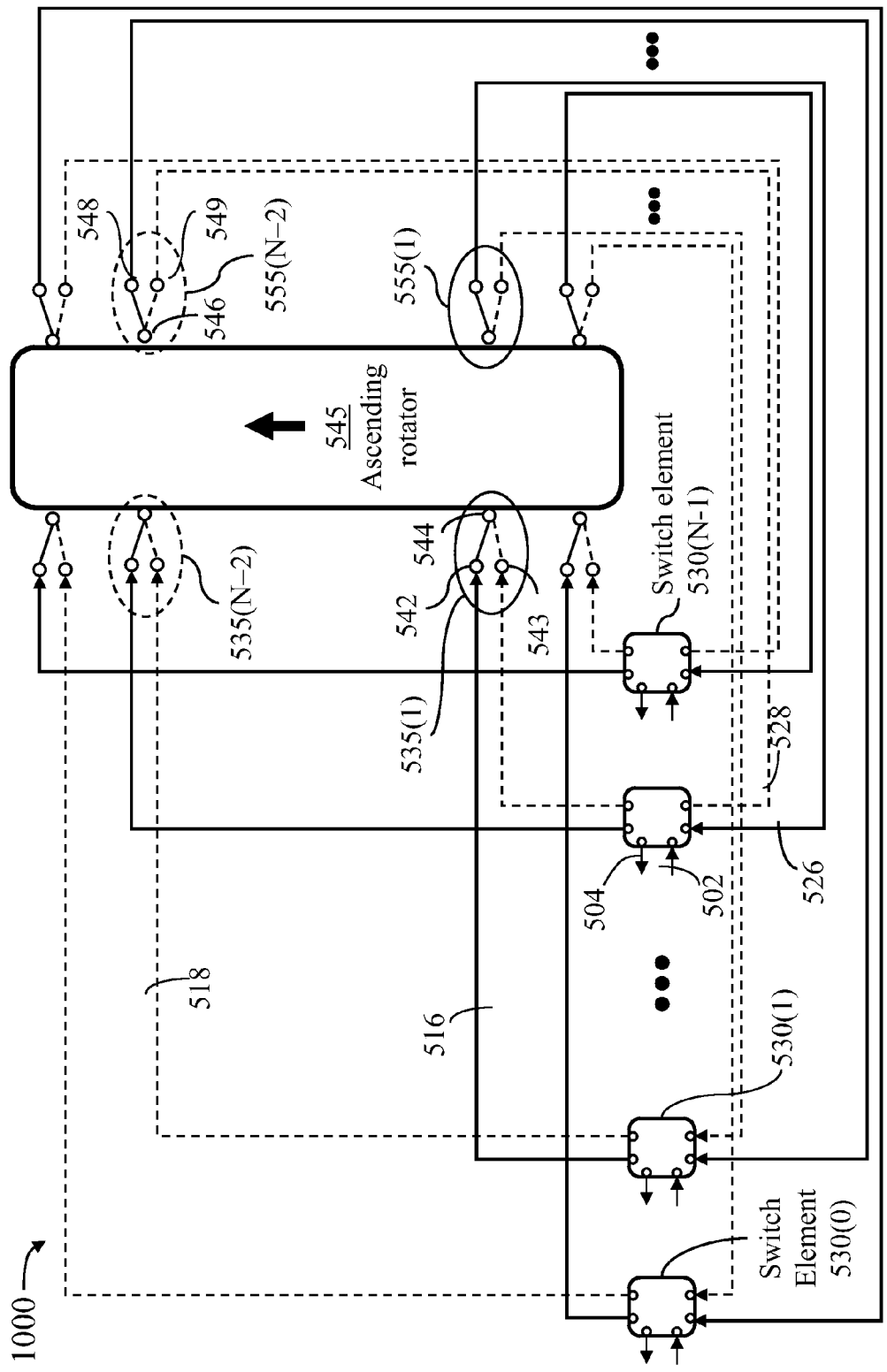
FIG. 10 illustrates a two-phase single-rotator circulating switch having an arbitrary number of switch elements and preserving sequential order of data segments of each data stream, in accordance with an embodiment of the present invention.

FIG. 10 illustrates a two-phase single-rotator circulating switch 1000 having an arbitrary number N>2 of switch elements 530 and preserving sequential order of data segments of each data stream. The N switch elements have ordinary connections to N inlet ports 542, transposed connections to N inlet ports 543, transposed connections from N outlet ports 548, and ordinary connections from outlet ports 549.

Figure 11:
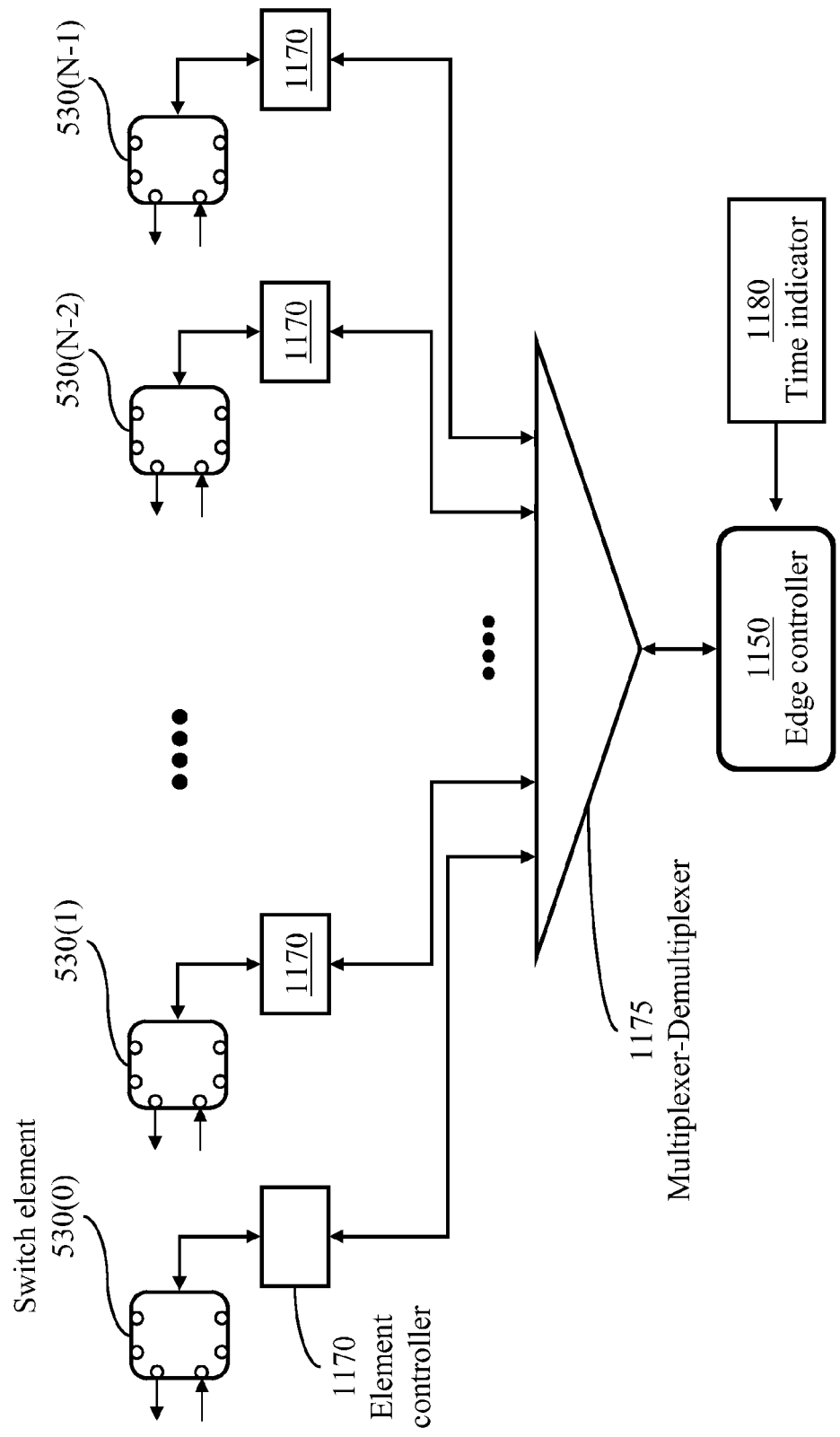
FIG. 11 illustrates a control system of the single-rotator circulating switch of FIG. 10.

FIG. 11 illustrates a control system of the single-rotator circulating switch of FIG. 10. Each switch element 530 has an element controller 1170 which communicates with an edge controller 1150. A control time frame is organized into N equal control time slots with each control time slot allocated to a respective switch-element controller 1170 for two-way communications with the edge controller 1150. A switch element controller 1170 may be allocated a specific control time slot for transmitting control signals to the edge controller 1150 and a different control time slot for receiving control signals from the edge controller. The edge controller 1150 is coupled to a time indicator 1180.

Figure 12:
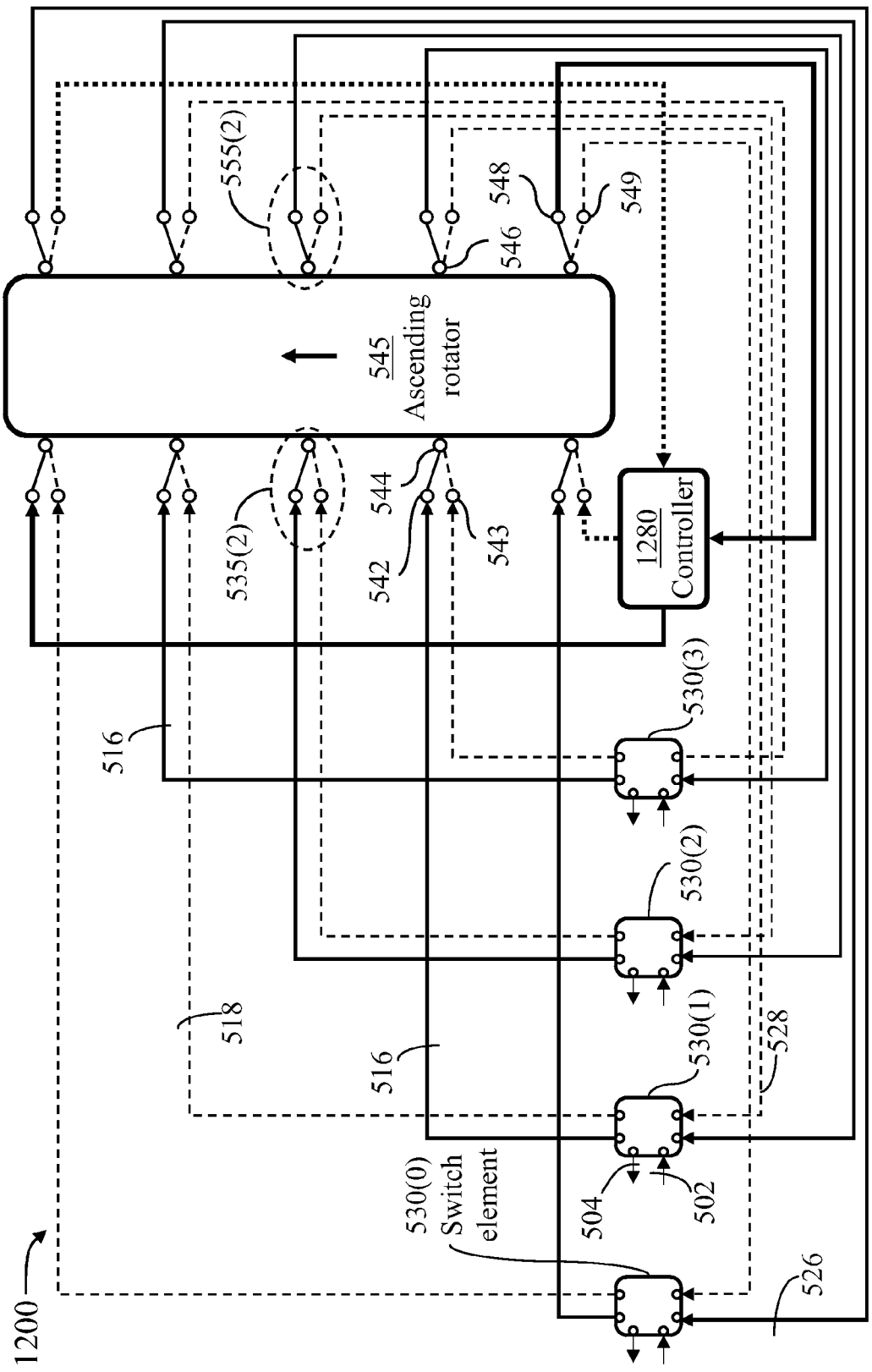
FIG. 12 illustrates a two-phase single-rotator circulating switch having transposed connections to a single rotator and employing a controller accessible through the single rotator, in accordance with an embodiment of the present invention.

FIG. 12 illustrates a two-phase single-rotator circulating switch 1200 having five switch elements 530 with transposed connections of order 4, and employing a controller 1280 accessible through the single rotator. Each switch element is allocated at least one time slot for communicating with the controller 1280.

Figure 13:
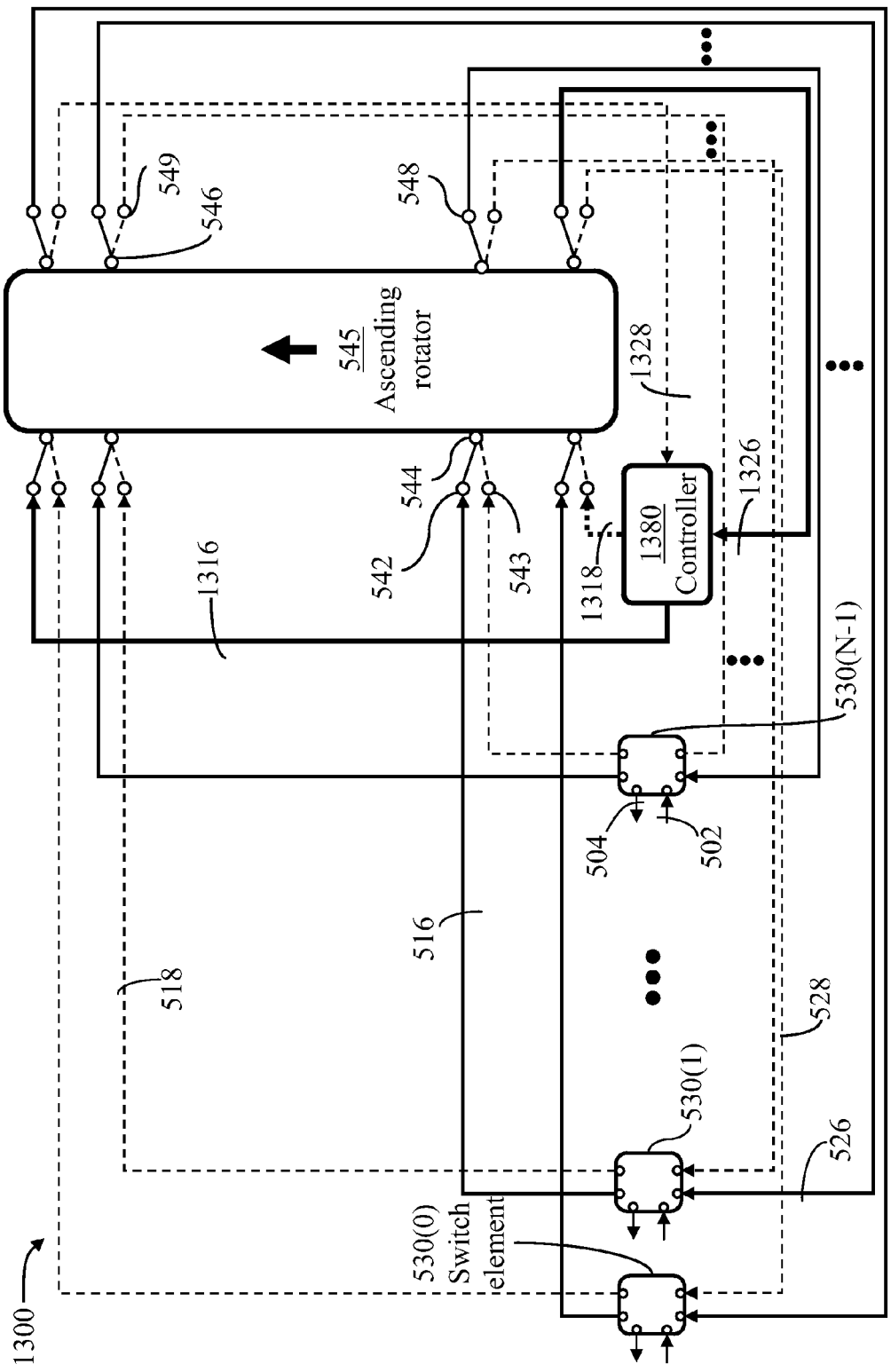
FIG. 13 illustrates a two-phase single-rotator circulating switch, with an arbitrary number of switch elements, having transposed connections to a single rotator and employing a controller accessible through the single rotator, in accordance with an embodiment of the present invention.

FIG. 13 illustrates a two-phase single-rotator circulating switch 1300 with an arbitrary number N>2 of switch elements having transposed connections of order L=(N−1) and employing a controller 1380 accessible through the single rotator. Controller 1380 has a channel 1316 to an input port 542 of an input selector of inlet 544 of index 7 and a channel 1318 to an input port 543 of a selector of inlet 544 of index 0. Controller 1380 has a channel 1326 from an output port 548 of an output selector of outlet 546 of index 0 and a channel 1328 from an output port 549 of a selector of outlet 546 of index 7. Each switch element is allocated at least one time slot for communicating with the controller 1380.

FIG. 14 tabulates data-transfer timing of the two-phase single-rotator circulating switch of FIG. 10. With static ordinary connections from the switch elements to single rotator and static transposed connections from the single rotator to the switch elements, a switch element j connects to inlet j (inlet port 542(j)). With an ascending rotator 545, inlet j connects to outlet $(j+t_1)$ during a first part of a time slot $t_1$, $0 \le t_1 < N$. Outlet $(j+t_1)$ connects to a transit (intermediate) switch element 530 of index $(L-(j+t_1))$. Switch element $(L-(j+t_1))$ has a channel to inlet port 542 of inlet $(L-(j+t_1))$. In order to reach destination switch element 530(k), transit data in switch element $(L-(j+t_1))$ is transferred from inlet $(L-(j+t_1))$ to outlet $(L-k)$ during a time slot $t_2=(L-k)-(L-(j+t_1))=(j-k+t_1)$. Thus, the normalized transit delay is $t_2-t_1=j-k$.

Likewise, with static transposed connections from the switch elements to single rotator and static ordinary connections from the single rotator to the switch elements, a switch element j connects to inlet $(L-j)$. With an ascending rotator 545, inlet $(L-j)$ connects to outlet $(L-j+t_1)$ during a first part of a time slot $t_1$, $0 \le t_1 < N$. Outlet $(L-j+t_1)$ connects to a transit (intermediate) switch element 530 of index $(L-j+t_1)$. Switch element $(L-j+t_1)$ has a channel to inlet port 542 of inlet $(j-t_1)$. In order to reach destination switch element 530(k), transit data in switch element $(L-j+t_1)$ is transferred from inlet $(j-t_1)$ to outlet k during a time slot $t_2=k-j+t_1$. Thus, the normalized transit delay is $t_2-t_1=k-j$.

During a rotation cycle, each inlet of rotator 545 connects to each outlet during a time slot of predefined duration. Thus, rotator 545 completes a rotation cycle of N time slots. Controller 1380 receives control signals from the switch elements 530, schedules exchange of data among the switch elements, and communicates data-transfer schedules to the switch elements 530. A scheduling time frame having a number Γ of time slots may be used to facilitate data-transfer scheduling. The number Γ is at least equal to the number N of rotator inlets which is also the number of time slots in a rotation cycle. To simplify communications between controller 1380 and individual controllers (not illustrated) of the switch elements 530, the switch elements may be allocated non-overlapping control time slots within the scheduling time frame. With a large value of N, 4096 for example, the number Γ of time slots in a scheduling time frame may be selected to equal the number N of time slots of the rotation cycle. However, the number Γ may be any arbitrary integer exceeding N, and may substantially exceed N.

Figure 15:
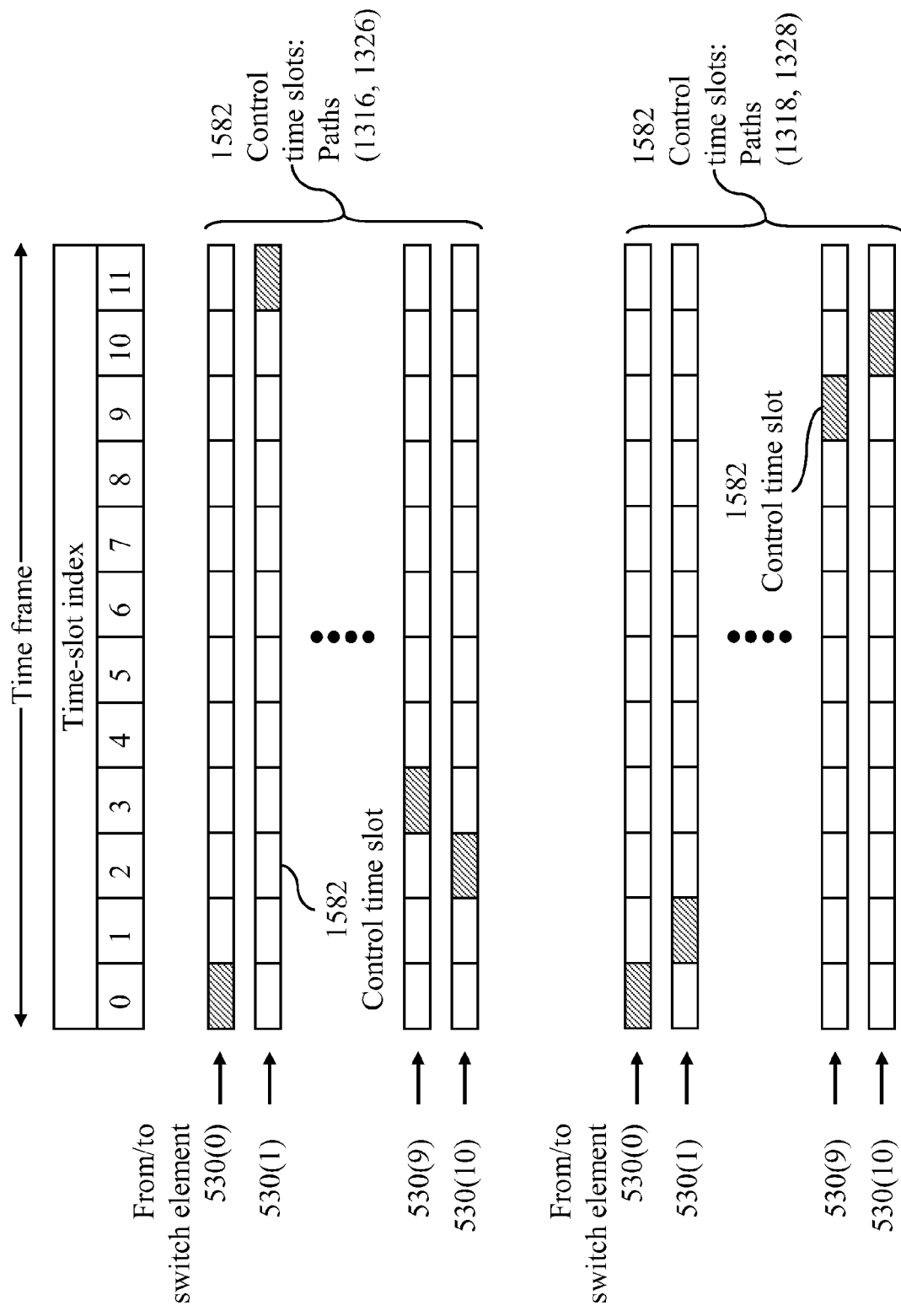
FIG. 15 illustrates allocation of control time slots for the two-phase single-rotator circulating switch of FIG. 14, in accordance with an embodiment of the present invention.

FIG. 15 illustrates an exemplary allocation of control time slots for the two-phase single-rotator circulating switch of FIG. 13 for a case where Γ=N=12. The controller 1380 has a channel 1316 to inlet 544(N−1), a channel 1318 to inlet 544(0), a channel 1326 from outlet 546(0), and a channel 1328 from outlet 546(N−1). Controller 1360 replaces switch element 530(N−1). Each switch element 530(j), $0 \le j < (N-2)$, has a first path to controller 1380 traversing channels 516 and 1326, and a second path traversing channels 518 and 1328. Controller 1380 has a first path to a switch element 530(j), $0 \le j < (N-2)$, traversing channels 1316 and 526, and a second path traversing channels 1318 and 528. As illustrated in FIG. 14, a switch element 530(j) has a first path to a switch element 530 of index $\{L-j-t_1\}_{modulo\ N}$, and a second path to a switch element 530 of index $\{L-j+t_1\}_{modulo\ N}$, during a time slot $t_1$, $0 \le t_1 < N$.

The time slot τ during which the first path from switch element 530(j) to the controller 1380 is established is determined from $\{L-j-\tau\}_{modulo\ N}=(N-1)$. The configuration of FIG. 13 uses transposed connections of order L=(N−1). Thus, $\tau=\{-j\}_{modulo\ N}=(N-j)$. The time slot ξ during which the second path from switch element 530(j) to the controller 1380 is established is determined from $\{L-j+\xi\}_{modulo\ N}=(N-1)$. Thus, ξ=j. Time slot τ is allocated as a control time slot 1582 and time slot ξ is allocated as a control time slot for switch element 530(j). Thus, switch elements 530(0), 530(1), 530(2) . . . , 530(N−3), and 530(N−2), have paths through channels 516 and 526 to the controller 1380, during control time slots 1582 of indices 0, (N−1), (N−2), . . . , 3, and 2, respectively, and paths through channels 518 and 528 to the controller 1380 during control time slots 1584 of indices 0, 1, 2, . . . , (N−2), and (N−1), respectively.

Single-Rotator Latent-Space Switch

Figure 16:
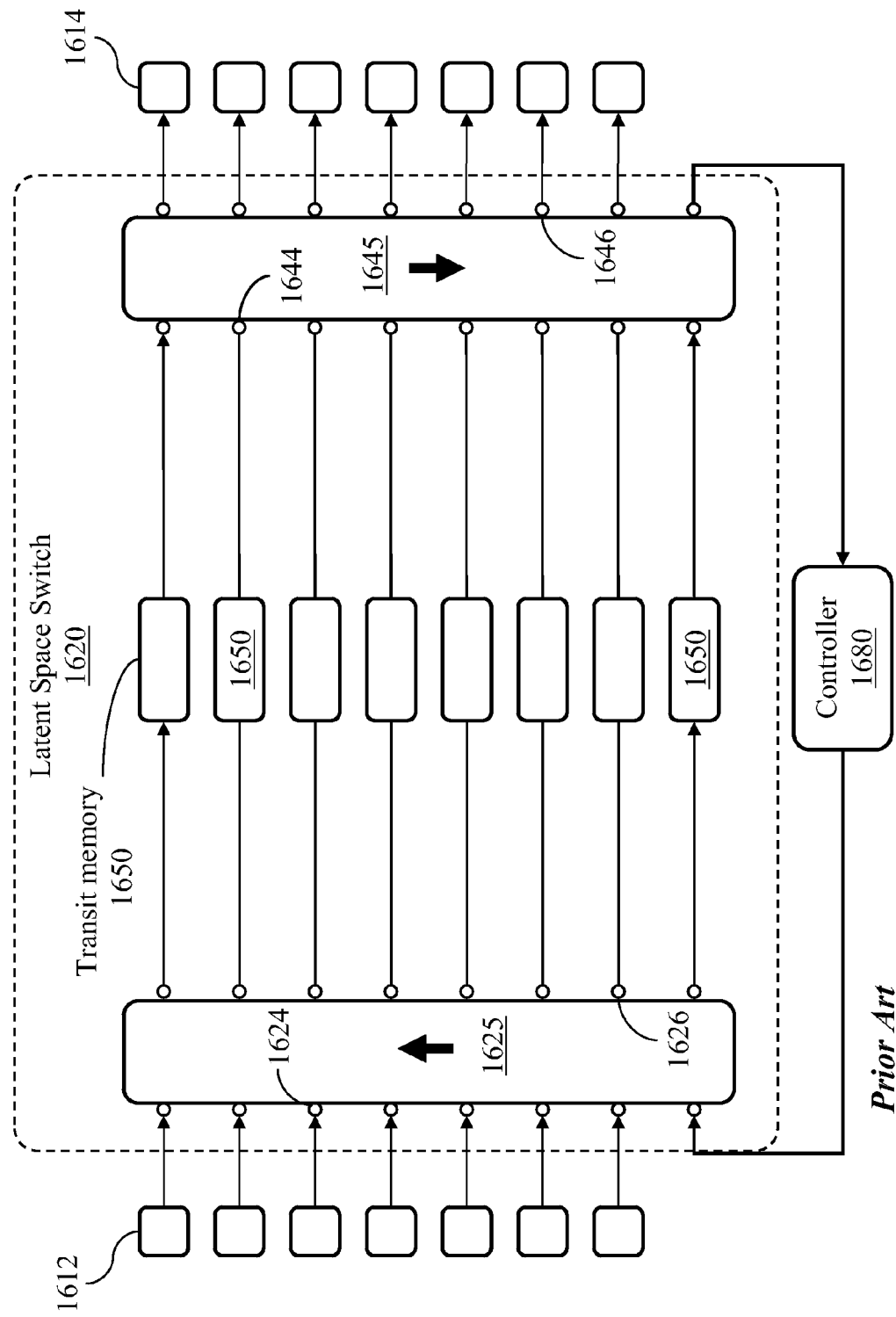
FIG. 16 illustrates a prior art latent space switch comprising a bank of transit memory devices between a first rotator and a second rotator and a controller connecting to an inlet of the first rotator and an outlet of the second rotator, where the first and second rotators are of opposite rotation directions so that the switching delay for a connection is independent of the transit memory device used.

FIG. 16 illustrates a known rotating access packet switch (U.S. Pat. Nos. 5,168,492, 5,745,486, and 7,639,678) comprising a latent space switch 1620, input buffers 1612 and output buffers 1614. The latent space switch 1620 comprises an input rotator 1625 having N inlets 1624 and N outlets 1626 and an output rotator 1645 having N inlets 1644 and N outlets 1646; N=8 in the illustrated exemplary rotating-access switch. A bank of N transit memory devices 1650 connects to the N outlets 1626 of input rotators 1625 and N inlets 1644 of output rotator 1645. A controller 1680 is connected to an outlet 1646 of output rotator 1645 and an inlet 1624 of input rotator 1625 leaving (N−1) inlets 1624 of input rotator 1625 to connect to (N−1) input buffers 1612 and (N−1) outlets 1646 of output rotator 1645 to connect to (N−1) output buffers 1614. One of the two rotators 1625 and 1645 is an ascending rotator and the other is a descending rotator. The input buffers are individually identified as 1612(j), $1 \le j < N$. Likewise output buffers 1614 are individually identified as 1614(j), $1 \le j < N$, and transit memory devices 1650 are individually identified as 1650(j), $0 \le j < N$. During a time slot t in a repetitive time frame having N time slots, input rotator 1625 connects inlet 1624(j) to transit memory device $\{j+\beta \times t\}_{modulo\ N}$, and output rotator 1645 connects transit memory device 1650(j) to an outlet 1646 of index $(j-\beta \times t)_{modulo\ N}$, where β=1 if rotator 1625 is an ascending rotator and rotator 1645 is a descending rotator and β=−1 if rotator 1625 is a descending rotator and rotator 1645 is an ascending rotator. A data unit transferred from an input buffer 1612(j) to an output buffer 1614(k) through any transit memory device 1650 is delayed in the transit memory device 1650 for a period of $\{j-k\}_{modulo\ N}$ time slots, if rotator 1625 is an ascending rotator and rotator 1645 is a descending rotator, or delayed for a period of $\{k-j\}_{modulo\ N}$ time slots, if rotator 1625 is a descending rotator and rotator 1645 is an ascending rotator.

Figure 17:
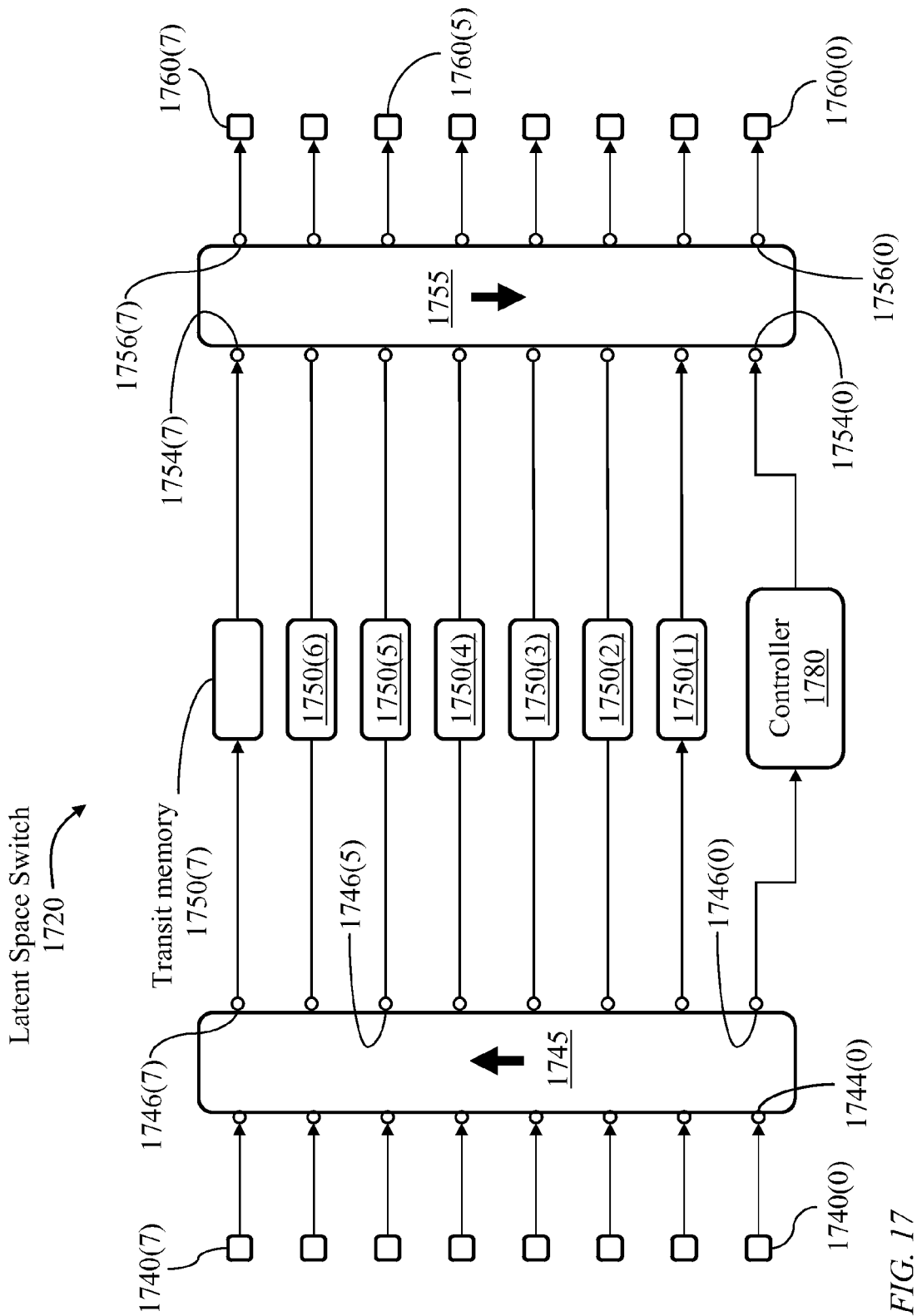
FIG. 17 illustrates a latent space switch comprising a bank of transit memory devices between a first rotator and a second rotator and a controller connecting to an outlet of the first rotator and an inlet of the second rotator, where the first and second rotators are of opposite rotation directions so that the switching delay for a connection is independent of the transit memory device used, in accordance with an embodiment of the present invention.

FIG. 17 illustrates a latent space switch 1720 comprising an input rotator 1745 having N inlets 1744 and N outlets 1746 and an output rotator 1755 having N inlets 1754 and N outlets 1756; N=8 in the illustrated latent space switch. A bank of (N−1) transit memory devices 1750 connects to (N−1) outlets 1746 of input rotator 1745 and (N−1) inlets 1754 of output rotator 1755. A controller 1780 is connected to an outlet 1746 of input rotator 1745 and an inlet 1754 of output rotator 1755. As in latent-space switch 1620, one of the two rotators 1745 and 1755 is an ascending rotator and the other is a descending rotator. The inlets 1744 are individually identified as 1744($j$), $0 \le j < N$. Likewise outlets 1756 are individually identified as 1756($j$) and transit memory devices 1750 are individually identified as 1750($j$), $1 \le j < N$. During a time slot t in a repetitive time frame having N time slots, input rotator 1745 connects inlet 1744($j$) to an outlet 1746 of index $\{j+\beta \times t\}_{modulo\ N}$, and output rotator 1755 connects inlet 1754($j$) to outlet 1756($k$), $k = \{j - \beta \times t\}_{modulo\ N}$, where $\beta = 1$ if rotator 1745 is an ascending rotator and rotator 1755 is a descending rotator and $\beta = -1$ if rotator 1745 is a descending rotator and rotator 1755 is an ascending rotator. A data unit transferred from an inlet 1744($j$) to an outlet 1756($k$) through any transit memory device 1750 is delayed in the transit memory device 1750 for a period of $\{j-k\}_{modulo\ N}$ time slots, if rotator 1745 is an ascending rotator and rotator 1755 is a descending rotator, or delayed for a period of $\{k-j\}_{modulo\ N}$ time slots, if rotator 1745 is a descending rotator and rotator 1745 is an ascending rotator.

An ingress port 1740 connecting to inlet 1744 dedicates a time slot within the time frame for receiving control signals from respective external sources and transferring the control signals to controller 1780. An egress port 1760 connecting to an outlet 1756 dedicates a time slot within the time frame for transmitting control signals from controller 1780 to respective external sinks.

Latent space switch 1620 uses N transit memory devices 1650 and supports (N−1) ingress ports and (N−1) egress ports. A control data unit transferred from an ingress port to controller 1680 is first written in a transit memory device 1650 then transferred to controller 1680. A control data unit transferred from controller 1680 to an egress port is first written in a transit memory device 1650 then transferred to the egress port. Latent space switch 1720 uses (N−1) transit memory devices 1750, supports N ingress ports and N egress ports, and simplifies access to the controller 1780.

During a first part of a time slot, data is transferred from inlets 1744 to controller 1780 and to transit memory devices 1750 through input rotator 1745. During a second part of the time slot, data is transferred from controller 1780 and transit memory devices 1750 to outlets 1756 through output rotator 1755. The two rotators 1745 and 1755 may, therefore, be replaced by a single rotator. However, rotators 1745 and 1755 should rotate in opposite directions, one being an ascending rotator and the other a descending rotator, in order to guarantee a transit delay for a path from an inlet 1744($j$) to an outlet 1756($k$) which is independent of the transit memory device 1750 used and depends only on the indices j and k.

A single rotator may be devised to be an ascending rotator during a first part of each time slot and a descending rotator during a second part of each time slot. Preferably, in accordance with an embodiment of the present invention, the connectivity of the transit memory devices to the input side and output side of a single rotator rotating in one direction, either ascending or descending, may be configured to realize delay independence of the transit memory devices traversed by a data stream.

Figure 18:
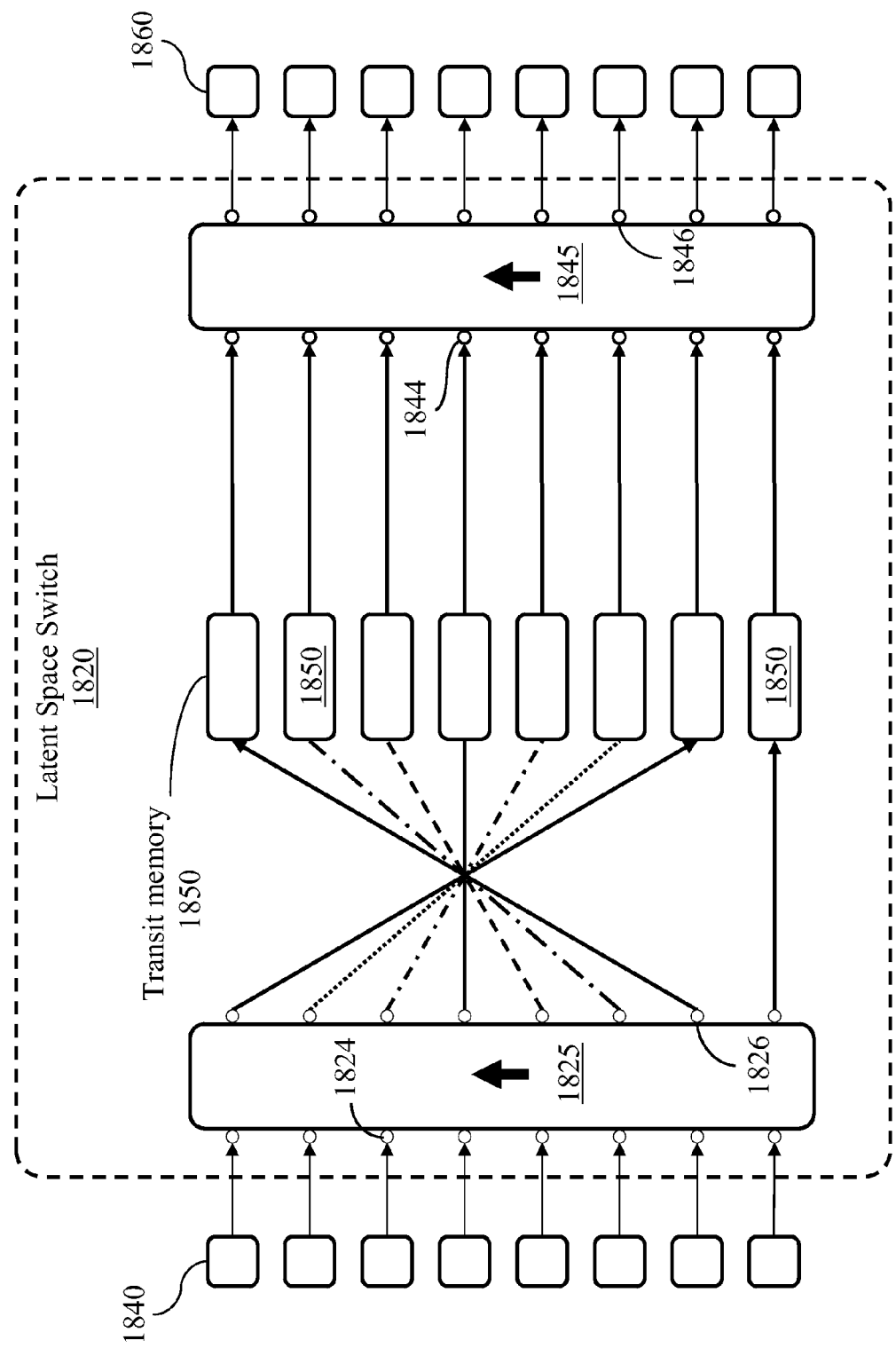
FIG. 18 illustrates a latent space switch comprising a first ascending rotator having transposed connections of order 0 to a bank of eight transit memory devices with the bank of transit memory devices having ordinary connection to a second ascending rotator, so that the switching delay for a connection is independent of the transit memory device used, in accordance with an embodiment of the present invention.

FIG. 18 illustrates a latent space switch 1820 comprising a first ascending rotator 1825 having eight inlets 1824 and eight outlets 1826, a bank of eight transit memory devices 1850, and a second ascending rotator 1845 having eight inlets 1844 and eight outlets 1846. The eight outlets 1826 of the first ascending rotator have static transposed connections of order 0 to the bank of transit memory devices 1850, and the bank of transit memory devices 1850 has ordinary connection to the inlets 1844 of the second ascending rotator. The inlets 1824 of the first ascending rotator may have ordinary connections to ingress ports 1840 and the outlets 1846 of the second ascending rotator may have ordinary connections to egress ports 1860.

An inlet 1824($j$) of the first ascending rotator connects to outlet 1826($|j+t_1|$), where $|j+t_1|$ denotes $(j+t_1)_{modulo\ N}$, during a time slot $t_1$, $0 \le t_1 < N$. Outlet 1826($|j+t_1|$) connects to a transit memory device 1850($|L-(j+t_1)|$). Transit memory device 1850 of index $|L-(j+t_1)|$ connects to inlet 1844($|L-(j+t_1)|$) of the second ascending rotator. In order to reach outlet 1846($k$) of the second ascending rotator, transit data in transit memory device 1850 of index $|L-(j+t_1)|$ is transferred from inlet 1844 of index $|L-(j+t_1)|$ to outlet 1846($k$) during a time slot $t_2 = |k-(L-(j+t_1))| = |j+k-L+t_1|$. Thus, the normalized transit delay is $t_2 - t_1 = |j+k-L|$, which is independent of the transit memory device used. The transit delay depends on the indices j and k of the ingress and egress ports and the order L, $0 \le L < N$, of the transposed connection, which is a fixed parameter for a specific configuration of a latent space switch 1820. The value of L is 0 in the configuration of FIG. 18.

To render the delay from an ingress port 1840($j$) to an egress port 1860($k$), $0 \le j < N$, $0 \le k < N$, independent of the transposition order L, the outlets 1846 of the second ascending rotator may have transposed connections of the same order L to the egress ports. Thus, in order to reach egress port 1860($k$), transit data in transit memory device 1850 of index $|L-(j+t_1)|$ is transferred from inlet 1844 of index $|L-(j+t_1)|$ to outlet 1846 of index $|L-k|$ during a time slot $t_2 = |(L-k)-(L-(j+t_1))| = |j-k+t_1|$, and the normalized transit delay is $t_2-t_1 = |j-k|$, which is independent of the transposition order L.

Figure 19:
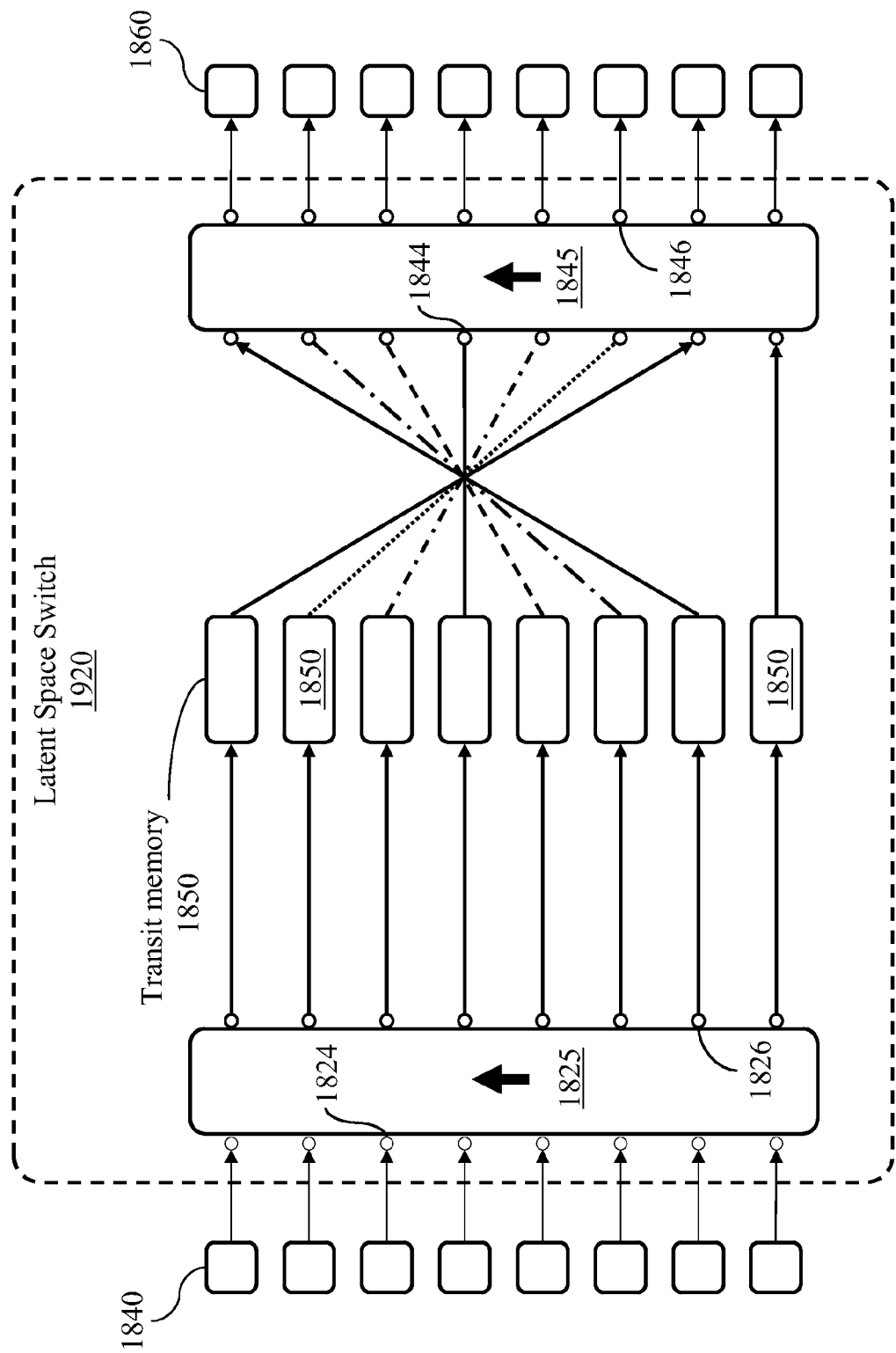
FIG. 19 illustrates a latent space switch comprising a first ascending rotator having ordinary connections to a bank of eight transit memory devices with the bank of transit memory devices having transposed connections of order 0 to a second ascending rotator, so that the switching delay for a connection is independent of the transit memory device used, in accordance with an embodiment of the present invention.

FIG. 19 illustrates a latent space switch 1920 comprising a first ascending rotator 1825 having eight inlets 1824 and eight outlets 1826, a bank of eight transit memory devices 1850, and a second ascending rotator 1845 having eight inlets 1844 and eight outlets 1846. The eight outlets 1826 of the first ascending rotator have static ordinary connections to the bank of transit memory devices 1850, and the bank of transit memory devices 1850 has transposed connections to the inlets 1844 of the second ascending rotator. The inlets 1824 of the first ascending rotator may have ordinary connections from ingress ports 1840 and the outlets 1846 of the second ascending rotator may have ordinary connections to egress ports 1860.

An inlet 1824($j$) of the first ascending rotator connects to outlet 1826 of index $|j+t_1|$ during a time slot $t_1$, $0 \le t_1 < N$. Outlet 1826 of index $|j+t_1|$ connects to a transit memory device 1850 of index $|j+t_1|$. Transit memory device 1850 of index $|j+t_1|$ connects to inlet 1844 of index $|L-(j+t_1)|$ of the second ascending rotator. In order to reach outlet 1846($k$), transit data in transit memory device 1850 of index $|j+t_1|$ is transferred from inlet 1844 of index $|L-(j+t_1)|$ to outlet 1846($k$) during a time slot $t_2 = |k-(L-(j+t_1))| = |j+k-L+t_1|$. Thus, the normalized transit delay is $t_2-t_1 = |j+k-L|$. The value of L is 0 in the configuration of FIG. 19.

To render the delay from an ingress port 1840($j$) to an egress port 1860($k$), $0 \le j < N$, $0 \le k < N$, independent of the transposition order L, the outlets 1846 of the second ascending rotator may have transposed connections of the same order L to the egress ports 1860, resulting in a transit delay of $|j-k|$.

Figure 20:
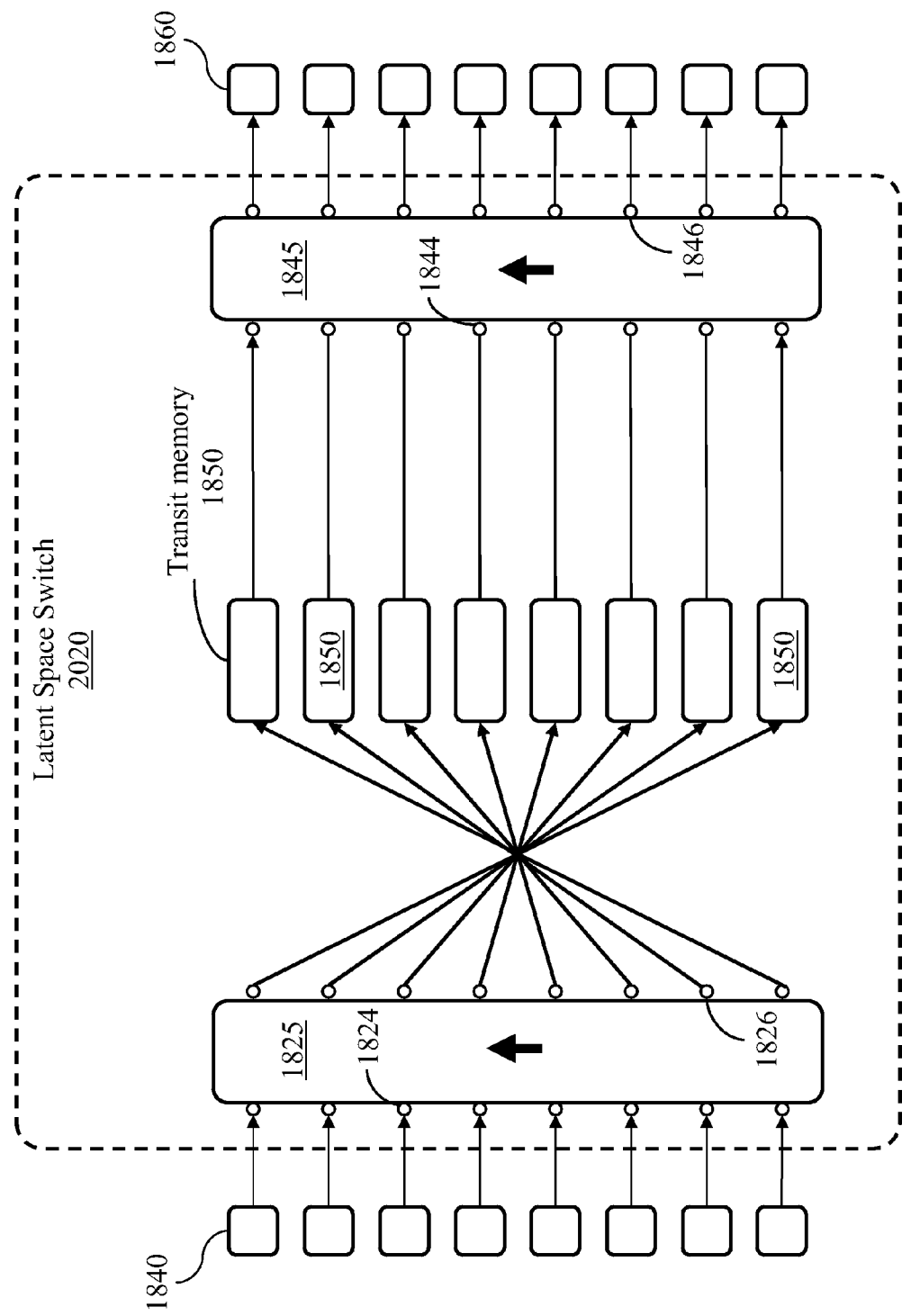
FIG. 20 illustrates a latent space switch similar to the latent space switch of FIG. 18 but with the first ascending rotator having transposed connections of order 7 to a bank of transit memory devices.

FIG. 20 illustrates a latent space switch 2020 similar to the latent space switch of FIG. 18 but with the first ascending rotator having transposed connections of order 7 to a bank of transit memory devices. The transit delay for a connection from an ingress port 1840(*j*) to an egress port 1860(*k*) is then |j+k−7| if the outlets 1846 of the second ascending rotator have ordinary connections to the egress ports 1860. With transposed connections of order 7 from the outlets 1846 of the second ascending rotator to the egress ports 1860, the transition delay from an ingress port 1840(*j*) to an egress port 1860(*k*) is |j−k|.

Figure 21:
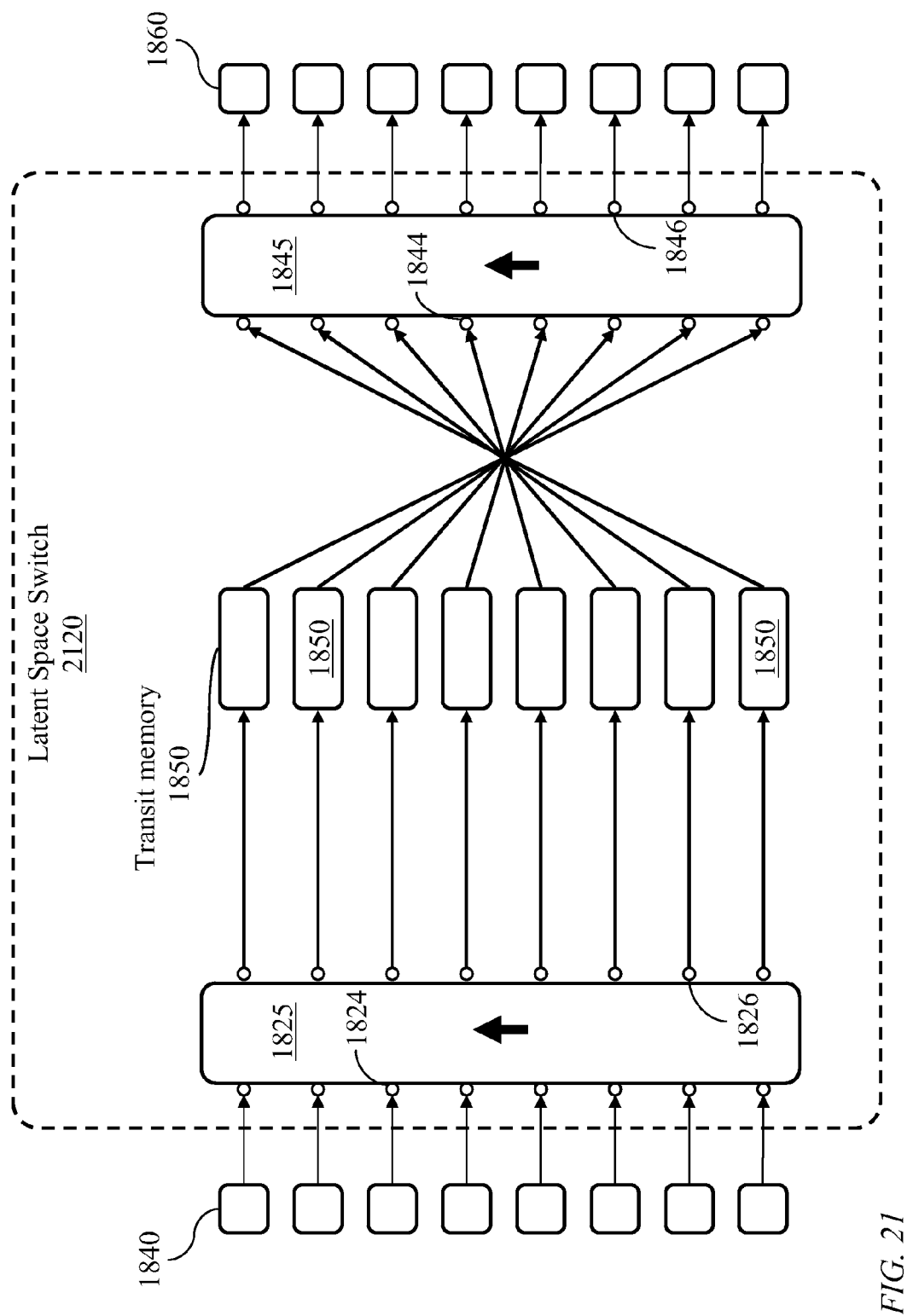
FIG. 21 illustrates a latent space switch similar to the latent space switch of FIG. 19 but with the bank of transit memory devices having transposed connections of order 7 to the second ascending rotator.

FIG. 21 illustrates a latent space switch 2120 similar to the latent space switch of FIG. 19 but with the bank of transit memory devices having transposed connections of order 7 to the inlets 1844 of the second ascending rotator. The transit delay for a connection from an ingress port 1840(*j*) to an egress port 1860(*k*) is then |j+k−7| if the outlets 1846 of the second ascending rotator have ordinary connections to the egress ports 1860. With transposed connections of order L from the outlets 1846 of the second ascending rotator to the egress ports 1860, the transition delay from an ingress port 1840(*j*) to an egress port 1860(*k*) is |j−k|.

Figure 22:
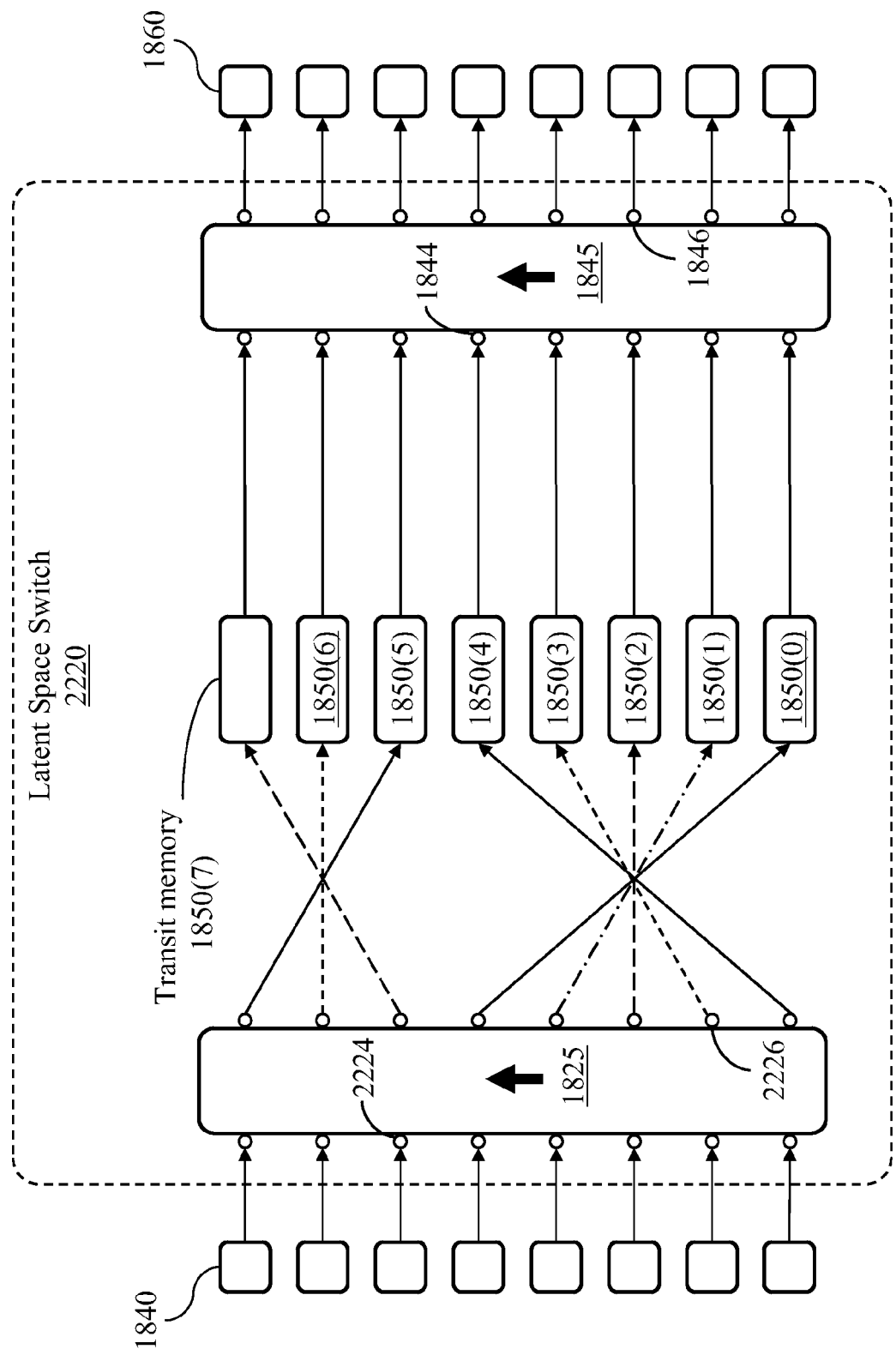
FIG. 22 illustrates a latent space switch similar to the latent space switch of FIG. 18 but with the first ascending rotator having transposed connections of index 4 to a bank of transit memory devices.

FIG. 22 illustrates a latent space 2220 switch similar to the latent space switch of FIG. 18 but with the first ascending rotator having transposed connections of order 4 to a bank of transit memory devices. The transit delay for a connection from an ingress port 1840(*j*) to an egress port 1860(*k*) is then |j+k−4| if the outlets 1846 of the second ascending rotator have ordinary connections to the egress ports 1860. With transposed connections of order 4 from the outlets 1846 of the second ascending rotator to the egress ports 1860, the transition delay from an ingress port 1840(*j*) to an egress port 1860(*k*) is |j−k|.

Figure 23:
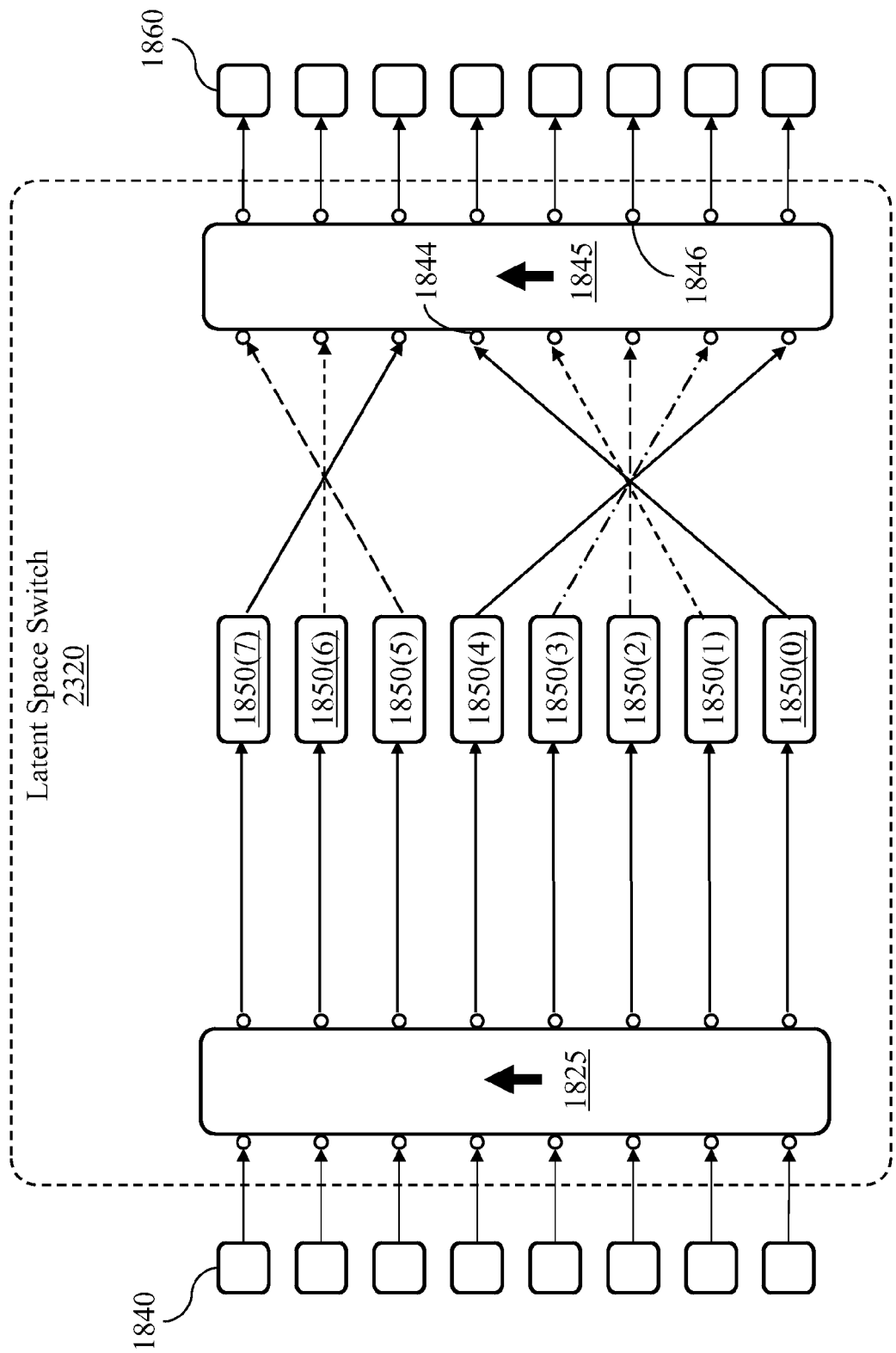
FIG. 23 illustrates a latent space switch similar to the latent space switch of FIG. 19 but with the bank of transit memory devices having transposed connections of order 4 to the second ascending rotator.

FIG. 23 illustrates a latent space switch 2320 similar to the latent space switch of FIG. 19 but with the bank of transit memory devices having transposed connections of order 4 to the inlets 1844 of the second ascending rotator. The transit delay for a connection from an ingress port 1840(*j*) to an egress port 1860(*k*) is then |j+k−4| if the outlets 1846 of the second ascending rotator have ordinary connections to the egress ports 1860. With transposed connections of order 4 from the outlets 1846 of the second ascending rotator to the egress ports 1860, the transition delay from an ingress port 1840(*j*) to an egress port 1860(*k*) is |j−k|.

FIG. 24 tabulates data-transfer timing of a latent space switch of the type illustrated in FIG. 18 to FIG. 23, with an arbitrary number of ports and an arbitrary value of the order of transposed connections.

The two rotators 1825 and 1845 of latent space switches 1820, 1920, 2020, 2120, 2220, and 2320 are of the same rotation direction and they are not active simultaneously. Thus, they may be replaced with a single rotator.

Transposing Rotator Versus Uniform Rotator

A rotator is a device connecting a number of inlets to a number of outlets where each inlet connects to each outlet during a rotation cycle. With N inlets and N outlets, N>1, the period of a rotation cycle may be divided into N time slots and the inlet-outlet connectivity of the rotator changes during successive time slots. Several inlet-outlet rotator connectivity patterns may be devised and a rotator may be classified accordingly. The connectivity pattern may be characterized according to rotation order, rotation direction, and rotation step as described below. To facilitate defining the different patterns, the inlets are indexed as inlets 0 to (N−1) and the outlets are indexed as outlets 0 to (N−1).

The rotation order may be categorized as "uniform" or "transposing". With uniform rotation, a "uniform" rotator connects an inlet of index j, 0≤j<N, to an outlet of index $(j+\beta \times t+\Theta)_{modulo\ N}$, during a time slot t, 0≤t<N, of a repetitive time frame of N time slots. $\Theta$ is an arbitrary integer which may be set to equal zero without loss of generality. With "transposing" rotation, a "transposing" rotator connects an inlet of index j, 0≤j<N, to an outlet of index $(L-j+\beta \times t)_{modulo\ N}$, during a time slot t, 0≤t<N, of the repetitive time frame, where L is a predetermined transposition order L, 0≤L<N. The parameter $\beta$ is an integer, not equal to zero, which defines rotation direction and rotation step.

Regardless of the value of $\beta$, a uniform rotator connects consecutive inlets to consecutive outlets of a same order during any time slot t while a transposing rotator connects consecutive inlets to outlets of a reversed order. For example, with N=8, L=7, $\beta$=1, two inlets of indices 3 and 4 connect to outlets of indices 5 and 6, respectively, during time slot t=2, in a uniform rotator but connect to outlets of indices 6 and 5, respectively, in a transposing rotator.

The sign of $\beta$ defines rotation direction and the magnitude of $\beta$ defines a rotation step. A positive value of $\beta$ defines the rotation direction as "ascending" because the index of an outlet to which a specific inlet connects increases as the value of t increases. A negative value of $\beta$ defines the rotation direction as "descending" because the index of an outlet to which a specific inlet connects decreases as t increases. The magnitude of $\beta$ defines a rotation step which is selected to equal 1 in all latent-space switch configurations disclosed herein.

Figure 25:
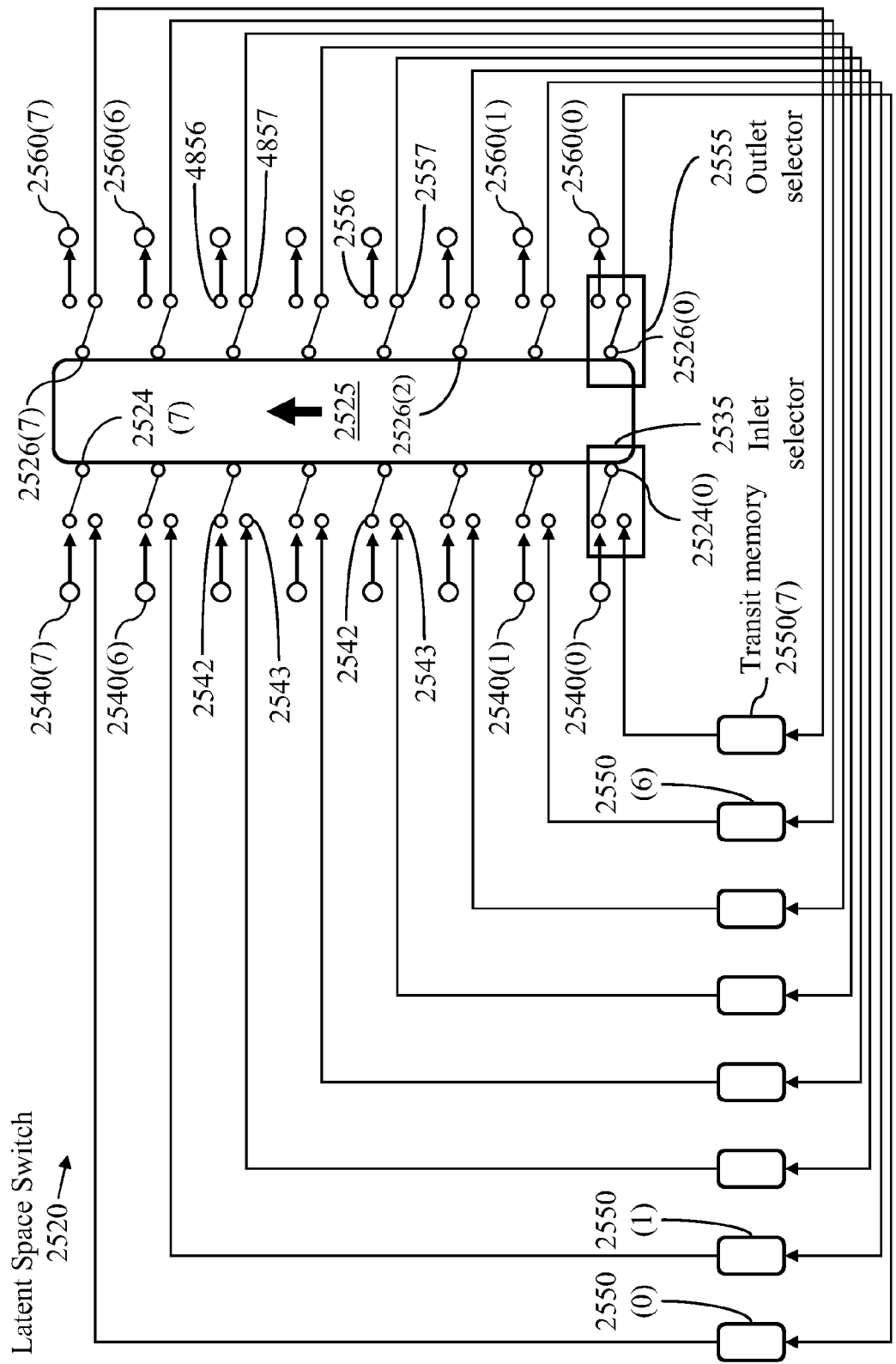
FIG. 25 illustrates a single-rotator latent space switch, in accordance with an embodiment of the present invention, comprising a bank of eight transit memory devices connecting to inlet selectors and outlet selectors of a single rotator with transposed connections of order 7 from the transit memory devices to the inlet selectors and ordinary connections from the transit memory devices to the outlet selectors, thus realizing a constant switching delay from an ingress port to an egress port, the figure illustrates a setting of the selectors during data transfer from data sources to the transit memory devices.

FIG. 25 illustrates a latent space switch 2520 having a single rotator 2525 with N inlets, individually or collectively referenced as 2524, and N outlets, individually or collectively referenced as 2526; N=8 in the exemplary configuration of FIG. 25. Each inlet 2524(*j*) is provided with an inlet selector 2535(*j*), 0≤j<N. An inlet selector 2535(*j*) has one inlet-selector port 2542 connecting to ingress port 2540(*j*) and one inlet-selector port 2543 connecting to transit memory device 2550 of index |L−j|, L=N−1; |L−j| denotes $(L-j)_{modulo\ N}$. Each outlet 2526(*j*) is provided with an outlet selector 2555($\chi$), 0≤$\chi$<N. An outlet selector 2555($\chi$) has one outlet-selector port 2556 connecting to egress port 2560($\chi$) and one outlet-selector port 2557 connecting to transit memory device 2550($\chi$). Thus, the transit memory devices 2550 have transposed connections of order (N−1), to the single rotator 2525 and ordinary connections from the single rotator. Notably, an ingress port 2540 may have a short buffer for holding a data unit received from an external source and an egress port may have a short buffer for holding a data unit to be transmitted to an external sink. An inlet selector 2535 is a 2:1 selector and an outlet selector 2555 is a 1:2 selector.

Figure 26:
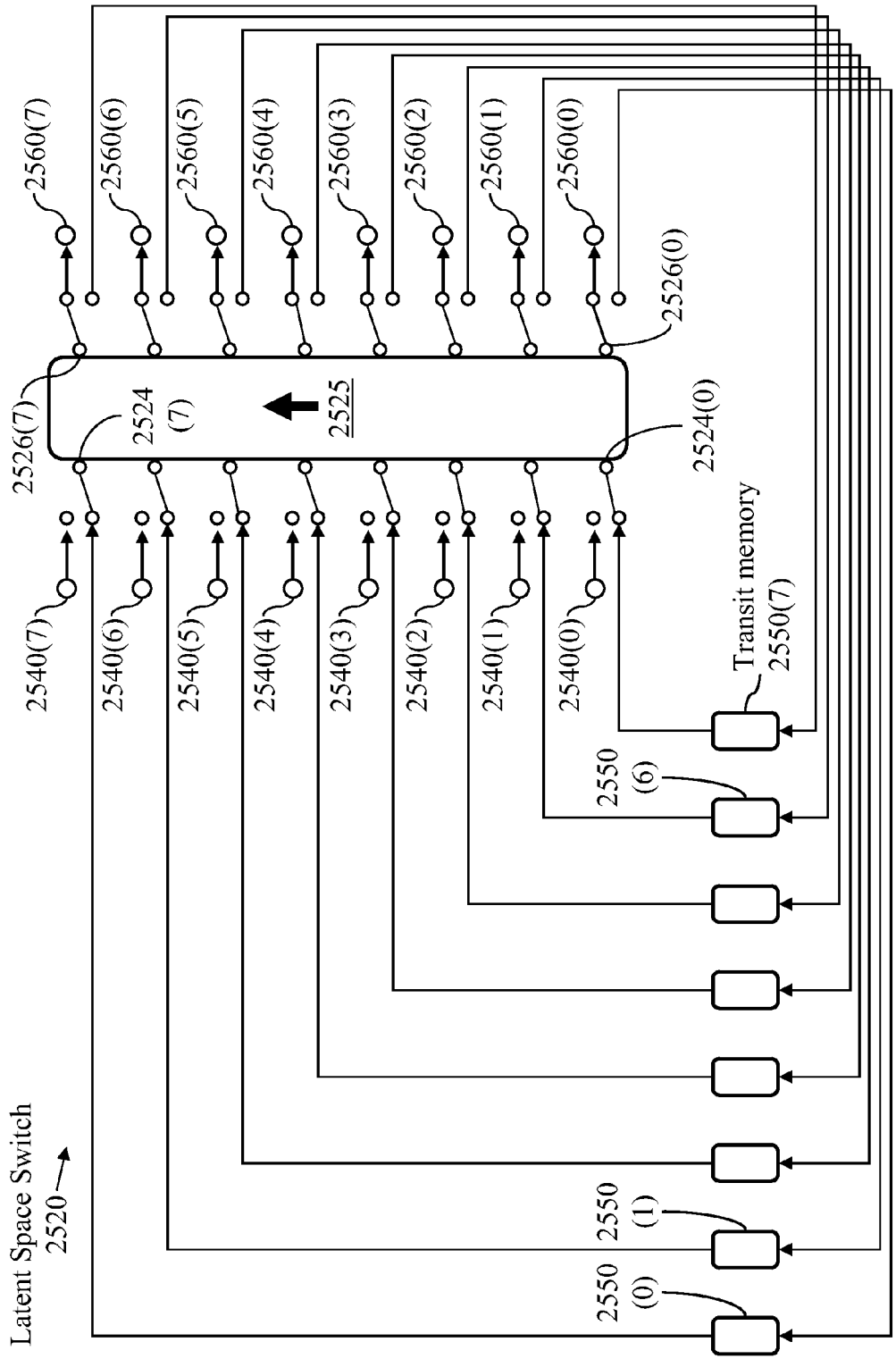
FIG. 26 illustrates a setting of the selectors in the latent space switch of FIG. 25 during data transfer from the transit memory devices to data sinks.

The transit delay (also called "systematic delay", "switching delay", or "systematic switching delay") for data units received at an ingress port 2540(*x*) and destined to egress port 2560(*y*) is |x+y−L| (i.e., $(x+y-L)_{modulo\ N}$) time slots if rotator 2525 is an ascending rotator or |L−x−y| (i.e., $(L-x-y)_{modulo\ N}$) if rotator 2525 is a descending rotator. FIG. 25 illustrates the states of the selectors 2535 and 2555 during a first part of a time slot. FIG. 26 illustrates the states of the selectors 2535 and 2555 of switch 2520 during a second part of a time slot. During the first part of the time slot, data is transferred from ingress ports 2540 to the transit memory devices 2550 and data is transferred from egress ports 2560 to respective external sinks. During the second part of the time slot, data is transferred from the transit memory devices 2550 to the egress ports 2560 and data is received at the ingress ports 2540 from respective external sources.

Figure 27:
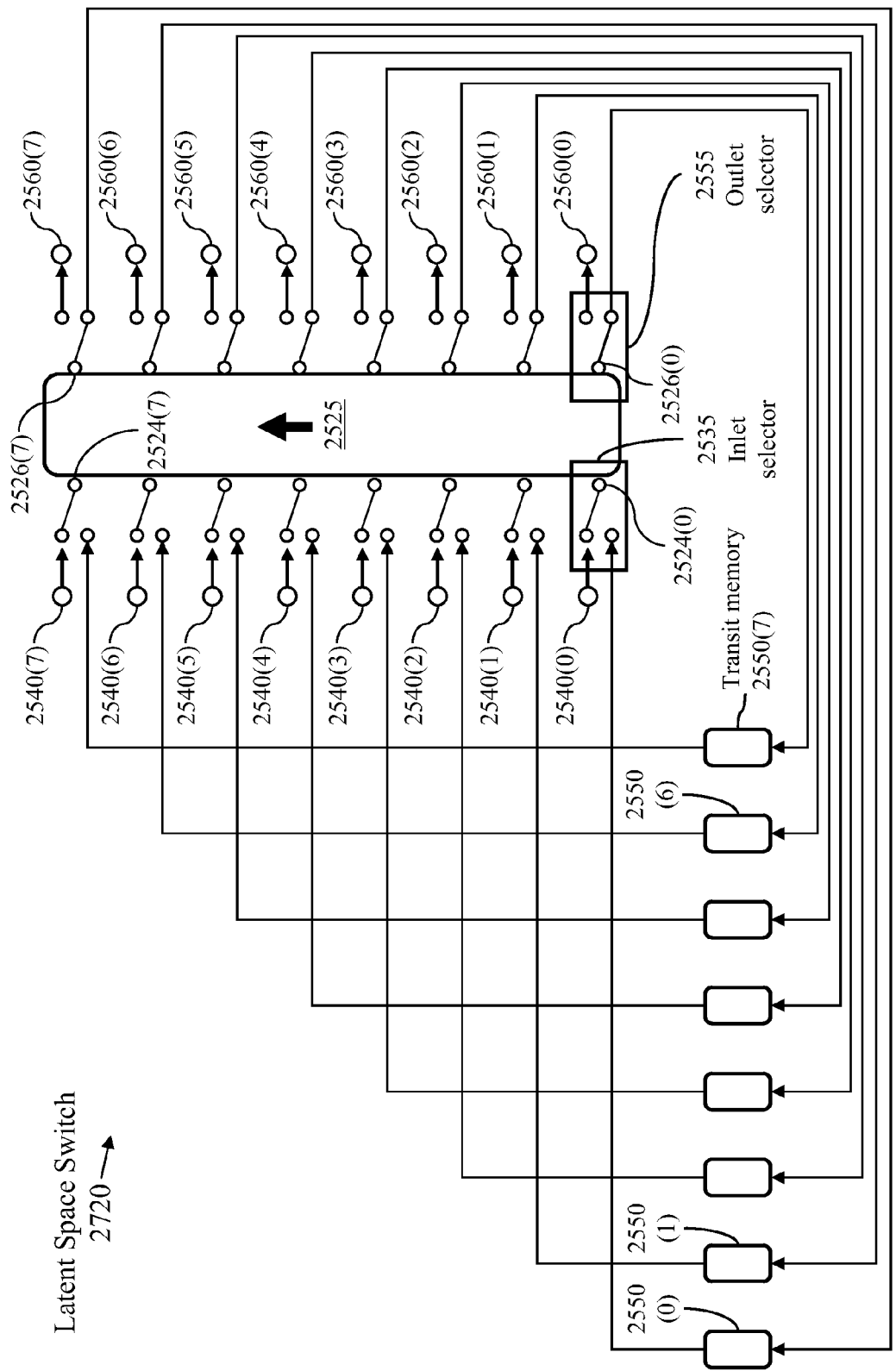
FIG. 27 illustrates a single-rotator latent space switch, in accordance with an embodiment of the present invention, comprising a bank of eight transit memory devices connecting to inlet selectors and outlet selectors of a single rotator with ordinary connections from the transit memory devices to the inlet selectors and transposed connections of order 7 from the transit memory devices to the outlet selector, thus realizing a constant switching delay from an ingress port to an egress port, the figure illustrates a setting of the selectors during data transfer from data sources to the transit memory devices.

FIG. 27 illustrates a single-rotator latent space switch 2720 having the same single rotator, the same inlet selectors 2535, the same outlet selectors 2555, and the same transit-memory devices 2550, of switch 2520 of FIG. 25. However, the transit memory devices 2550 have ordinary connections to the single rotator and transposed connections of order (N−1) from the rotator. FIG. 27 indicates the states of the selectors 2535 and 2555 during a first part of a time slot, i.e. during data transfer from external data sources to the transit memory devices.

Figure 28:
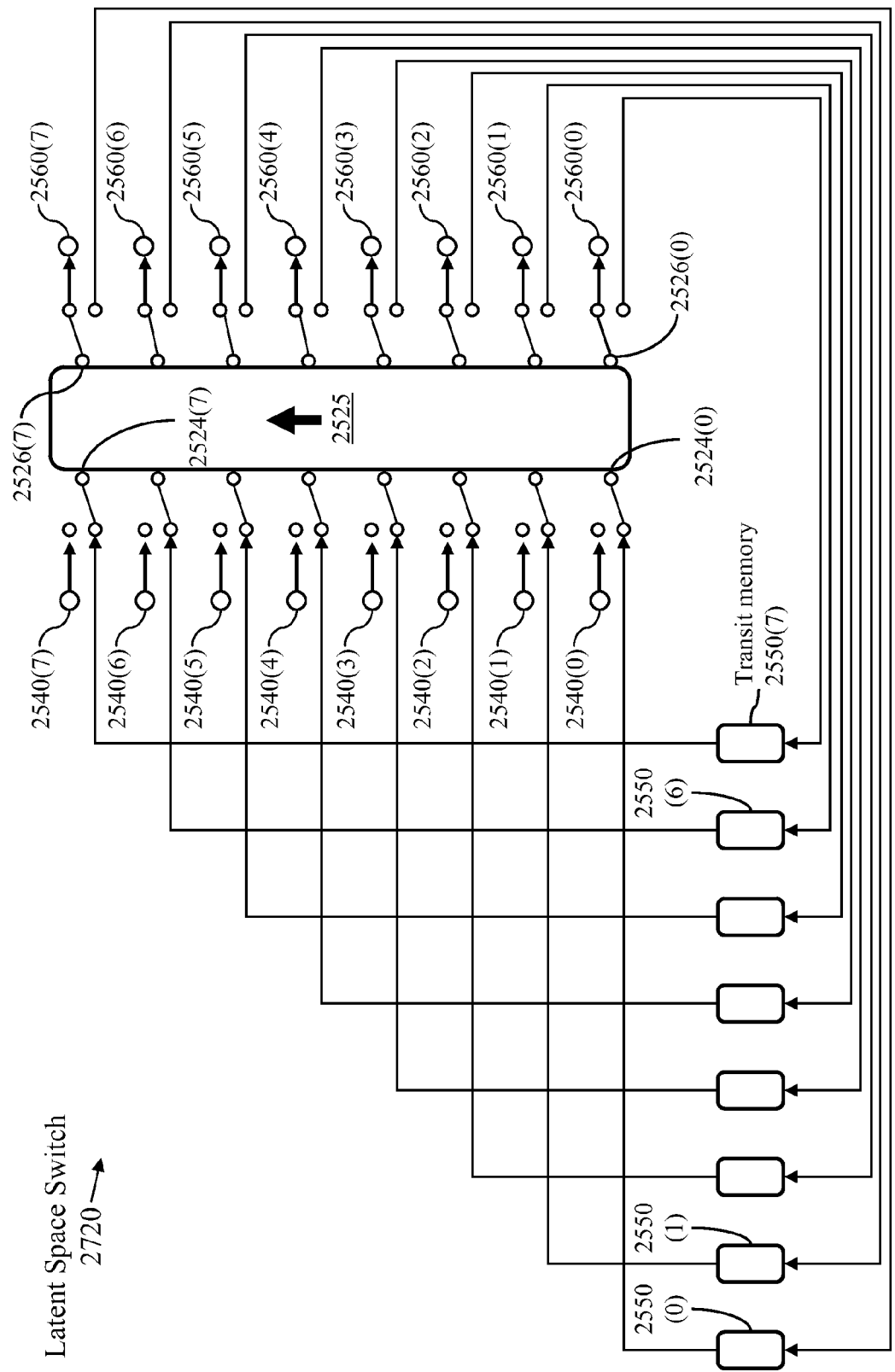
FIG. 28 illustrates a setting of the selectors in the latent space switch of FIG. 27 during data transfer from the transit memory devices to data sinks.

FIG. 28 illustrates the states of the selectors 2535 and 2555 of switch 2720 during a second part of a time slot, i.e. during data transfer from the transit memory devices to external data sinks.

Figure 29:
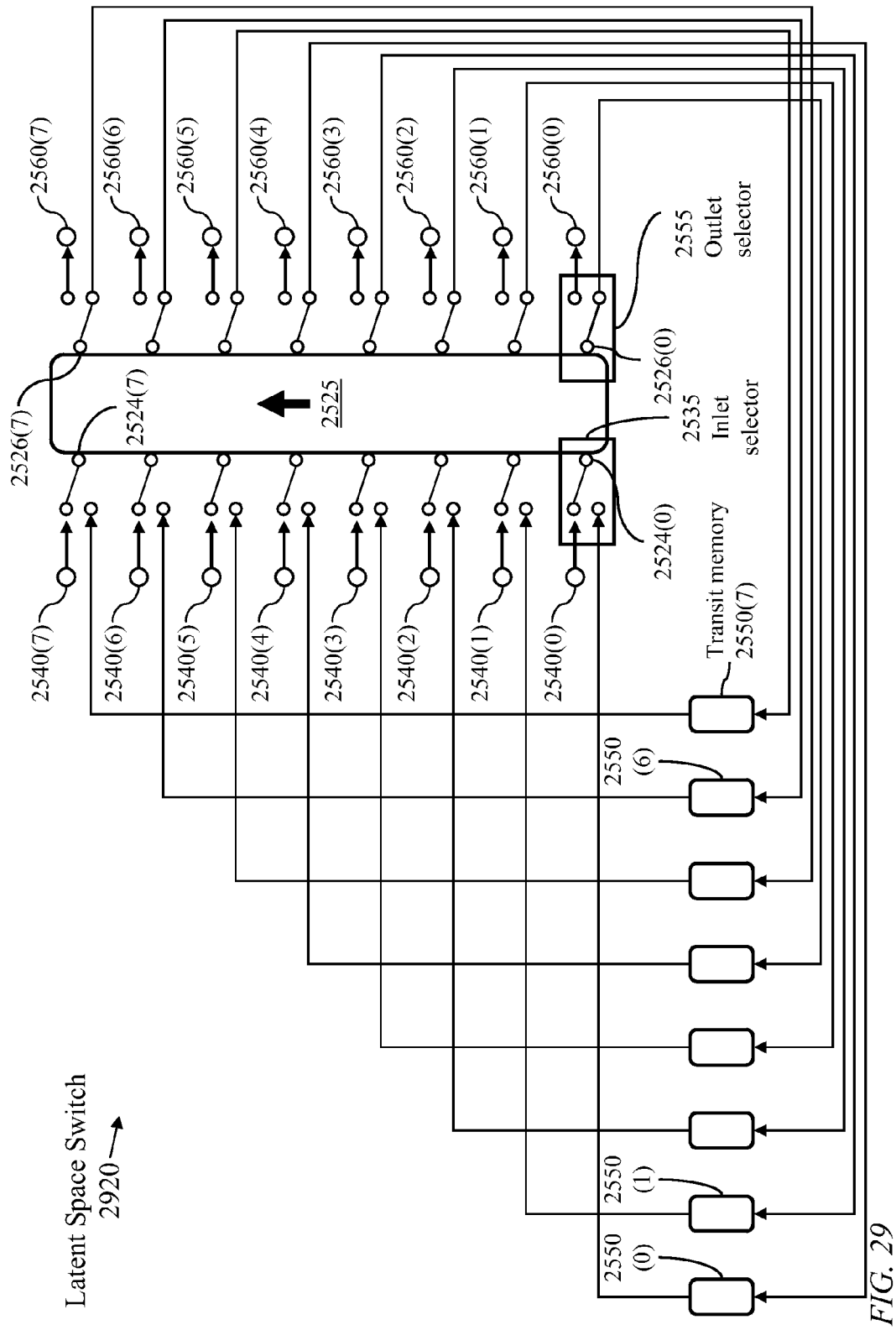
FIG. 29 illustrates a single-rotator latent space switch, in accordance with an embodiment of the present invention, comprising a bank of eight transit memory devices connecting to inlet selectors and outlet selectors of a single rotator with ordinary connections from the transit memory devices to the inlet selectors and transposed connections of order 4 from the transit memory devices to the outlet selector, thus realizing a constant switching delay from an ingress port to an egress port, the figure illustrates a setting of the selectors during data transfer from data sources to the transit memory devices.

FIG. 29 illustrates a single-rotator latent space switch 2920 having the same single rotator, the same inlet selectors 2535, the same outlet selectors 2555, and the same transit-memory devices 2550, of switch 2720 of FIG. 27. However, the transit memory devices 2550 have transposed connections of order 4 from the single rotator.

Figure 30:
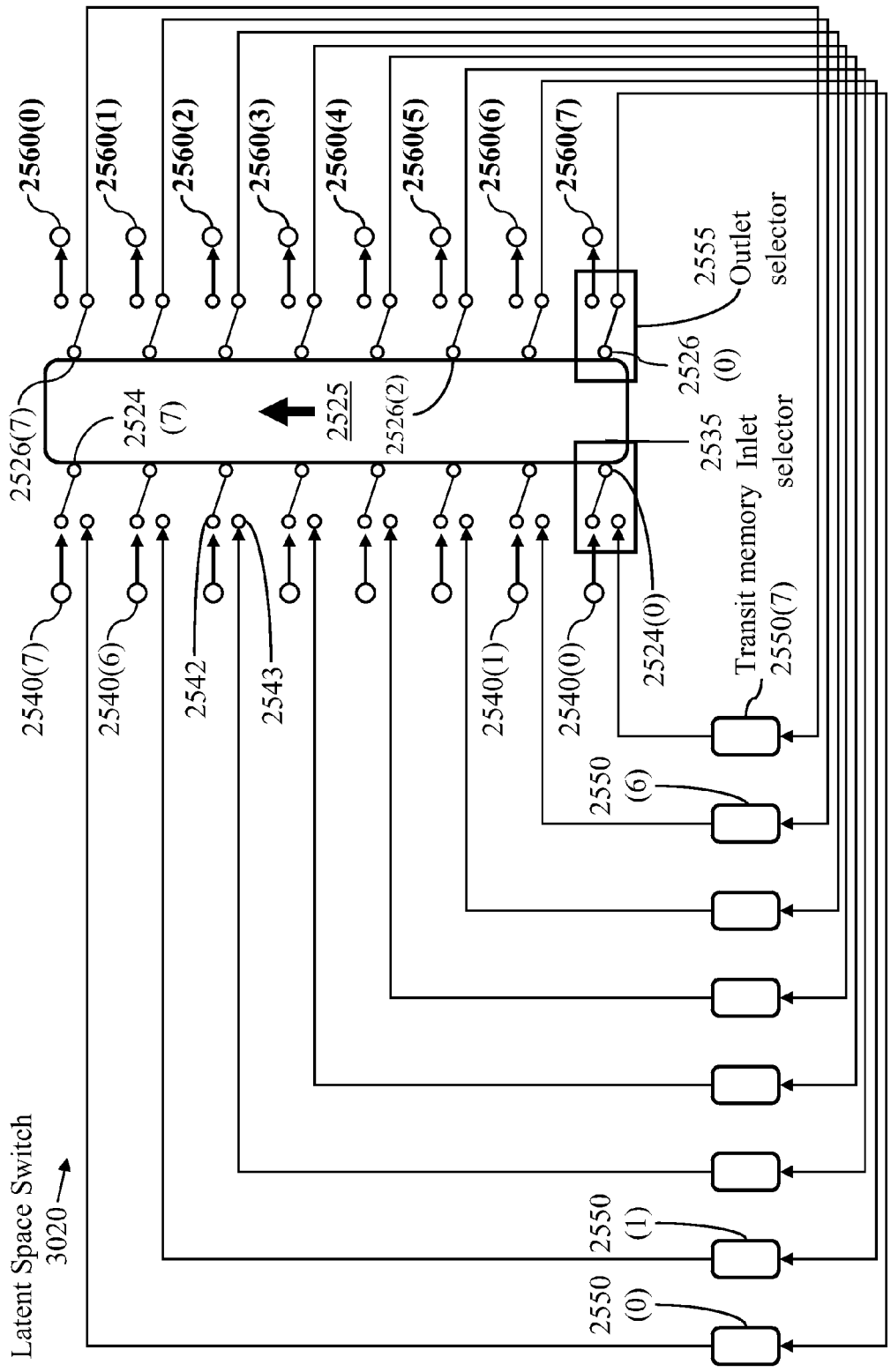
FIG. 30 illustrates a single-rotator space switch similar to the latent space switch of FIG. 25 but with transposed egress ports, in accordance with an embodiment of the present invention.

FIG. 30 illustrates a single-rotator space switch 3020 similar to the latent space switch of FIG. 25 but with transposed egress ports. This results in a transit delay which is independent of the transposition order as indicated in FIG. 35.

Figure 31:
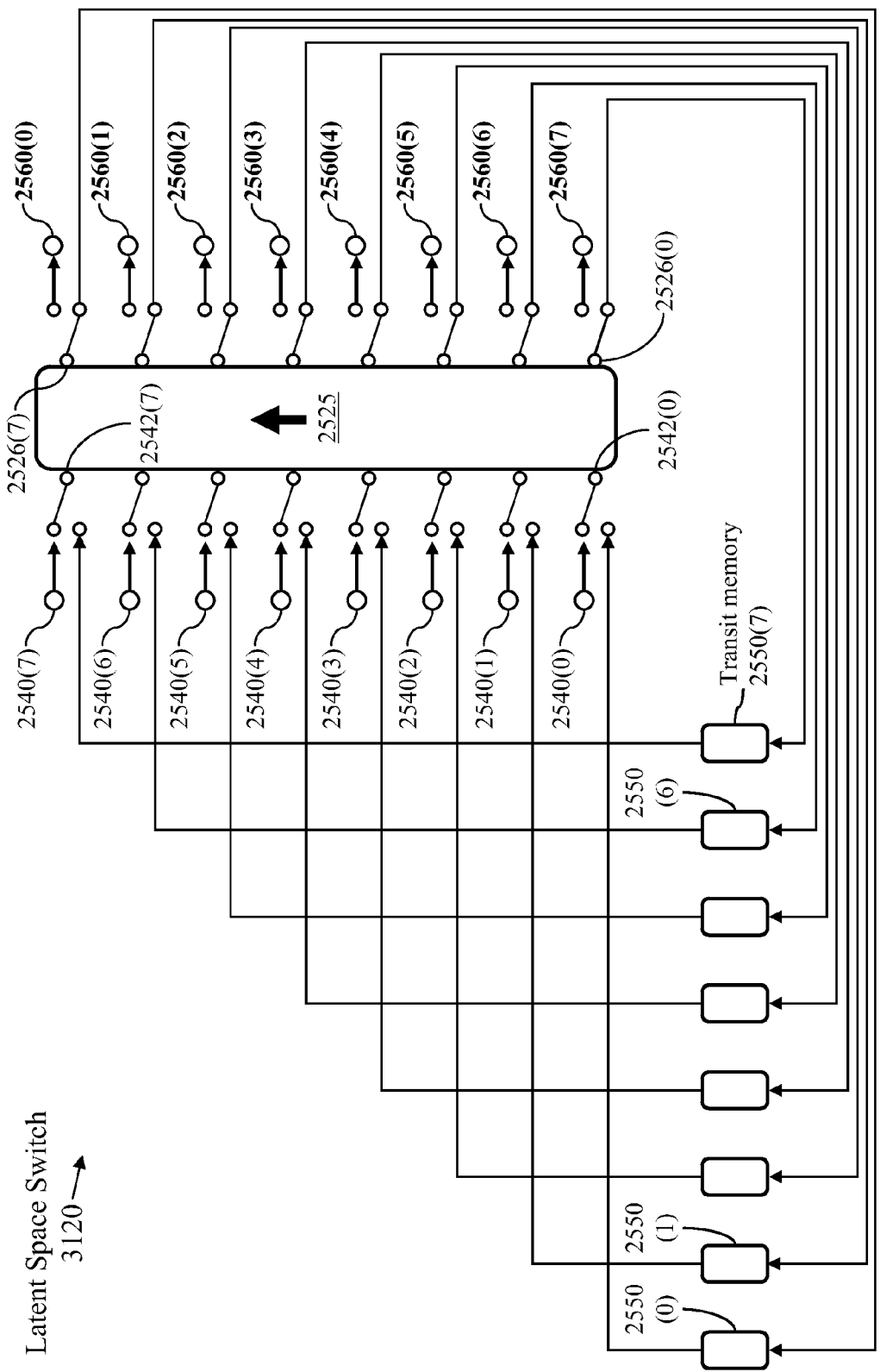
FIG. 31 illustrates a single-rotator space switch similar to the latent space switch of FIG. 27 but with transposed egress ports, in accordance with an embodiment of the present invention.

FIG. 31 illustrates a single-rotator space switch 3120 similar to the latent space switch of FIG. 27 but with transposed egress ports. This results in a transit delay which is independent of the transposition order as indicated in FIG. 35.

Figure 32:
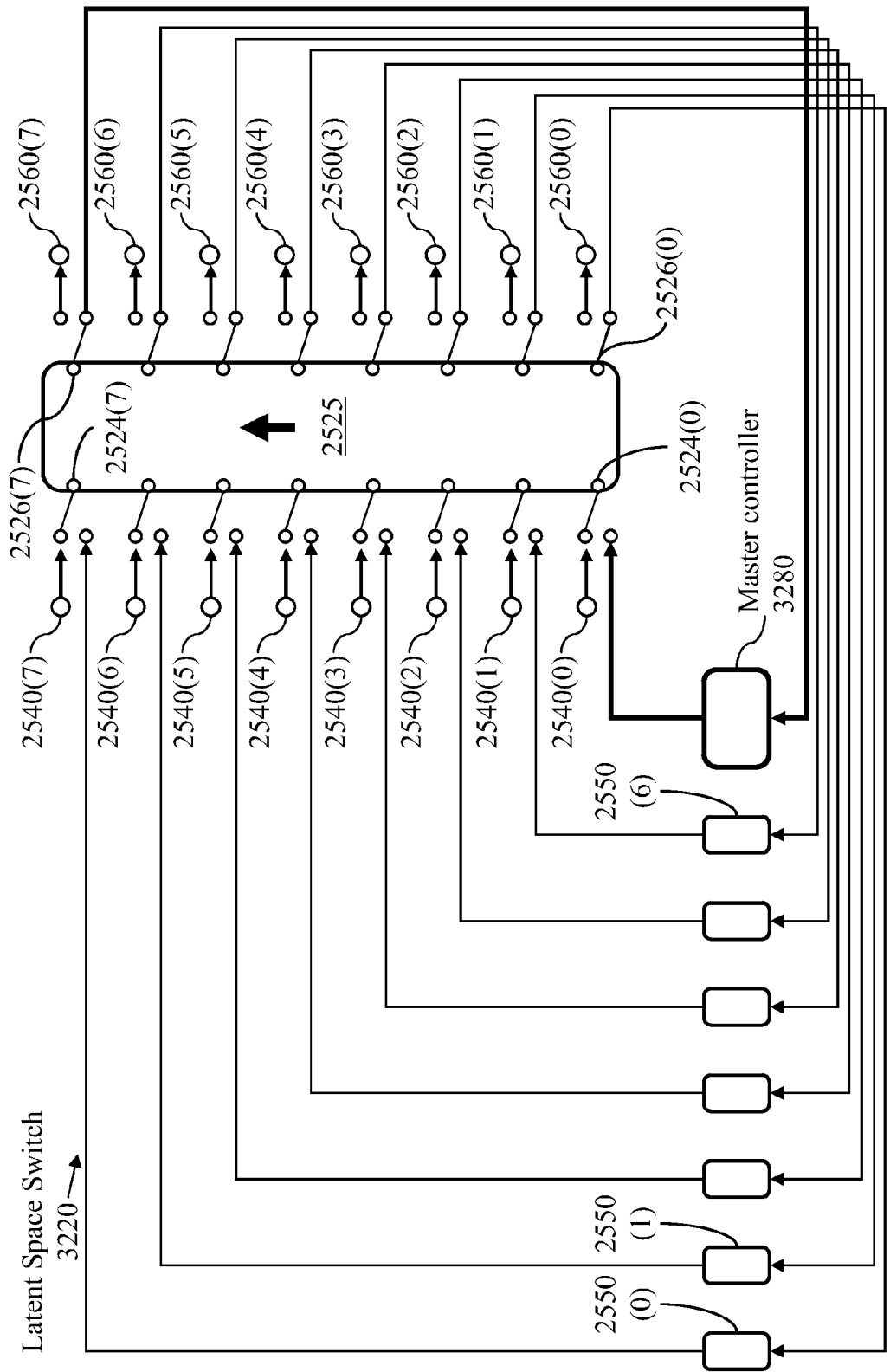
FIG. 32 illustrates the latent space switch of FIG. 25 comprising a controller connecting to an inlet and an outlet of the single rotator in accordance with an embodiment of the present invention.

FIG. 32 illustrates a latent space switch 3220 similar to latent space switch 2520 of FIG. 25 but with a master controller 3280 replacing transit memory device 2550(7).

Figure 33:
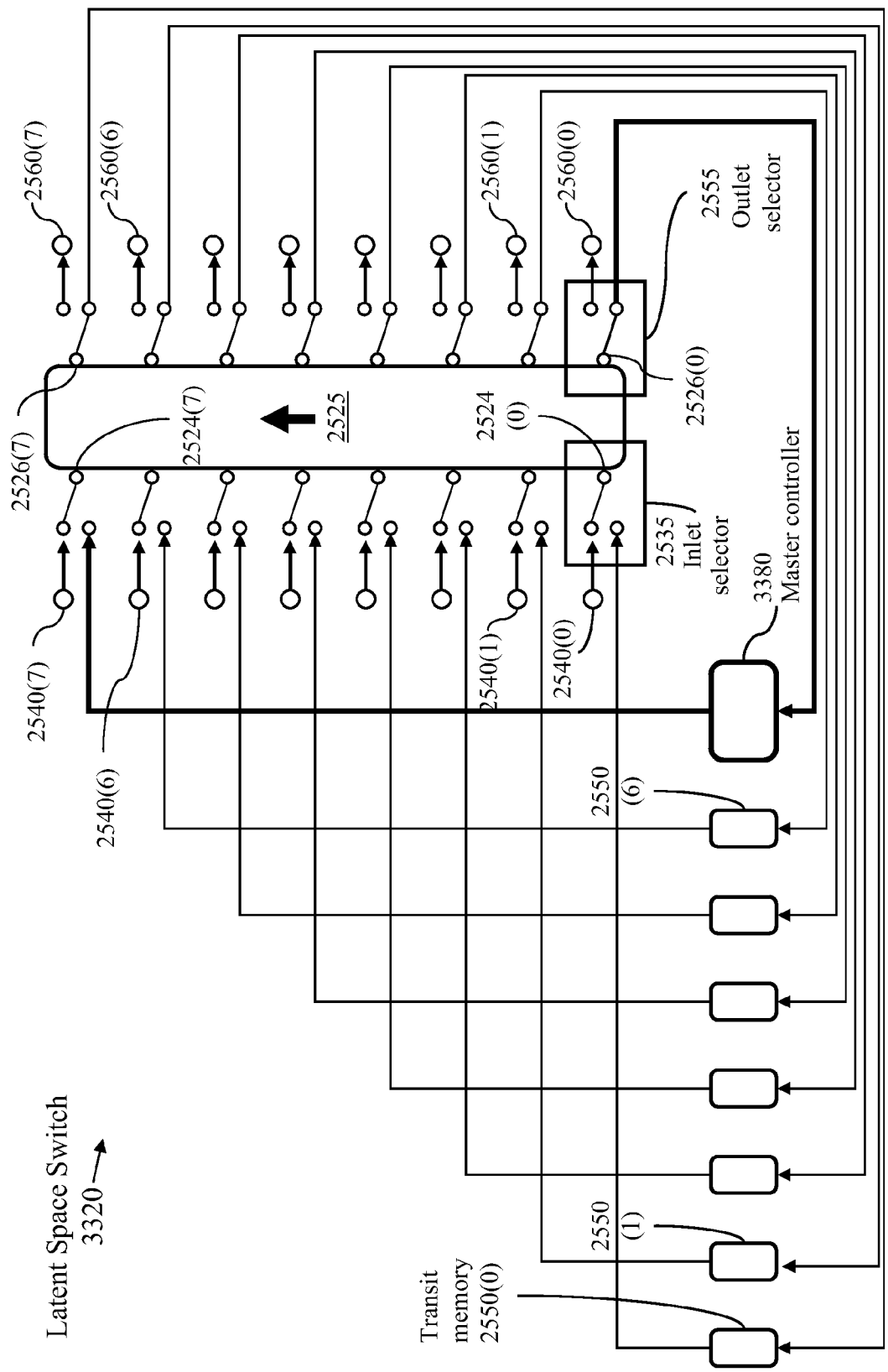
FIG. 33 illustrates the latent space switch of FIG. 27 comprising a controller connecting to an inlet and an outlet of the single rotator in accordance with an embodiment of the present invention.

FIG. 33 illustrates a latent space switch 3320 similar to latent space switch 2720 of FIG. 27 but with a master controller 3380 replacing transit memory device 2550(7).

FIG. 34 tabulates data-transfer timing of a single-rotator latent space switch of the type illustrated in FIG. 25, FIG. 27, and FIG. 29, with an ascending rotator having an arbitrary number N of inlets or outlets and with an arbitrary value L of the order of transposed connections.

Referring to FIG. 25, ingress port 2540($j$) connects to outlet $|j+t_1|$ during a first part of a time slot $t_1$, $0 \le t_1 < N$. With static ordinary connections from the ascending rotator 2525 to the transit memory devices, outlet $|j+t_1|$ connects to a transit memory device $2550|j+t_1|$. With static transposed connections of order L (L=7, N=8) from the transit memory devices 2550 to the ascending rotator 2525, a transit memory device $2550|j+t_1|$ connects to inlet $|L-j-t_1|$ of the ascending rotator 2525. In order to reach egress port 2560($k$), transit data in transit memory device 2550 of index $|j+t_1|$ is transferred from inlet $|L-j-t_1|$ to outlet k during a time slot $t_2=|k-(L-j-t_1))|=|(j+k-L+t_1)|$. Thus, the transit delay is $t_2-t_1=|j+k-L|$.

Referring to FIG. 27 and FIG. 29, ingress port 2540($j$) connects to outlet $|j+t_1|$ during a first part of a time slot $t_1$, $0 \le t_1 < N$. With static transposed connections of order L (L=7 in latent space switch 2720 and L=4 in latent space switch 2920) from the ascending rotator 2525 to the transit memory devices, outlet $|j+t_1|$ connects to a transit memory device 2550 of index $|L-j-t_1|$. With static ordinary connections from the transit memory devices 2550 to the ascending rotator 2525, a transit memory device 2550 of index $|L-j-t_1|$ connects to inlet $|L-j-t_1|$ of the ascending rotator 2525. In order to reach egress port 2560($k$), transit data in transit memory device 2550 of index $|L-j-t_1|$ is transferred from inlet $|L-j-t_1|$ to outlet k during a time slot $t_2=|k-(L-j-t_1))|$ which is $|j+k-L+t_1|$. Thus, the transit delay is $t_2-t_1=|j+k-L|$, as in the configuration of FIG. 25.

To render the delay from an ingress port 2540($j$) to an egress port 2560($k$), $0 \le j < N$, $0 \le k < N$, independent of the transposition order L, the outlets 2526 of the ascending rotator 2525 may have transposed connections of the same order L to the egress ports 2560. Thus, in order to reach egress port 2560($k$), transit data is transferred from inlet 2524 of index $|L-j-t_1|$ to outlet 2526 of index $|L-k|$, hence to egress port 2560($k$), during a time slot $t_2=|(L-k)-(L-(j+t_1))|$ which is $|j-k+t_1|$, and the transit delay is $t_2-t_1=|j-k|$, which is independent of the transposition order L.

FIG. 35 tabulates data-transfer timing of a single-rotator latent space switch of the type illustrated in FIG. 30 and FIG. 31, using an ascending rotator having an arbitrary number of inlets, with transposed connections from the outlets 2526 of the single rotator 2525 to the egress ports 2560, and with an arbitrary value of the order of transposed connections. In the latent space switches 2520, 2720, 2920, egress port 2560($k$) connects to outlet 2526($k$), $0 \le k < N$. In the latent space switches 3020 and 3120, egress port 2560($k$) connects to outlet 2526 of index $|L-k|$. This results in a transit delay, for a given data stream, which depends only on the indices of an ingress port 2540 and an egress port 2560 as indicated in FIG. 35.

FIG. 36 tabulates data-transfer timing of a single-rotator latent space switch of the type illustrated in FIG. 25, FIG. 27, and FIG. 29, with a descending rotator having an arbitrary number N of inlets or outlets and with an arbitrary value L of the order of transposed connections.

FIG. 37 tabulates data-transfer timing of a single-rotator latent space switch of the type illustrated in FIG. 30 and FIG. 31, using a descending rotator having an arbitrary number of inlets, with transposed connections from the outlets 2526 of the single rotator 2525 to the egress ports 2560, and with an arbitrary value of the order of transposed connections.

Scheduling Cycle Versus Rotation Cycle

During a rotation cycle of N time slots, rotator 2525 connects each inlet 2524($j$) to each outlet 2526($k$), $0 \le j < N$, $0 \le k < N$. In the exemplary configuration of FIG. 32, N=8 and the master controller 3280 has a channel to inlet 2524(0) of rotator 2525 and a channel from outlet 2526(7) of rotator 2525. An ingress port 2540($j$), $0 \le j < 8$, connects to the master controller 3280 once per rotation cycle, during every relative time slot $|7-j|$ of a rotation cycle, i.e., during absolute time slots $(7-j)+8\times\chi$, $0 \le \chi < \infty$. The master controller 3280 connects to an egress port 2560($k$), $0 \le k < N$, once per rotation cycle, during every relative time slot k, i.e., during absolute time slots $(k+8\times\chi)$, $0 \le \chi < \infty$. The master controller 3280 receives control signals from ingress port 2540($j$) during time slots $(7-j)+8\times\chi$ and transmits control signal to egress port k during time slots $(k+8\times\chi)$, $0 \le \chi < \infty$. Preferably, each egress port is integrated with an ingress port so that master controller 3280 may send control data, including data transfer schedules, to a specific ingress port through an egress port integrated with the specific ingress port.

Master controller 3280 receives control signals from the ingress ports 2540 and schedules transfer of data from ingress ports 2540($j$) to egress ports 2560($k$), $0 \le j < N$, $0 \le k < N$, over a predefined scheduling time frame. The scheduling time frame is preferably selected to cover an integer number, exceeding zero, of rotation-cycle periods. However, the scheduling cycle may have any number of time slots, greater than or equal to N, that need not be an integer multiple of N.

Figure 38:
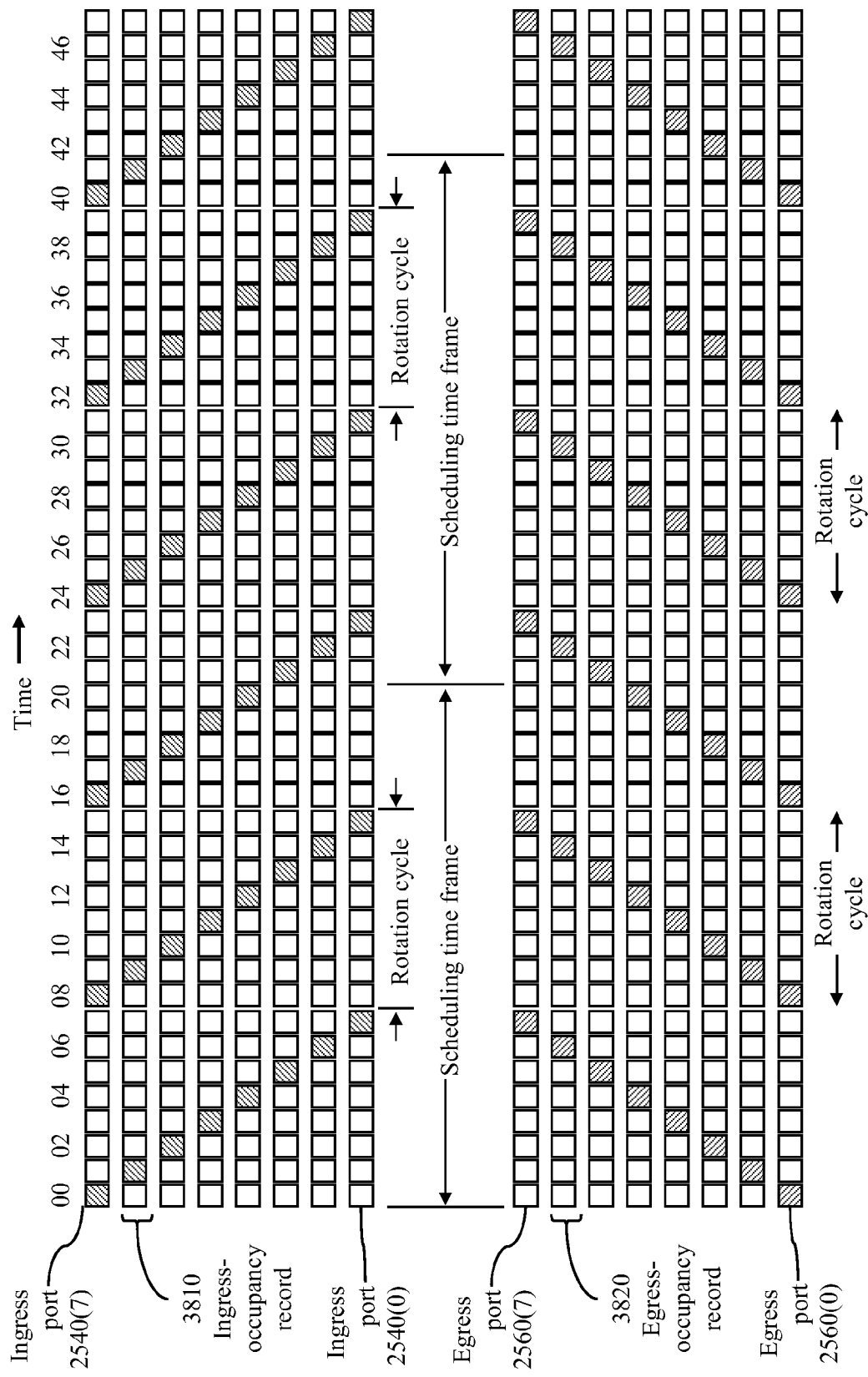
FIG. 38 illustrates occupancy records, over a scheduling time frame, used for scheduling data transfer in the latent space switch of FIG. 32 in accordance with an embodiment of the present invention.

The transfer of payload data from an ingress port to an egress port is subject to contention, hence the need for scheduling. FIG. 38 illustrates an exemplary scheduling frame of 21 time slots. The master controller maintains an ingress occupancy record (or a vacancy record) 3810 for each ingress port 2540 and an egress occupancy record (or vacancy record) 3820 for each egress port 2560. As indicated in FIG. 34, a data segment transferred from an ingress port 2540(*j*) at time $t_1$ relative to a rotation cycle is transferred to an egress port 2560(*k*) during a time slot $t_2$, relative to a rotation cycle, where $t_2=\{j+k-L+t_1\}_{modulo\ N}$, where L=7 in the exemplary configuration of FIG. 25. Thus, to establish a connection from ingress port 2540(*j*) to egress port 2560(*k*), the master controller examines the occupancy state of ingress port 2540(*j*) during time slot $t_1$ and the occupancy state egress port 2560(*k*) during time slot $t_2$.

Preferably, the exchange of control data between the master controller 3280 and controllers of the ingress ports 2540 and egress ports 2560 takes place during dedicated time slots. Each ingress port 2540(*j*) is preferably integrated with a corresponding egress port, such as egress port 2560(*j*), in order to simplify exchange of control data.

As illustrated in FIG. 38, ingress port 2540(0) connects to the master controller 3280 during time slots {7, 15, 23, 31, ... }, ingress port 2540(1) connects to the master controller during time slots {6, 14, 22, 30, ... }, and ingress port 2540(7) connects to the master controller during time slots {0, 8, 16, 24, ... }. The master controller 3280 connects to egress port 2560(0) during time slots {0, 8, 16, 24, ... }, connects to egress port 2560(1) during time slots {1, 9, 17, 25, ... }, and connects to egress port 2560(7) during time slots {7, 15, 23, 31, ... }.

Figure 39:
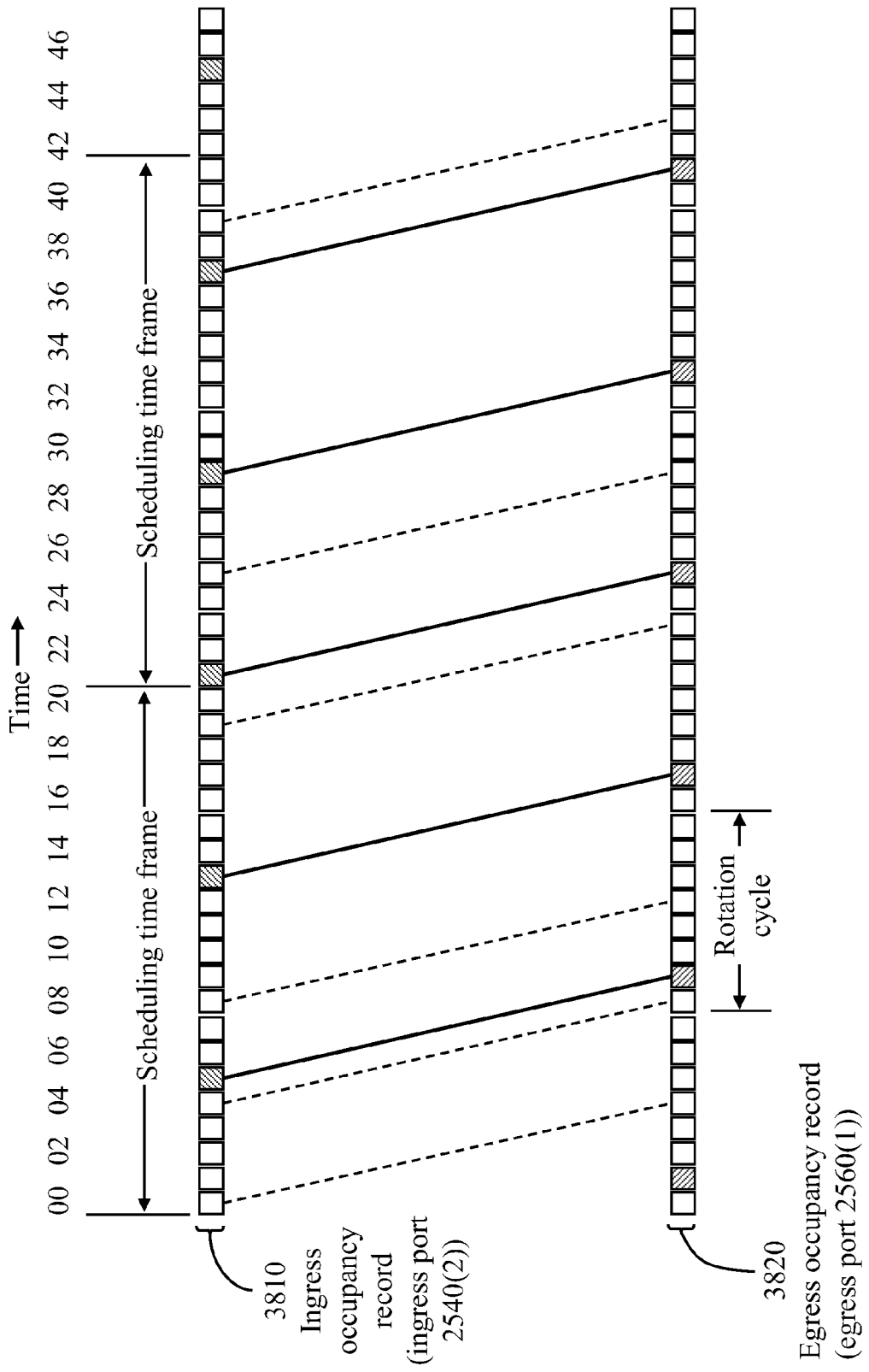
FIG. 39 illustrates a time-slot-matching process for scheduling a connection from an ingress port to an egress port in the latent space switch of FIG. 32 in accordance with an embodiment of the present invention.

FIG. 39 illustrates an ingress occupancy record 3810 of ingress port 2540(2) and egress occupancy record 3820 of egress port 2560(1) of latent space switch 3220 of FIG. 32. Each occupancy record has a number of entries equal to the number of time slots per scheduling time frame. A data segment received at an ingress port 2540(*j*) at time $t_1$ is delivered to an egress port 2560(*k*) during a time slot $t_2=(t_1+j+k-L)_{modulo\ N}$, where N is the number of ingress ports (or egress ports) and L is the transposition index as described earlier. In the configuration of FIG. 32, N=8 and L=7. A data segment received during time slot $t_1$ is delivered to egress 2560(1) during time slot $t_2=t_1+4$. Corresponding values of $t_1$ and $t_2$ are indicated in FIG. 39. A path from ingress port 2540(2) to egress port 2560(1) is available for a new connection request when ingress port 2540(2) is free (i.e., not in use and not reserved) during a time slot $t_1$ and egress port 2560(1) is free during time slot=$t_1+4$. To establish a connection, requiring a number σ>0 of time slots per scheduling frame, any ingress port 2540 to any egress port 2560, a number σ of available paths need be reserved. When a path is reserved, corresponding entries in an ingress occupancy record 3810 and an egress occupancy record are marked as busy. When the path is released, the corresponding entries are marked as available.

Figure 40:
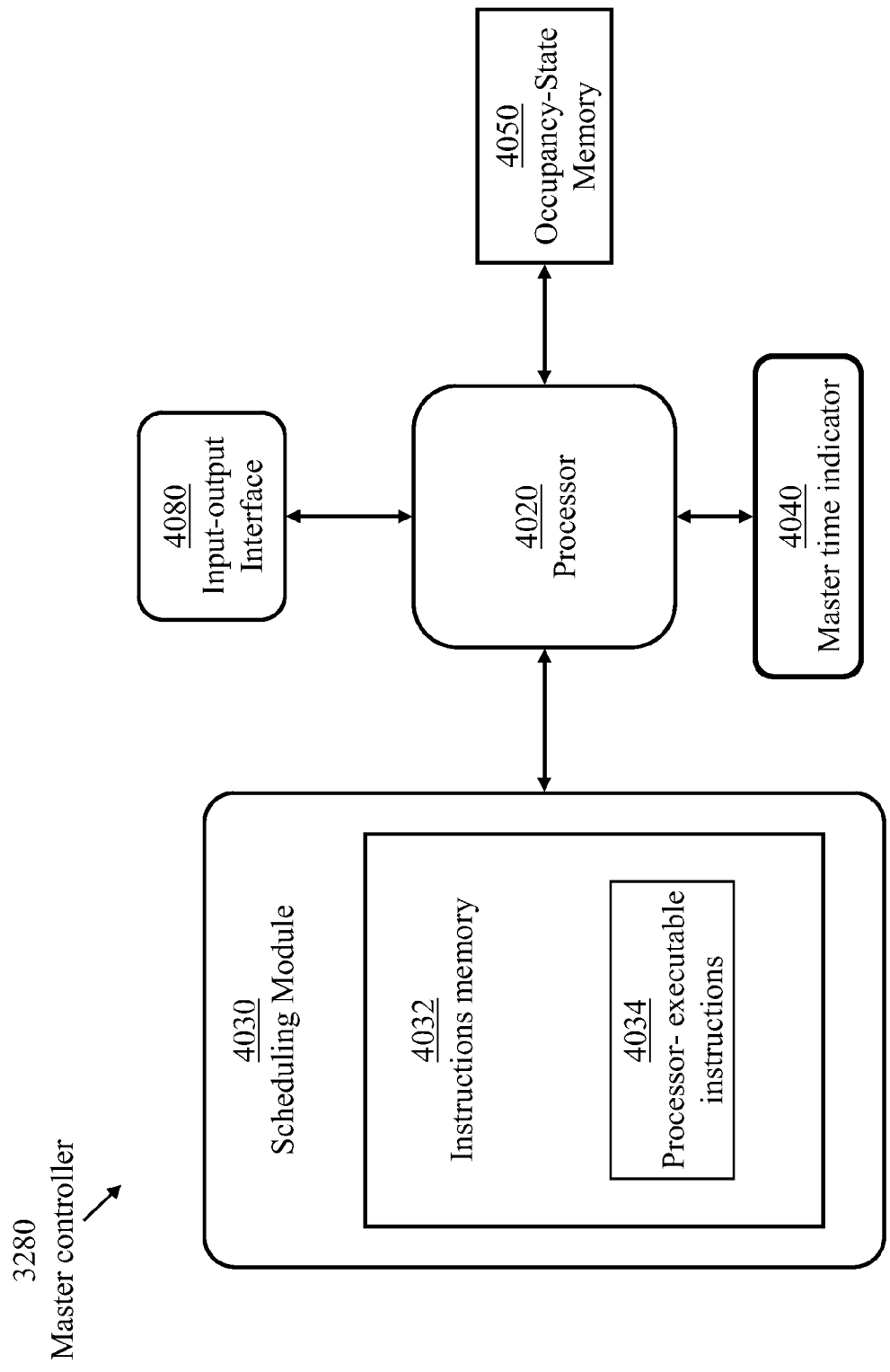
FIG. 40 details a master controller of the latent space switch of FIG. 32 in accordance with an embodiment of the present invention.

FIG. 40 illustrates a master controller 3280 of a latent space switch 3220 (FIG. 32). The master controller 3280 has a processor 4020 and a scheduling module 4030 which includes a memory device 4032 storing processor executable instructions 4034 which cause the processor to implement the time-locking and scheduling functions described above. Processor 4020 communicates with input and output ports of the latent space switch through an input-output interface 4080. Upon receiving a time indication from an edge controller of an edge node (not illustrated), processor 4020 communicates a corresponding reading of the master time indicator 4040 to the edge node. The edge controller then determines a reference time for an outbound port of the edge node leading to the master controller of the latent space switch 3220. A memory device 4050 stores current occupancy states of all inlets and all outlets during all time slots of a time frame.

Configuration Details

The N inlets 2524 of a rotator 2525 are indexed as 0 to (N−1) and are individually referenced as 2524(0), 2524(1), ..., 2524(N−1). Likewise, the N outlets 2526 of the rotator 2525 are indexed as 0 to (N−1) and are individually referenced as 2526(0), 2526(1), ..., 2526(N−1). The N transit memory devices 2550 are indexed as 0 to (N−1) and are individually referenced as 2550(0), 2550(1), ..., 2550(N−1).

If the rotator is an ascending rotator, then during a time slot t, 0≤t<N, an inlet of index j, 0≤j<N, connects through the rotator to an outlet of index k, 0≤k<N, determined as:

$k=\{j+t+\Theta\}_{modulo\ N}$, where Θ (an integer) is an arbitrary offset.

If the rotator is a descending rotator, then during a time slot t, 0≤t<N, the rotator connects an inlet of index j, 0≤j<N to an outlet of index k, 0≤k<N, determined as:

$k=\{j-t+\Theta\}_{modulo\ N}$.

Without loss of generality, the offset Θ may be set to zero.

Figure 41:
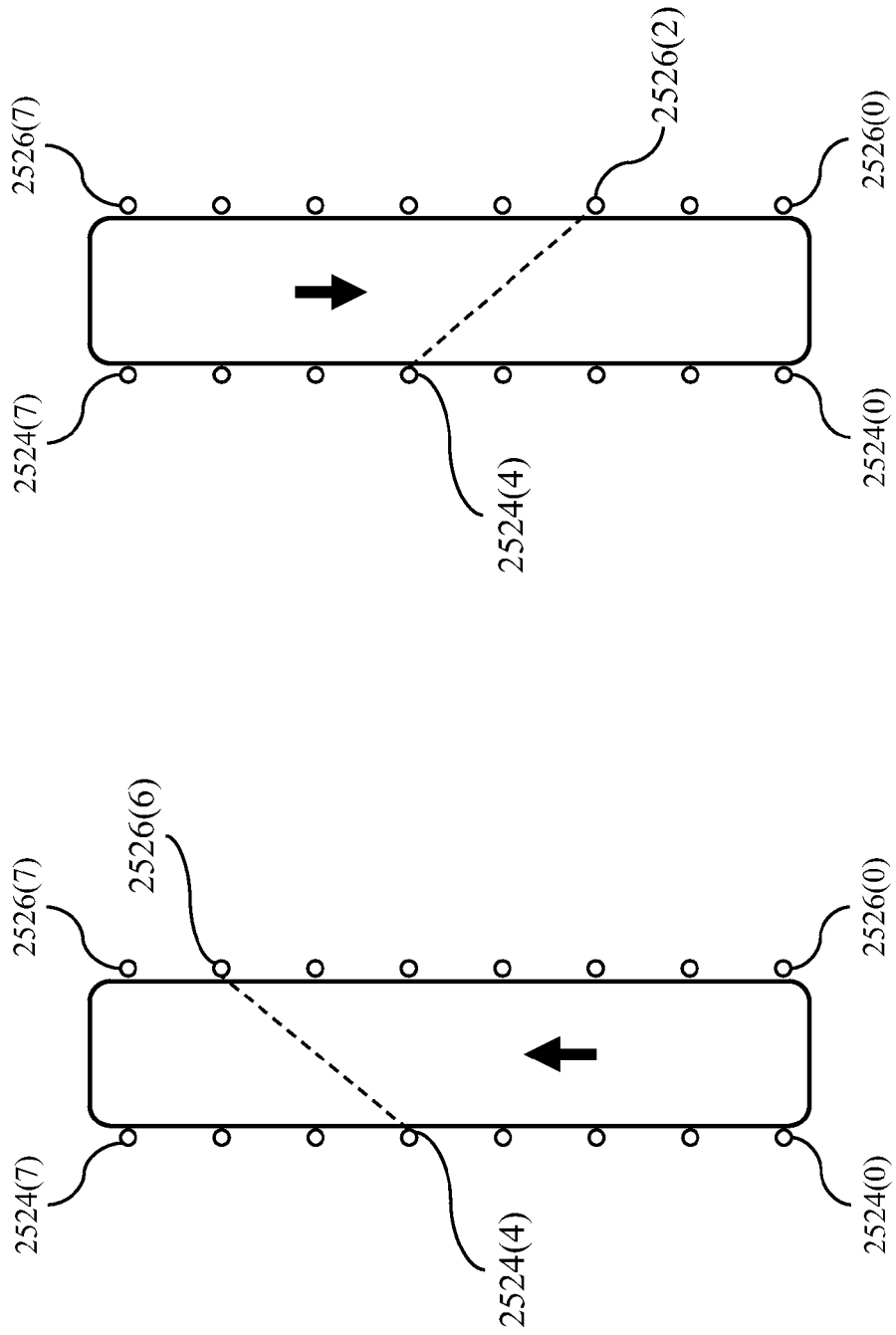
FIG. 41 illustrates inlet-outlet connectivity of an ascending single rotator and a descending single rotator.

FIG. 41 illustrates inlet-outlet connectivity of an ascending single rotator and a descending single rotator. An inlet and an outlet to which the inlet connects at the start of a rotation cycle (at t=0) are said to form a "paired inlet-outlet". With a zero offset (Θ=0), an inlet 2524(*j*) connects to an outlet 2526(*j*), 0≤j<N, at t=0 whether the rotator is an ascending rotator or a descending rotator. Thus, inlet 2524(4) and outlet 2526(4) form an inlet-outlet pair. At t=2, inlet 2524(4) connects to outlet 2526(6) if the rotator is operated in an ascending direction or connects to outlet 2526(2) if the rotator is operated in a descending direction.

An inlet 2524(*j*) and its transposed outlet 2526(L−j), 0≤j<N, where L is a "transposition order" which may be selected to be any integer in the range 0≤L<N, are said to form a "transposed inlet-outlet". Table-1 indicates an index of a transposed outlet 2526 corresponding to each inlet 2524 for different selections of the transposition order L. The connectivity of all transit-memory devices in a single-rotator latent space switch may be based on the same transposition order.

Figure 42:
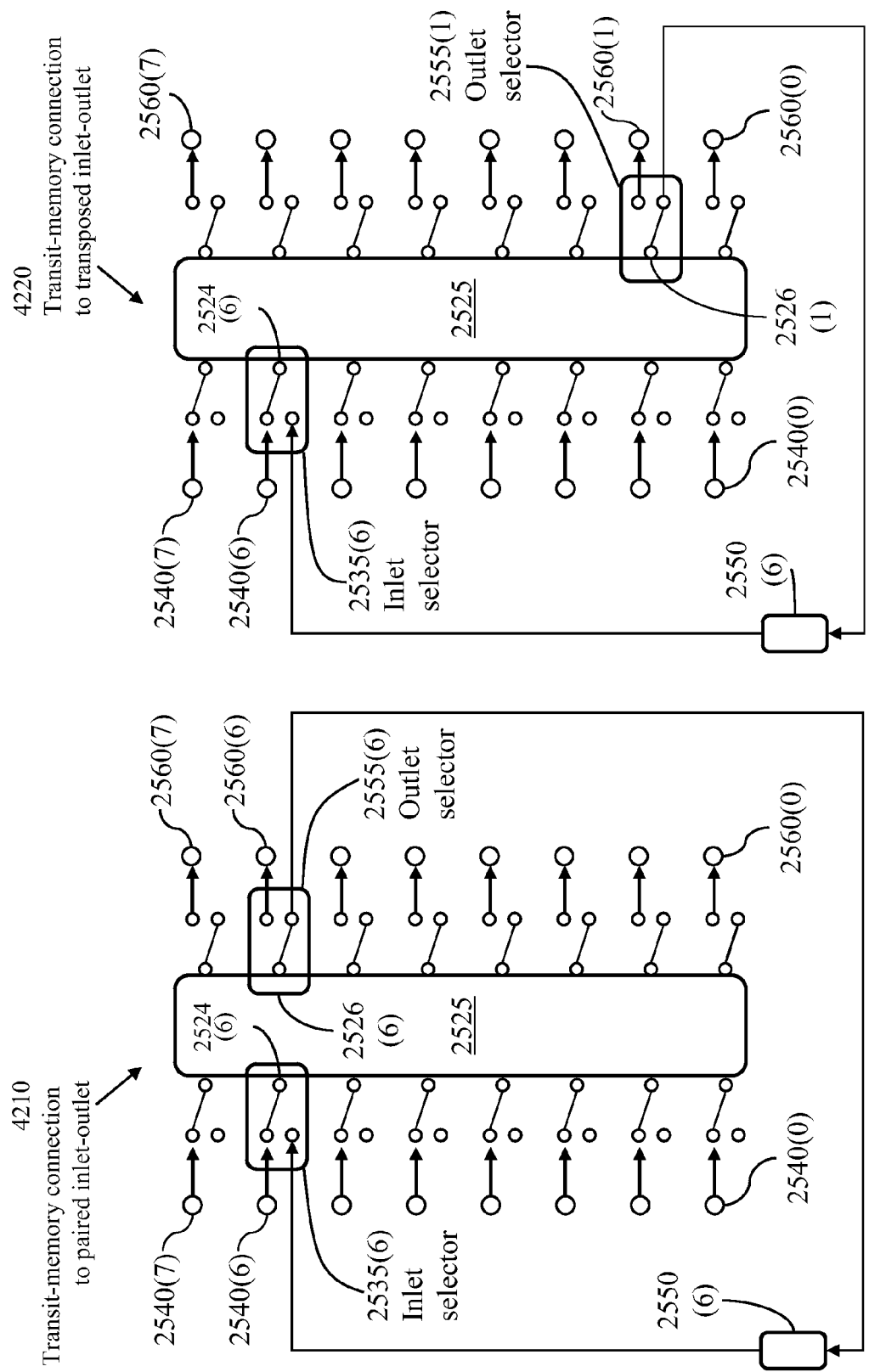
FIG. 42 illustrates connection of a transit memory device to an inlet and a peer outlet of a rotator and connection of a transit memory device to an inlet and a transposed outlet of the rotator.

As described earlier, each inlet 2524 is coupled to a respective inlet selector 2535 and each outlet 2526 is coupled to a respective outlet selector 2555. FIG. 42 illustrates a configuration 4210 where a transit memory device 2550(6) connects to an input selector 2535(6) and an outlet selector 2555(6) of a paired inlet-outlet {2524(6), 2526(6)}, and a configuration 4220 where the transit memory device 2550(6) connects to an input selector 2535(6) and an outlet selector 2555(1) of a transposed inlet-outlet pair {2524(6), 2526(1)}.

TABLE 1

Indices of inlets 2524(j) and corresponding transposed outlets 2526(L − j)

| Inlet index | Outlet index (transposition order L) | | | | | | | |
|---|---|---|---|---|---|---|---|---|
| | L = 0 | 1 | 2 | 3 | 4 | 5 | 6 | L = 7 |
| 0 | 0 | 1 | 2 | 3 | 4 | 5 | 6 | 7 |
| 1 | 7 | 0 | 1 | 2 | 3 | 4 | 5 | 6 |
| 2 | 6 | 7 | 0 | 1 | 2 | 3 | 4 | 5 |
| 3 | 5 | 6 | 7 | 0 | 1 | 2 | 3 | 4 |
| 4 | 4 | 5 | 6 | 7 | 0 | 1 | 2 | 3 |
| 5 | 3 | 4 | 5 | 6 | 7 | 0 | 1 | 2 |
| 6 | 2 | 3 | 4 | 5 | 6 | 7 | 0 | 1 |
| 7 | 1 | 2 | 3 | 4 | 5 | 6 | 7 | 0 |

The data-transfer timing of FIGS. 34 and 35 is based on connecting each transit-memory device 2550 to a respective transposed inlet-outlet of rotator 2525 as illustrated in FIGS. 25 to 31. In the configurations illustrated in FIGS. 25 to 31, the number of inlets or outlets of the single rotator 2525 is N=8. Data transferred from an ingress port 2540(*j*) to an egress port 2560(*k*), 0≤j<N, 0≤k<N, waits in a transit memory device 2550(*m*), 0≤m<N, for a deterministic period of time, D, called "systematic delay".

FIG. 43 tabulates data-transfer timing of a single-rotator latent space switch with each transit memory device connected to a paired inlet-outlet, using an ascending rotator or a descending rotator. As illustrated in FIG. 43, if each transit memory device 2550($m$) is connected to a paired inlet-outlet {2524($m$), 2526($m$)} of the rotator 2525, the normalized systematic delay for data transferred from ingress port 2540($j$) to egress port 2560($k$) through a transit memory device 2550($m$) is determined as:

$D^{(1)} = \{j+k-2 \times m\}_{modulo\ N}$, if the rotator 2525 is an ascending rotator; and $D^{(2)} = \{2 \times m-j-k\}_{modulo\ N}$, if the rotator 2525 is a descending rotator.

Thus, the systematic delay depends on the selected transit memory device. With $j=5$ and $k=2$, for example, the normalized systematic switch delays $D(1)$ and $D(2)$ are:

$D^{(1)} = \{j+k-2 \times m\}_{modulo\ N} = \{7-2 \times m\}_{modulo\ 8}$, and $D^{(2)} = \{2 \times m-j-k\}_{modulo\ N} = \{2 \times m-7\}_{modulo\ 8}$.

If each transit memory device 2550($m$) is connected to a transposed inlet-outlet {2524($m$), 2526(L−m)}, $0 \le L < N$, of the rotator 2525, the normalized systematic delay for data transferred from ingress port 2540($j$) to egress port 2560($k$) through a transit memory device 2550($m$) is independent of the transit memory device used and is determined as:

$D^{(3)} = \{j-k\}_{modulo\ N}$, if the rotator 2525 is an ascending rotator; and $D^{(4)} = \{k-j\}_{modulo\ N}$, if the rotator 2525 is a descending rotator.

With $j=5$ and $k=2$, the normalized systematic switch delay $D^{(3)}$ and $D^{(4)}$ are $D^{(3)} = \{j-k\}_{modulo\ N} = \{3\}_{modulo\ 8} = 3$, and $D^{(4)} = \{k-j\}_{modulo\ N} = \{-3\}_{modulo\ 8} = 5$.

Table-2 illustrates the systematic delay for data transferred from an ingress port 2540(5) to an egress port 2560(2) during each time slot of a rotation cycle of 8 time slots. In the table, the time at which a data segment is transferred from the ingress port is denoted $t_1$. The index of the transit memory to which the ingress port connects during a time slot is denoted m. The time slot at which a data segment transferred from ingress port (5) is received at egress port 2560(2) is denoted:

$t_2^{(1)}$ for an ascending rotator and transit-memory connection to paired inlets-outlets;

$t_2^{(2)}$ for a descending rotator and transit-memory connection to paired inlets-outlets;

$t_2^{(3)}$ for an ascending rotator and transit-memory connection to transposed inlets-outlets; and $t_2^{(4)}$ for a descending rotator and transit-memory connection to transposed inlets-outlets.

As indicated, the systematic delay is independent of the transit memory device 2550 when each transit memory connects to a transposed inlet-outlet pair.

Figure 44:
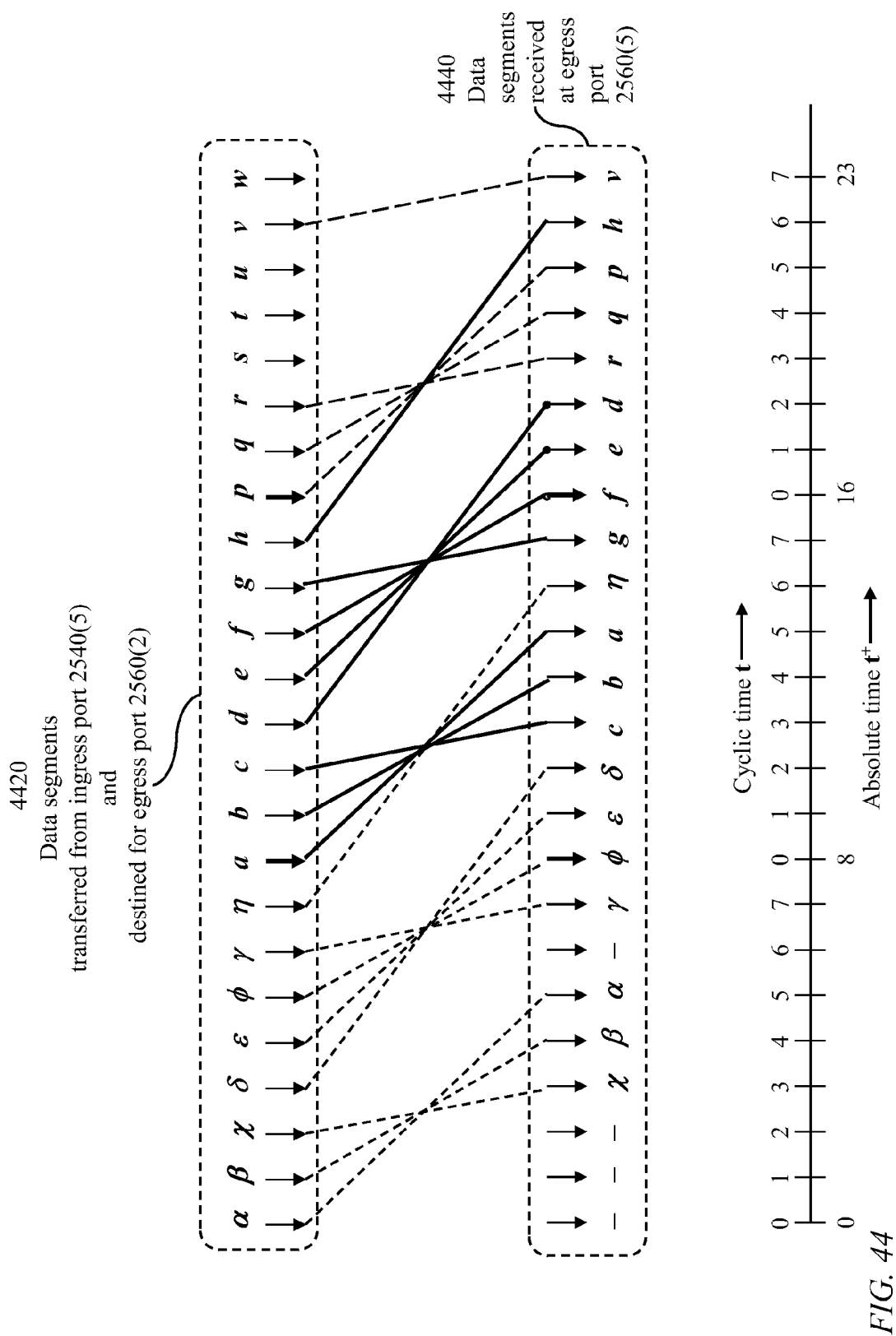
FIG. 44 illustrates data scrambling in a single-rotator latent space switch using an ascending rotator, where each transit memory device is connected to a peer inlet-outlet pair.

FIG. 44 illustrates data scrambling in a single-rotator latent space switch using an ascending rotator, where each transit memory device is connected to a paired inlet-outlet. A set 4420 of data segments, identified by alphabetical symbols, of a data stream from ingress port 2540(5) to egress port 2560(2) is received at egress port 2560(2) as a delayed set 4440 of a different order; for example, consecutive data segments labeled "a, b, c, d, e, f, g, h" transferred from ingress port 2540(5) at time instants 8 to 15 are received at egress port 2560(2) at time instants 11, 12, 13, 15, 16, 17, 18, and 22, in the order "c, b, a, g, f, e, d, h". FIGS. 44 to 47 indicate both cyclic time t and cumulative time $t^+$.

TABLE 2

Normalized Systematic Delay

|  |  | Time data transferred to transit memory: $t_1$ |  |  |  |  |  |  |  |
|---|---|---|---|---|---|---|---|---|---|
|  |  | 0 | 1 | 2 | 3 | 4 | 5 | 6 | 7 |
| Index of transit memory: m |  | 5 | 6 | 7 | 0 | 1 | 2 | 3 | 4 |
| Ascending rotator: Transit memory | $t_2^{(1)}$ | 5 | 4 | 3 | 2 | 1 | 0 | 7 | 6 |
| connected to paired inlet-outlet | $D^{(1)}$ | 5 | 3 | 1 | 7 | 5 | 3 | 1 | 7 |
| Descending rotator: Transit memory | $t_2^{(2)}$ | 3 | 6 | 1 | 4 | 7 | 2 | 5 | 0 |
| connected to paired inlet-outlet | $D^{(2)}$ | 3 | 5 | 7 | 1 | 3 | 5 | 7 | 1 |
| Ascending rotator: Transit memory | $t_2^{(3)}$ | 3 | 4 | 5 | 6 | 7 | 0 | 1 | 2 |
| connected to transposed inlet-outlet | $D^{(3)}$ | 3 | 3 | 3 | 3 | 3 | 3 | 3 | 3 |
| Descending rotator: Transit memory | $t_2^{(4)}$ | 5 | 6 | 7 | 0 | 1 | 2 | 3 | 4 |
| connected to transposed inlet-outlet | $D^{(4)}$ | 5 | 5 | 5 | 5 | 5 | 5 | 5 | 5 |

Figure 45:
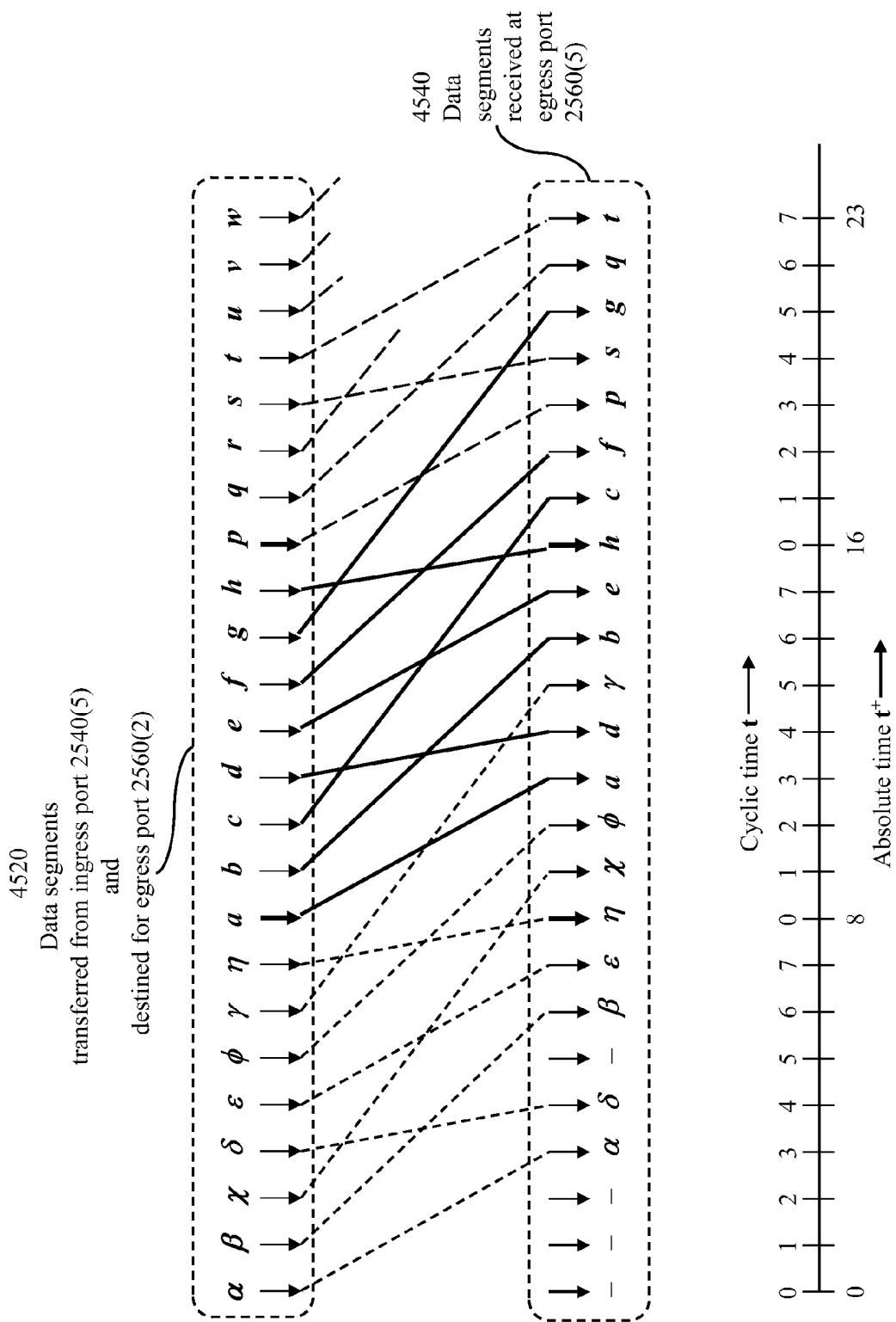
FIG. 45 illustrates data scrambling in a single-rotator latent space switch using a descending rotator, where each transit memory device is connected to a peer inlet-outlet pair.

FIG. 45 illustrates data scrambling in a single-rotator latent space switch using a descending rotator, where each transit memory device is connected to a paired inlet-outlet. A set 4520 of data segments of a data stream from ingress port 2540(5) to egress port 2560(2) is received at egress port 2560(2) as a delayed set 4540 of a different order; for example, consecutive data segments labeled "a, b, c, d, e, f, g, h" transferred from ingress port 2540(5) at time instants 8 to 15 are received at egress port 2560(2) at time instants 11, 12, 14, 15, 16, 17, 18, and 21, in the order "a, d, b, e, h, c, f, g".

The systematic delay of a data stream from an ingress port 2540($j$) to an egress port 2560($k$) in the configuration of FIG. 25 or FIG. 27 depends on the indices j, k, and the transposition order L; as indicated in FIG. 34, the normalized systematic delay would be $(j+k-L)_{modulo\ N}$, for an ascending rotator. If each outlet selector of an outlet 2526($k$) connects to an egress port 2560(L−k), the systematic delay becomes independent of the transposition order and would depend only on the indices j and k; as indicated in FIG. 35 the normalized systematic delay would be $(j-k)_{modulo\ N}$. FIG. 31 illustrates the single-rotator space switch of FIG. 27 with the outlet selector of each outlet 2526($k$) connecting to an egress port 2560(L−k) of a transposed index (L−k). It is noted, however, that the transposition order L is a fixed parameter of a selected switch configuration. Thus, data segments of a data stream are switched in proper order whether or not the systematic delay depends on the transposition order L.

The data-transfer timing illustrated in FIG. 34 and FIG. 35 applies to a single-rotator latent space switch employing an ascending rotator. FIG. 36 and FIG. 37 tabulate corresponding data-transfer timing of a single-rotator latent space employing a descending rotator. As indicated in FIG. 36, the normalized systematic delay experienced by a data stream from an ingress port 2540(j) to an egress port 2560(k) is determined as $(L-j-k)_{modulo\ N}$, instead of $(j+k-L)_{modulo\ N}$, for the case of an ascending rotator.

For the configuration of FIG. 31, where the egress ports 2560 are transposed with respect to the ingress ports, FIG. 37 indicates that the normalized systematic delay experienced by a data stream from an ingress port 2540(j) to an egress port 2560(k) is determined as $(k-j)_{modulo\ N}$ (instead of $(j-k)_{modulo\ N}$, for the case of an ascending rotator).

Figure 46:
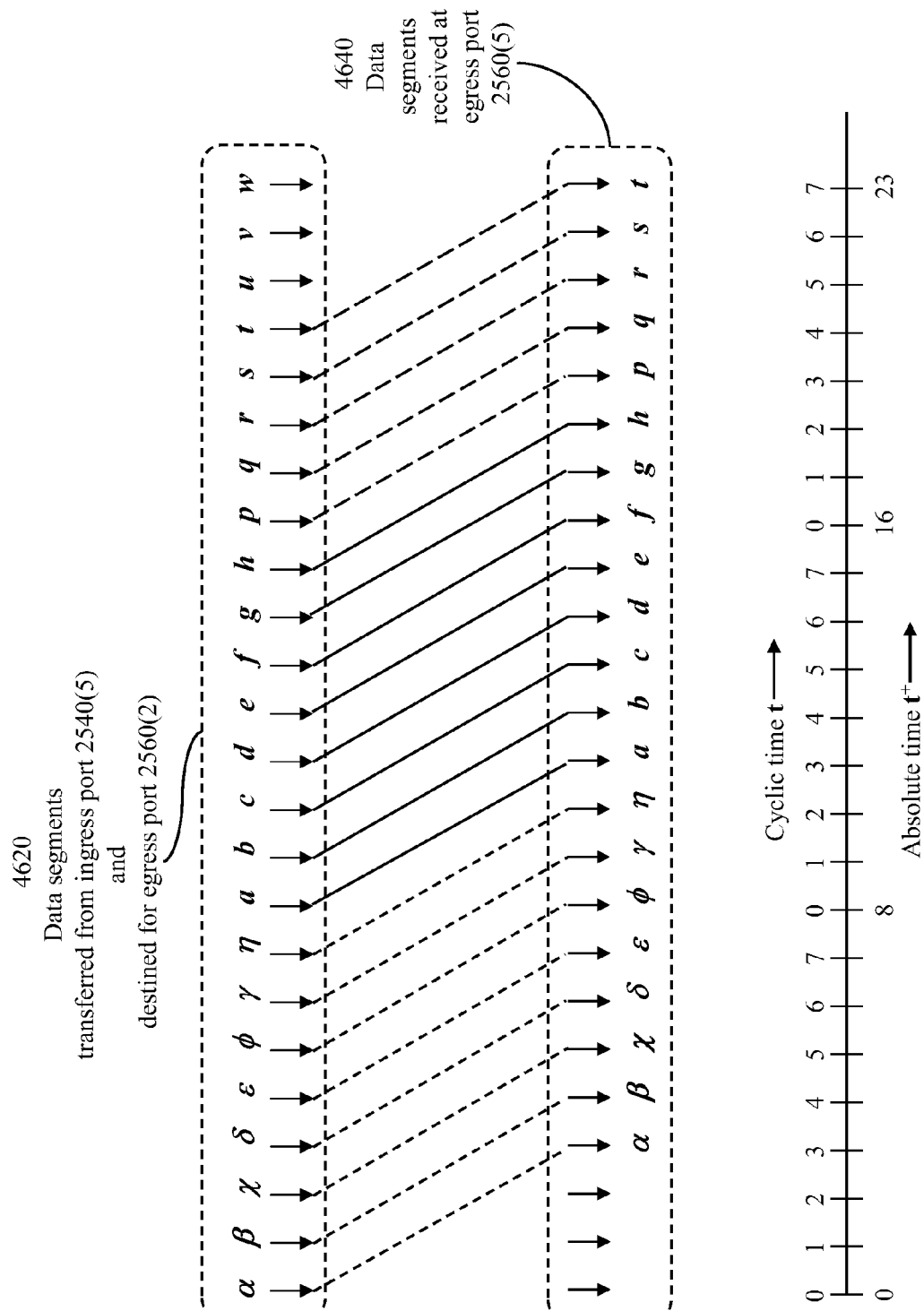
FIG. 46 illustrates preservation of data order in a single-rotator latent space switch using an ascending rotator, where each transit memory device is connected to a transposed inlet-outlet pair, in accordance with an embodiment of the present invention.

FIG. 46 illustrates preservation of data order in a single-rotator latent space switch using an ascending rotator, where each transit memory device is connected to a transposed inlet-outlet. A set 4620 of data segments transferred from an ingress port to an egress port is received as a delayed set 4640 which preserves the order of the data segments. As illustrated, consecutive data segments labeled "a, b, c, d, e, f, g, h" transferred from ingress port 2540(5) at time instants 8 to 15 are received in proper order at egress port 2560(2) at time instants 11 to 18, with a constant systematic delay of $D=(j-k)_{modulo\ N}$ time slots (j=5, k=2, N=8, D=3).

Figure 47:
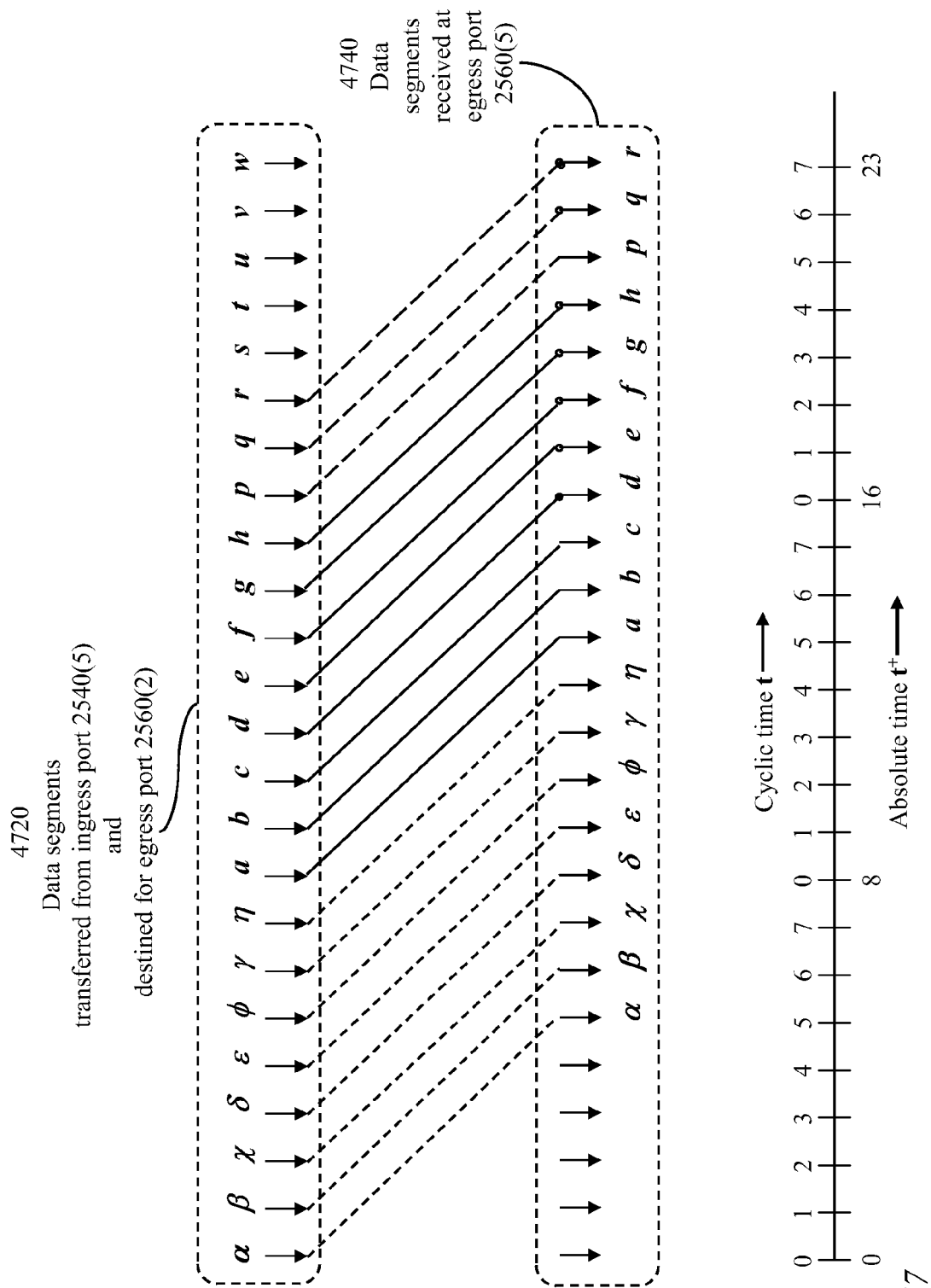
FIG. 47 illustrates preservation of data order in a single-rotator latent space switch using a descending rotator, where each transit memory device is connected to a transposed inlet-outlet pair, in accordance with an embodiment of the present invention.

FIG. 47 illustrates preservation of data order in a single-rotator latent space switch using a descending rotator, where each transit memory device is connected to a transposed inlet-outlet. A set 4720 of data segments transferred from an ingress port to an egress port is received as a delayed set 4740 which preserves the order of the data segments. As illustrated, consecutive data segments labeled "a, b, c, d, e, f, g, h" transferred from ingress port 2540(5) at time instants 8 to 15 are received in proper order at egress port 2560(2) at time instants 13 to 20, with a constant systematic delay of $D=(k-j)_{modulo\ N}$ time slots (j=5, k=2, N=8, D=5).

Figure 48:
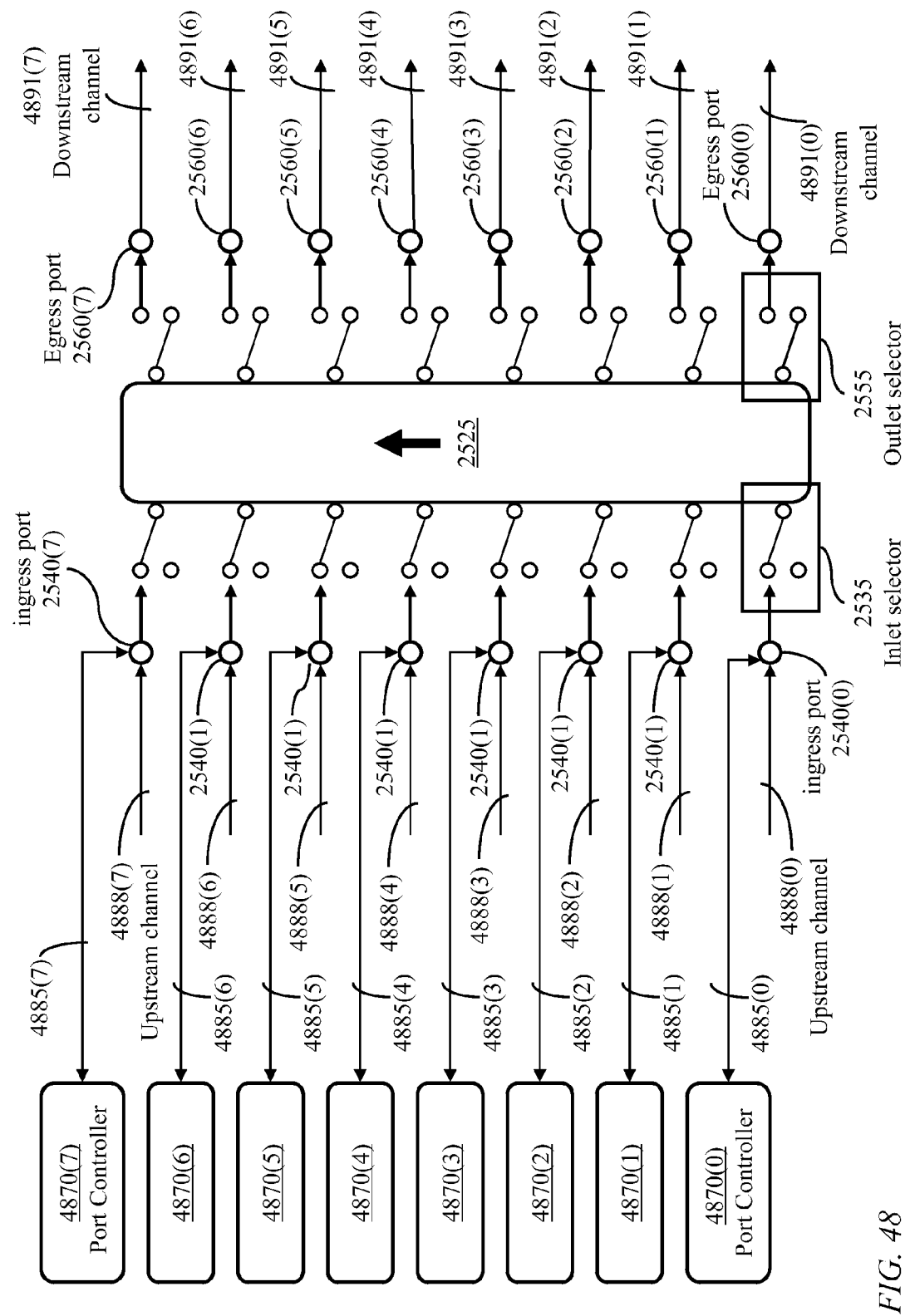
FIG. 48 illustrates port controllers each coupled to an ingress port of the single-rotator latent space switch of FIG. 25, where the ingress port and an aligned egress port connect to an inlet selector and an aligned outlet selector, in accordance with an embodiment of the present invention.

Each ingress port 2540(j) is integrated with an egress port 2560(j), 0≤j<N, to form an integrated access port accessible to external network elements, such as edge nodes. FIG. 48 illustrates port controllers 4870, individually referenced as 4870(0), 4870(1), . . . , 4870(7), connecting to ingress ports 2540 of the single-rotator latent space switch of FIG. 25 or FIG. 27. Each port controller 4870(j) has a dual channel 4885(j) to an ingress port 2540(j), 0≤j<N=8. The egress ports 2560 connect to outlet selectors of likewise-indexed outlets. Thus, egress port 2560(0) connects to the outlet selector of outlet 2526(0), egress port 2560(1) connects to the outlet selector of outlet 2526(1), etc. Each ingress port 2540(j) has a likewise-indexed upstream channel 4888(j) carrying data from respective edge nodes or other data sources. Each egress port 2560(k) has a likewise-indexed downstream channel 4891(k) carrying switched data to respective edge nodes or other data sinks.

Figure 49:
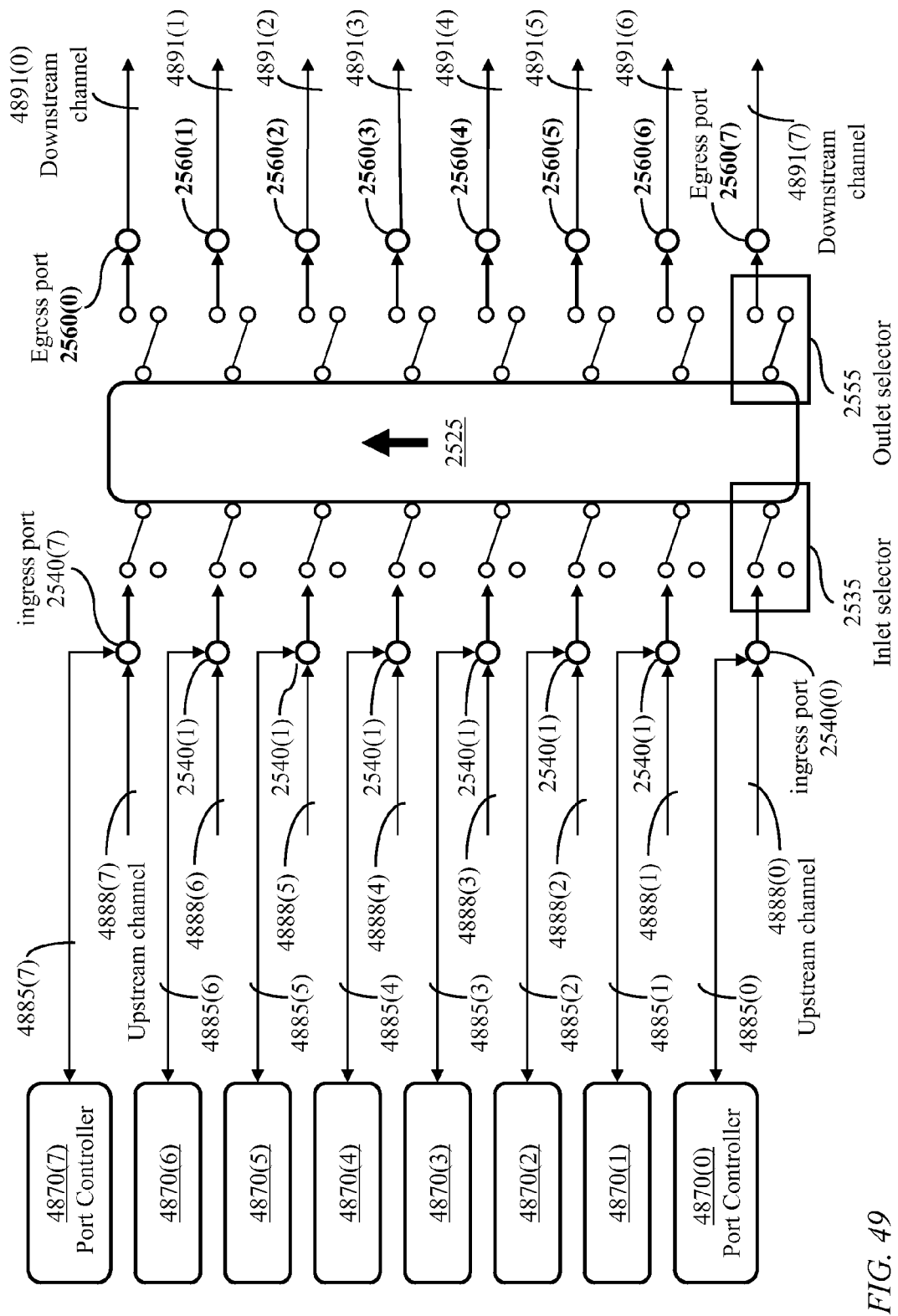
FIG. 49 illustrates port controllers each coupled to an ingress port of the single-rotator latent space switch of FIG. 25, where the ingress port and an aligned egress port connect to an inlet selector and a transposed outlet selector, in accordance with an embodiment of the present invention.

FIG. 49 illustrates the port controllers' connectivity of configuration of FIG. 48 applied to a configuration where each egress port 2560 connects to an outlet selector of an outlet of a transposed index. Thus, with a transposition order L of 7, egress port 2560(0) connects to the outlet selector of outlet 2526(7), egress port 2560(1) connects to the outlet selector of outlet 2526(6), etc.

Figure 50:
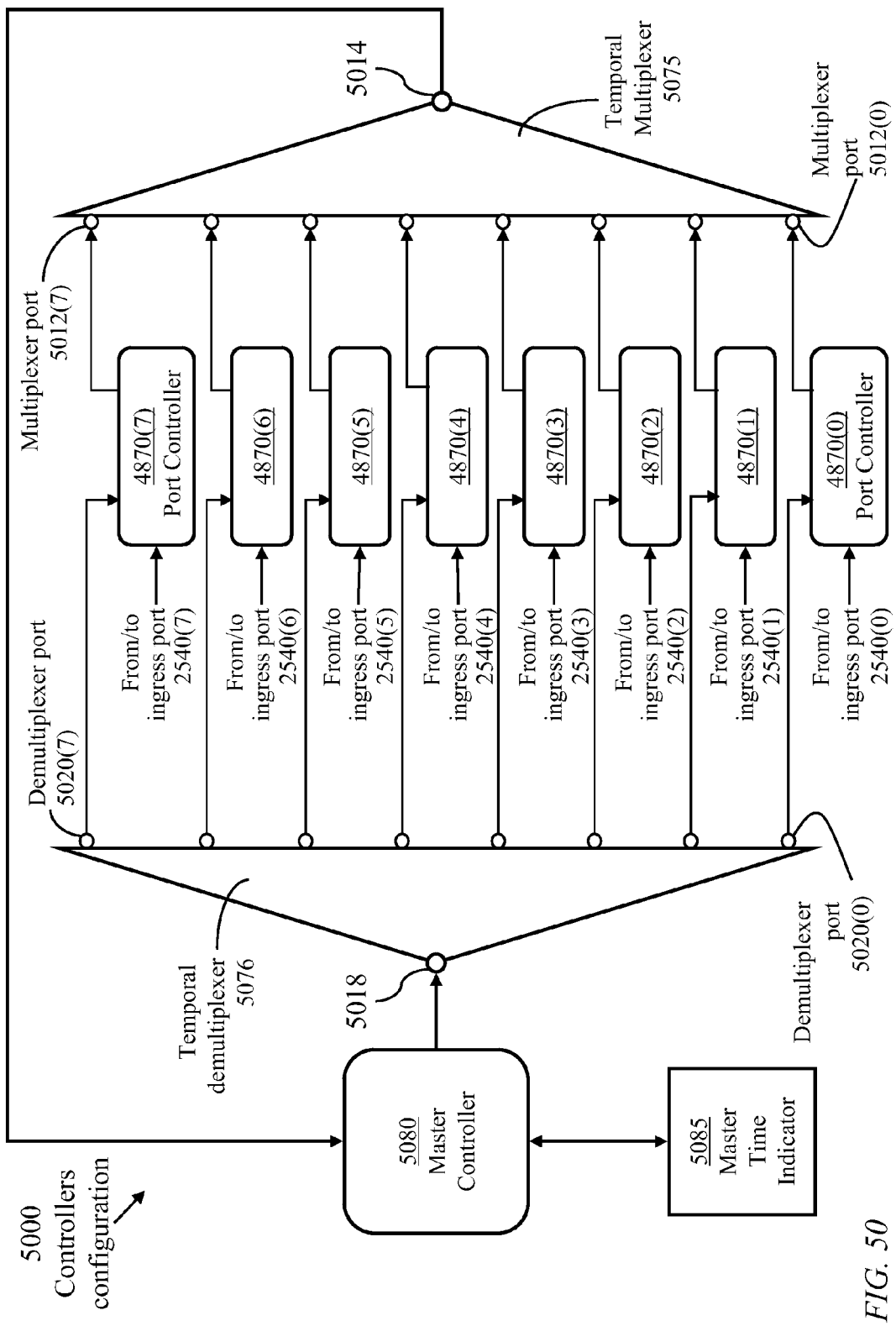
FIG. 50 illustrates a master controller for the single-rotator latent space switch of any of FIG. 25, 27, or 30, the master controller cyclically accesses the port controllers through a temporal multiplexer and a temporal demultiplexer, in accordance with an embodiment of the present invention.

FIG. 50 illustrates a control system 5000 for the single-rotator latent space switch of any of FIG. 25, 27, or 30. A master controller 5080 cyclically accesses the port controllers 4870 through a temporal multiplexer 5075 and a temporal demultiplexer 5076. The temporal multiplexer 5075 has N multiplexer input ports 5012(0), 5012(1), . . . , 5012(N-1) and one multiplexer output port 5014 connecting to master controller 5080. The temporal demultiplexer 5076 has one demultiplexer input port 5018 connecting to master controller 5080 and N demultiplexer output ports 5020(0), 5020(1), . . . , 5020(N-1) connecting to the port controllers. Each port controller 4870 has a channel to a multiplexer port 5012 and a channel from a demultiplexer port 5020. A master time indicator 5085 is coupled to the master controller and provides a reference time to be distributed by master controller 5080 to port controllers 4870 which, in turn, provide the reference time to external devices connecting to the port controllers 4870.

Figure 51:
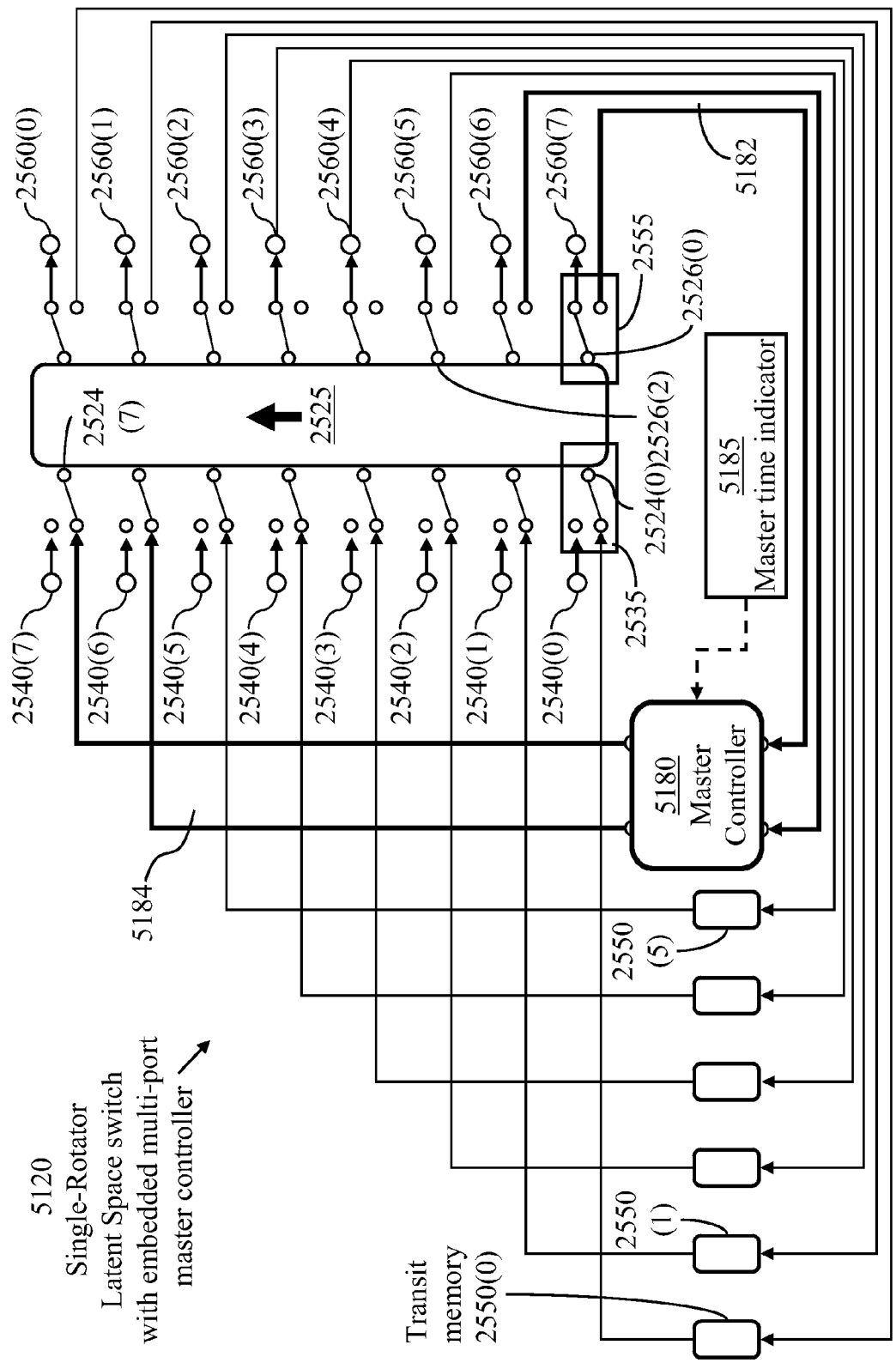
FIG. 51 illustrates a latent space switch having an embedded master controller connecting to two selected inlets, through respective inlet selectors, and corresponding transposed outlets, through respective outlet selectors, in accordance with an embodiment of the present invention.

A master controller may access port controllers 4870 through the single rotator, thus eliminating the multiplexer 5075 and the demultiplexer 5076. The master controller may connect to at least one inlet selector and at least one outlet selector. The ingress ports 2540 are individually integrated with respective egress ports 2560. Thus, a master controller may receive control signals from a specific ingress port 2540 through the single rotator 2525 and send control signals to an egress port integrated with the specific ingress port through the single rotator. FIG. 51 illustrates a latent space switch having an embedded master controller 5180 connecting to two selected inlets and corresponding transposed outlets of the latent space switch of FIG. 31. An upstream control channel 5182 connecting an outlet selector to master controller 5180 carries control signals from ingress ports 2540 through the rotator and a downstream control channel 5184 carries control signals from master controller 5180, through the rotator, to egress ports 2560 which are individually integrated with respective ingress ports. Such an arrangement has the advantage of enabling the master controller 5180 to connect to multiple inlets and multiple outlets, through respective inlet selectors and outlet selectors. When the number N of inlets, or outlets, is relatively large, for example for N>4000, the flow rate of control signals exchanged between the single-rotator latent space switch and external network elements connecting to the ingress ports 2540 and egress ports 2560 may require multiple upstream control channels 5182 to the master controller and multiple downstream control channels 5184 from the master controller. The upstream control channels 5182 and the downstream control channels 5164 preferably connect to transposed sets of inlet selectors and outlet selectors. For example, upstream control channels 5182 connect to outlet selectors of outlets 2526(0) and 2526(1) and downstream control channels 5184 connect to inlet selectors of inlets 2524(6) and 2524(7). Outlet 2526(0) and inlet 2524(7) are transposed with respect to each other; the transposition order of the configuration of FIG. 51 is L=7. Likewise, outlet 2526(1) and inlet 2524(6) are transposed with respect to each other.

A master time indicator 5185 is coupled to the master controller 5180 and provides a reference time to be distributed by master controller 5180 to egress ports 2560 which, in turn, provide the reference time to external devices.

Figure 52:
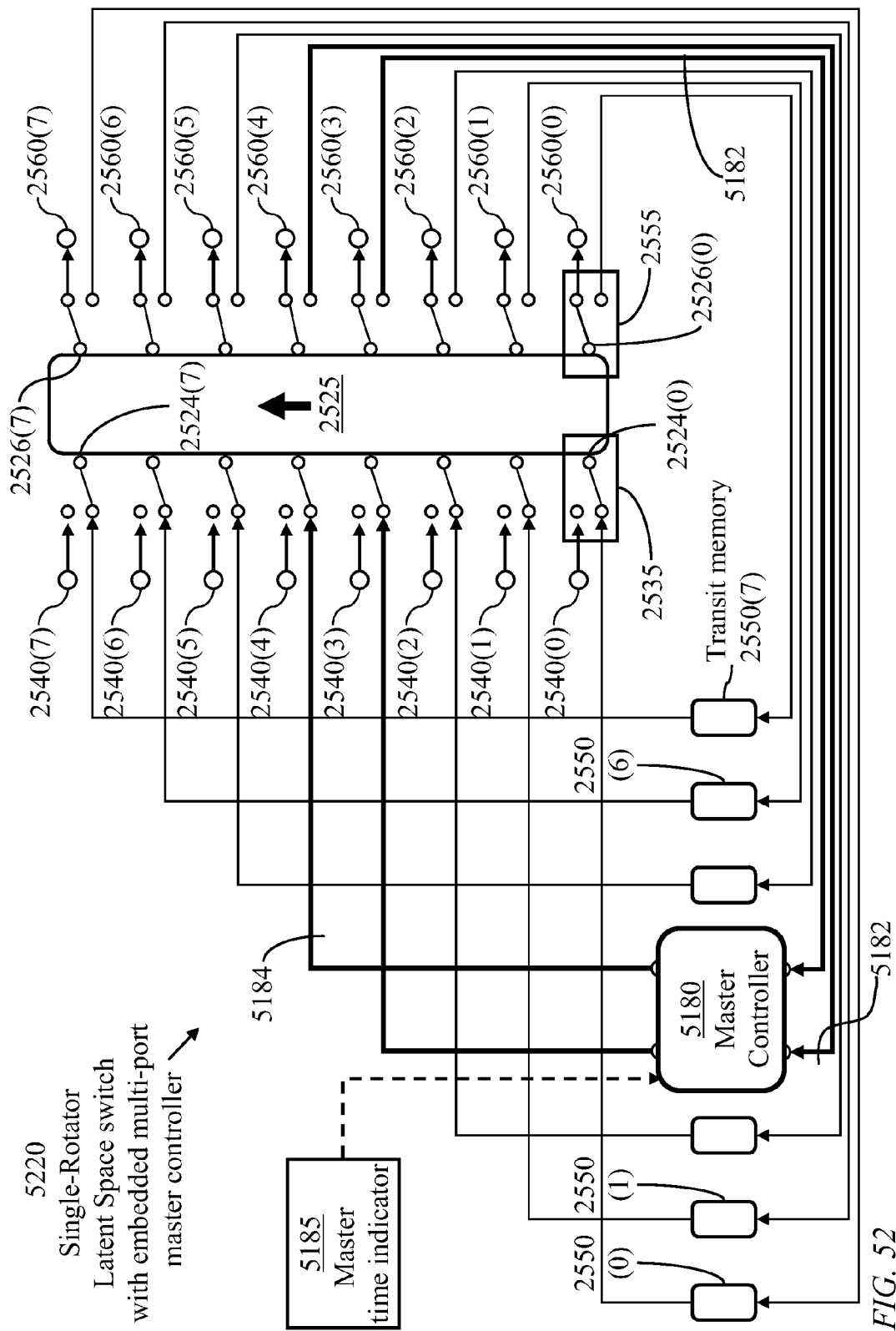
FIG. 52 illustrates a latent space switch similar to the latent space switch of FIG. 51 but with the embedded master controller connected differently to the rotator.

The master controller 5180 may connect to any inlet and a corresponding transposed outlet. FIG. 52 illustrates a connectivity pattern of the master controller 5180 of FIG. 51 where the upstream channels 5182 connect to outlet selectors of outlets 2526(3) and 2526(4) and the downstream control channels 5184 connect to inlet selectors of inlets 2524(3) and 2524(4). With L=7, outlet 2526(4) and inlet 2524(3) are transposed with respect to each other, and outlet 2526(3) and inlet 2524(4) are transposed with respect to each other. The latent space switch 5220 of FIG. 52 has an embedded master controller 5180 connecting to inlets 2524(3) and 2524(4), through respective inlet selectors, and corresponding transposed outlets 2526(4) and 2526(3), through respective outlet selectors.

Figure 53:
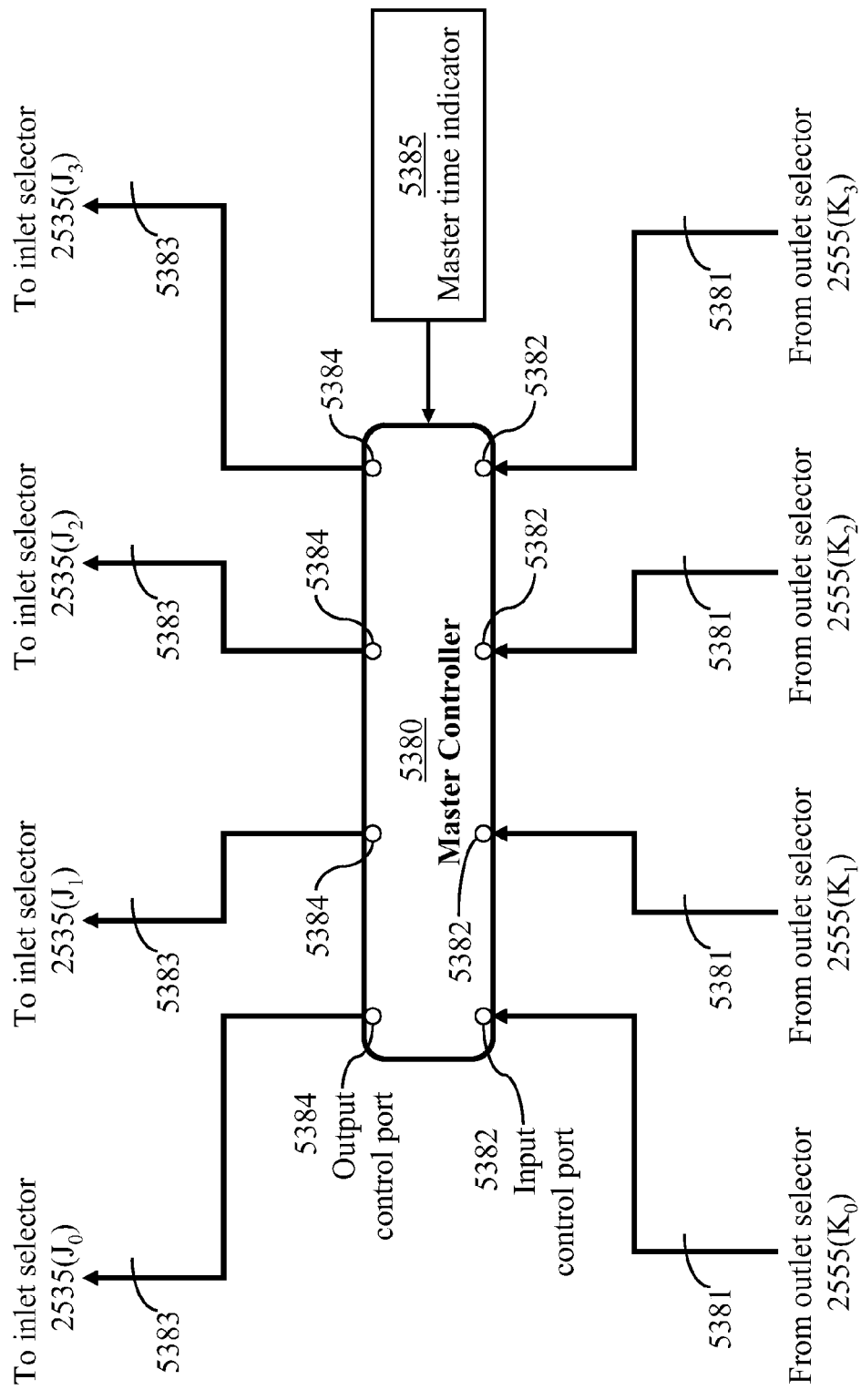
FIG. 53 illustrates a master controller connecting to four inlet selectors and corresponding transposed outlet selectors in a single-rotator latent space switch, of any of the configurations of FIGS. 25, 27, 29, 30, and 31 in accordance with an embodiment of the present invention.

FIG. 53 illustrates a master controller 5380 connecting to four inlet selectors and corresponding transposed outlet selectors in a single-rotator space switch of any of the configurations of FIGS. 25, 27, 29, 30 and 31 but with a much larger number N of ingress ports (N>1000, for example). Four upstream control channels 5381, carrying control signals received from ingress ports 2540(0) to 2540(N−1) through the rotator 2525, connect four control outlets 2526($K_0$), 2526($K_1$), 2526($K_2$), 2526($K_3$), through respective outlet selectors 2555, to input control ports 5382 of the master controller 5380. Four downstream control channels 5383 connect output control ports 5384 of master controller 5380 to four control inlets 2524($J_0$), 2524($J_1$), 2524($J_2$), 2524($J_3$), through respective inlet selectors 2535. In general, the master controller 5380 may connect to a set of Ω control inlets and a set of Ω control outlets, Ω≥1. Preferably the set of control inlets and the set control outlets are selected to be transposed sets so that each control inlet has a corresponding transposed control outlet. For example, with Ω=4, the indices $J_0$, $J_1$, $J_2$, and $J_3$ of the control inlets and the indices $K_0$, $K_1$, $K_2$, and $K_3$ of the control outlets may be selected so that: ($J_0$+$K_0$)=($J_1$+$K_1$)=($J_2$+$K_2$)=($J_3$+$K_3$)=L, L being a transposition index, 0≤L<N. Preferably, the four control outlets are evenly spread so that |$K_1$−$K_0$|, |$K_2$−$K_1$|, |$K_3$−$K_2$|, and |$K_0$−$K_3$| are equal or differ slightly.

The order of pairing control inlets and control outlets is arbitrary; for example the transposition of the set of control inlets and control outlets may be realized with:

$$(J_0+K_2)_{modulo\ N}=(J_1+K_3)_{modulo\ N}=(J_2+K_0)_{modulo\ N}=(J_3+K_1)_{modulo\ N}=L.$$

When the number N of inlets (or outlets) is large, master controller 5380 would have multiple input control ports 5382 and multiple output control ports 5384. The single rotator considered in FIG. 53 may have 2048 inlets and 2048 outlets. With four upstream control channels, the indices $K_0$, $K_1$, $K_2$, and $K_3$ are selected to be 0, 512, 1024, and 1536. With L=(N−1), the corresponding indices of the transposed inlets $J_0$, $J_1$, $J_2$, and $J_3$ are (2047−0), (2047−512=1535), (2047−1024=1023), and (2047−1536=511), respectively.

A master time indicator 5385 is coupled to the master controller 5380. Master time indicator 5385 provides a reference time which may be distributed by master controller 5380 to egress ports 2560 which, in turn, may provide the reference time to external devices.

Figure 54:
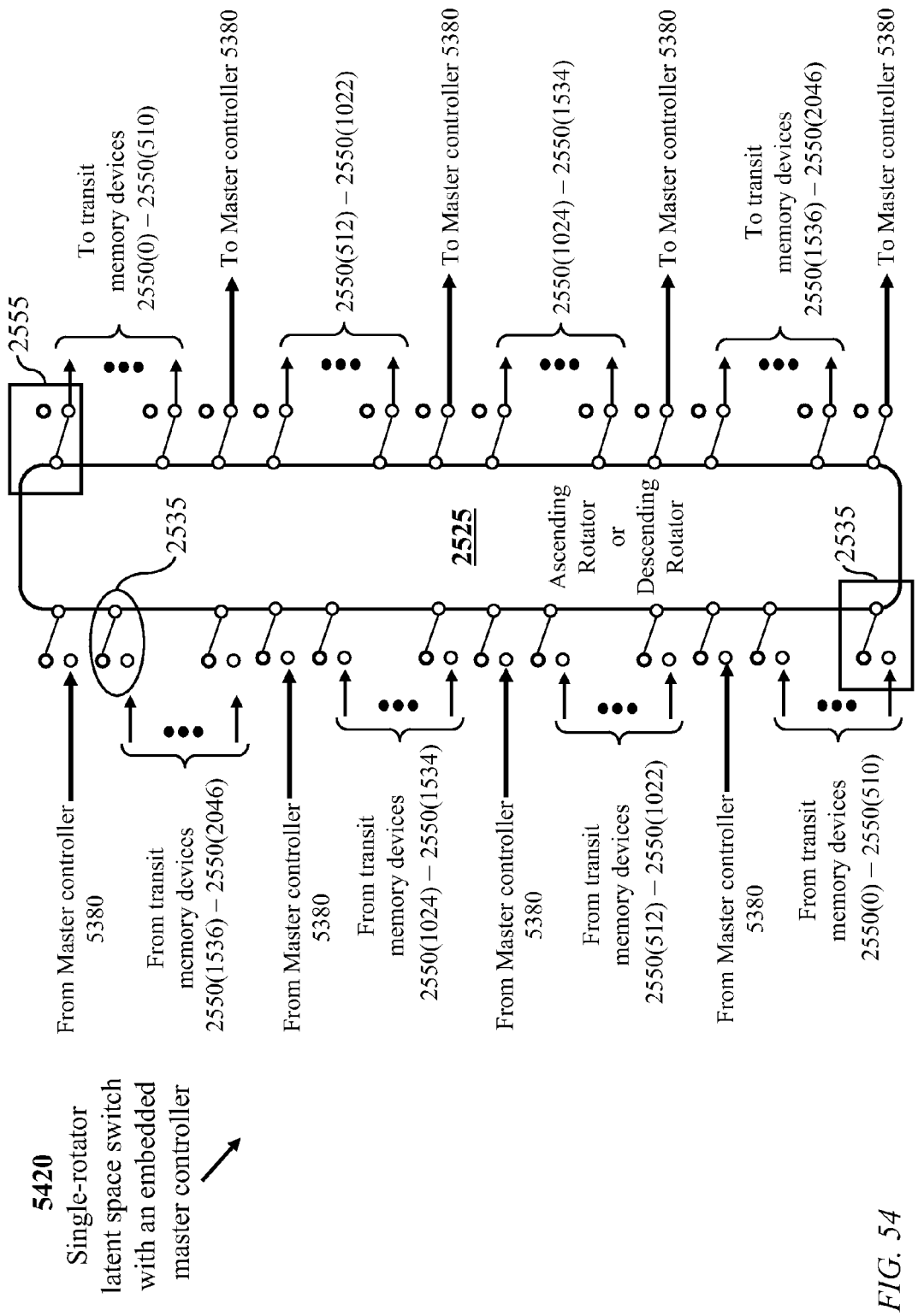
FIG. 54 illustrates connectivity of a rotator having 2048 inlets and 2048 outlets to the multi-port master controller of FIG. 53 and to transit memory devices, in accordance with an embodiment of the present invention.

FIG. 54 illustrates connectivity of a rotator having 2048 inlets and 2048 outlets to the master controller of FIG. 53 and to transit memory devices of a single-rotator latent space switch 5420. The outlets connecting to upstream control channels 5381, through respective outlet selectors, have indices 0, 512, 1024, and 1536. The inlets to which the four downstream control channels 5383 connect through respective inlet selectors have indices 2047, 1535, 1023, and 511. Rotator 2525 of FIG. 54 supports N ingress ports and N egress ports, and (N−4) transit memory devices 2550. A transit-memory device 2550 and an ingress port alternately connect to a respective inlet 2524(j). A transposed outlet 2526 of index |(L−j)| alternately connects to the transit-memory device and an egress port.

Figure 55:
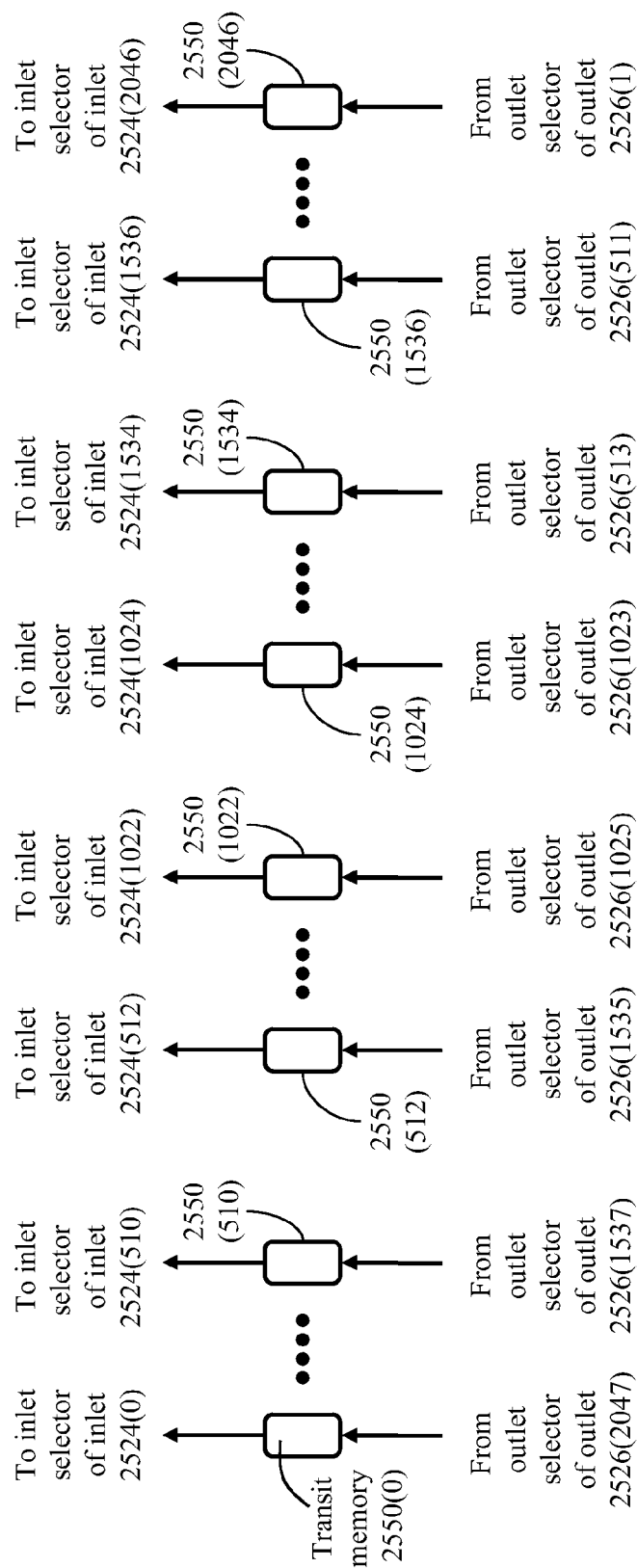
FIG. 55 illustrate connectivity of transit memory devices in a single-rotator space switch having 2048 inlets and 2048 outlets, hence 2048 inlet selectors and 2048 outlet selectors, where 2044 transit memory devices are arranged into four groups each connecting to consecutive inlet selectors and corresponding transposed outlet selectors so that the master controller of FIG. 53 connects to evenly spaced inlet selectors and corresponding evenly spaced outlet selectors, in accordance with an embodiment of the present invention.

FIG. 55 illustrates connectivity of transit memory devices in a single-rotator space switch having 2048 inlets, 2048 outlets, 2048 inlet selectors, and 2048 outlet selectors. With master controller 5380 connecting to four inlet selectors and corresponding transposed outlet selectors, 2044 transit memory devices 2550 connect to 2044 inlet selectors and 2044 outlet selectors. The transit memory devices are arranged into four groups each connecting to consecutive inlet selectors and corresponding transposed outlet selectors so that the master controller of FIG. 53 connects to evenly spaced inlet selectors and corresponding evenly spaced outlet selectors. Transit-memory devices 2550(0) to 2550(510) connect to inlet selectors 2535(0) to 2535(510) and corresponding transposed outlet selectors 2555(2047) to 2555(1537). Transit-memory devices 2550(512) to 2550(1022) connect to inlet selectors 2535(512) to 2535(1022) and corresponding transposed outlet selectors 2555(1535) to 2555(1025). Transit-memory devices 2550(1024) to 2550(1534) connect to inlet selectors 2535(1024) to 2535(1534) and corresponding transposed outlet selectors 2555(1023) to 2555(513). Transit-memory devices 2550(1536) to 2550(2046) connect to inlet selectors 2535(1536) to 2535(2046) and corresponding transposed outlet selectors 2555(511) to 2555(1).

WRITE and READ Addresses

The single-rotator latent space switches of FIG. 25 and FIG. 27 use a rotator having 8 inlets and 8 outlets (N=8). Each of 8 transit memory devices 2550 connects to a transposed inlet-outlet pair with a transposition order of 7 (L=7). During time-slot 0 (t=0), an inlet 2524(j) connects to outlet 2526(j). With rotator 2525 operated as an ascending rotator the normalized systematic delay for a connection from ingress port 2540(j) to egress port 2560(k) is determined as $\{j+k-L\}_{modulo\ N}$.

Preferably, each transit memory device 2550 is logically divided into N memory divisions, each memory division for holding data directed to a respective egress port. In the arrangement of FIG. 25, a transit memory device 2550(m), connects to outlets m, $(m+1)_{modulo\ N}$, $(m+2)_{modulo\ N}$, ..., $(m+N-1)_{modulo\ N}$, during time slots 0, 1, ..., (N−1). With memory divisions of equal lengths, a memory-READ address of a transit-memory device 2550(m) during a time slot t, 0≤t<N, is then proportional to $(m+t)_{modulo\ N}$. An up-counter, reset to state (L−m) during time slot 0 of a time frame of N time slots, may be coupled to a transit-memory device 2550(m) to provide an indication of memory-READ addresses during each time slot of the time frame. Table-3 indicates states of up-counters coupled to the transit-memory devices 2550(m), 0≤m<N, of the single-rotator latent space switch of FIG. 25.

TABLE 3 up-counter states during a time frame,
configuration 2520, ascending rotator

| | Indices of egress ports connecting to memory device 2550(m): | | | | | | | |
|---|---|---|---|---|---|---|---|---|
| t | m = 0 | m = 1 | m = 2 | m = 3 | m = 4 | m = 5 | m = 6 | m = 7 |
| 0 | 7 | 6 | 5 | 4 | 3 | 2 | 1 | 0 |
| 1 | 0 | 7 | 6 | 5 | 4 | 3 | 2 | 1 |
| 2 | 1 | 0 | 7 | 6 | 5 | 4 | 3 | 2 |
| 3 | 2 | 1 | 0 | 7 | 6 | 5 | 4 | 3 |
| 4 | 3 | 2 | 1 | 0 | 7 | 6 | 5 | 4 |
| 5 | 4 | 3 | 2 | 1 | 0 | 7 | 6 | 5 |
| 6 | 5 | 4 | 3 | 2 | 1 | 0 | 7 | 6 |
| 7 | 6 | 5 | 4 | 3 | 2 | 1 | 0 | 7 |

For the switch configuration of FIG. 30, with N=8, transposition order L of 7, and using an ascending rotator which connects inlet j to outlet k, $k=\{j+t\}_{modulo\ N}$, the normalized transit delay (i.e., the normalized systematic delay) for a connection from inlet j to outlet k equals $\{j-k\}_{modulo\ N}$.

The single-rotator latent space switches of FIG. 30 is similar to the single-rotator latent space switches of FIG. 25 except that each outlet 2526(k) accesses an egress port 2560 (L−k), where the transposition order L equals N−1=7. With rotator 2525 operated as an ascending rotator the normalized systematic delay for a connection from ingress port 2540(j) to egress port 2560(k) is determined as $\{j-k\}_{modulo\ N}$.

A down-counter, reset to state m during time slot 0 of a time frame of N time slots, may be coupled to a transit-memory device 2550(m) to provide an indication of memory-READ addresses during each time slot of the time frame. Table-4 indicates states of down-counters coupled to the transit-memory devices 2550(m), 0≤m<N, of the single-rotator latent space switch of FIG. 30.

TABLE 4 down-counter states during a time frame,
configuration 3020, ascending rotator

Indices of egress ports connecting to memory device 2550(m):

| t | m = 0 | m = 1 | m = 2 | m = 3 | m = 4 | m = 5 | m = 6 | m = 7 |
|---|---|---|---|---|---|---|---|---|
| 0 | 0 | 1 | 2 | 3 | 4 | 5 | 6 | 7 |
| 1 | 7 | 0 | 1 | 2 | 3 | 4 | 5 | 6 |
| 2 | 6 | 7 | 0 | 1 | 2 | 3 | 4 | 5 |
| 3 | 5 | 6 | 7 | 0 | 1 | 2 | 3 | 4 |
| 4 | 4 | 5 | 6 | 7 | 0 | 1 | 2 | 3 |
| 5 | 3 | 4 | 5 | 6 | 7 | 0 | 1 | 2 |
| 6 | 2 | 3 | 4 | 5 | 6 | 7 | 0 | 1 |
| 7 | 1 | 2 | 3 | 4 | 5 | 6 | 7 | 0 |

With rotator 2525 operated as a descending rotator in the configuration of FIG. 25, the normalized systematic delay for a connection from ingress port 2540(j) to egress port 2560(k) is determined as $\{L-j-k\}_{modulo\ N}$.

A down-counter, reset to state (L−m) during time slot 0 of a time frame of N time slots, may be coupled to a transit-memory device 2550(m) to provide an indication of memory-READ addresses during each time slot of the time frame. Table-5 indicates states of down-counters coupled to the transit-memory devices 2550(m), 0≤m<N, of the single-rotator latent space switch of FIG. 25.

TABLE 5 down-counter states during a time frame,
configuration 2520, descending rotator

Indices of egress ports connecting to memory device 2550(m):

| t | m = 0 | m = 1 | m = 2 | m = 3 | m = 4 | m = 5 | m = 6 | m = 7 |
|---|---|---|---|---|---|---|---|---|
| 0 | 7 | 6 | 5 | 4 | 3 | 2 | 1 | 0 |
| 1 | 6 | 5 | 4 | 3 | 2 | 1 | 0 | 7 |
| 2 | 5 | 4 | 3 | 2 | 1 | 0 | 7 | 6 |
| 3 | 4 | 3 | 2 | 1 | 0 | 7 | 6 | 5 |
| 4 | 3 | 2 | 1 | 0 | 7 | 6 | 5 | 4 |
| 5 | 2 | 1 | 0 | 7 | 6 | 5 | 4 | 3 |
| 6 | 1 | 0 | 7 | 6 | 5 | 4 | 3 | 2 |
| 7 | 0 | 7 | 6 | 5 | 4 | 3 | 2 | 1 |

With rotator 2525 operated as a descending rotator in the configuration of FIG. 30, the normalized systematic delay for a connection from ingress port 2540(j) to egress port 2560(k) is determined as $\{k-j\}_{modulo\ N}$.

TABLE 6

Up-counter states during a time frame,
configuration 3020, descending rotator

Indices of egress ports connecting to memory device 2550(m):

| t | m = 0 | m = 1 | m = 2 | m = 3 | m = 4 | m = 5 | m = 6 | m = 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 0 |
| 2 | 2 | 3 | 4 | 5 | 6 | 7 | 0 | 1 |
| 3 | 3 | 4 | 5 | 6 | 7 | 0 | 1 | 2 |
| 4 | 4 | 5 | 6 | 7 | 0 | 1 | 2 | 3 |
| 5 | 5 | 6 | 7 | 0 | 1 | 2 | 3 | 4 |
| 6 | 6 | 7 | 0 | 1 | 2 | 3 | 4 | 5 |
| 7 | 7 | 0 | 1 | 2 | 3 | 4 | 5 | 6 |

An up-counter, reset to state m during time slot 0 of a time frame of N time slots, may be coupled to a transit-memory device 2550(m) to provide an indication of memory-READ addresses during each time slot of the time frame. Table-6 indicates states of up-counters coupled to the transit-memory devices 2550(m), 0≤m<N, of a single-rotator latent space switch of FIG. 30 using a descending rotator.

As described above, each transit-memory device 2550 may be logically partitioned into N memory sections (memory divisions), each memory section for holding a data segment directed to a respective egress port. During each time slot, an ingress port transfers a data segment destined for an egress port to a memory device to which the ingress port connects through the rotator. The WRITE address of the memory device is a function of the destined egress port and may vary during successive time slots. The occupancy state of the outlet leading to the destined egress port during each time slot is determined by a master controller 3280, 3380, 5080, 5180, or 5380 which oversees the occupancy states of all inlets and all outlets. The master controller selects, for each ingress port, an egress port during each time slot and communicates the selection to the port controller coupled to the ingress port. The port controller may determine a WRITE address and affix the WRITE address to a data segment to be transferred to the destined egress port.

Unlike the WRITE addresses in a memory device 2550 which may vary during successive time slots, the READ addresses are sequential. With each memory device logically partitioned into N sections, each section for storing data directed to a respective egress port of the N egress ports, data segments are read from successive sections during successive time slots. During the N time slots of a time frame, data segments directed to outlets {2526(0), 2526(1), . . . , 2526(N−1)} are read from a memory device of index m, 0≤m<N, from sections m, $(m+1)_{modulo\ N}$, . . . , $(m+N-1)_{modulo\ N}$, if the rotator is an ascending rotator or from sections m, $(m-1)_{modulo\ N}$, . . . , $(m-N+1)_{modulo\ N}$, if the rotator is a descending rotator. A memory controller of each memory device may be configured to sequentially generate memory addresses of the N sections. An up-counter or a down-counter may be used to determine successive memory-READ addresses as indicated in Table-3, Table-4, Table-5, and Table-6.

FIG. 56 illustrates settings of initial states of counters used to provide sequential READ-addresses of transit-memory devices 2550 for switch configurations employing an ascending rotator or a descending rotator and an up-counter or a down-counter. The index of an egress port to which a specific memory device connects during a time slot t is herein denoted E(t), 0≤t<N. A list of {E(0), E(1), . . . , E(N−1)} may be stored in an address memory (not illustrated) associated with a transit-memory device holding payload data segments. Preferably, each transit-memory device 2550(*m*) acquires N sequential READ addresses from a respective counter of N states triggered each time slot of the time frame.

Considering the configuration of FIG. 25 employing a descending rotator, a down-counter having a state of $(L-m)_{modulo\ N}$ during time slot t=0 of each time frame provides a READ-address for transit-memory device 2550(*m*) during each time slot. The corresponding normalized systematic delay is then $\Delta=(L-j-k)_{modulo\ N}$. Using an up-counter in the configuration of FIG. 25 employing an ascending rotator, the up-counter may have a state of $(L-m)_{modulo\ N}$ during time slot t=0 of each time frame and the corresponding normalized systematic delay is then $\Delta=(j+k-L)_{modulo\ N}$.

Considering the configuration of FIG. 30 employing a descending rotator, an up-counter having a state of m during time slot t=0 of each time frame provides a READ-address for transit-memory device 2550(*m*) during each time slot. The corresponding normalized systematic delay is then $\Delta=(k-j)_{modulo\ N}$. Using a down-counter in the configuration of FIG. 30 employing an ascending rotator, the down-counter may have a state of m during time slot t=0 of each time frame and the corresponding normalized systematic delay is then determined as $\Delta=(j-k)_{modulo\ N}$.

Figure 57:
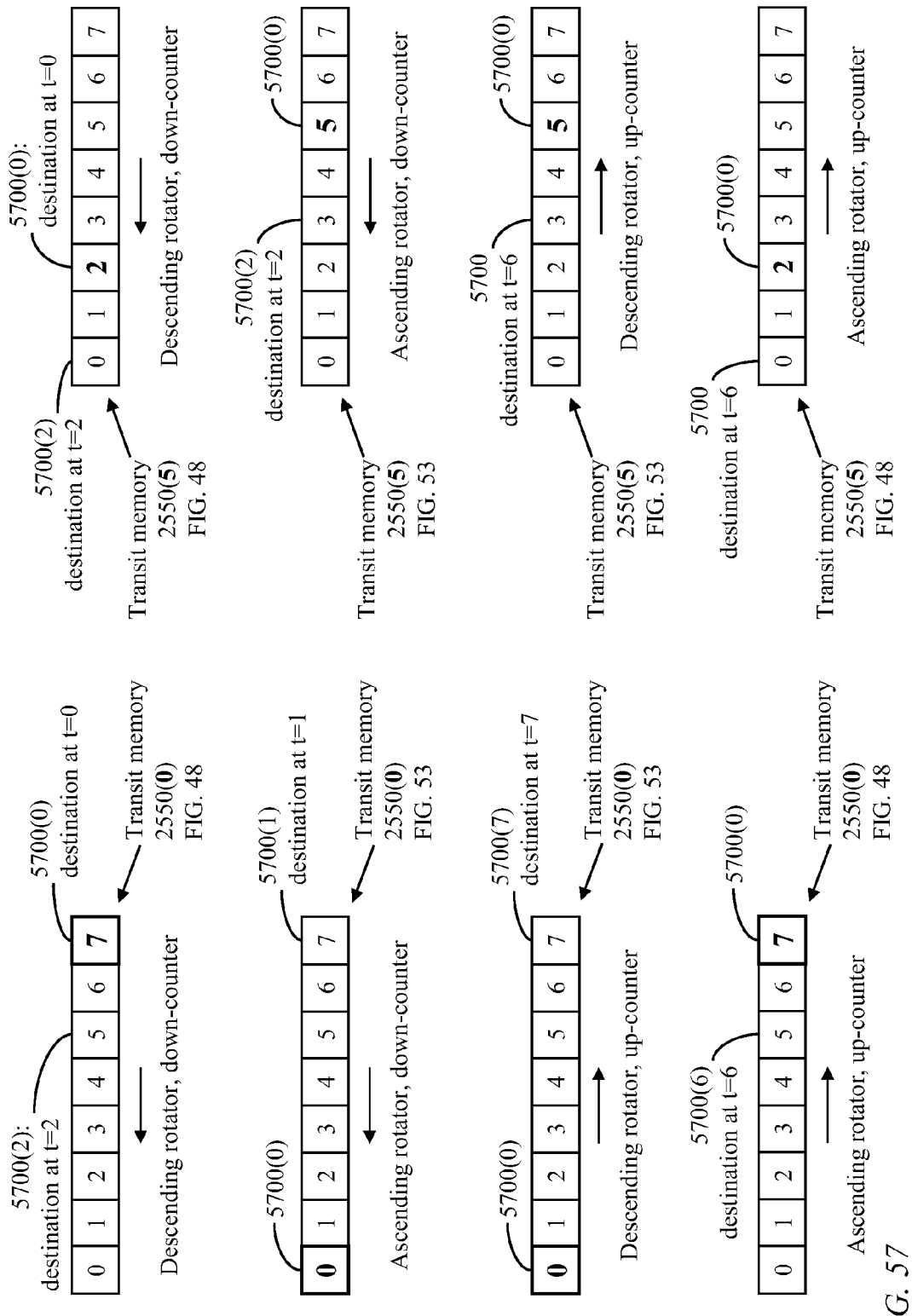
FIG. 57 illustrates settings of initial states of counters for exemplary switch configurations having a small number of dual ingress-egress ports.

FIG. 57 illustrates the counter settings of FIG. 56 for a case of N=8, L=7, m=0 and m=5. Identifiers 5700 of indices E(t) of memory sections to be read during N successive time slots of a time frame are illustrated. Using an ascending rotator and an up-counter in the configuration of FIG. 25, E(0) is set as $(L-m)_{modulo\ N}$, which equals 7 for m=0 and equals 2 for m=5. For m=0, the sections of memory device 2550(0) are read in the sequence 7, 0, 1, 2, 3, 4, 5, and 6 during time slots 0 to 7. For m=5, the sections of memory device 2550(5) are read in the sequence 2, 3, 4, 5, 6, 7, 0, and 1 during time slots 0 to 7.

Using a descending rotator and an up-counter in the configuration of FIG. 30, E(0) is set as m. For m=0, the sections of memory device 2550(0) are read in the sequence 0, 1, 2, 3, 4, 5, 6, and 7 during time slots 0 to 7. For m=5, the sections of memory device 2550(5) are read in the sequence 5, 6, 7, 0, 1, 2, 3, and 4 during time slots 0 to 7.

Using an ascending rotator and a down-counter in the configuration of FIG. 30, E(0) is set as m. For m=0, the sections of memory device 2550(0) are read in the sequence 0, 7, 6, 5, 4, 3, 2, and 1 during time slots 0 to 7. For m=5, the sections of memory device 2550(5) are read in the sequence 5, 4, 3, 2, 1, 0, 7, and 6 during time slots 0 to 7.

Using a descending rotator and a down-counter in the configuration of FIG. 25, E(0) is set as $(L-m)_{modulo\ N}$, which equals 7 for m=0 and equals 2 for m=5. For m=0, the sections of memory device 2550(0) are read in the sequence 7, 6, 5, 4, 3, 2, 1, and 0 during time slots 0 to 7. For m=5, the sections of memory device 2550(5) are read in the sequence 2, 1, 0, 7, 6, 5, 4, and 3 during time slots 0 to 7.

FIG. 58 illustrates indices of upstream control time slots of a time frame organized in 2048 time slots at selected ingress ports of the single rotator of FIG. 54, where the single rotator is an ascending rotator. An ingress port 2540(*j*) receives payload data and control data from an edge node or any other external source. Both the payload data and control data are organized into data segments each having a duration of a time slot of N time slots of a repetitive time frame. The master controller 5380 receives upstream control data from the N ingress ports 2540 through a set of $\Omega$, $\Omega>1$, control outlets 2526($K_0$), 2526($K_1$), ..., 2526($K_{\Omega-1}$). The master controller 5380 sends downstream control data, through the rotator, to the N egress ports 2560 from a set of $\Omega$, $\Omega>1$, control inlets 2524($J_0$), 2524($J_1$), ..., 2524($J_{\Omega-1}$). An ingress port 2540(*j*), $0 \le j < N$, accesses the $\Omega$ control outlets during upstream control time slots:

$$\{(K_0-j)_{modulo\ N}, (K_1-j)_{modulo\ N}, \ldots, (K_{\Omega-1}-j)_{modulo\ N}\}.$$

Thus, upstream control data from ingress port 2540(*j*) to the master controller 5380 interleave payload data during the $\Omega$ upstream control time slots. FIG. 58 illustrates the positions of $\Omega$ downstream control time slots (with $\Omega=4$) within a time frame of N time slots, with N=2048, for ingress ports 2540(0), 2540(500), 2540(1000), 2540(1500), and 2540(2000). Ingress port 2540(0) accesses control outlets 2526($K_0$), 2526($K_1$), 2526($K_2$), and 2526($K_3$), during time slots 0, 512, 1024, and 1536, respectively. Ingress port 2540(500) accesses control outlets 2526($K_1$), 2526($K_2$), 2526($K_3$), and 2526($K_0$), during time slots 12, 524, 1036, and 1548, respectively. Likewise, each of ingress ports 2540(1000), 2540(1500), and 2540(2000) accesses $\Omega$ control outlets in a respective order. During a time frame, each ingress port 2540(0) to 2540(N-1) accesses each of the $\Omega$ control outlets.

Figure 59:
FIG. 59 illustrates indices of downstream control time slots of a time frame organized in 2048 time slots at each control inlet port of the single rotator of FIG. 54, where the single rotator is an ascending rotator.

FIG. 59 illustrates indices of downstream control time slots of a time frame organized in 2048 time slots at each control inlet port of the single rotator of FIG. 54, where the single rotator is an ascending rotator. The $\Omega$ control inlets access an egress port 2560(*k*), $0 \le k < N$, during downstream control time slots:

$$\{(k-J_0)_{modulo\ N}, (k-J_1)_{modulo\ N}, \ldots, (k-J_{\Omega-1})_{modulo\ N}\}.$$

Thus, downstream control data the master controller 5380 to egress port 2560(*k*) interleave payload data during the $\Omega$ downstream control time slots. FIG. 59 illustrates the positions of $\Omega$ downstream control time slots (with $\Omega=4$) within a time frame of N time slots, with N=2048, for egress ports 2560(0), 2560(500), 2560(1000), 2560(1500), and 2560(2000). Egress port 2560(0) receives downstream control data from control inlets 2524($J_3$), 2524($J_2$), 2524($J_1$), and 2524($J_0$), during time slots 1, 513, 1025, and 1537, respectively. Egress port 2560(500) receives downstream control data from control inlets 2524($J_3$), 2524($J_2$), 2524($J_1$), and 2524($J_0$), during time slots 501, 1013, 1525, and 2037, respectively. Egress port 2560(1000) receives downstream control data from control inlets 2524($J_0$), 2524($J_3$), 2524($J_2$), and 2524($J_1$), during time slots 489, 1001, 1513, and 2025, respectively. Likewise, each of ingress ports 2540(1500), and 2540(2000) accesses $\Omega$ control outlets in a respective order. During a time frame, each of the $\Omega$ control inlets accesses each egress port 2560(0) to 2560(N-1). A control inlet 2524 is an inlet which connects, through an inlet selector, to a master controller rather than to a transit memory device. A control outlet 2526 is an outlet which connects, through an outlet selector, to the master controller rather than to a transit memory device.

In a switch configuration of a large dimension, having a large number of ingress ports and egress port, the master controller need be designed to handle control messages received at a high rate. The master controller may be devised to employ multiple coordinated scheduling units, with each scheduling unit having at least one processor. The master controller need also provide multiple input control ports for receiving upstream control messages and multiple output control ports for transmitting downstream control messages.

Figure 60:
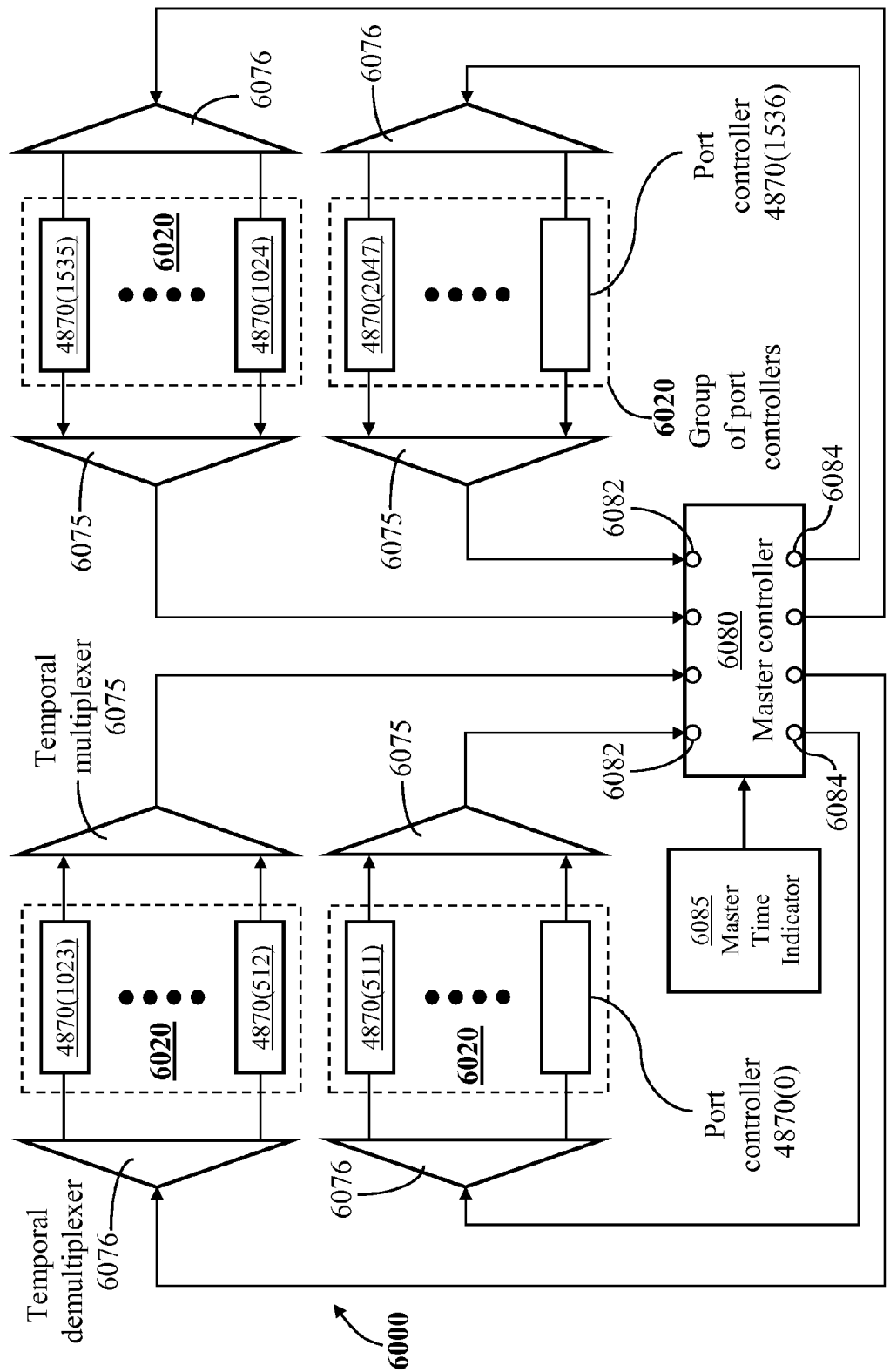
FIG. 60 illustrates a control system comprising a master controller connecting to subsets of port controllers, in accordance with an embodiment of the present invention.

FIG. 60 illustrates a control system 6000 for any of the switch configurations of FIG. 25, 27, 29, 30, or 31. Each of the latent space switches illustrated in FIGS. 25, 27, and 28 to 31 has N ingress ports (2540), each for receiving data from respective external sources and N egress ports (2560), each for transmitting data to respective external sinks. Each ingress port 2540 may be communicatively coupled to a respective egress port 2560 or integrated with the respective egress port 2560 to form an integrated access port. Thus, each ingress port 2540 may share a port controller 4870 with an associated egress port 2560, and a control message directed to a port controller 4870 may be relevant to either the ingress port or the associated egress port.

The control system includes a set of N port controllers 4870 and a master controller 6080. Each access port has a port controller 4870 of the set of N port controllers. The set of port controllers is divided into a number Ω of subsets (groups) of port controllers. The master controller has Ω input control ports 6082 and Ω output control ports 6084, 0<Ω<⌊N/2⌋. The N port controllers are coupled to the master controller 6080 through Ω temporal multiplexers 6075 and Ω temporal demultiplexers 6076. In the illustrated control system 6000, the set of N port controllers is divided into four subsets (four groups) 6020 (Ω=4) and master controller 6080 has four input control ports 6082 and four output control ports 6084.

Each temporal multiplexer 6075 combines upstream control messages originating from a respective subset 6020 of port controllers 4870 and delivers multiplexed outcome to a respective input control port 6082. Each temporal demultiplexer 6076 distributes downstream control signals sent from a respective output control port 6084 to a respective subset 6020 of port controllers 4870.

A master time indicator 6085 is coupled to master controller 6080 for providing a reference-time indication to be distributed by the master controller 6080 to the port controllers 4870 which, in turn, may distribute the reference-time indication to external nodes.

The latent space switch may connect to geographically distributed external nodes where upstream channels from the external nodes to the latent space switch may experience widely varying propagation delays. Preferably, the ingress ports 2540 are not equipped with data buffers. Thus, data sent from external nodes to the ingress ports 2540 should arrive at scheduled time instants. To realize such time alignment, the master controller 6080 is configured to receive a reading of a source time indicator from an external controller and respond to the external controller by sending a corresponding reading of the master time indicator 6085 to enable the external controller to time lock to the master time indicator 6085. It is noted that techniques of time locking one network element to another are known in the art.

Latent Space Switch Configuration with an Embedded Master Controller

FIGS. 32, 33, 51-55 illustrate configurations of latent space switches (3220, 3320, 5120, 5220, and 5420) each using a single uniform rotator 2525 which may be an ascending rotator or a descending rotator. Rotator 2525 cyclically connects each inlet 2524 of a set of N inlets to each outlet 2526 of a set of N outlets, N>2, during a rotation cycle. Indexing the N inlets as inlets 0 to (N−1), and the N outlets as outlets 0 to (N−1), rotator 2525 connects an inlet of index j, 0≤j<N, to an outlet of index $(j+\beta \times t)_{modulo\ N}$ during a time slot t, 0≤t<N, of a repetitive time frame, where β equals −1 if the rotator is a descending rotator and equals 1 if the rotator is an ascending rotator. Rotator 2525 is a uniform rotator because successive inlets connect to successive outlets during any time slot of the repetitive time frame.

External nodes access the latent space switch through N ingress ports 2540 and N egress ports 2560. Each ingress port is configured to receive connection requests and payload data from a respective set of data sources and each egress port is configured to transmit data to a respective set of data sinks. An ingress port 2540(j) is preferably coupled to a respective egress port 2560(j), 0≤j<N, to form an integrated access port 2540/2560. Thus, the integrated ingress ports and egress ports form N access ports. In the configurations of FIG. 32 and FIG. 33, an ingress port 2540(j) connects to inlet 2524(j) through an inlet selector and an egress port 2560(j) connects to a transposed outlet 2526(L−j) through an outlet selector, where the transposition order L equals 7.

Each access port is equipped with a port controller 4870 as illustrated in FIG. 48. FIG. 48 illustrates port controllers 4870 having dual links 4885 to the ingress ports 2540. However, it is understood that the port controllers may also communicate with the egress ports 2560 because each egress port 2560 is coupled to a respective ingress port 2540.

A set of inlet selectors 2535 and outlet selectors 2555 are coordinated so that during each time slot of the time frame:

(1) each access port, combining an ingress port and an egress port, alternately (successively) connects to a respective inlet through an inlet selector and a transposed outlet of the respective inlet through an outlet selector;

(2) each memory device 2550 of a set of M memory devices, M<N, alternately (successively) connects to a respective inlet 2524, for transferring data to a respective destination egress port 2560 through the rotator, and a transposed outlet 2526 of the respective inlet for receiving data from a respective ingress port 2540; and (3) a master controller (3280, 3380, 5180, 5280, or 5380) alternately (successively) connects to a subset of (N−M) inlets 2524 and (N−M) transposed outlets 2526 of the subset of inlets.

Each ingress port is allocated (N−M) upstream control time slots for transferring upstream control messages to the master controller through the rotator and each egress port is allocated (N−M) downstream control time slots for receiving downstream control messages from the master controller.

The master controller sends downstream control messages to the port controllers 4870 through the subset of inlets and the rotator. The N port controllers 4870 send upstream control messages to the master controller through the rotator 2525 and the transposed outlets 2526 of the subset of inlets. The inlets of the subset of inlets connected to the master controller are preferably allocated in circular even spacing. Consequently, the corresponding transposed outlets connecting to the master controller are also evenly spaced. For example, the master controller 5380 of FIG. 53 connects to inlets 2524 of indices 511, 1023, 1535, and 2047 of a rotator having 2048 inlets and 2048 outlets (N=2048) as indicated in FIG. 59. The master controller connects to outlets 2526 of indices 0, 512, 1024, and 1536 as illustrated in FIG. 58.

Each memory device 2550 may hold up to N data segments (data units), each data segment directed to one egress port 2560. Each memory device 2550 may be logically partitioned into N memory sections, each memory section for holding data directed to a respective egress port 2560. This simplifies data transfer from a memory device 2550 to the egress ports; the controller of the memory device simply generates N sequential addresses of the memory sections. The initial memory section to be addressed during time slot 0 of the time frame is specific to each memory device as described with reference to FIG. 56 and FIG. 57. A conventional counter may be used to generate circular sequential addresses for memory sections indexed as 0 to (N−1).

An ingress port 2540 receives data segment from respective external data sources. The destination egress port of each received data segment is known. With each memory section dedicated to a respective egress port 2560, and with likewise-indexed memory sections for all of the M memory devices, a port controller of coupled to ingress port 2540(j) may affix memory-WRITE addresses to data segments received at ingress port 2540(j).

A port controller 4870 may receive connection requests from data sources, or receive data from the data sources, categorize the data into data streams, and formulate respective connection requests. In either case, the port controller send connection request to the master controller and waits for indications of allocated memory devices for each connection.

A master time indicator (5085, 5185, or 5385) may be coupled to the master controller for providing a reference time indication to be distributed to external devices through the access ports.

Switching Methods

Figure 61:
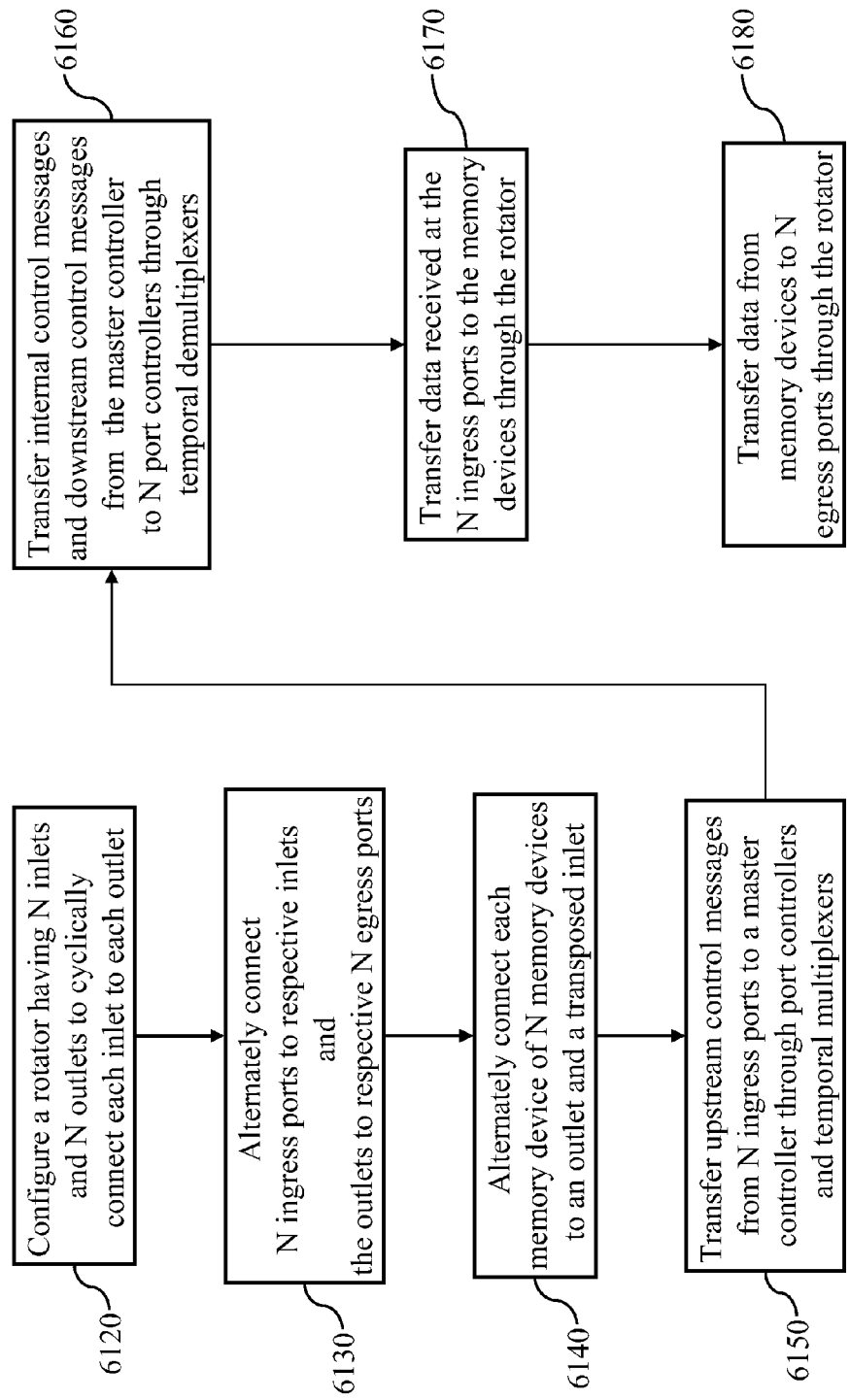
FIG. 61 illustrates a method of switching using a latent space switch having a single rotator and an external master controller coupled to access ports of the switch, in accordance with an embodiment of the present invention.

FIG. 61 illustrates a method of switching using a latent space switch (FIGS. 25 to 31) employing a single rotator 2525 and having an exterior master controller (5080, 6080) coupled to port controllers 4870 (FIGS. 48, 50, 60) of access ports of the latent space switch.

In step 6120, a rotator having N inlets and N outlets is configured to cyclically connect each inlet to each outlet.

In step 6130, a set of inlet selectors and a set of outlet selectors are coordinated to alternately connect N ingress ports 2540 to respective inlets 2524 and the outlets 2526 to respective N egress ports 2560.

In step 6140, the set of inlet selectors and outlet selectors alternately connect each memory device 2550 of N memory devices to a respective outlet 2526 and a transposed inlet 2524 of the respective outlet.

In step 6150, port controllers 4870 transfer upstream control messages from the N ingress ports 2540 to the exterior master controller through temporal multiplexers (5075 or 6075).

In step 6160, the exterior master controller sends downstream control messages to N port controllers 4870 through temporal demultiplexers 5076 or 6076. The downstream control messages include messages to external nodes and internal control messages for timing transfer of data from ingress ports to the memory devices.

In step 6170, port controllers 4870 direct transfer of data received at the N ingress ports 2540 to the memory devices 2550 through the rotator 2525 according to timing data provided in the internal control messages.

In step 6180, data is transferred from the memory devices 2550 to the N egress ports 2560 through the rotator 2525.

Figure 62:
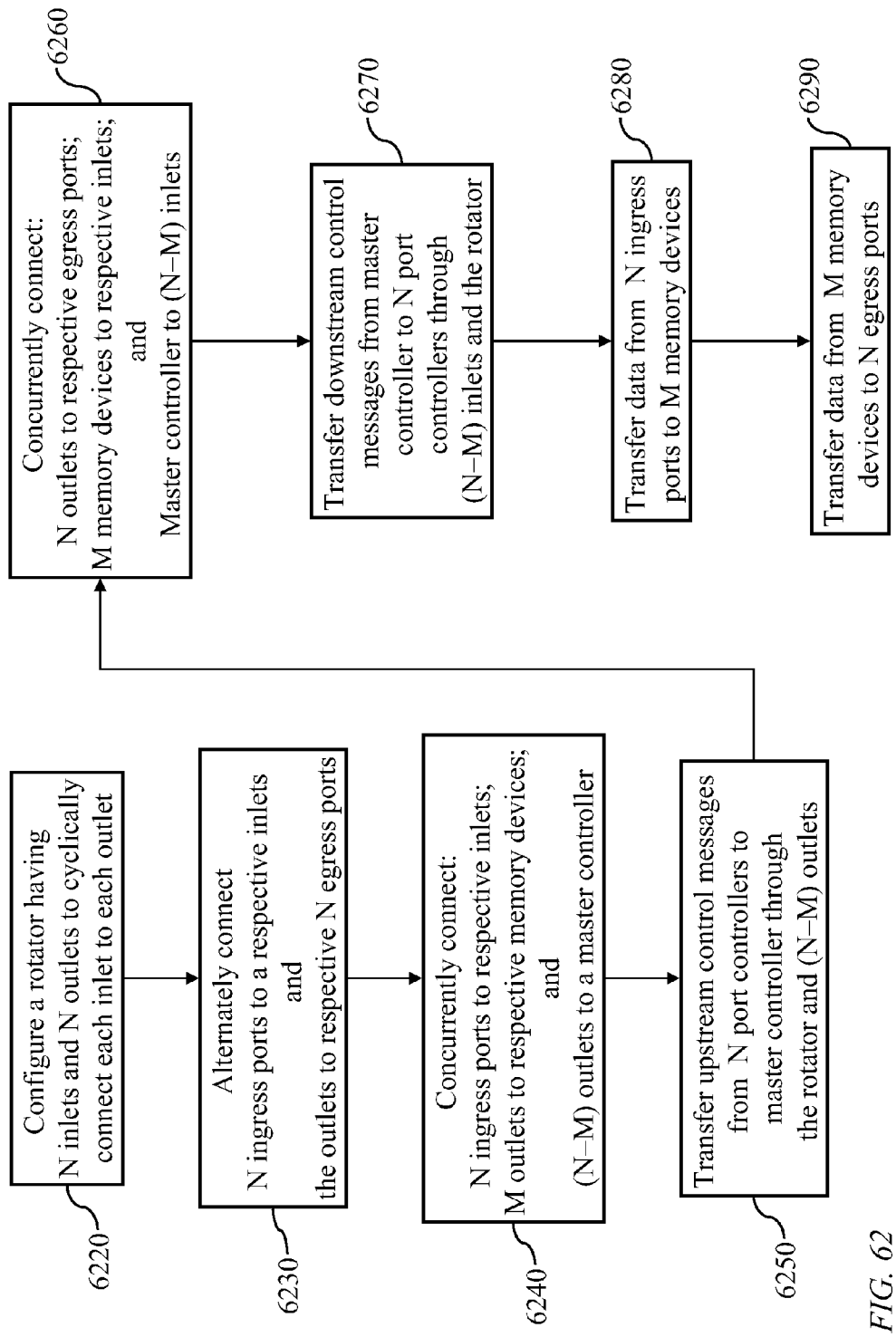
FIG. 62 illustrates a method of switching using a latent space switch having a single rotator and an embedded master controller accessible through the single rotator, in accordance with an embodiment of the present invention.

FIG. 62 illustrates a method of switching using a latent space switch (3220, 3320, 5120, 5220, or 5420) using a single rotator and having an interior master controller (3280, 3380, 5180, or 5380) accessible through the single rotator Steps 6220 and 6230 are similar to steps 6120 and 6130, respectively.

In step 6240, a set of inlet selectors and a set of outlet selectors are coordinated to concurrently connect: the N ingress ports 2540 to respective inlets 2524; M outlets 2526 to a set of M memory devices 2550, and the remaining (N−M) outlets 2526 to the interior master controller; N>M. In the exemplary configuration of FIG. 51 or FIG. 52, N=8 and M=6. In the exemplary configuration of FIG. 54, N=2048 and M=2044.

In step 6250, N port controllers, each coupled to an ingress port 2540 and an egress port 2560, send upstream control messages to the interior master controller through the rotator 2525 and (N−M) outlets 2526.

In step 6260, the coordinated inlet selectors and outlet selectors concurrently connect: N outlets 2526 to respective egress ports 2560; M memory devices to respective M inlets 2524; and the interior master controller to the remaining (N−M) inlets 2524.

In step 6270, the interior master controller sends downstream control messages to the N port controllers 4870 through (N−M) inlets 2524 and the rotator 2525. The downstream control messages include messages to external nodes and internal control messages for timing transfer of data from ingress ports 2540 to the memory devices 2550.

In step 6280, the N port controllers 4870 direct data transfer from the N ingress ports 2540 to the M memory devices 2550 during time slots indicated in the internal control messages.

In step 6290, data is transferred from the M memory devices 2550 to the N egress ports 2560 through the rotator 2525.

Transposing Rotator

Figure 63:
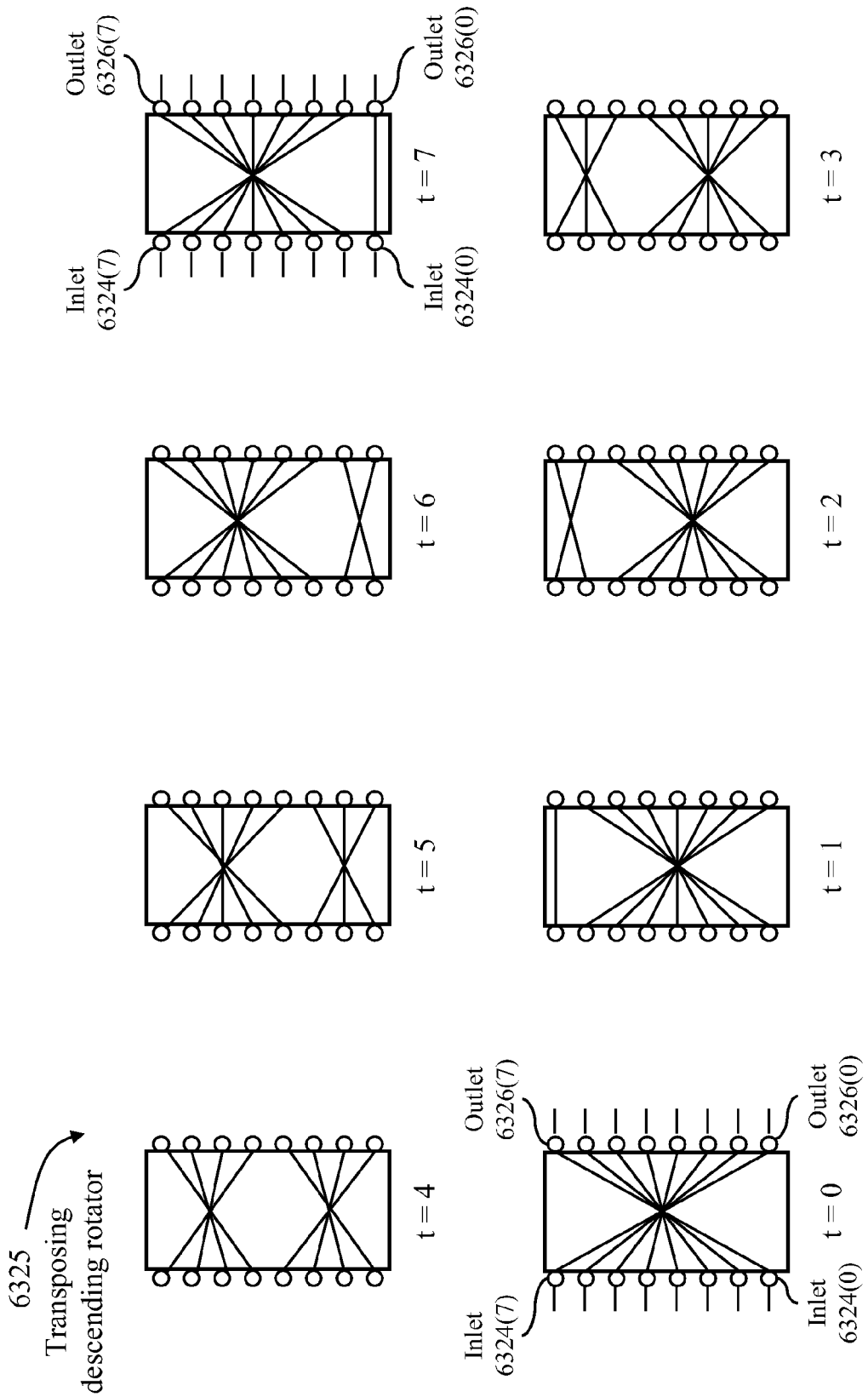
FIG. 63 illustrates a connectivity pattern of a transposing rotator of a transposition order of seven, in accordance with an embodiment of the present invention.

FIG. 63 illustrates a rotator 6325 similar to rotator 2525 of FIG. 25 but configured as a transposing rotator having N inlets and N outlets, N=8. With the N inlets 6324 indexed as 0 to (N−1), and the N outlets 6326 indexed as 0 to (N−1), transposing rotator 6325 connects an inlet of index j, $0 \le j < N$, to an outlet of index $(L-j+\beta \times t)_{modulo\ N}$, during a time slot t, $0 \le t < N$, of a time frame organized into N time slots, where L is a predetermined transposition order L, $0 \le L < N$, and $\beta$ is an integer selected to equal −1, or +1. A value of $\beta$ of −1 applies to a descending transposing rotator, and a value of $\beta$ of +1 applies to an ascending transposing rotator. The illustrated exemplary rotator of FIG. 63 is a descending transposing rotator with L=N−1.

Figure 64:
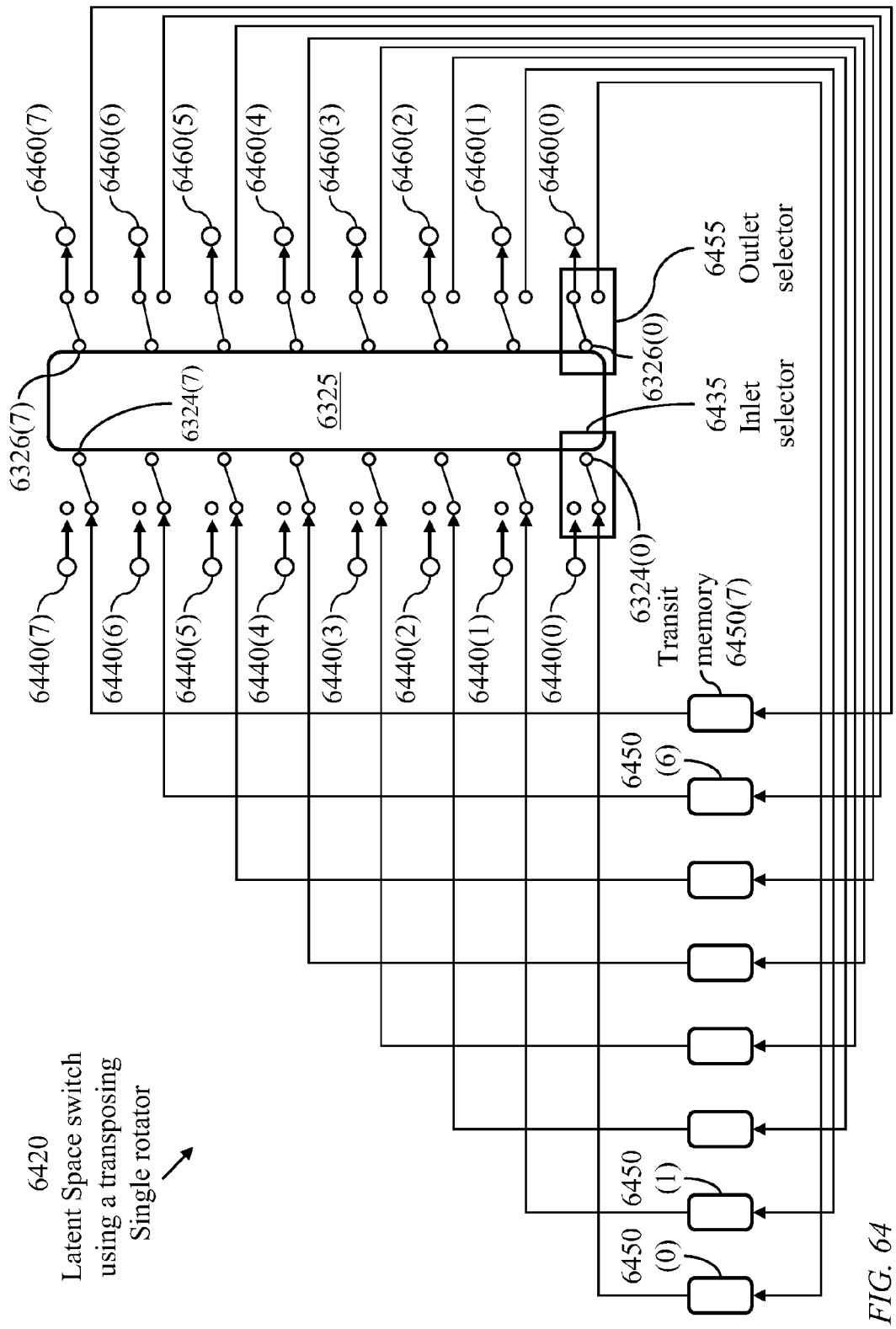
FIG. 64 illustrates a single-rotator latent space switch employing a transposing rotator, in accordance with an embodiment of the present invention.

FIG. 64 illustrates a latent space switch 6420 using a single transposing rotator 6325. Latent space switch 6420 has N memory devices, N>2, individually or collectively referenced as 6450, N ingress ports, individually or collectively referenced as 6440, for receiving data from external sources, and N egress ports for transmitting data to external sinks, individually or collectively referenced as 6460. The transposing rotator 6325 has N inlets, individually or collectively referenced as 6324, and N outlets, individually or collectively referenced as 6326. The transposing rotator 6325 is configured to cyclically connect each inlet 6324 to each outlet 6326, starting with a transposed outlet of each inlet, during a time frame organized into N time slots. A circular sum of an index of an inlet and an index of a transposed outlet of the same inlet equals a preselected transposition order L, $0 \le L < N$.

A bank of inlet selectors, individually or collectively referenced as 6435, alternately connect the ingress ports 6440 and the memory devices 6450 to the inlets 6324. A bank of outlet selectors, individually or collectively referenced as 6455, alternately connect the outlets 6326 to the memory devices 6450 and the egress ports 6460.

During each time slot: an inlet 6324(j) alternately connects to an ingress port 6440(j) and a respective memory device 6450(j) using an inlet selector 6435(j); and a peer outlet 6326(j) of inlet 6324(j) alternately connects to memory device 6450(j) and an egress port 6326(j) using an outlet selector 6455(*j*). Thus, during each time slot the N ingress ports 6324 concurrently transfer data to the N memory devices 6450 and, subsequently, the N egress ports 6460 concurrently read data from the N memory devices. Generally, a circular difference between an index of an inlet and an index of a peer outlet of the same inlet may be selected as an arbitrary constant. In the configuration of FIG. 64, the constant is selected to be zero.

Each memory device may be logically partitioned into N memory section, each memory section for holding data directed to a respective egress port 6460. A controller (not illustrated) of a memory device 6450 may then generate sequential addresses of the memory sections.

The time slots of a time frame are indexed as time slots 0 to (N−1). If the transposing rotator is an ascending rotator (β equals 1), a controller (not illustrated) of a memory device 6450(*j*) connecting to an inlet 6324(*j*), 0≤j<N, may be coupled to an up-counter (not illustrated) initialized to a value of j during time slot 0 of the time frame. The up-counter reading cyclically varies between 0 and (N−1), and the reading during any time slot determines a memory-READ address. If the transposing rotator is a descending rotator (β equals −1), a controller of a memory device 6450(*j*) connecting to an inlet 6324(*j*), 0≤j<N, may be coupled to a down-counter initialized to a value of j during time slot 0 of the time frame. The down-counter reading cyclically varies between (N−1) and 0, and the reading during any time slot determines a memory-READ address.

The control system illustrated in FIGS. 48, 49, 50, and 60 for a latent space switch using a uniform rotator 2525 are also applicable to a latent space switch using a transposing rotator 6325. Thus, latent space switch 6420 may include N port controllers, similar to port controllers 4870, where an ingress port 6440(*j*) and an egress port 6460(*j*), 0≤j<N, share a port controller. The N port controllers may be organized into Ω groups, Ω≥1. The number Ω of groups is in the range of 0<Ω≤⌊N/2⌋; Ω would typically be much less than N.

A master controller, similar to master controller 6080 of FIG. 60, having Ω input control ports and Ω output control ports may be used for scheduling connections through the latent space switch 6420 and performing other control functions. The N port controllers are coupled to the master controller through Ω temporal multiplexers and Ω temporal demultiplexer.

Each temporal multiplexer time-multiplexes upstream control messages originating from a respective subset of port controllers and delivers multiplexed outcome to a respective input control port. Each temporal demultiplexer distributes downstream control signals sent from a respective output control port to a respective subset of port controllers.

A master time indicator may be coupled to the master controller for providing a reference-time indication to be distributed by the master controller to the port controllers which, in turn, may distribute the reference-time indication to external nodes.

As in the case of a latent space switch using a uniform rotator, each port controller organizes data received from a respective ingress port into data segments and affixes a WRITE address to each data segment according to data-segment destination. Each port controller is configured to receive connection requests from respective data sources and communicate the connection requests to the master controller. The master controller allocates time slots for each accepted connection request and communicates indications of the allocated time slots to a respective port controller. Upon receiving indications of allocated time slots for a connection request, a port controller causes transfer of data segments relevant to an accepted connection request, together with corresponding memory WRITE addresses, from an ingress port 6440 to memory devices 6450 accessed through the transposing rotator 6325 during the allocated time slots. The connectivity pattern of port controllers 4870 to access ports (ingress ports and egress ports) illustrated in FIG. 48 also applies to the latent space switch of FIG. 64.

Figure 65:
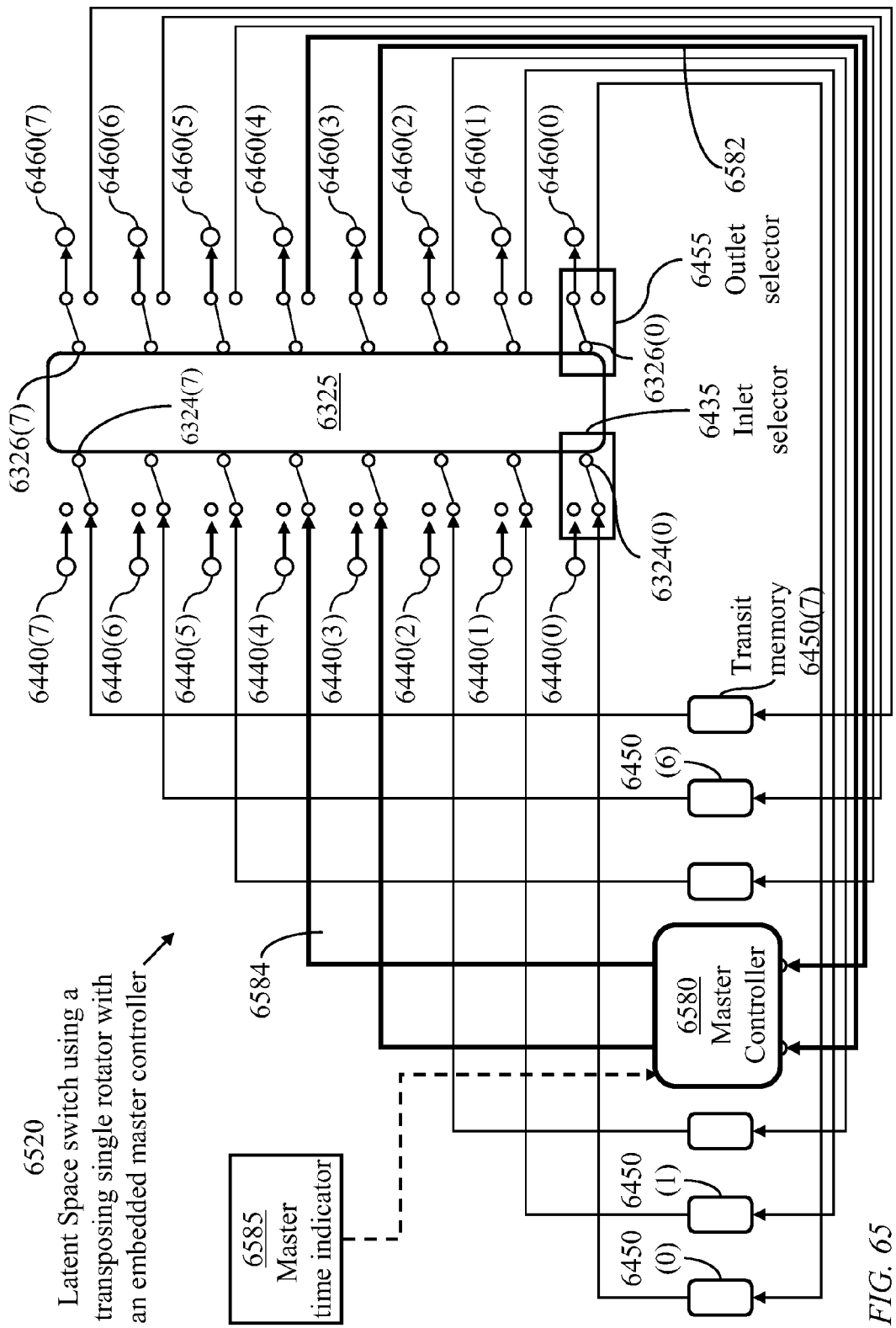
FIG. 65 illustrates a single-rotator latent space switch employing a transposing rotator coupled to a master controller, in accordance with an embodiment of the present invention.

FIG. 65 illustrates a latent space switch 6520 using a transposing rotator cyclically connecting each inlet of a set of N inlets 6324 to each outlet of a set of N outlets 6326 during a repetitive time frame of N time slots, indexed as time slots 0 to (N−1). During time slot 0, an inlet 6324(*j*) connects to a transposed outlet 6326(L−j) of inlet 6324(*j*).

A set of M memory devices, M<N, connects to M inlets 6324 through M inlet selectors and connects to M outlets 6326 through M outlet selectors. A memory device 6450(*j*) alternately connects to a respective inlet 6324(*j*) and a peer outlet 6326(*j*) of inlet 6324(*j*).

A master controller having a number $\Omega_1$ of input control ports, and a number $\Omega_2$ of output control ports, where $1 \leq \Omega_1 \leq$ (N−M), $1 \leq \Omega_2 \leq$ (N−M), alternately connects to selected outlets 6326 and selected inlets 6324. With $\Omega 1 = \Omega 2 = \Omega$, the selected outlets are peers of the selected inlets.

The latent space switch 6520 interfaces with external nodes through a set of N ingress ports and a set of N egress ports. Each ingress port is preferably integrated with a peer egress port to form an integrated access port. Thus, the set of N ingress ports and the set of N egress ports form a set of N access ports. During a time slot t of the repetitive time frame, 0≤t<N, the transposing rotator connects an inlet 6324(*j*), 0≤j<N, to an outlet 6326(k), k=(L−j+β×t)$_{modulo\ N}$, where L is a predetermined transposition order L, 0≤L<N, β is an integer selected as one of −1 and +1.

During a time slot of the repetitive time frame, M outlets 6326 alternately connect to M egress ports 6460 and the M memory devices. The remaining outlets alternately connect to the remaining egress ports 6460 and the $\Omega_1$ input control ports of the master controller.

During a time slot, the set of N access ports alternately connect to the set of N inlets and the set of N outlets. In other words the set of N ingress ports connect to the set of N inlets and subsequently the set of N outlets connect to the set of N egress ports. The set of N access ports connect to the set of N inlets for transferring data to the set of M memory devices and transferring control messages to the master controller. The set of N access ports connect to the set of N outlets for receiving data read from the set of M memory devices and receiving downstream control messages from the master controller.

Individually, an access port 6440(*j*)/6460(*j*) alternately connects to an inlet 6324(*j*) and a peer outlet 6326(*j*), 0≤j<N, during each time slot. During time slot t, 0≤t<N, inlet 6324(*j*) connects to an outlet 6326(L−j+β×t)$_{modulo\ N}$, where β equals 1, if transposing rotator 6325 is an ascending rotator, or −1 if transposing rotator 6325 is a descending rotator. There are M outlets 6326 which individually connect to respective memory devices 6450 for transferring data, and at most (N−M) outlets 6326 which connect to a master controller 6580 for transferring upstream control messages to the master controller.

During time slot t, a data segment read from a memory device 6450(*j*) is received at egress port 6460 of index (L−j+β×t)$_{modulo\ N}$ through outlet 6326 of index (L−j+β×t)$_{modulo\ N}$ and a downstream control message sent from the master controller 6580 through an inlet 6324(m), m≠j, is received at outlet 6326 of index (L−m+β×t)$_{modulo\ N}$. Thus, each outlet

6326 may receive (payload) data during M time slots and downstream control messages during (N−M) time slots of the repetitive time frame.

Using controller 5380 in a latent space switch employing a transposing rotator instead of a uniform rotator, the indices $J_0$, $J_1$, $J_2$, and $J_3$ of inlets receiving control messages from the controller and the indices $K_0$, $K_1$, $K_2$, and $K_3$ of outlets transferring control messages to the controller would be selected so that $J_0=K_0$, $J_1=K_1$, $J_2=K_2$, and $J_3=K_3$.

The latent space switch 6520 interfaces with external network elements (not illustrated) through access ports {6440, 6460}. The access ports connect to the inlets 6324 through inlet selectors 6435 for transferring data to the memory devices 6450 and transferring upstream control messages to the master controller 6580 through the transposing rotator 6325 and upstream channels 6582. The access ports connect to the outlets 6326 through outlet selectors 6455 for receiving data read from the memory devices 6450 through the transposing rotator and receiving downstream control messages sent from the master controller 6580 through channels 6584 and the transposing rotator 6325. A master time indicator 6585 may be coupled to the master controller 6580 for providing a reference-time indication to be distributed by the master controller to the access ports.

Thus, during a rotation cycle of the transposing rotator 6325, each access port:

(1) transfers data segments to the memory devices 6450 through the rotator;
(2) transfers upstream control messages to the master controller 6580 through the rotator and channels 6582;
(3) receives data segments read from the memory devices 6450 through the rotator; and
(4) receives downstream control messages from the master controller 6580 through the rotator and channels 6584.

Switching Methods Based on use of a Transposing Rotator

A method of switching according to the present invention is based on configuring a transposing rotator 6325 having N inlets, 6324(0) to 6324(N−1) and N outlets 6326(0) to 6326(N−1), N>2, to cyclically connect each inlet to each outlet during a rotation cycle of N time slots so that, during time slot t, $0 \leq t < N$, an inlet 6324 of index j, $0 \leq j < N$, connects to an outlet 6326 of index $(L-j+\beta \times t)_{modulo\ N}$, where L is a predetermined transposition order L, $0 \leq L < N$, and β is an integer selected as one of −1 and +1. Thus, at the start of each rotation cycle, the transposing rotator 6325 connects an inlet to a transposed outlet of the inlet.

During each time slot of the rotation cycle:

(1) N ingress ports 6440 connect to the N inlets 6324 and, alternately, the N outlets 6326 connect to N egress ports 6460; and
(2) a memory device 6450(j) of a set of N memory devices 6450 connects to a respective inlet 6324(j) and, alternately, a peer outlet 6326(j) of inlet 6324(j) connects to memory device 6450(j).

The alternate connections are coordinated so that the N ingress ports 6440 connect to the N inlets and the outlets 6326 connect to the N memory devices 6450 simultaneously. Successively, the N memory devices 6450 connect to the N inlets 6324 and the N outlets 6326 connect to the N egress ports 6460 simultaneously.

Upon receiving data at the N ingress ports 6440, to be selectively switched to the N egress ports 6460, the data is transferred to the memory devices through rotator 6325 and transferred from the memory devices to the N egress ports through the rotator 6325. A data segment (data unit) transferred from an ingress port 6440(j) during time slot t of the rotation cycle is stored in a memory device 6450 of index $(L-j+t)_{modulo\ N}$, if the transposing rotator is an ascending rotator, or in a memory device 6450 of index $(L-j-t)_{modulo\ N}$, if the transposing rotator is a descending rotator. For the case of an ascending transposing rotator, a data segment (data unit) transferred from a memory device 6450 of index $(L-j+t)_{modulo\ N}$ is transferred to an egress port 6460(k), $0 \leq k < N$, during time slot $\tau=(k-j+t)_{modulo\ N}$. Thus the normalized systematic delay is: $\tau-t=(k-j)_{modulo\ N}$. For the case of a descending transposing rotator, a data segment transferred from a memory device 6450 of index $(L-j-t)_{modulo\ N}$ is transferred to an egress port 6460(k), $0 \leq k < N$, during time slot $\tau=(j-k+t)_{modulo\ N}$. Thus the normalized systematic delay is: $\tau-t=(j-k)_{modulo\ N}$.

The control system of FIG. 60 may be employed in any of latent space switches 2520, 2720, 3020, 3120, or 6420.

A method of switching according to another embodiment comprises configuring a rotator 6325 (FIG. 63, FIG. 65) having N inlets and N outlets, to cyclically connect each inlet to each outlet during a rotation cycle and initializing the rotator so that each inlet 6324 connects to a respective transposed outlet 6326. Each inlet 6324 is connected to an inlet selector 6435 and each outlet 6326 is connected to an outlet selector 6455. The inlet selectors 6435 and the outlet selectors 6455 are time-coordinated to alternately connect:

(1) N ingress ports 6440 to the N inlets 6324 and the N outlets 6326 to the N egress ports 6460;
(2) each memory device 6450 of a set of M memory devices, M<N, to a respective inlet 6324 and a peer outlet 6326 of the respective inlet; and
(3) a master controller 6580 to a set of (N−M) inlets 6324 and peer outlets 6326 of the set of (N−M) inlets.

An ingress port 6440 and a peer egress port 6460 form an access port {6440, 6460}. Each access port {6440, 6460} has a port controller 4870. The method further comprises transferring, under control of port controllers 4870 of the N access ports:

(a) data received at the N ingress ports from data sources to the set of M memory devices;
(b) control messages from the N ingress ports to the master controller; and
(c) data from the set of M memory devices to the N egress ports for transmission to data sinks.

The method further comprises sending downstream control messages from the master controller 6580 to a port controller 4870 of each access port. The downstream control messages indicate allocated time slots for transferring data among the access ports. The downstream control messages may be sent from a port controller 4870 to an external node (not illustrated).

Exchange of Control Messages

As described above, the set of N ingress ports and the set of N egress ports form a set of N access ports. Each access port has a port controller 4870. With a large number N of access ports (N=8000 for example), the access ports may be divided into a number of groups of access ports 6440/6460 and the port controllers 4870 of each group 6020 of access ports may communicate with an input control port 6082 and an output control port 6084 of a master controller having multiple input control ports 6082 and multiple output control ports 6084.

Each port controller 4870 is allocated at least one upstream control time slot of a control time frame and at least one downstream control time slots in the control time frame. A control time frame may be divided into a large number of control time slots. The duration of the control time slot is independent of the duration of a rotation cycle of the rotator 6325 and the number of control time slots is independent of the number N of time slots of a rotation cycle.

The upstream control time slots allocated to port controllers 4870 of a group are non-coincident so that upstream control messages from port controllers of a group can be multiplexed onto a channel connecting to an input control port 6082. Likewise, the downstream control time slots allocated to port controllers 4870 of a group are non-coincident so that downstream control messages from an output control port 6084 of the master controller port may be sent on a channel connecting the output control port to a demultiplexer which distributes the downstream control messages to the individual port controller 4870 of the group.

the multi-port master controller would connect to a number of peer inlet-outlet pairs. The upstream control time slots and downstream control time slots for a master controller connecting to outlets of specific indices (0, 512, 1024, and 1536, for example) would be determined as indicated in Table-7 and Table-8. Table-7 and Table-8 also indicate corresponding control time slots for the case of a uniform rotator.

FIG. 66 tabulates data-transfer timing of a single-rotator latent space switch of FIG. 64. Referring to FIG. 64, with rotator 6325 configured as an ascending transposing rotator, ingress port 6440($j$) connects to inlet 6324($j$) which connects to outlet 6326 of index $|L-j+t_1|$ during a first part of a time slot $t_1$, $0 \le t_1 < N$. With static ordinary connections of order L from the rotator 6325 to the transit memory devices, outlet 6326 of index $|L-j+t_1|$ connects to a transit memory device 6450 of index $|L-j+t_1|$. With static ordinary connections from the transit memory devices 6350 to the ascending rotator 6325, a transit memory device 6450 of index $|L-j+t_1|$ connects to inlet 6324 of index $|L-j+t_1|$ of rotator 6325. In order to reach egress port 6460($k$), which connects outlet 6326($k$), transit data in transit memory device 6450 of index $|L-j+t_1|$ is transferred from inlet 6324 of index $|L-j+t_1|$ to an outlet 6326($k$) during a time slot $t_2$, where $k=|j-t_1+t_2|$. Thus, the transit delay is $t_2-t_1=|k-j|$, i.e., $\{k-j\}_{modulo\ N}$, as indicated in FIG. 66. Employing a descending rotator instead of an ascending rotator, the transit delay is determined as $|j-k|$, i.e., $\{j-k\}_{modulo\ N}$.

TABLE 7

Upstream control time slots

Control Time Slots: inlet j, outlet k

| K: Index of outlet connecting to Master Controller | Uniform Ascending Rotator | | Transposing Ascending Rotator | |
|---|---|---|---|---|
| | Upstream: $(K-j)_{modulo\ N}$ Ingress: j = 1000 | Downstream: $(K-k)_{modulo\ N}$ Egress: k = 500 | Upstream: $(K+j-L)_{modulo\ N}$ Ingress: j = 1000 L = 2047 | Downstream: $(K+k-L)_{modulo\ N}$ Egress: k = 500 |
| 0 | 1048 | 1548 | 1001 | 501 |
| 512 | 1560 | 12 | 1513 | 1013 |
| 1024 | 24 | 524 | 2025 | 1525 |
| 1536 | 536 | 1036 | 489 | 2037 |

TABLE 8

Downstream control time slots

Control Time Slots: inlet j, outlet k

| K: Index of outlet connecting to Master Controller | Uniform Descending Rotator | | Transposing Descending Rotator | |
|---|---|---|---|---|
| | Upstream: $(j-K)_{modulo\ N}$ Ingress: j = 1000 | Downstream: $(k-K)_{modulo\ N}$ Egress: k = 500 | Upstream: $(L-j-K)_{modulo\ N}$ Ingress: j = 1000 L = 2047 | Downstream: $(L-k-K)_{modulo\ N}$ Egress: k = 500 |
| 0 | 1000 | 500 | 1001 | 1547 |
| 512 | 488 | 2036 | 1513 | 1035 |
| 1024 | 2024 | 1524 | 2025 | 523 |
| 1536 | 1512 | 1012 | 489 | 11 |

Replacing the uniform rotator 2525 of the latent space switch of FIG. 54 with a transposing rotator 6325, each transit memory device would connect to a peer inlet-outlet pair and In a latent switch using a rotator having N inlets and N outlets, N>1, each inlet connects to each outlet during a rotation cycle of N time slots. An inlet connects to a specific outlet during one time slot within the rotation cycle. Referring to the latent switch of FIG. 64 which uses a transposing rotator of order L, 0≤L<N, an inlet 6324(*j*), 0≤j<N, connects to an outlet 6326 of index m=(L−j+β×t)$_{modulo\ N}$ during time slot t, 0≤t<N, where β equals +1 or −1 depending on whether the rotator is ascending or descending. An inlet selector of inlet 6324(*j*) alternately connects an ingress port 6440(*j*) and a transit memory 6450(*j*) to inlet 6324(*j*). An outlet selector of outlet 6326(*m*) alternately connects outlet 6326(*m*) to egress port 6460(*m*) and transit memory 6450(*m*). During time slot t, ingress port 6440(*j*) writes a data segment in transit memory 6450(*m*) to be transferred to an egress port 6460(*k*), 0≤j<N, 0≤k<N. The data segment is read from transit memory 6450(*m*) and transferred to egress port 6460(*k*) during time slot (t+k−j)$_{modulo\ N}$ if β equals +1 or during time slot (t+j−k)$_{modulo\ N}$ if β equals −1. The normalized systematic delay is determined as the circular difference between the index of the time slot during which the data segment is read and the index of the time slot during which the data segment has been written. Within a single time slot, during a WRITE phase, a data segment may be written in a transit memory 6450 and, during a READ phase, a data segment may be read from the transit memory. If k≠j, the order of the WRITE phase and READ phase within a time slot is irrelevant. However, if k=j, then if the WRITE phase precedes a READ phase within a time slot, a data segment may be written and read during the same time slot while if the READ phase precedes the WRITE phase within a time slot, then a data segment written at time slot t would be read after a rotation cycle of N time slots. Hereinafter, without loss of generality, the systematic delay for a path from an ingress port 6440(*j*) to an egress port 6460(*j*) is considered to equal N×δ, δ being the duration of a time slot (10 or 20 nanoseconds, for example). Thus, the systematic delay of a path from an ingress ports 6440(*j*) to an egress port 6460(*k*) vary between δ and N×δ depending on the values of the indices j and k.

It is noted that the exemplary structure of master controller 3280 illustrated in FIG. 40 is applicable to any of master controllers 3380, 5080, 5180, or 5380.

Large-Scale Switching System

It is known to configure a switching system of a large dimension as a multi-stage network using cascaded interlaced arrays of switches of a small or moderate dimension. For example, switches each of dimension m×m may be arranged into S cascaded stages, S being an odd positive integer, to create a switching system having $m^{(S+1)/2}$ dual ports. With m=64 and S=3, the switching system would have 4096 input ports and 4096 output ports. With m=64 and S=5, the switching system would have a dimension of 262144×262144 (262144 input ports and 262144 output ports). The dimension of a multi-stage network grows rapidly as the number S of stages increases. However, the complexity of the switching system increases and its performance deteriorates as the number of stages increases.

A switching system of a dimension of 262144×262144 may be constructed as a three-stage Clos network (S=3) using 512×512 switches (m=512) which may be instantaneous space switches or latent switches. However, instantaneous switches are difficult to scale. A latent switch has the advantage of ease of scaling to significantly large dimensions. Latent switches of any of the types described in the present application, or the original rotating-access switch described in U.S. Pat. No. 5,168,492, incur a systematic delay. An m×m latent switch incurs a systematic delay which varies between δ and m×δ, δ being a time slot determined according to memory access time (READ phase and WRITE phase). With m=512 and δ=20 nanoseconds, for example, the systematic delay through three stages would have an upper bound of 30.72 microseconds.

Alternatively, a switching system of a dimension of 262144×262144 may be constructed as a three-stage Clos network (S=3) using 64×64 instantaneous switches in the first stage and the third stage, and latent switches of a dimension of 4096×4096 each in the second stage. With 4096 dual ports and δ=20 nanoseconds, the systematic delay within a second-stage switch would have an upper bound of approximately 82 microseconds. To realize low switching delay (low systematic delay) through the latent switches, according to an embodiment of the present invention, the first stage switches and the third-stage switches may have asymmetric connections to the ingress sides and egress sides of the latent switches resulting in paths from a first-stage switch to a third-stage switch through the central switches encountering staggered switching delays. This permits a controller of a first-stage switch to select an available path of minimum switching delay for a given flow.

Figure 67:
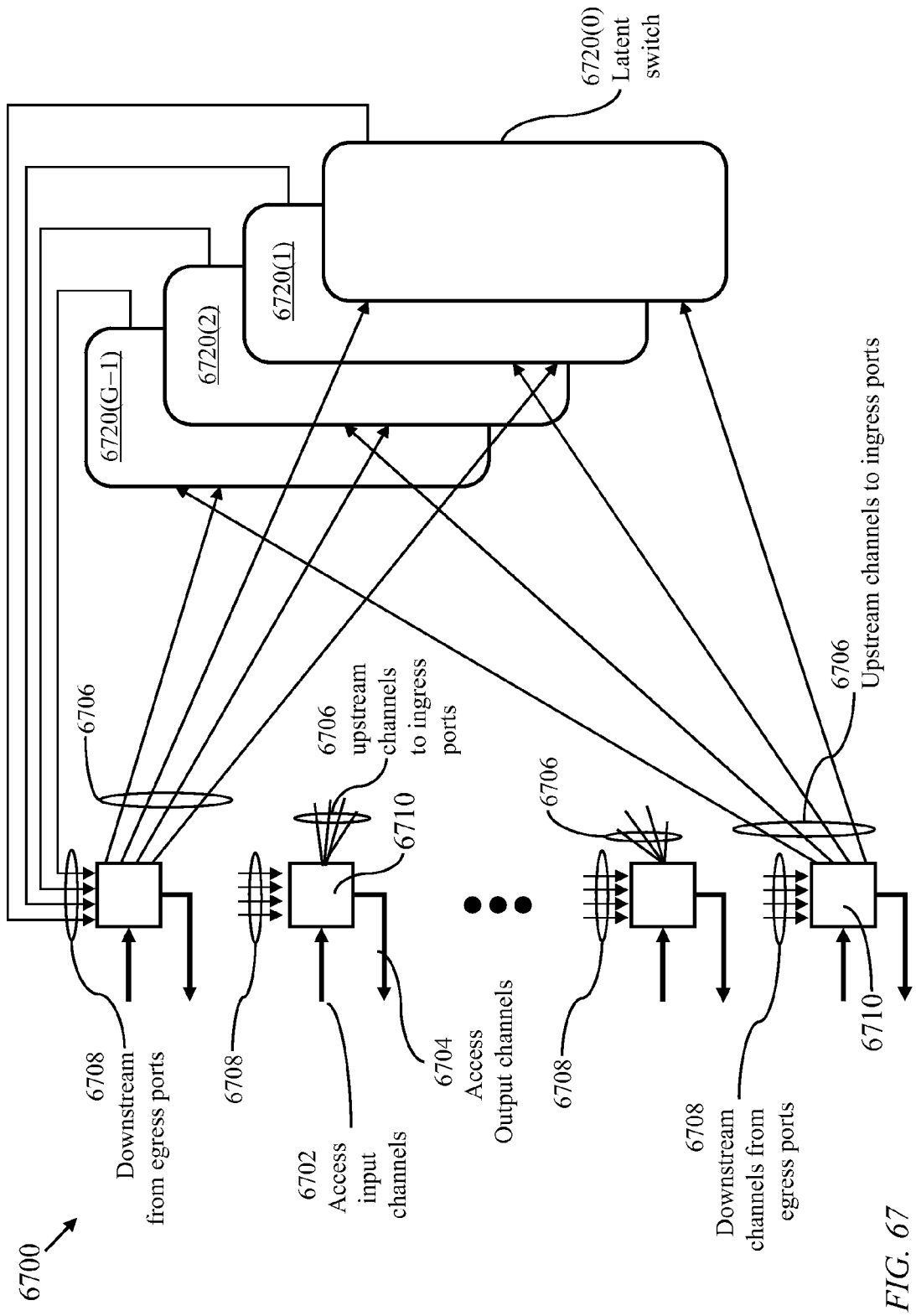
FIG. 67 illustrates a switching system having a number of independent central switches interconnecting a plurality of access switches.

FIG. 67 illustrates a switching system 6700 having a number of independent central switches 6720 interconnecting a plurality of access switches 6710. Each central switch 6720 has a respective master controller (not illustrated in FIG. 67) and each access switch 6710 has a respective access controller (not illustrated in FIG. 67). Each access switch 6710 receives data from external data sources through access input channels 6702 and transmits data to external data sinks through access output channels 6704. Data received at input ports of the access switches 6710 may include packets of arbitrary lengths and, to facilitate switching, the data may be segmented into data segments of equal size and switched as such through the switching system 6700. The switched data segments are re-assembled at output ports of access switches 6710 to reproduce the packets in the forms in which they were received.

Each central switch 6720 is preferably implemented as a latent switch having N ingress ports, N egress ports, a number of memory devices and a transposing rotator having N inlets and N outlets, N>2, as described with reference to FIG. 64 or FIG. 65. For a large scale switching system, the value of N would substantially exceed 100. The transposing rotator is configured to cyclically connect, during a time frame organized into N time slots, each inlet to each outlet starting with a transposed outlet of the each inlet. During each time slot an inlet 6324 alternately connects to an ingress port 6440 of the N ingress ports and a memory device 6450 and a peer outlet of the inlet alternately connects to the memory device and a respective egress port 6460 of the N egress ports. Each access switch 6710 connects to an upstream channel 6706 directed to a respective ingress port 6440 of each central switch 6720 and a downstream channel 6708 from a respective egress port 6460 of each central switch 6720. In a switching system 6700 having G central switches, G>1, each access switch 6710 has G dual ports connecting to the central switches and ν, ν≥1, dual ports connecting to external data sources and data sinks. The access capacity of the switching system 6700 is ν×N×R, where R is the capacity per access port; 10 Gigabits-per-second (Gb/s), for example. With R=10 Gb/s, N=4096, ν=100, an access capacity of approximately four Petabits per second ($4×10^{15}$ bits per second) can be realized. A major advantage of a latent switch is its structural simplicity and ease of control which enable scalability to several thousand ingress ports 6440 and egress ports 6460. However, a latent switch incurs a systematic delay which depends on the duration of a rotation cycle which, in turn, depends on the dimension N and duration of a time slot, denoted δ, which depends on memory access time. With N=4096 and δ=20 nanoseconds, for example, the systematic delay varies between δ and N×δ, i.e., between 20 nanoseconds and approximately 82 microseconds.

A systematic delay of 82 microseconds may be relatively insignificant in a geographically distributed network where the propagation delay from an originating access switch 6710 to a destination access switch 6710 may be of the order of several milliseconds. However, in a centralized switching system which may handle delay-sensitive data, a delay exceeding 50 microseconds, for example, may not be acceptable. It is an objective of the present invention to provide a switching system based on central switches 6720 configured as scalable latent switches while providing paths of low latency. While a single rotator latent switch is the preferred implementation of a central switch 6720, the prior-art rotating-access switch described in U.S. Pat. No. 5,168,492 may be adapted for use as a central switch 6720 of a large dimension using the control mechanisms described in the present disclosure. The control mechanism of the prior-art rotating-access switch was devised for a switch of relatively small dimension; not exceeding 128 dual ports for example.

Figure 68:
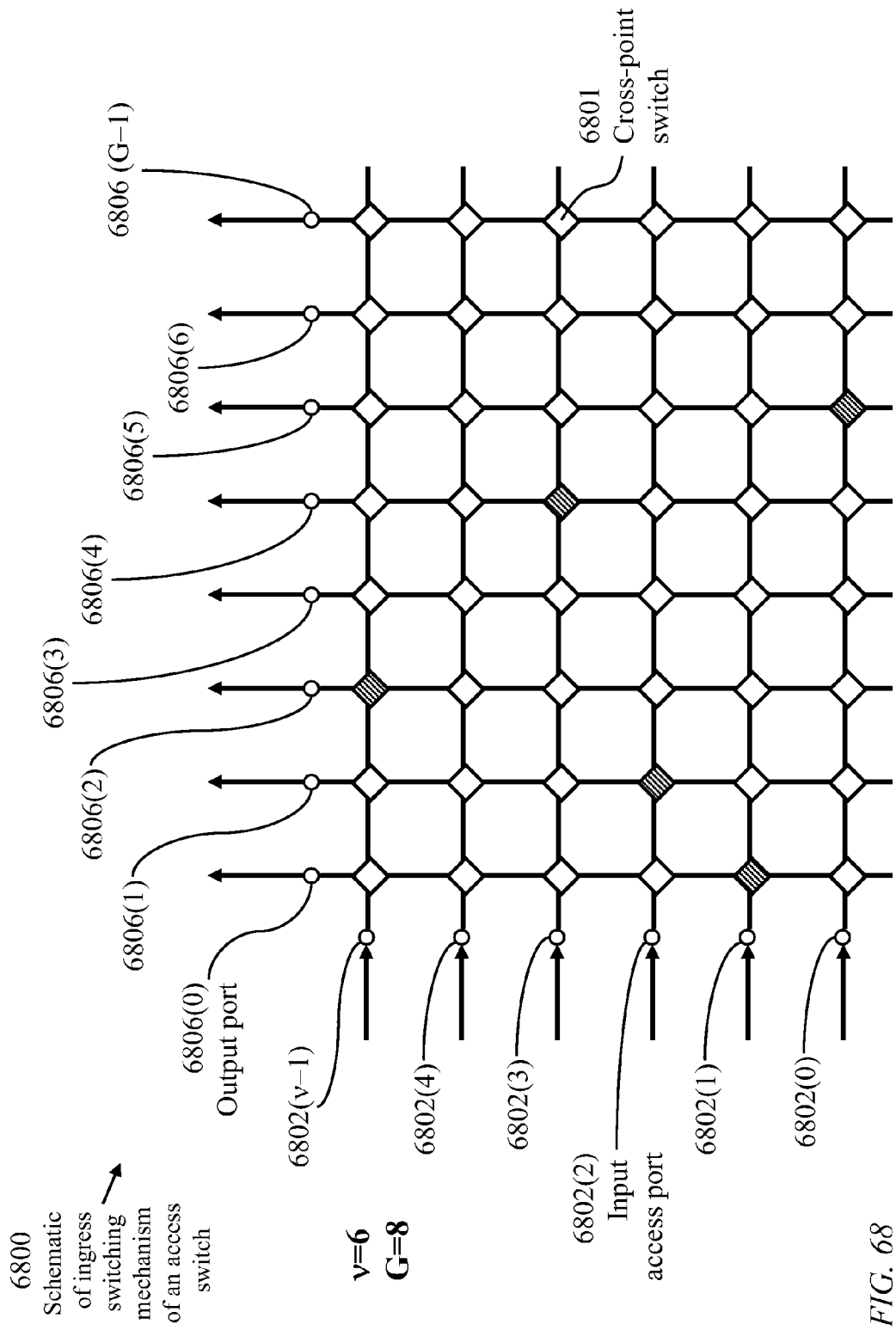
FIG. 68 is a schematic of an ingress switching mechanism of an access switch presented as a basic cross-point switching mechanism.

FIG. 68 is a schematic of an ingress switching mechanism 6800 of an access switch 6710 presented as a generic cross-point switching mechanism. The ingress switching mechanism 6800 has ν input ports 6802(0) to 6802(ν−1) and G output ports 6806(0) to 6806(G−1), ν≥1; ν=6 and G=8 in the example of FIG. 68. The ingress switching mechanism 6800 has ν×G cross-point switches 6801. At any instant of time, at most one cross-point switch per column (per output port 6806) may be activated. In the illustrated 6×8 cross-point switching mechanism, the activated cross-point switches connect input ports 6802 of indices 0, 1, 2, 3, and 5 to output ports 6806 of indices 5, 0, 1, 4, and 2, respectively. Each input port 6802 receives data from external data sources, such as computers, through an access input channel 6702 and each output port connects to an ingress port of a central switch 6720. Data received at any of the ν input ports 6802 of the ingress switching mechanism 6800 may be directed to any of the G output ports 6806 of the ingress switching mechanism 6800 to be switched through a respective central switch 6720 to a destination access switch 6710.

Figure 69:
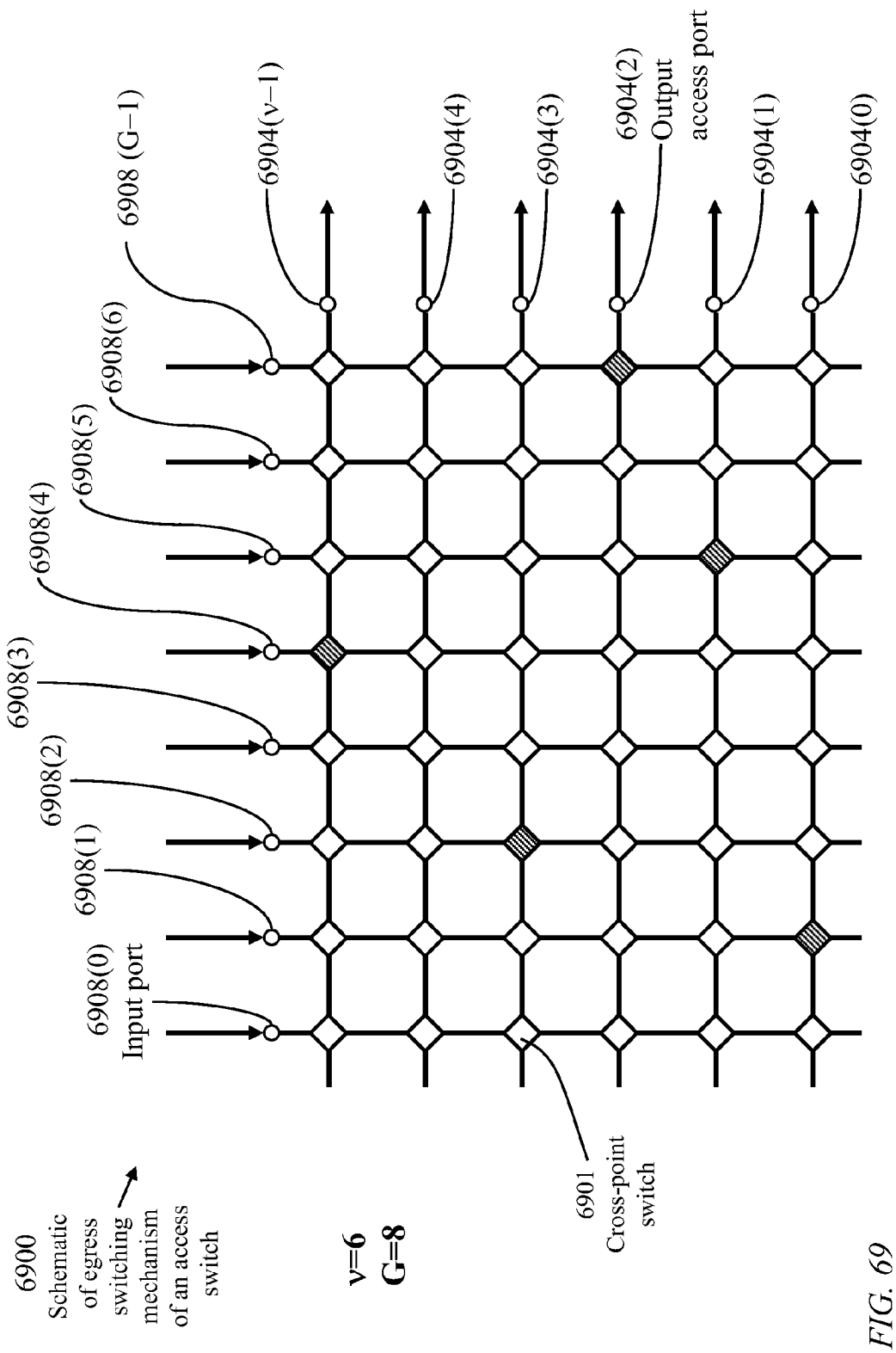
FIG. 69 is a schematic of an egress switching mechanism of an access switch presented as a basic cross-point switching mechanism.

FIG. 69 is a schematic of an egress switching mechanism 6900 of an access switch 6710 presented as a generic cross-point switching mechanism. The egress switching mechanism has G input ports 6908(0) to 6908(G−1), and ν output ports 6904(0) to 6904(ν−1), (G=8, ν=6). The egress switching mechanism 6900 has G×ν cross-point switches 6901. At any instant of time, at most one cross-point switch 6901 per column may be activated. In the illustrated 8×6 cross-point switching mechanism, the activated cross-point switches 6901 connect input ports 6908 of indices 1, 2, 4, 5, and 7 to output ports 6904 of indices 0, 3, 5, 1, and 2, respectively. Each input port 6908 connects to a downstream channel from an egress port of a central switch 6720 and each output port 6904 transmits data to external data sinks, such as computers, through a respective access output channel 6704.

The generic cross-point switching mechanism provides virtually instantaneous switching. Techniques for realizing switching mechanisms having the same properties of the generic cross-point switching mechanism are known in the art. Such instantaneous switching mechanisms are, however, difficult to scale to large dimensions. The switching system 6700 may use central switches 6720 of large dimensions and access switches 6710 of medium dimensions. Implementing each central switch 6720 as a latent switch of dimension 2048×2048 (N=2048), with each access switch 6710 having an ingress switching mechanism of dimension 60×64 and an egress switching mechanism of dimension 64×60 (ν=60, G=64), the switching system 6700 would have 122880 dual access ports connecting to access input channels 6702 and access output channels 6704. At a port capacity of 10 Gb/s, the capacity of the switching system would be 1.2288 Petabits/second.

Figure 70:
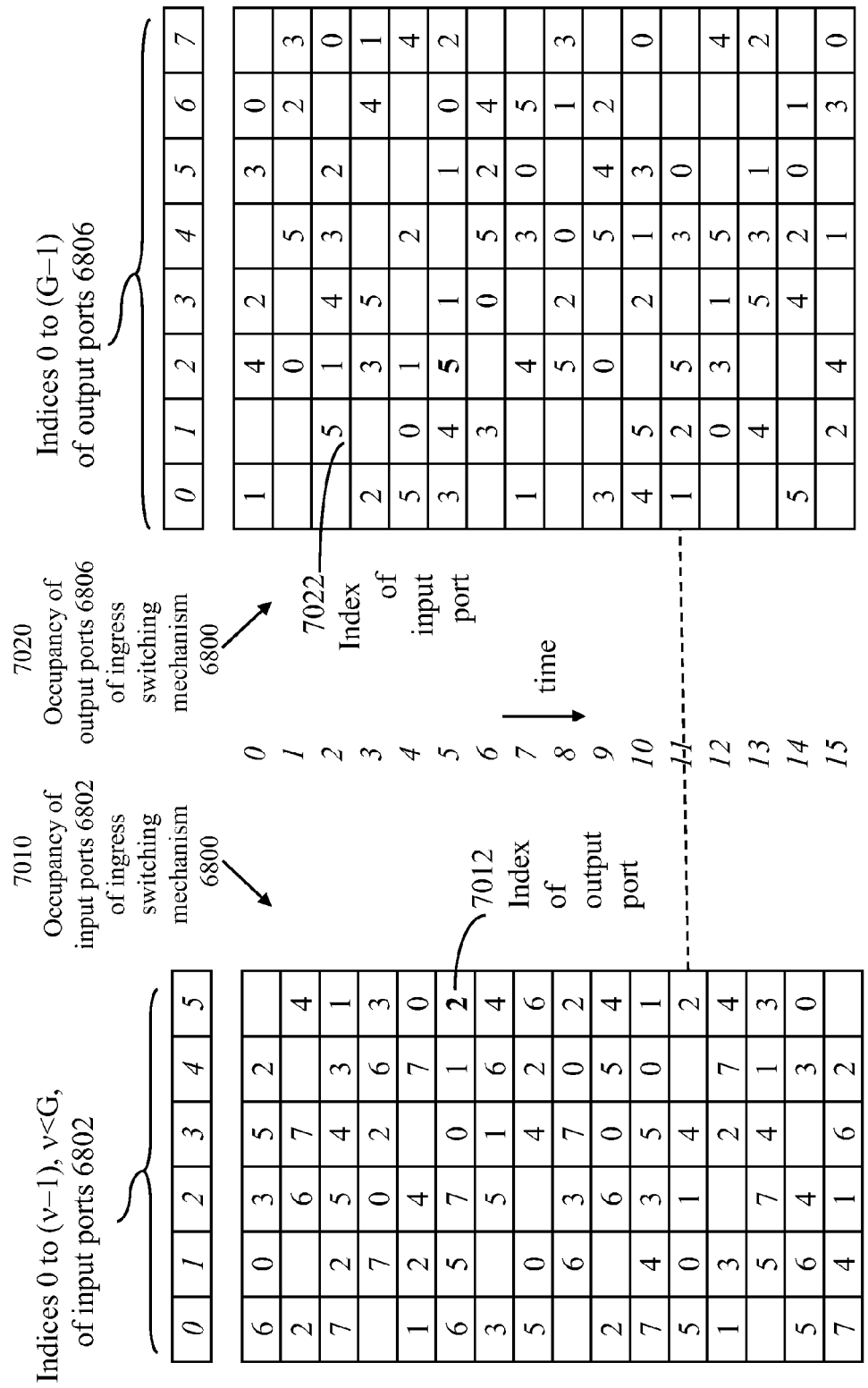
FIG. 70 illustrates occupancy of input ports and output ports of the ingress switching mechanism of FIG. 68.

FIG. 68 and FIG. 69 illustrate activated cross points (6801 and 6901 respectively) during a single time slot. FIG. 70 illustrates occupancy, during 16 successive time slots, of input ports 6802 and output ports 6806 of the ingress switching mechanism 6800 of FIG. 68 of dimension 6×8 (ν=6, G=8).

Occupancy table 7010 indicates activated cross points 6801 of ingress switching mechanism 6800. An entry 7012 is an index of an output port 6806 to which an input port 6802 connects during a respective time slot. For example, input port 6802(5) connects to output port 6806(2) during a time slot of index 5. Table 7010 indicates that input ports 6802 of indices 0, 1, 2, 3, and 5 connect to output ports 6806 of indices 5, 0, 1, 4, and 2, respectively during a time slot of index 11, which is the connectivity illustrated in FIG. 68.

Occupancy table 7020 also indicates activated cross points 6801 of ingress switching mechanism 6800. An entry 7022 is an index of an input port 6802 connecting to an output port 6806 during a respective time slot. Table 7020 indicates that input ports 6802 of indices 1, 2, 5, 3, and 0 connect to output ports 6806 of indices 0, 1, 2, 4, and 5, respectively during a time slot of index 11, which is the connectivity illustrated in FIG. 68.

Tables 7010 and 7020 illustrate the changing connectivity during successive time slots. A controller of an access switch may use similar tables except that an entry 7012 or 7022 would be a binary input indicating a state of "free" or "busy". A well-known process of time slot matching is then applied to establish a path through an ingress switching mechanism 6800. A path through an egress switching mechanism 6900 is established in a similar manner.

Figure 71:
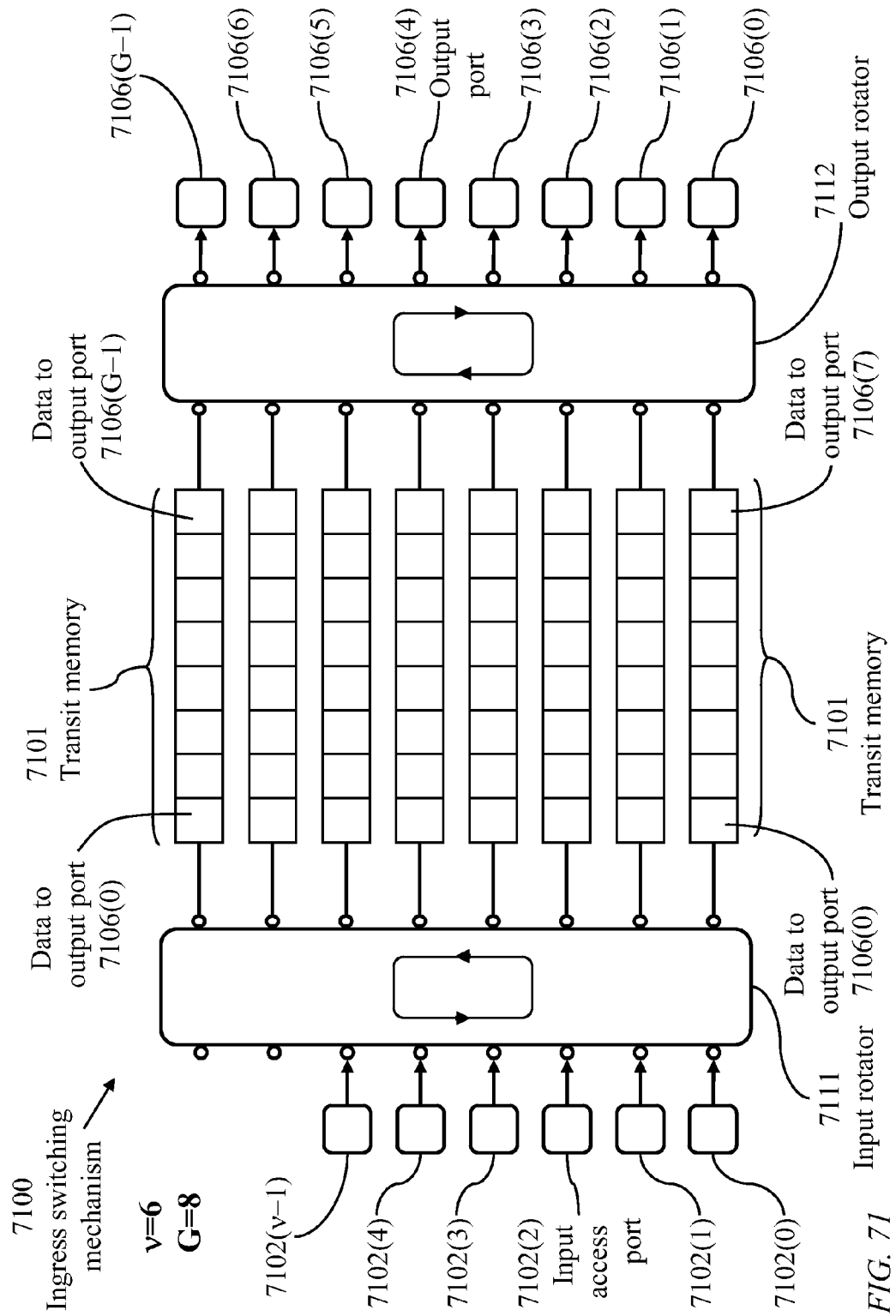
FIG. 71 illustrates an implementation of an ingress switching mechanism of an access switch based on the rotating-access architecture.

The rotating-access architecture, disclosed in U.S. Pat. No. 5,168,492 is an example of a latent space switch that may be configured as an ingress switching mechanism or an egress switching mechanism of an access switch 6710 of a relatively small dimension. FIG. 71 illustrates an implementation 7100 of an ingress switching mechanism of an access switch 6710 based on the rotating-access architecture. The ingress switching mechanism 7100 has ν input ports 7102(0) to 7102(ν−1), and G output ports 7106(0) to 7106(G−1). Each input port 7102 receives data from external data sources, such as computers, and each output port 7106 connects to an ingress port of a central switch 6720. The ingress switching mechanism 7100 has an input rotator 7111 cyclically connecting the input ports 7102 to a bank of G transit memory devices 7101 and an output rotator 7112 cyclically connecting the transit memory devices 7101 to the output ports 7106.

Figure 72:
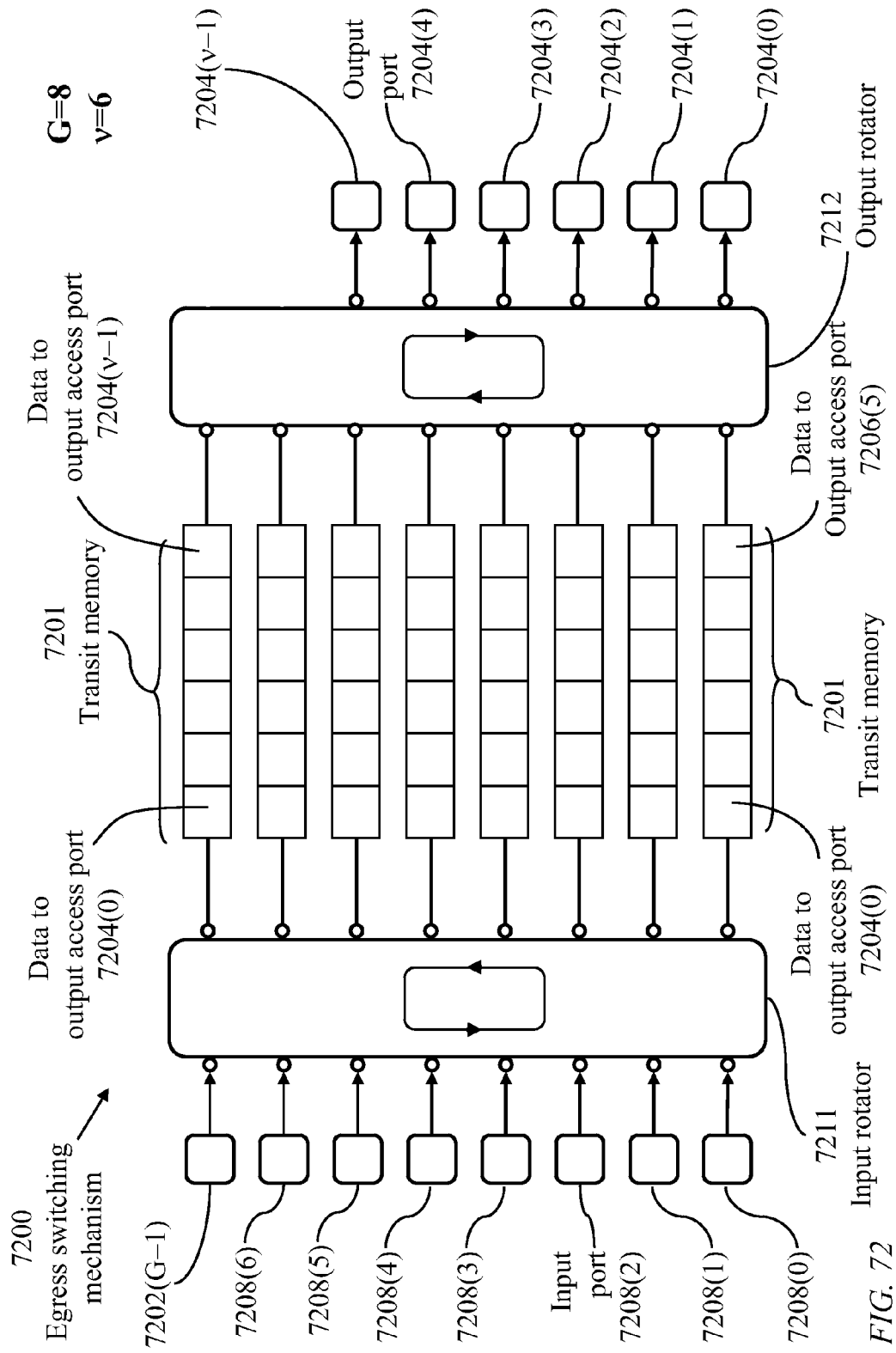
FIG. 72 illustrates an implementation of an egress switching mechanism of an access switch based on the rotating access architecture.

FIG. 72 illustrates an implementation 7200 of an egress switching mechanism of an access switch 6710 based on the rotating access architecture. The egress switching mechanism 7200 has G input ports 7208(0) to 7208(G−1), and ν output ports 7204(0) to 7204(ν−1). Each input port 7208 connects to a respective egress port of a central switch 6720 and each output port 7204 transmits data to external data sinks. The egress switching mechanism 7200 has an input rotator 7211 cyclically connecting the input ports 7208 to a bank of G transit memory devices 7201 and an output rotator 7212 cyclically connecting the transit memory devices 7201 to the output ports 7204.

The rotating-access architecture is analogous to the basic cross-point architecture. A cross-point switching mechanism of dimension n×m, n>1, m>1, connecting any of n input ports to any of m output ports, has n×m cross-point switches. At any instant of time, the largest number of activated cross-point switches is the lesser of n and m. An input port may simultaneously connect to more than one output port, but an output port may be connected to only one input port at any instant of time. In a rotating-access switching mechanism, an input port transfers data to a specific output port through any of the transit-memory devices. During any instant of time, the input rotator connects each input port to a respective transit-memory device and the output rotator connects each transit-memory device to a respective output port. At any instant of time, a transit-memory device holds data written by a set of input ports and directed to a set of output ports. Incoming data packets of arbitrary sizes are restructured into data segments of equal sizes to simplify the switching function. Each data segment has a same size and is transferred during a period referenced as a "time slot". Thus, input-output connections taking place "simultaneously" during a time slot through a cross-point switching mechanism are analogous to input-output connections through a single transit-memory device of a rotating-access switching mechanism.

Figure 73:
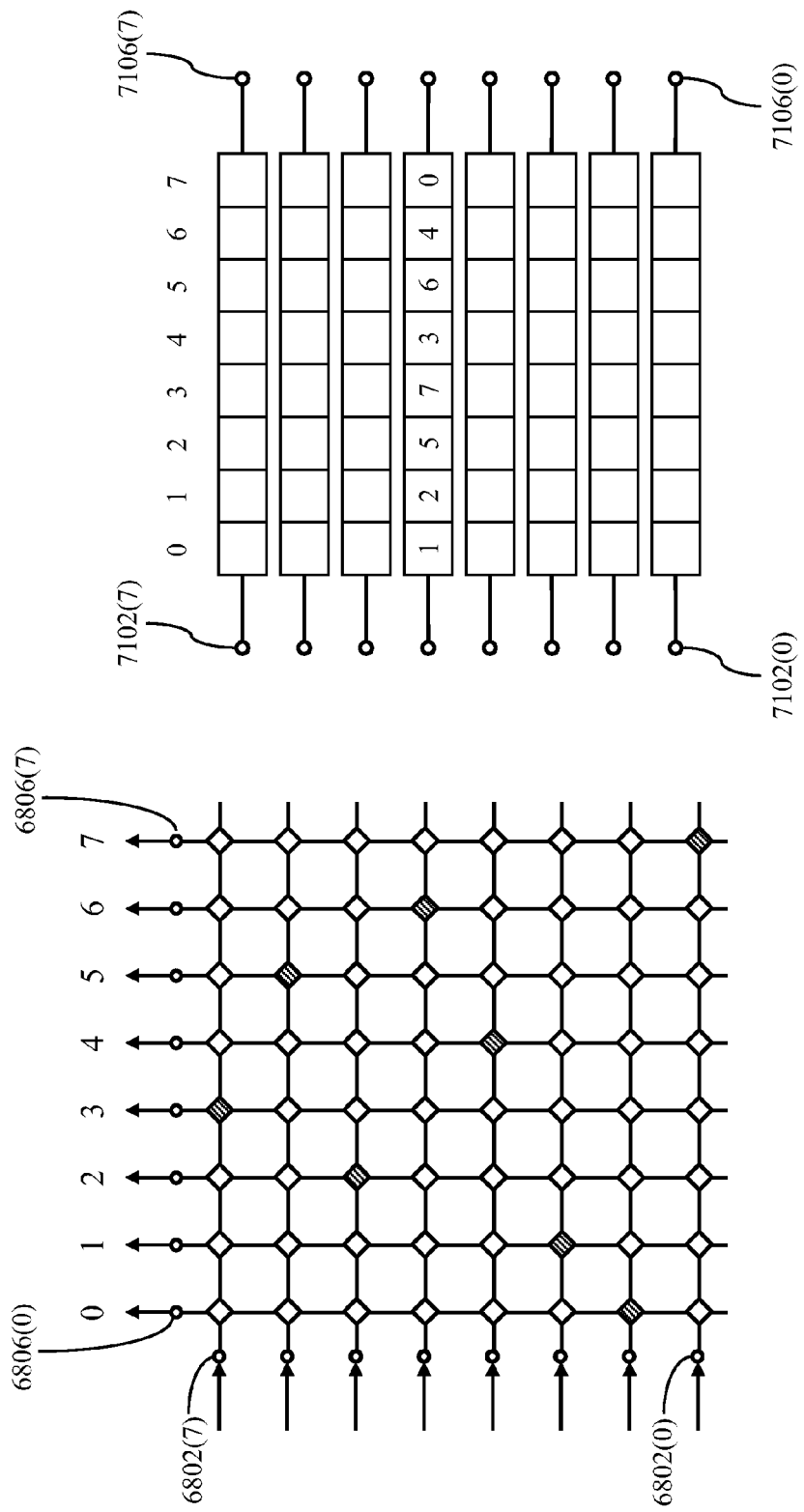
FIG. 73 illustrates connections through a cross-point switching mechanism and analogous connections through a rotating-access switching mechanism.

FIG. 73 illustrates connections from input ports 0 to 7 to output ports of indices 7, 0, 1, 4, 6, 2, 5, and 3, respectively through an 8×8 cross-point switching mechanism. Output ports of indices 0 to 7 receive data from input ports of indices 1, 2, 5, 7, 3, 6, 4, and 0 respectively. Analogous connections from input ports to output port of an 8×8 rotating-access switching mechanism are established through a transit-memory device of index 4 (for example) of the rotating-access switching mechanism. The illustrated entries of memory segments of the transit-memory device are indices of input ports 7102. Thus, output ports of indices 0 to 7 have connections from input ports of indices 1, 2, 5, 7, 3, 6, 4, and 0. The eight connections through the cross-point switching mechanism are concurrent while the corresponding connections through the rotating-access switching mechanism take place at consecutive time slots of a rotation cycle.

The rotation cycle of the ingress or egress rotating-access switching mechanism has duration of G×δ, δ being memory-access time. Thus, the systematic delay varies between δ and G×δ. With G limited to 64 and δ=20 nanoseconds, for example, the maximum systematic delay is 1.2 microseconds.

Figure 74:
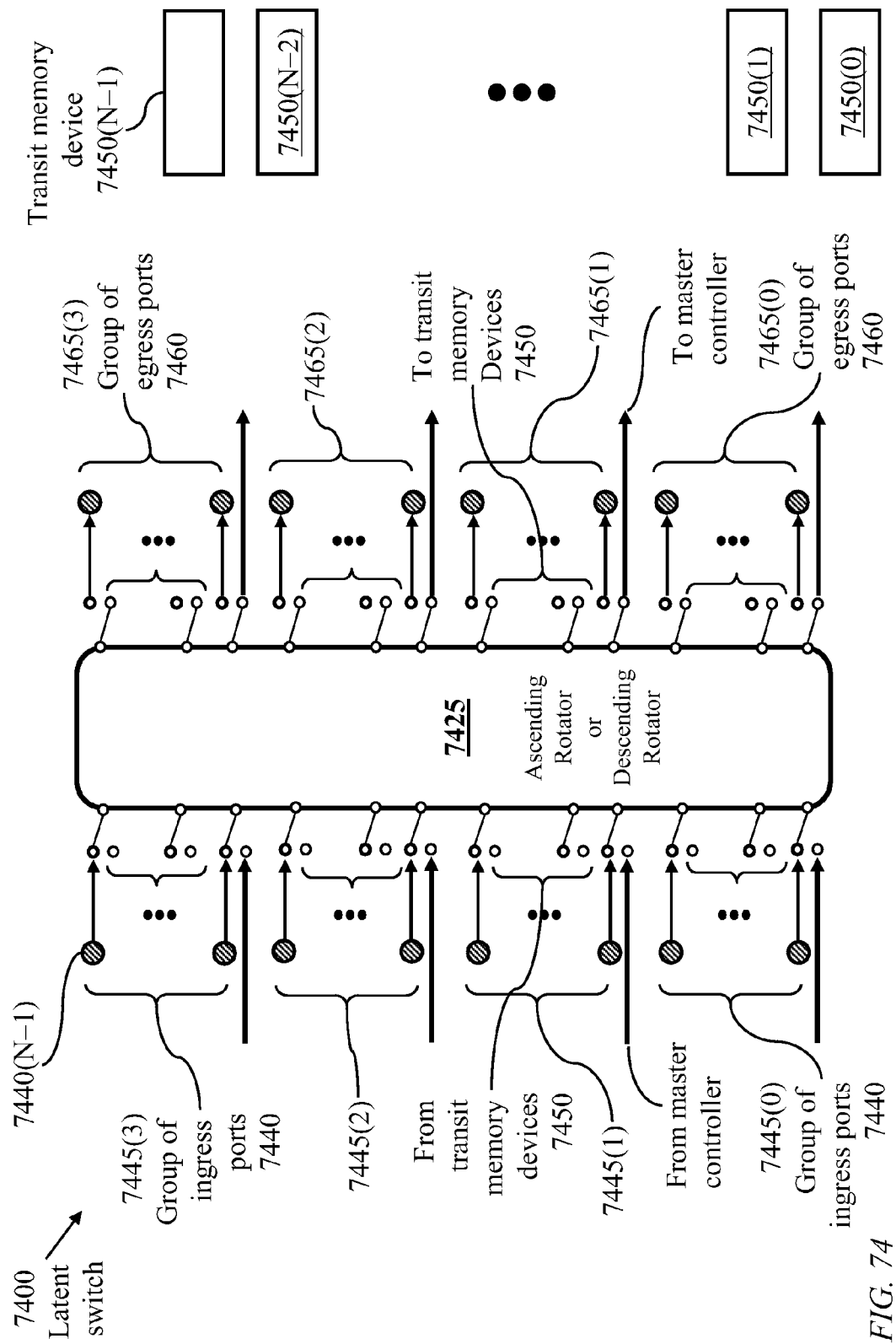
FIG. 74 illustrates a latent switch employing a transposing rotator.

FIG. 74 illustrates a central switch 6720 implemented as a latent switch 7400 employing a transposing rotator 7425 having inlets and outlets as described with reference to FIG. 64 and FIG. 65. Each inlet connects to an inlet selector and each outlet connects to an outlet selector. Each inlet selector alternately connects to an ingress port 7440 and an internal device which may be a transit memory device 7450 or a controller. Likewise, each outlet selector alternately connects to an egress port 7460 and an internal device which may be a transit memory device or a controller. Using an external controller as described with reference to FIG. 50, N transit-memory devices 7450 connect N inlets of the transposing rotator 7425 to respective outlets of the transposing rotator 7425. With N>>4 (for example, N=4096), using an embedded master controller having four dual ports, as illustrated in FIG. 53, (N−4) transit-memory devices 7450 connect (N−4) inlets of the transposing rotator 7425 to respective outlets of the transposing rotator 7425. To facilitate control, the inlets are arranged into four groups and the outlets are likewise arranged into four groups. Consequently, the ingress ports 7440 are divided into four groups 7445(0) to 7445(3) and the egress ports 7460 are arranged into four groups 7465(0) to 7465(3).

Figure 75:
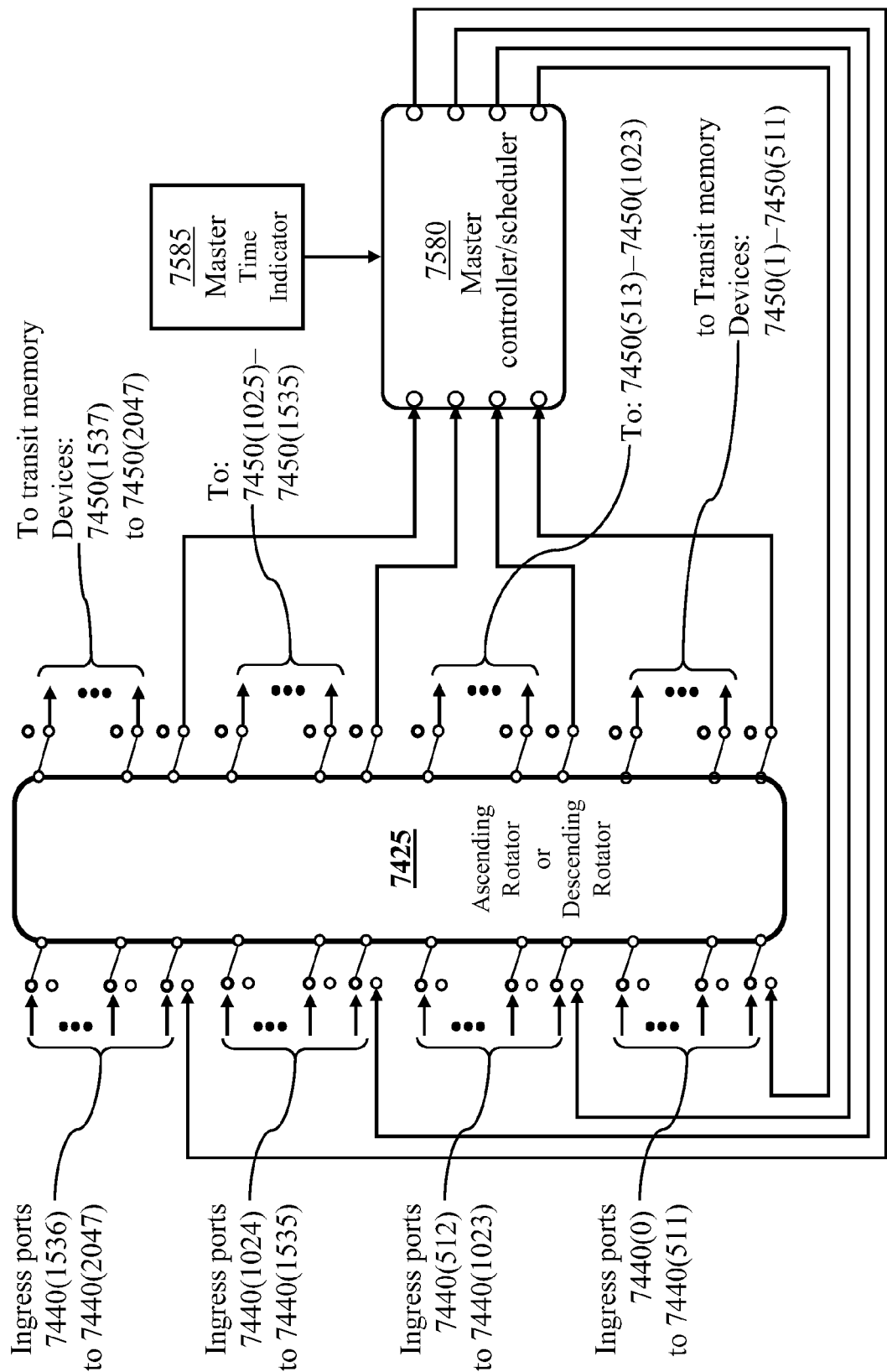
FIG. 75 illustrates an arrangement for coupling a master controller having four input ports and four output ports to the transposing rotator of FIG. 74 in accordance with an embodiment of the present invention.

FIG. 75 illustrates an arrangement for coupling a master controller 7580 having four input ports and four output ports to the transposing rotator of FIG. 74. One inlet from each of the four groups of inlets alternately connects to an ingress port and an output port of a master controller 7580 and, likewise, one outlet of each outlet group alternately connects to an egress port and an input port of the master controller 7580. The master controller 7580 receives upstream control data from ingress ports 7440 through the transposing rotator 7425 and sends downstream control data to the egress ports 7460 through the transposing rotator 7425. A master time indicator 7585 coupled to the master controller distributes timing data to the port controllers.

Figure 76:
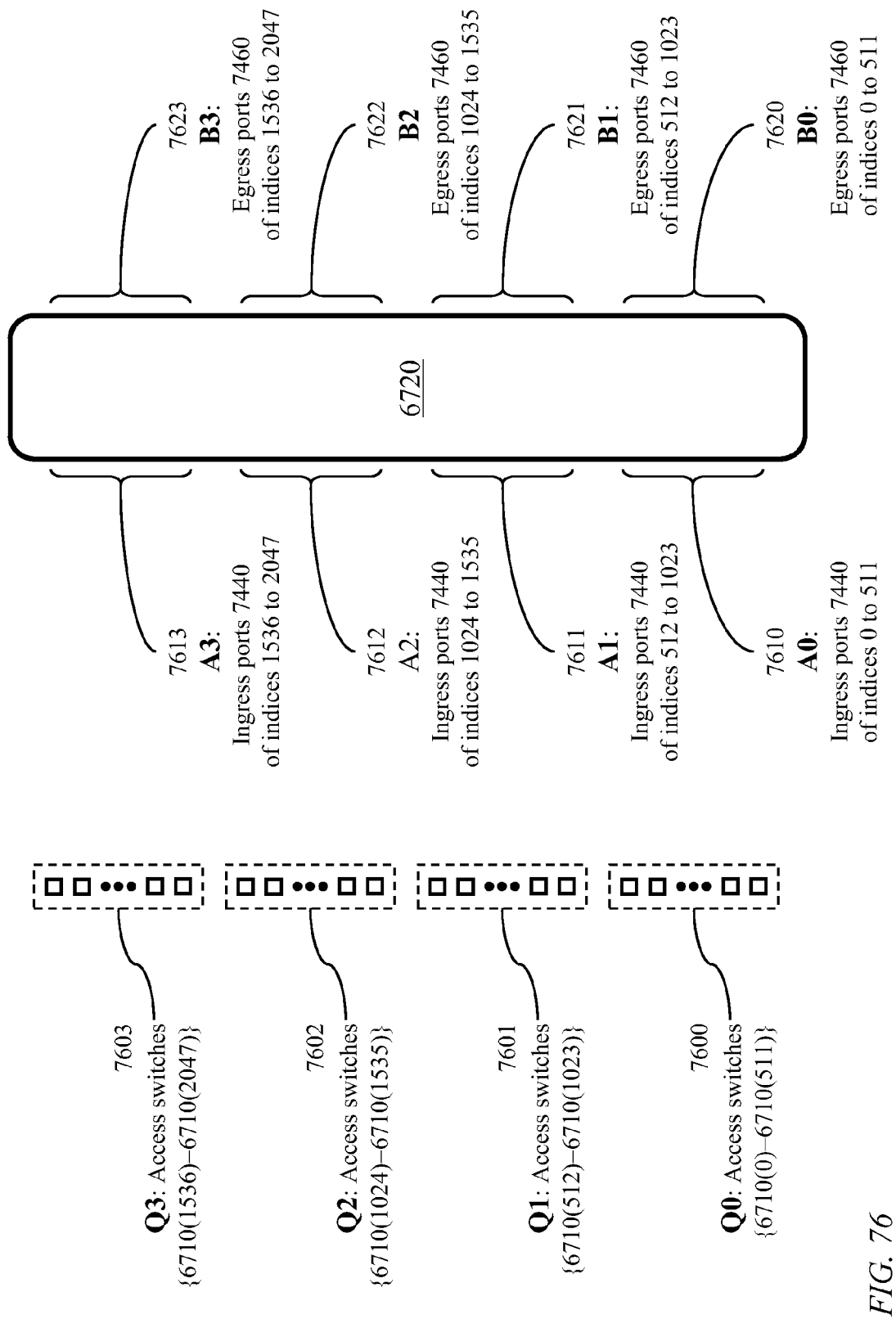
FIG. 76 illustrates a number of access switches, each connecting to a respective ingress port and a respective egress port of an exemplary latent switch in accordance with an embodiment of the present invention.

FIG. 76 illustrates a number, N, of access switches 6710, each connecting to a respective ingress port 7440 and a respective egress port 7460 of the exemplary latent switch of FIG. 74 having N ingress ports and N egress ports; N=2048. The access switches are indexed as 0 to (N−1). The ingress ports of each latent switch are indexed as 0 to (N−1), and the egress ports of each latent switch are indexed as 0 to (N−1). The access switches are logically divided into four access groups labeled Q0, Q1, Q2, and Q3. The ingress ports are logically divided into four ingress groups labeled A0, A1, A2, and A3. The egress ports are logically divided into four egress groups labeled B0, B1, B2, and B3. Each ingress group comprises consecutive ingress ports and each egress group comprises consecutive egress ports.

Access group Q0 includes access switches 6710 of indices 0 to 511, access group Q1 includes access switches 6710 of indices 512 to 1023, access group Q2 includes access switches 6710 of indices 1024 to 1535, and access group Q3 includes access switches 6710 of indices 1536 to 2047.

Ingress group A0 includes consecutive ingress ports 7440 of indices 0 to 511, ingress group A1 includes consecutive ingress ports 7440 of indices 512 to 1023, ingress group A2 includes consecutive ingress ports 7440 of indices 1024 to 1535, and ingress group A3 includes consecutive ingress ports 7440 of indices 1536 to 2047.

Egress group B0 includes consecutive egress ports 7460 of indices 0 to 511, egress group B1 includes consecutive egress ports 7460 of indices 512 to 1023, egress group B2 includes consecutive egress ports 7460 of indices 1024 to 1535, and egress group B3 includes consecutive egress ports 7460 of indices 1536 to 2047.

Figure 77:
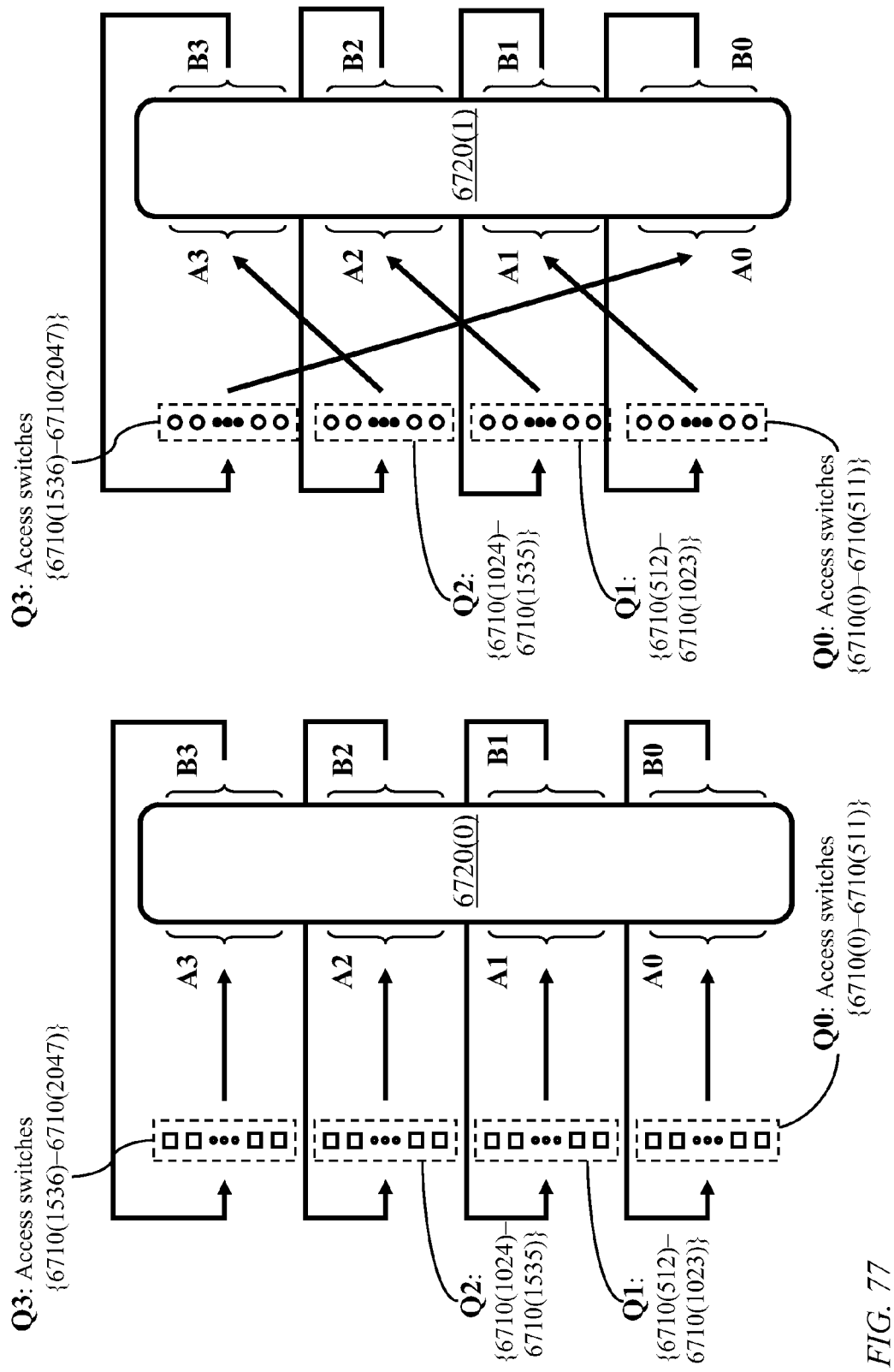
FIG. 77 and FIG. 78 illustrate a first connectivity scheme of the access switches to four latent switches, in accordance with an embodiment of the present invention.
Figure 78:
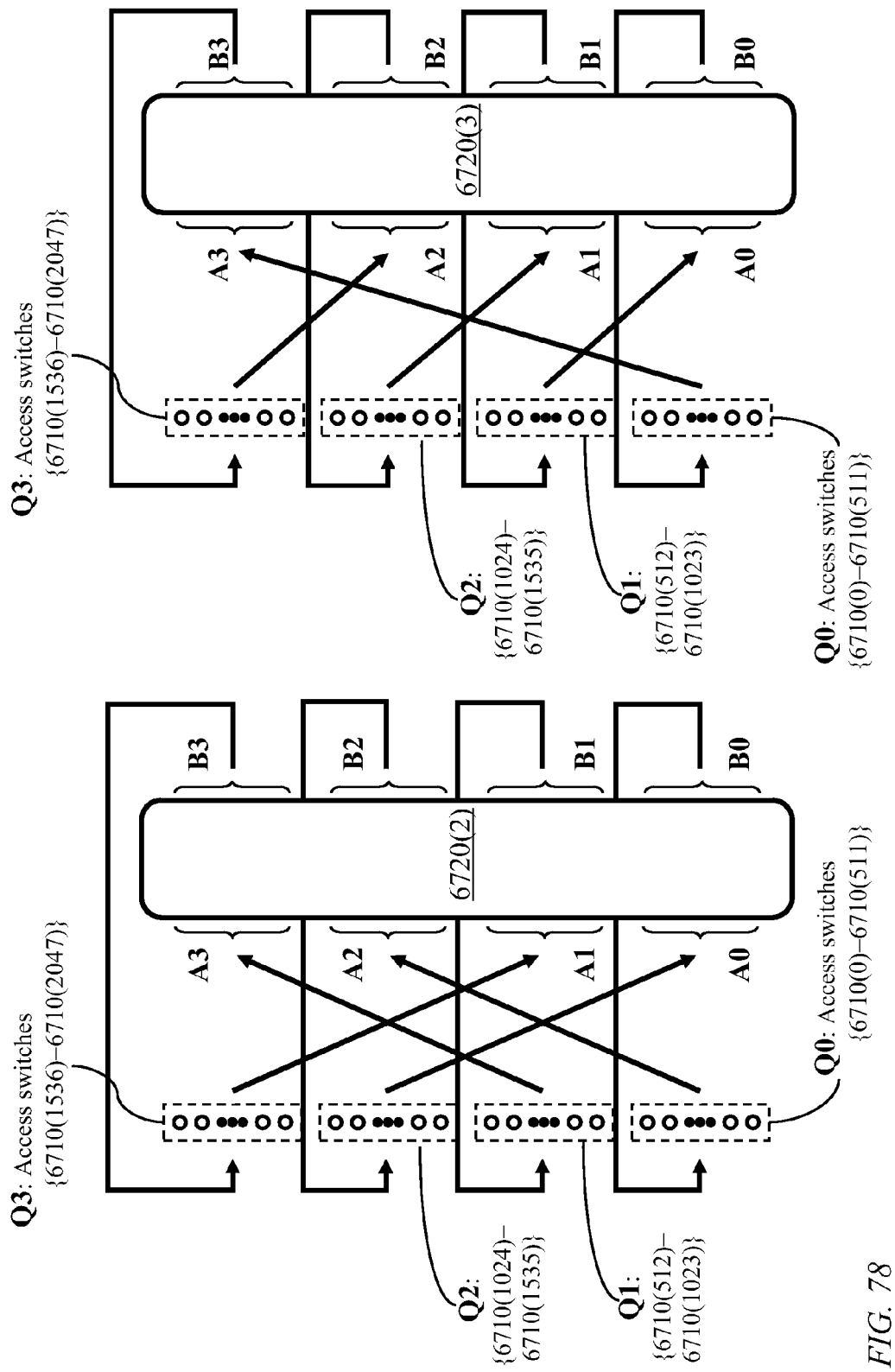
Figure 79:
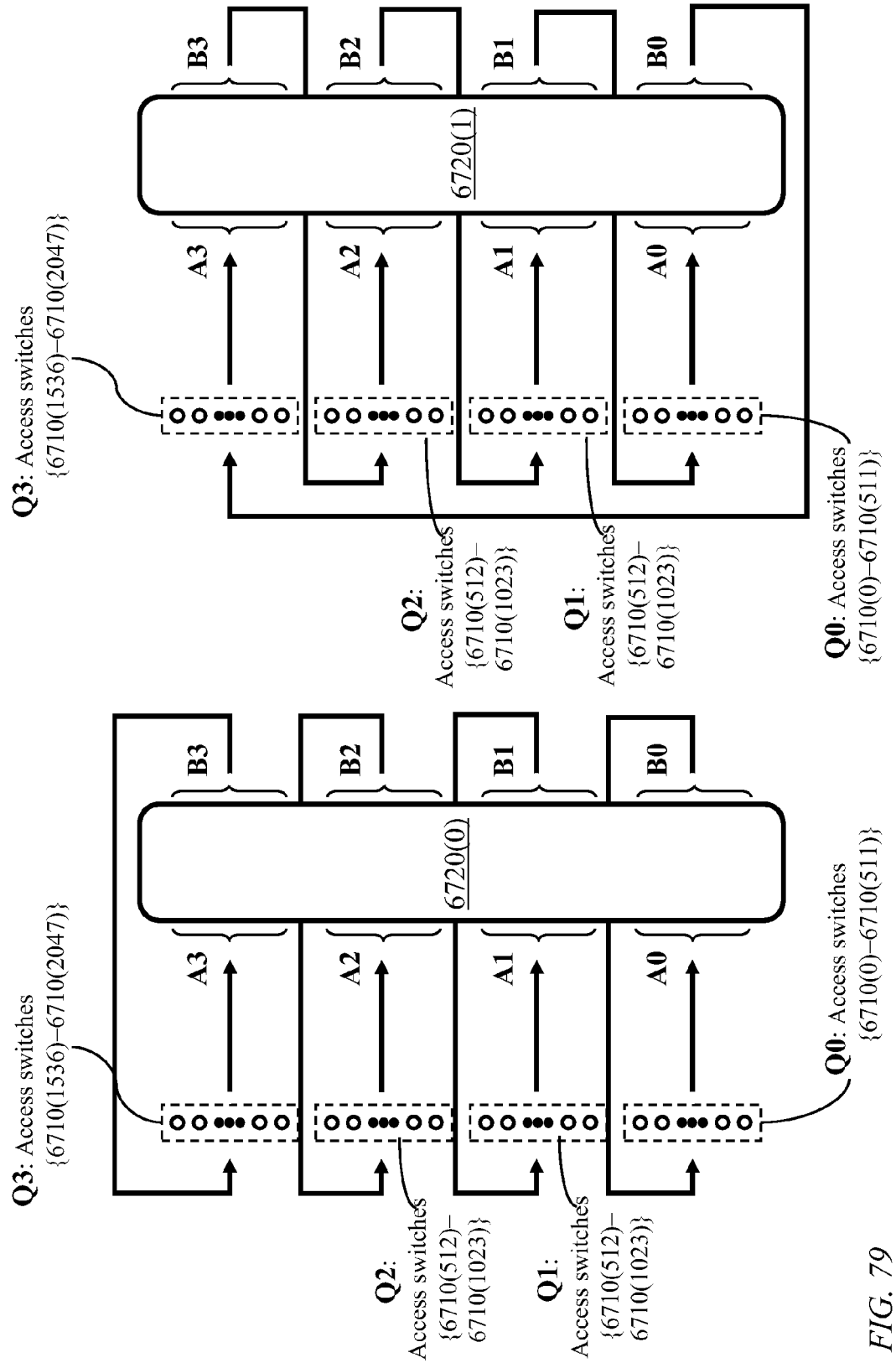
FIG. 79 and FIG. 80 illustrate a second connectivity scheme of the access switches to four latent switches, in accordance with an embodiment of the present invention.
Figure 80:
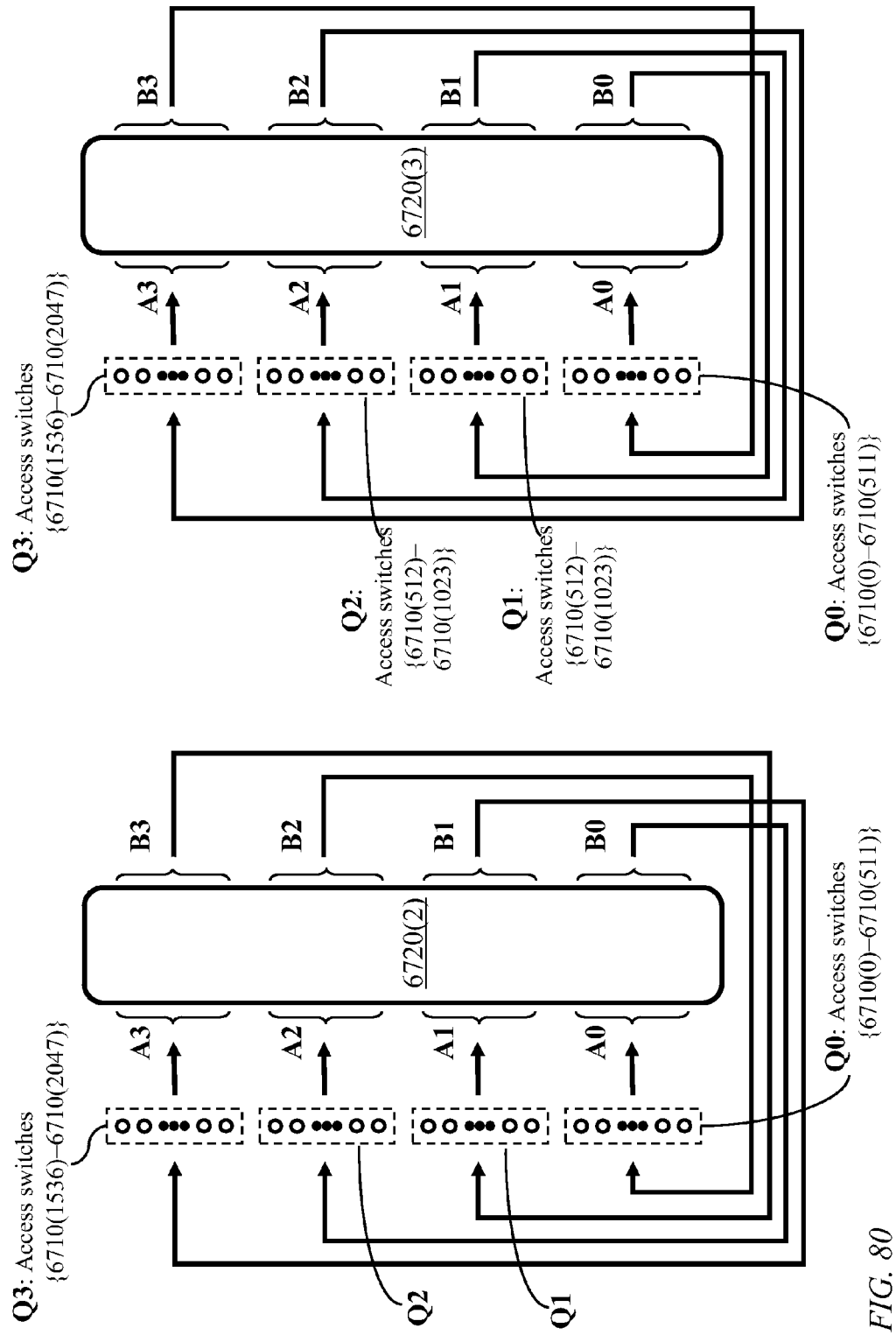

FIG. 77 and FIG. 78 illustrate a first connectivity scheme of access switches 6710 to four central switches 6720 (G=4), each central switch implemented as a latent switch having 2048 ingress ports and 2048 egress ports (N=2048). FIG. 79 and FIG. 80 illustrate a second connectivity scheme of the access switches to the four central switches. Preferably, the central switches are identical, each having a same number N of ingress ports and a same number N of egress ports and incurring a same systematic delay for a directed pair of an ingress port and an egress port, where the systematic delay depends on the number N, the index of the ingress port, and the index of the egress port.

According to the first connectivity scheme (FIG. 77 and FIG. 78), each access switch 6710 connects to G egress ports of a same index, one in each of the G central switches, and G ingress ports, one in each of the G central switches, where the G ingress ports are preferably evenly spread having indices substantially equally spaced between 0 and (N−1). In one implementation, an access switch of index j connects to an egress port of index j in each central switch 6720 and an ingress port of index $(j+p\times H)_{modulo\ N}$, in a central switch 6720 of index p, $0 \le p < G$, where H is a predetermined constant representing spacing between successive ingress ports of the G central switches 6720 to which an access switch connects. The spacing H is a circular difference between successive indices of the G ingress ports to which an access switch 6710 connects. The spacing H may be determined as: $H = \lfloor (2\times N + G)/(2\times G) \rfloor$.

Thus, access group Q0 connects to:
ingress group A0 and egress group B0 in a first central switch (p=0);
ingress group A1 and egress group B0 in a second central switch (p=1);
ingress group A2 and egress group B0 in a third central switch (p=2); and
ingress group A3 and egress group B0 in a fourth central switch (p=3).
Likewise:
Access group Q1 connects to:
ingress group A1 and egress group B1 in the first central switch (p=0);
ingress group A2 and egress group B1 in the second central switch (p=1);
ingress group A3 and egress group B1 in the third central switch (p=2); and
ingress group A0 and egress group B1 in the fourth central switch (p=3).
Access group Q2 connects to:
ingress group A2 and egress group B2 in the first central switch (p=0);
ingress group A3 and egress group B2 in the second central switch (p=1);
ingress group A0 and egress group B2 in the third central switch (p=2); and
ingress group A1 and egress group B2 in the fourth central switch (p=3).
Access group Q3 connects to:
ingress group A3 and egress group B3 in the first central switch (p=0);
ingress group A0 and egress group B3 in the second central switch (p=1);
ingress group A1 and egress group B3 in the third central switch (p=2); and
ingress group A2 and egress group B3 in the fourth central switch (p=3).

According to the second connectivity scheme (FIG. 79 and FIG. 80), each access switch 6710 connects to G ingress ports of a same index, one in each of the G central switches and G egress ports, one in each of the G central switches, where the G egress ports are preferably evenly spread. According to an implementation, an access switch of index j connects to an ingress port of index j in each central switch and an egress port of index $(j+p\times H)_{modulo\ N}$, in a central switch of index p, $0 \le p < G$, where H is a predetermined constant representing spacing between successive egress ports of the G central switches to which an access switch connects. The spacing H is a circular difference between successive indices of the G egress ports to which an access switch 6710 connects. The spacing H may be determined as: $H = \lfloor (2\times N + G)/(2\times G) \rfloor$.

Thus, access group Q0 connects to:
ingress group A0 and egress group B0 in a first central switch (p=0);
ingress group A0 and egress group B1 in a second central switch (p=1);
ingress group A0 and egress group B2 in a third central switch (p=2); and
ingress group A0 and egress group B3 in a fourth central switch (p=3).
Likewise:
Access group Q1 connects to:
ingress group A1 and egress group B1 in the first central switch (p=0);
ingress group A1 and egress group B2 in the second central switch (p=1);
ingress group A1 and egress group B3 in the third central switch (p=2); and
ingress group A1 and egress group B0 in the fourth central switch (p=3).
Access group Q2 connects to:
ingress group A2 and egress group B2 in the first central switch (p=0);
ingress group A2 and egress group B3 in the second central switch (p=1);
ingress group A2 and egress group B0 in the third central switch (p=2); and
ingress group A2 and egress group B1 in the fourth central switch (p=3).
Access group Q3 connects to:
ingress group A3 and egress group B3 in the first central switch (p=0);
ingress group A3 and egress group B0 in the second central switch (p=1);
ingress group A3 and egress group B1 in the third central switch (p=2); and
ingress group A3 and egress group B2 in the fourth central switch (p=3).

Figure 81:
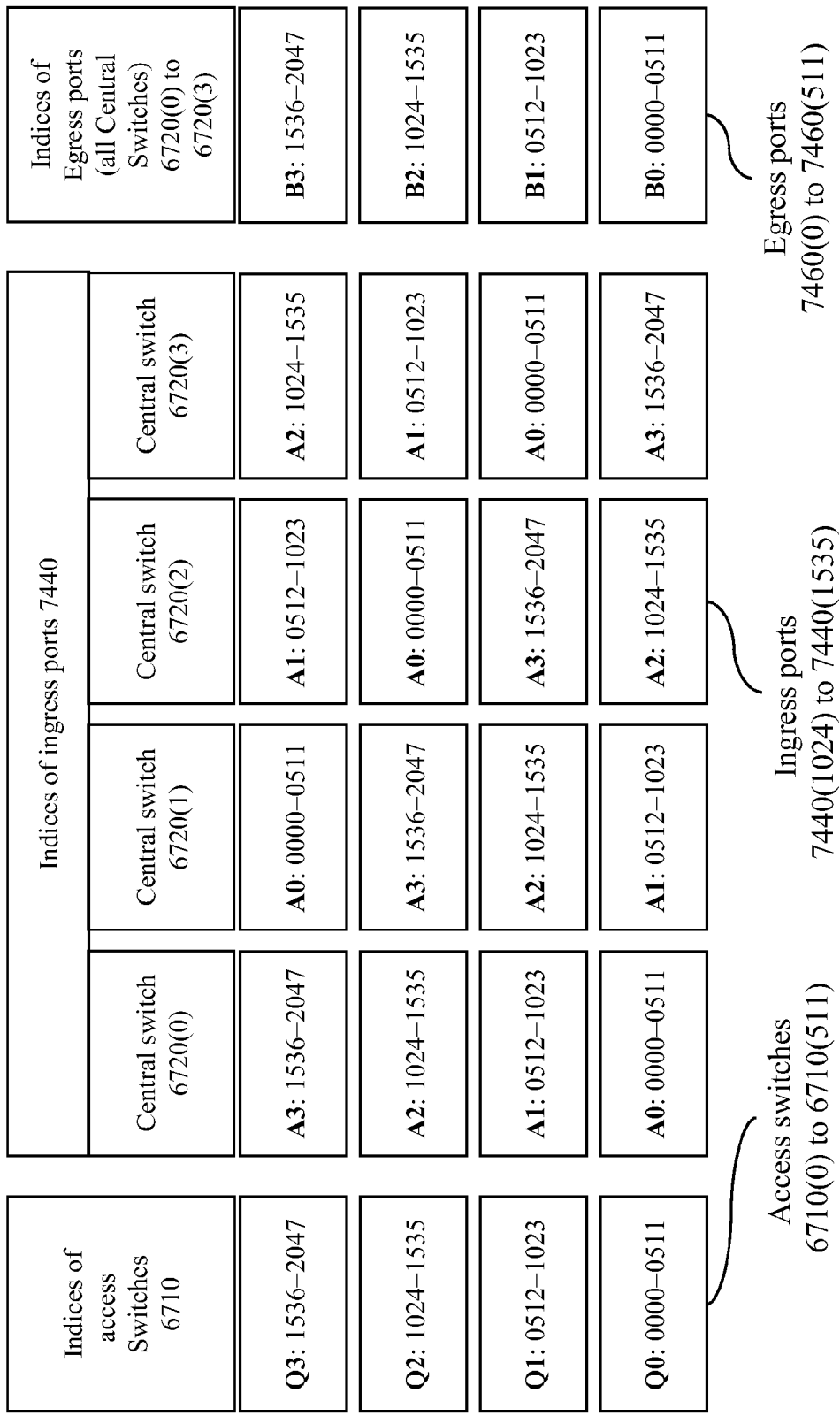
FIG. 81 illustrates the connectivity of access groups, illustrated in FIG. 77 and FIG. 78, in a tabular form.

FIG. 81 illustrates the connectivity of access groups Q0, Q1, Q2, and Q3, illustrated in FIG. 77 and FIG. 78 in a tabular form. As indicated, access group Q0 connects to ingress groups A0, A1, A2, and A3 in central switches 6720 of indices 0, 1, 2, and 3, respectively, and connects to egress group B0 of all central switches. Access group Q1 connects to ingress groups A1, A2, A3, and A0 in central switches 6720 of indices 0, 1, 2, and 3, respectively, and connects to egress group B1 of all central switches. Access group Q2 connects to ingress groups A2, A3, A0, and A1 in central switches 6720 of indices 0, 1, 2, and 3, respectively, and connects to egress group B2 of all central switches. Access group Q3 connects to ingress groups A3, A0, A1, and A2 in central switches 6720 of indices 0, 1, 2, and 3, respectively, and connects to egress group B3 of all central switches.

FIG. 82 illustrates the connectivity of access groups Q0, Q1, Q2, and Q3, illustrated in FIG. 79 and FIG. 80 in a tabular form. As indicated, access group Q0 connects to ingress group A0 of all central switches and connects to egress groups B0, B1, B2, and B3 in central switches 6720 of indices 0, 1, 2, and 3, respectively. Access group Q1 connects to ingress group A1 of all central switches and connects to egress groups B1, B2, B3, and B0 in central switches 6720 of indices 0, 1, 2, and 3, respectively. Access group Q2 connects to ingress group A2 of all central switches and connects to egress groups B2, B3, B0, and B1 in central switches 6720 of indices 0, 1, 2, and 3, respectively. Access group Q3 connects to ingress group A3 of all central switches and connects to egress groups B3, B0, B1, and B2 in central switches 6720 of indices 0, 1, 2, and 3, respectively.

Figure 83:
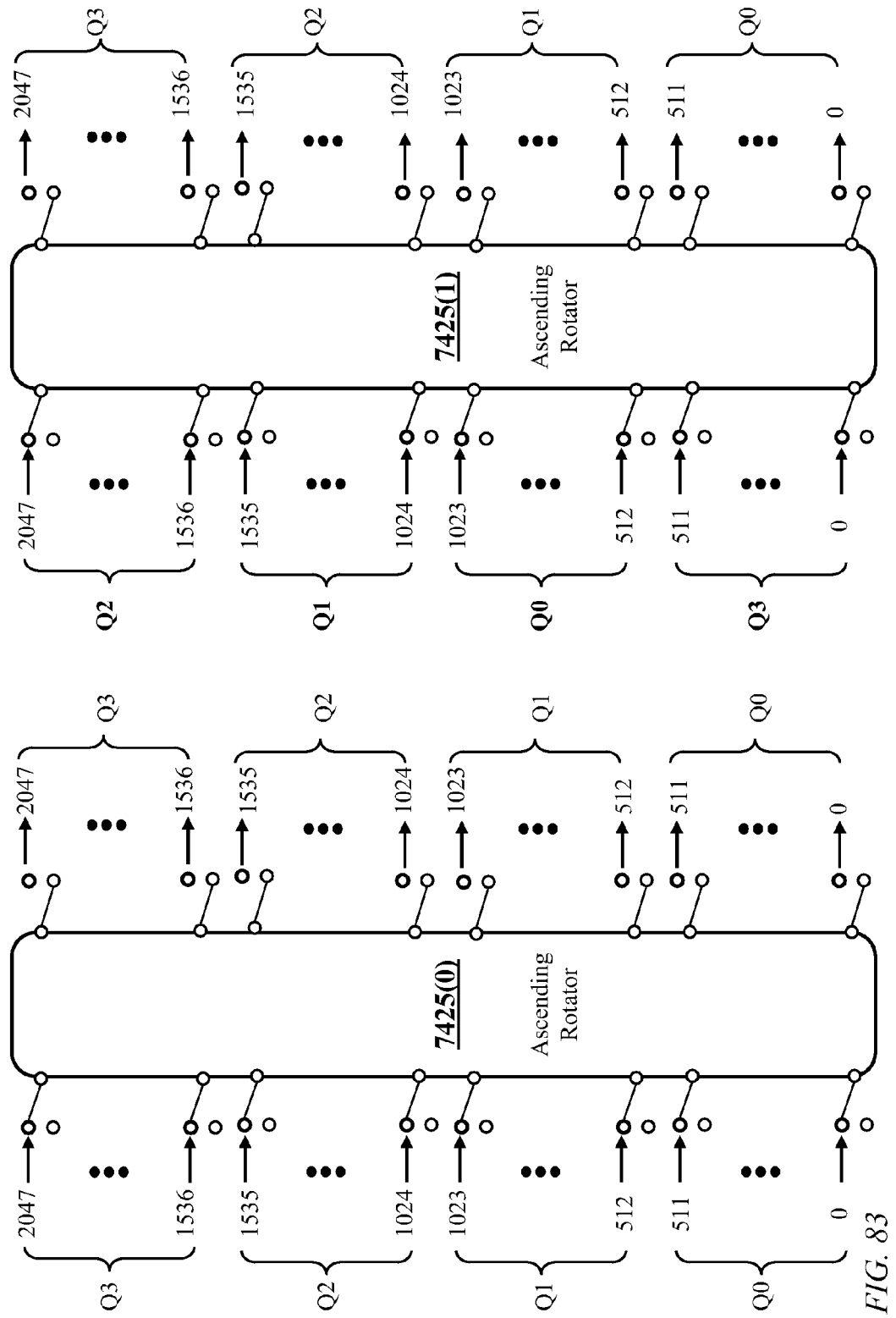
FIG. 83 and FIG. 84 illustrate the connectivity of access groups to rotators of latent switches each based on a transposing rotator, in accordance with an embodiment of the present invention.
Figure 84:
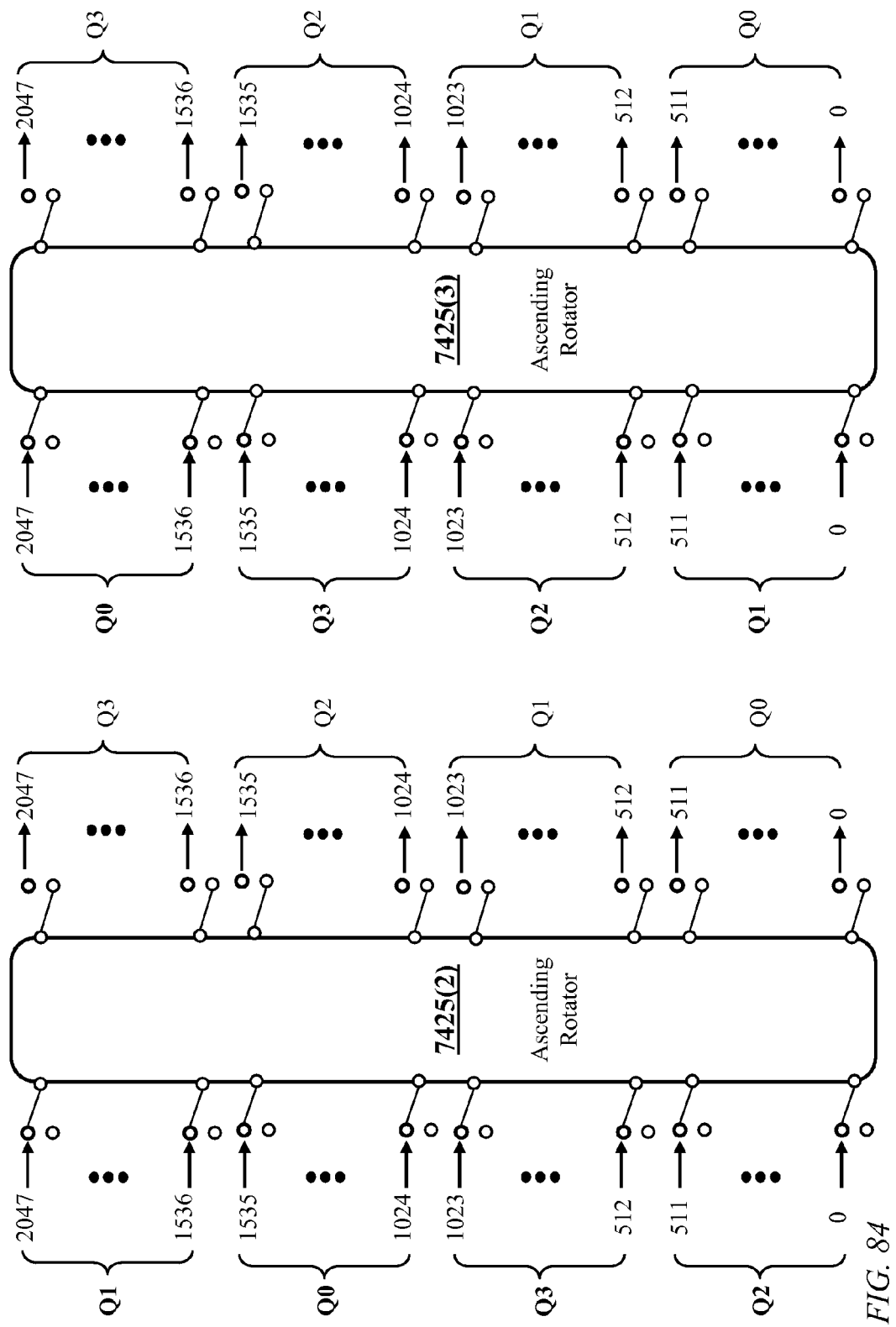

FIG. 83 and FIG. 84 illustrate the connectivity of access groups Q0, Q1, Q2, and Q3 to rotators of central switches 6720 each having 2048 ingress ports and 2048 egress ports and implemented as a latent switch based on a transposing rotator. The connectivity of access switches to the transposing rotators corresponds to the first connectivity pattern defined in the table of FIG. 81.

Figure 85:
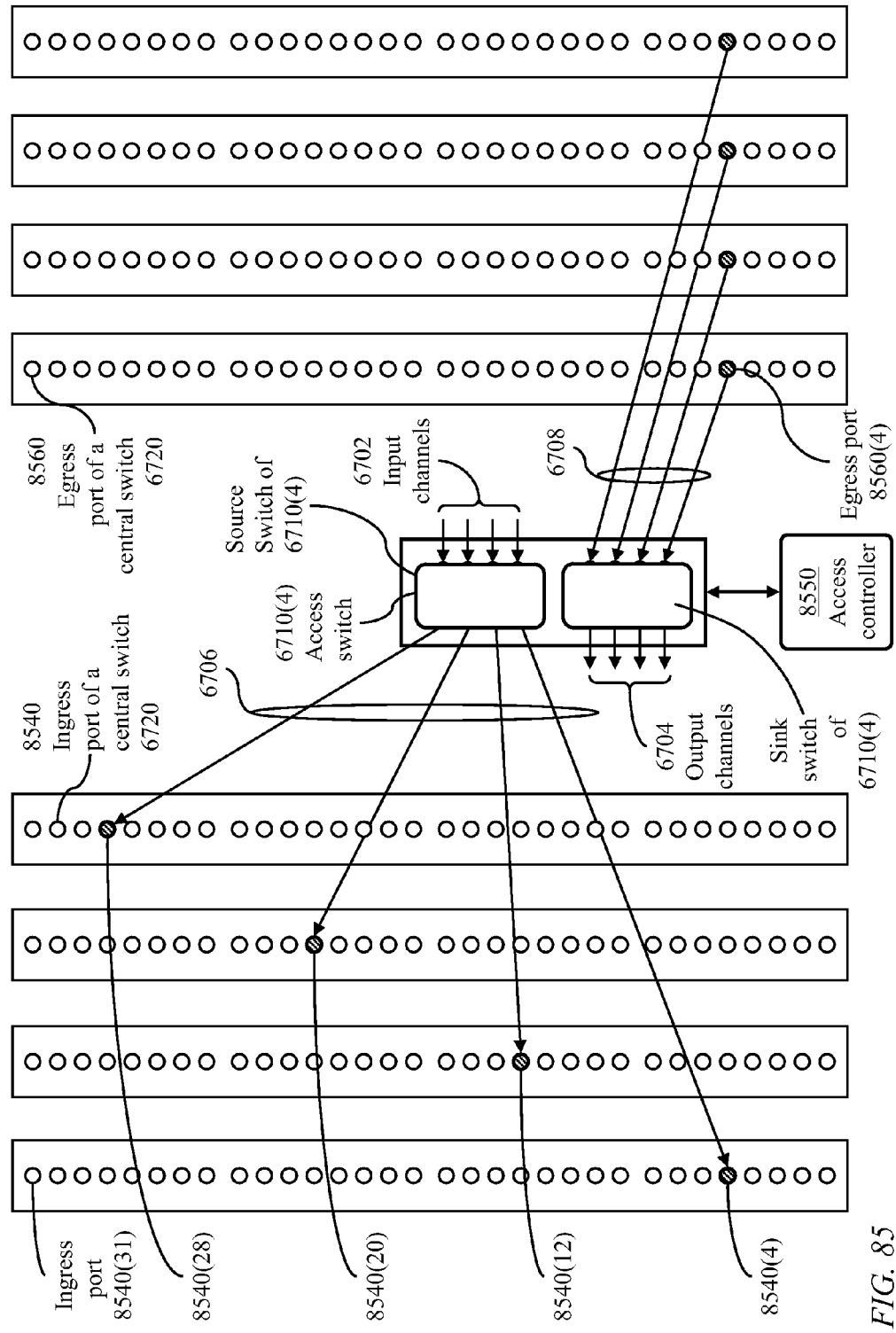
FIG. 85 illustrates a first connectivity scheme of an access switch to four latent switches of a switching system, in accordance with an embodiment of the present invention.

FIG. 85 illustrates connectivity of access switch 6710(4) to four central switches 6720 of an exemplary switching system 6700 according to the first connectivity scheme. Each central switch 6720 has 32 ingress ports 8540 and 32 egress ports 8560 (N=32). Each central switch 6720 is configured as a single-rotator latent space switch employing a transposing rotator alternatively connecting ingress ports to a bank of transit-memory devices and the bank of memory devices to egress ports. The access switch 6710 comprises a source switch having an ingress switching mechanism 6800 or 7100 and a sink switch having an egress switching mechanism 6900 or 7200.

Each access switch 6710 is coupled to a respective access controller 8550. The source switch and the sink switch of an access switch may share an access controller 8550 and may also share a switching mechanism replacing the ingress switching mechanism and the egress switching mechanism. The latent switches 6720 may be structurally identical and, preferably, may have identical rotation cycles. The ingress ports 8540 of each central switch 6720 are indexed as 0 to (N−1) and the egress ports 8560 of each central switch are indexed as 0 to (N−1). The central switches exhibit similar switching-delay characteristics where a path from an ingress port of index x to an egress port of index y, $0 \leq x < N$, $0 \leq y < N$, encounters a normalized systematic delay of $(y-x)_{modulo\ N}$, if each of the rotators is an ascending rotator, or a normalized switching delay (systematic delay) of $(x-y)_{modulo\ N}$, if each of the rotators is a descending rotator. Four upstream channels 6706 from the access switch 6710(4) connect to respective ingress ports 8540 of the four central switches 6720 and four downstream channels 6708 from four egress ports 8560 of the four central switches connect to the access switch. Preferably the indices of the four ingress ports 8540 to which the access switch 6710 connects are substantially equally spaced between 0 and (N−1) while the four egress ports 8560 connecting to the access switch 6710 have a same index. In the example of FIG. 85, access switch 6710(4) connects to ingress ports 8540 of indices 4, 12, 20, and 30 in consecutive central switches and connects to an egress port 8560 of index 4 in each central switch.

Thus, the switching system of FIG. 85 supports 32 access switches 6710 (N=32), each access switch connecting to a respective ingress port and a respective egress port of each central switch of four central switches 6720 (G=4). Each access switch connects to egress ports of a same index and ingress ports of different indices in the four central switches. Preferably, the circular difference between indices $X_0, X_1, \ldots, X_{G-1}$ of successive ingress ports to which an access switch 6710 connects equals a predetermined constant H, $1 \leq H < N$. As described above, the predetermined constant, H, may be selected as $H = \lfloor (2 \times N + G)/(2 \times G) \rfloor$, G being the number of latent switches of the switching system.

An access switch of index j, $0 \leq j < N$, has a downstream channel from an egress port of index j in each central switch of the G central switches and an upstream channel to an ingress port of index $(j + p \times H)_{modulo\ N}$, in a central switch of index p, $0 \leq p < G$. In the switching system of FIG. 85, N=32 and G=4. Thus, the circular difference between indices of ingress ports of successive central switches is H=8. As illustrated, access switch 6710(4) connects to downstream channels 6708 from an egress port 8560(4) of each central switch and connects to upstream channels 6706 to ingress ports 8540 of indices 4, 12, 20, and 28 of central switches 6720 of indices 0, 1, 2, and 3, respectively. If N is not an integer multiple of G, the circular difference between $X_{G-1}$ and $X_0$ differs from H.

Figure 86:
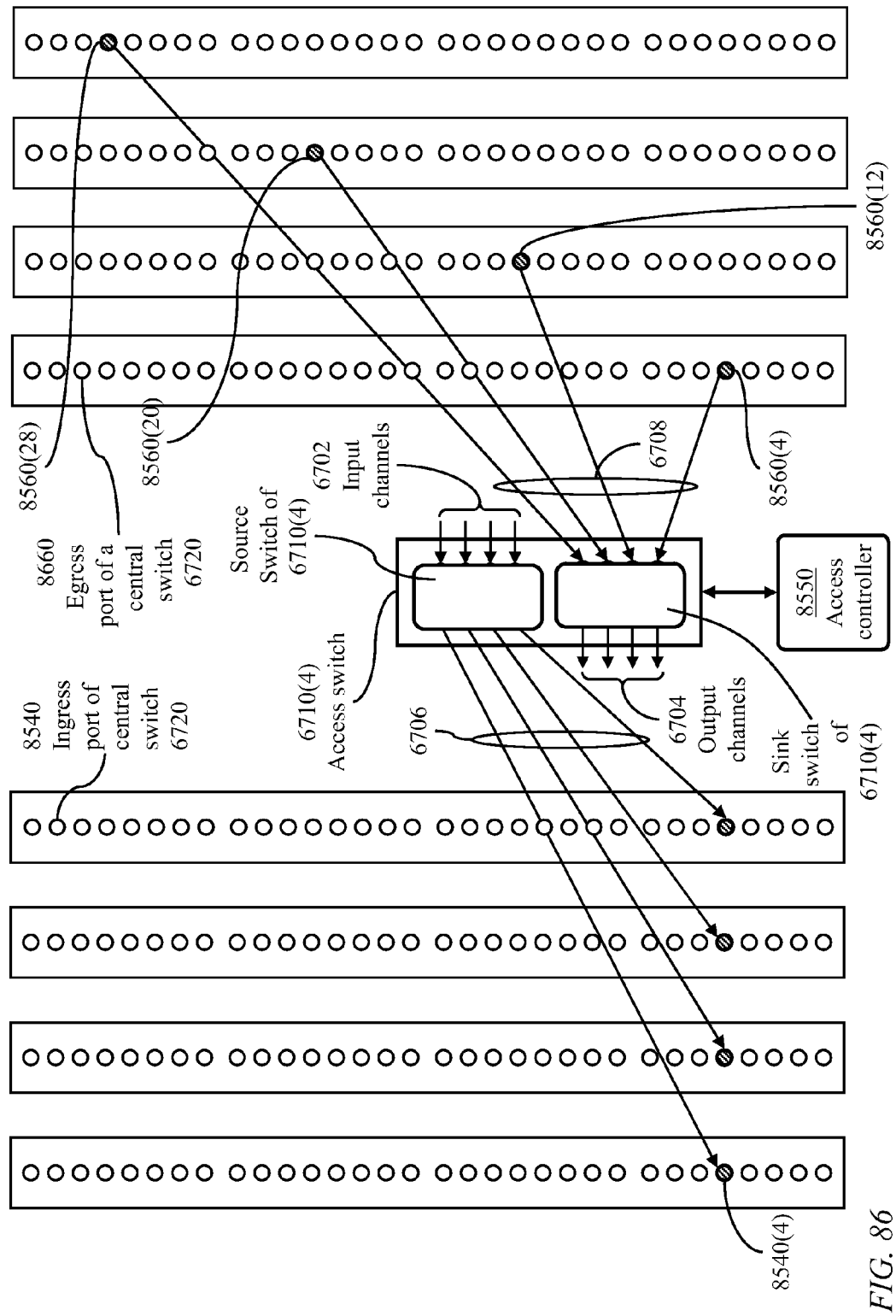
FIG. 86 illustrates an alternate connectivity scheme of an access switch to four latent switches of a switching system, in accordance with an embodiment of the present invention.

FIG. 86 illustrates connectivity of access switch 6710(4) to four central switches 6720 of an exemplary switching system having four central switches according to the second connectivity scheme. The four ingress ports 8540 to which the access switch connects have a same index. The indices of the four egress ports 8560 connecting to the access switch are substantially equally spaced between 0 and (N−1). Implementing either of the two connectivity schemes results in a same capacity and performance. However, the first scheme has the advantages that an access switch connects to egress ports of a same index which simplifies routing and addressing. Each access switch is coupled to a respective access controller 8550 which may be shared by the source switch and the sink switch components of the access switch 6710.

Thus, the switching system of FIG. 86 supports N access switches where each access switch connects to a respective ingress port and a respective egress port of each central switch. Each access switch connects to ingress ports of a same index and egress ports of different indices in the four central switches. Preferably, the circular difference between indices $Y_0, Y_1, \ldots, Y_{G-1}$ of successive egress ports to which an access switch connects equals a predetermined constant H, $1 \leq H < N$. An access switch of index j, $0 \leq j < N$, has an upstream channel to an ingress port of index j in each central switch of the switching system and a downstream channel from an egress port of index $(j + p \times H)_{modulo\ N}$, in a central switch of index p, $0 \leq p < G$. In the exemplary switching system of FIG. 86, N=32 and G=4. Thus, the circular difference between indices of ingress ports of successive central switches is H=8. As illustrated, the access switch 6710 of index 4 connects to ingress ports 8540, each of index 4, and egress ports 8560 of indices 4, 12, 20, and 28. If N is not an integer multiple of G, the circular difference between $Y_{G-1}$ and $Y_0$ differs from H.

Table-9 lists indices of ingress ports 8540 of the four central switches 6720 to which each access switch 6710 connects according to the first connectivity scheme of FIG. 85. Each access switch 6710 connects to a likewise numbered egress port 8560 in each central switch 6720. The ingress ports 8540 of each central switch 6720 are indexed as ingress ports 0 to (N−1) and the egress ports 8560 of each central switch 6720 are indexed as egress ports 0 to (N−1).

Table-10 lists indices of access switches 6710 connecting to ingress ports 8540 and egress ports 8560 of each central switch 6720 according to the first connectivity scheme. As described above, an access switch 6710 of index j connects to an ingress port 8540 of index $(j + p \times H)_{modulo\ N}$, $0 \leq j < N$, in a central switch 6720 of index p, $0 \leq p < G$. Conversely, an ingress port 8540 of index x in a central switch 6720(p) connects to an access switch 6710 of index $(x − p \times H)_{modulo\ N}$. An egress port 8560 of index y in any central switch 6720 connects to an access switch 6710 of index y. Ingress ports 8540 of a same index in the G central switches connect to different access switches 6710 while egress ports 8560 of a same index in the G central switches connect to a single access switch 6710.

TABLE 9

Connectivity of access switches to ingress and egress ports

| j: Index of access switch 6710 | Index of ingress port 8540 in central switch 6720(p) connected to access switch 6710(j): $(j + p \times H)_{modulo\ N}$ | | | | Index of egress port 8560 in each central switch connected to 6710(j) |
|---|---|---|---|---|---|
| | p = 0 | p = 1 | p = 2 | p = 3 | |
| 0 | 0 | 8 | 16 | 24 | 0 |
| 1 | 1 | 9 | 17 | 25 | 1 |

TABLE 9-continued

Connectivity of access switches to ingress and egress ports

| j: Index of access switch 6710 | Index of ingress port 8540 in central switch 6720(p) connected to access switch 6710(j): $(j + p \times H)_{modulo\ N}$ | | | | Index of egress port 8560 in each central switch connected to 6710(j) |
|---|---|---|---|---|---|
| | p = 0 | p = 1 | p = 2 | p = 3 | |
| 2 | 2 | 10 | 18 | 26 | 2 |
| 3 | 3 | 11 | 19 | 27 | 3 |
| 4 | 4 | 12 | 20 | 28 | 4 |
| 5 | 5 | 13 | 21 | 29 | 5 |
| 6 | 6 | 14 | 22 | 30 | 6 |
| 7 | 7 | 15 | 23 | 31 | 7 |
| 8 | 8 | 16 | 24 | 0 | 8 |
| 9 | 9 | 17 | 25 | 1 | 9 |
| 10 | 10 | 18 | 26 | 2 | 10 |
| 11 | 11 | 19 | 27 | 3 | 11 |
| 12 | 12 | 20 | 28 | 4 | 12 |
| 13 | 13 | 21 | 29 | 5 | 13 |
| 14 | 14 | 22 | 30 | 6 | 14 |
| 15 | 15 | 23 | 31 | 7 | 15 |
| 16 | 16 | 24 | 0 | 8 | 16 |
| 17 | 17 | 25 | 1 | 9 | 17 |
| 18 | 18 | 26 | 2 | 10 | 18 |
| 19 | 19 | 27 | 3 | 11 | 19 |
| 20 | 20 | 28 | 4 | 12 | 20 |
| 21 | 21 | 29 | 5 | 13 | 21 |
| 22 | 22 | 30 | 6 | 14 | 22 |
| 23 | 23 | 31 | 7 | 15 | 23 |
| 24 | 24 | 0 | 8 | 16 | 24 |
| 25 | 25 | 1 | 9 | 17 | 25 |
| 26 | 26 | 2 | 10 | 18 | 26 |
| 27 | 27 | 3 | 11 | 19 | 27 |
| 28 | 28 | 4 | 12 | 20 | 28 |
| 29 | 29 | 5 | 13 | 21 | 29 |
| 30 | 30 | 6 | 14 | 22 | 30 |
| 31 | 31 | 7 | 15 | 23 | 31 |

TABLE 10

Connectivity of ingress and egress ports to access switches

| x: Index of ingress port 8540 | Index of access switch connected to ingress port 8540(x) of central switch 6720(p): $(x - p \times H)_{modulo\ N}$ | | | | y: Index of egress port 8560 | Index of access switch 6710 connected to 8560(y) |
|---|---|---|---|---|---|---|
| | p = 0 | p = 1 | p = 2 | p = 3 | | |
| 0 | 0 | 24 | 16 | 8 | 0 | 0 |
| 1 | 1 | 25 | 17 | 9 | 1 | 1 |
| 2 | 2 | 26 | 18 | 10 | 2 | 2 |
| 3 | 3 | 27 | 19 | 11 | 3 | 3 |
| 4 | 4 | 28 | 20 | 12 | 4 | 4 |
| 5 | 5 | 29 | 21 | 13 | 5 | 5 |
| 6 | 6 | 30 | 22 | 14 | 6 | 6 |
| 7 | 7 | 31 | 23 | 15 | 7 | 7 |
| 8 | 8 | 0 | 24 | 16 | 8 | 8 |
| 9 | 9 | 1 | 25 | 17 | 9 | 9 |
| 10 | 10 | 2 | 26 | 18 | 10 | 10 |
| 11 | 11 | 3 | 27 | 19 | 11 | 11 |
| 12 | 12 | 4 | 28 | 20 | 12 | 12 |
| 13 | 13 | 5 | 29 | 21 | 13 | 13 |
| 14 | 14 | 6 | 30 | 22 | 14 | 14 |
| 15 | 15 | 7 | 31 | 23 | 15 | 15 |
| 16 | 16 | 8 | 0 | 24 | 16 | 16 |
| 17 | 17 | 9 | 1 | 25 | 17 | 17 |
| 18 | 18 | 10 | 2 | 26 | 18 | 18 |
| 19 | 19 | 11 | 3 | 27 | 19 | 19 |
| 20 | 20 | 12 | 4 | 28 | 20 | 20 |
| 21 | 21 | 13 | 5 | 29 | 21 | 21 |
| 22 | 22 | 14 | 6 | 30 | 22 | 22 |
| 23 | 23 | 15 | 7 | 31 | 23 | 23 |

TABLE 10-continued

Connectivity of ingress and egress ports to access switches

| x: Index of ingress port 8540 | Index of access switch connected to ingress port 8540(x) of central switch 6720(p): $(x - p \times H)_{modulo\ N}$ | | | | y: Index of egress port 8560 | Index of access switch 6710 connected to 8560(y) |
|---|---|---|---|---|---|---|
| | p = 0 | p = 1 | p = 2 | p = 3 | | |
| 24 | 24 | 16 | 8 | 0 | 24 | 24 |
| 25 | 25 | 17 | 9 | 1 | 25 | 25 |
| 26 | 26 | 18 | 10 | 2 | 26 | 26 |
| 27 | 27 | 19 | 11 | 3 | 27 | 27 |
| 28 | 28 | 20 | 12 | 4 | 28 | 28 |
| 29 | 29 | 21 | 13 | 5 | 29 | 29 |
| 30 | 30 | 22 | 14 | 6 | 30 | 30 |
| 31 | 31 | 23 | 15 | 7 | 31 | 31 |

Table-10 is an inverse of Table-9. As indicated in Table-9, access switches 6710 of indices 4, 28, 20, and 12 connect to an ingress port 8540 of index 4 in central switches 6720 of indices 0, 1, 2, and 3, respectively. Table-10 indicates that ingress ports 8540 of a same index 4 in central switches 6720 of indices 0 to 3 connect to access switches 6710 of indices 4, 28, 20, and 12, respectively.

According to the second connectivity pattern, an access switch 6710 of index j connects to an egress port 8560 of index $(j+p \times H)_{modulo\ N}$, $0 \leq j < N$, in a central switch 6720 of index p, $0 \leq p < G$. Conversely, an egress port 8560 of index y, $0 \leq y < N$, in a central switch 6720(p) connects to an access switch 6710 of index $(y - p \times H)_{modulo\ N}$. Egress ports of a same index in the G central switches connect to different access switches while ingress ports of a same index in the G central switches connect to a single access switch.

The connectivity pattern of the ingress side according to the first connectivity scheme corresponds to the connectivity pattern of the egress side according to the second connectivity scheme, and vice versa. Exchanging the terms "ingress port" and "egress port", in Table-9 and Table-10, produces corresponding connectivity tables applicable to the second connectivity scheme.

Figure 87:
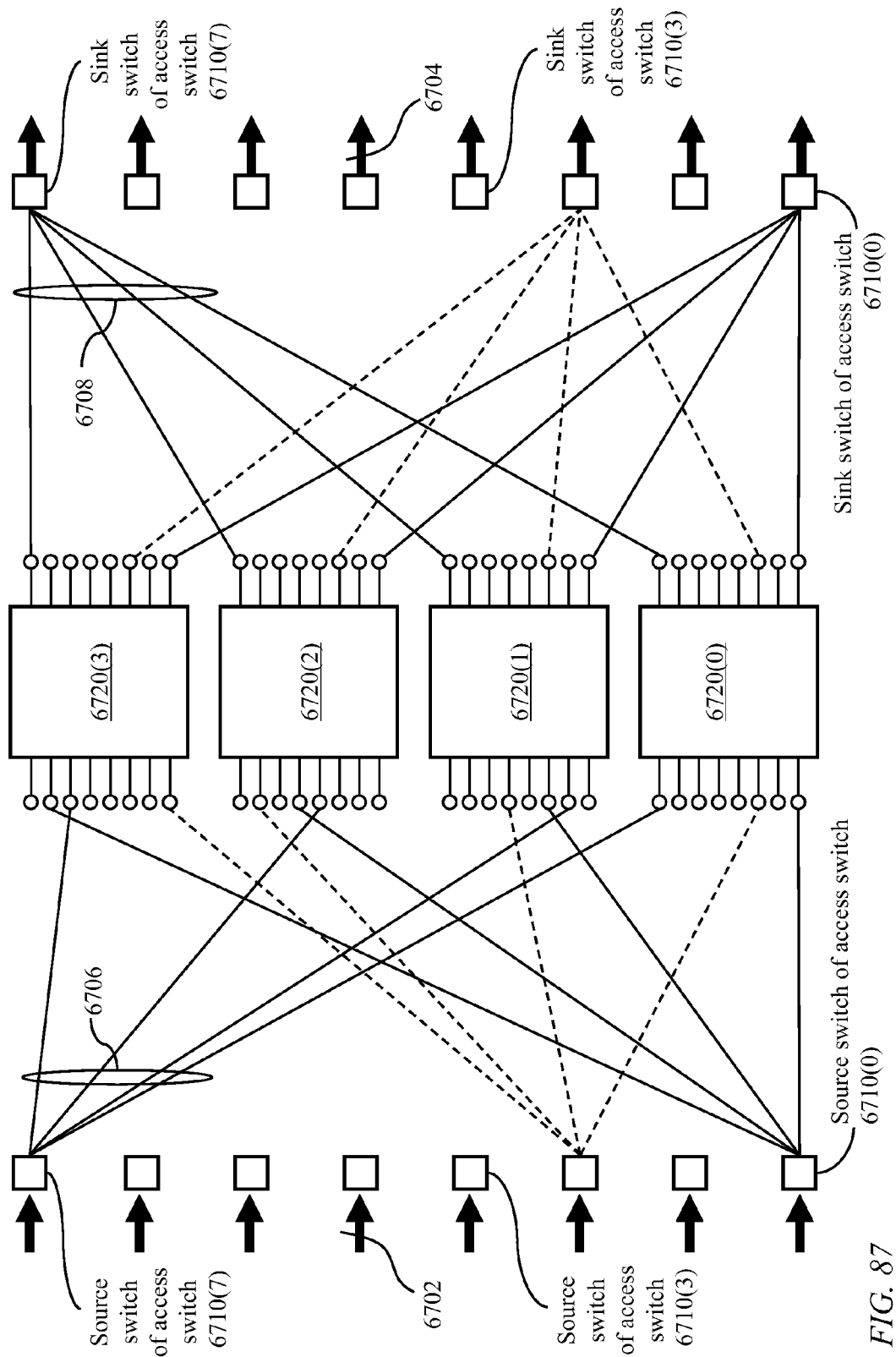
FIG. 87 illustrates a switching system having four latent switches and eight access switches configured according to the first connectivity scheme.

FIG. 87 illustrates a switching system having four central switches 6720 (G=4) and eight access switches 6710(0) to 6710(7). Each central switch has eight ingress ports and eight egress ports (N=8). Each access switch connects to four ingress ports of different indices and four egress ports of a same index in the four central switches 6720 according to the first connectivity scheme. The circular difference H between indices of successive ingress ports to which an access switch connects is determined as: $H = \lfloor (2 \times N + G)/(2 \times G) \rfloor = 2$.

Figure 88:
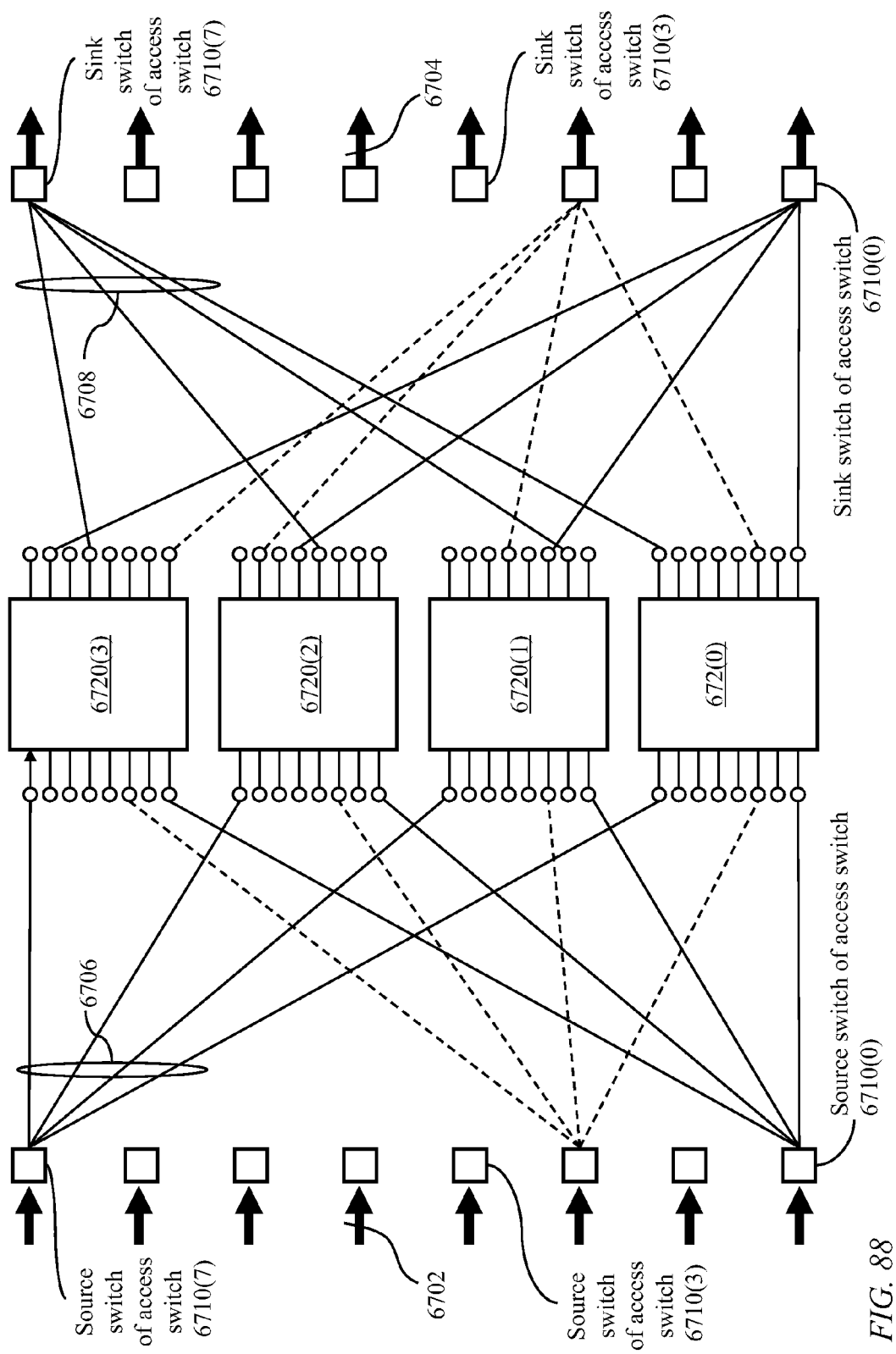
FIG. 88 illustrates a switching system having four latent switches and eight access switches configured according to the second connectivity scheme.

FIG. 88 illustrates a switching system having four central switches 6720 (G=4) and eight access switches 6710(0) to 6710(7). Each central switch has eight ingress ports and eight egress ports (N=8). Each access switch connects to four ingress ports of a same index and four egress ports of different indices in the four central switches 6720 according to the second connectivity scheme. The circular difference H between indices of successive egress ports connecting to an access switch is determined as: $H = \lfloor (2 \times N + G)/(2 \times G) \rfloor = 2$.

FIG. 89 and FIG. 90 illustrate, in tabular forms, the systematic delays of paths traversing each of the central switches 6720, configured as latent switches, according to the connectivity scheme of the switching system of FIG. 87 where each central switch 6720 is a latent switch employing an ascending transposing rotator. An entry 8980 indicates a normalized systematic delay through a respective central switch 6720 of a path from an originating access switch 6710 to a destination access switch 6710.

As indicated in FIG. 89, the four paths from an access switch of index 1 to an access switch of index 2 through the central switches of indices 0 to 3 encounter systematic delays of normalized values of 1, 7, 5, and 3 respectively. Thus, the path through the central switch of index 0 may be selected for routing data from the access switch of index 1 to the access switch of index 2, followed by paths through the central switches of indices 3, 2, and 1, if needed. As indicated in FIG. 90, the four paths from an access switch of index 5 to an access switch of index 1 through the central switches of indices 0 to 3 encounter systematic delays of 4, 2, 8, and 6 respectively. The path through central switch of index 1 incurs the least delay having a normalized value of 2.

Figure 91:
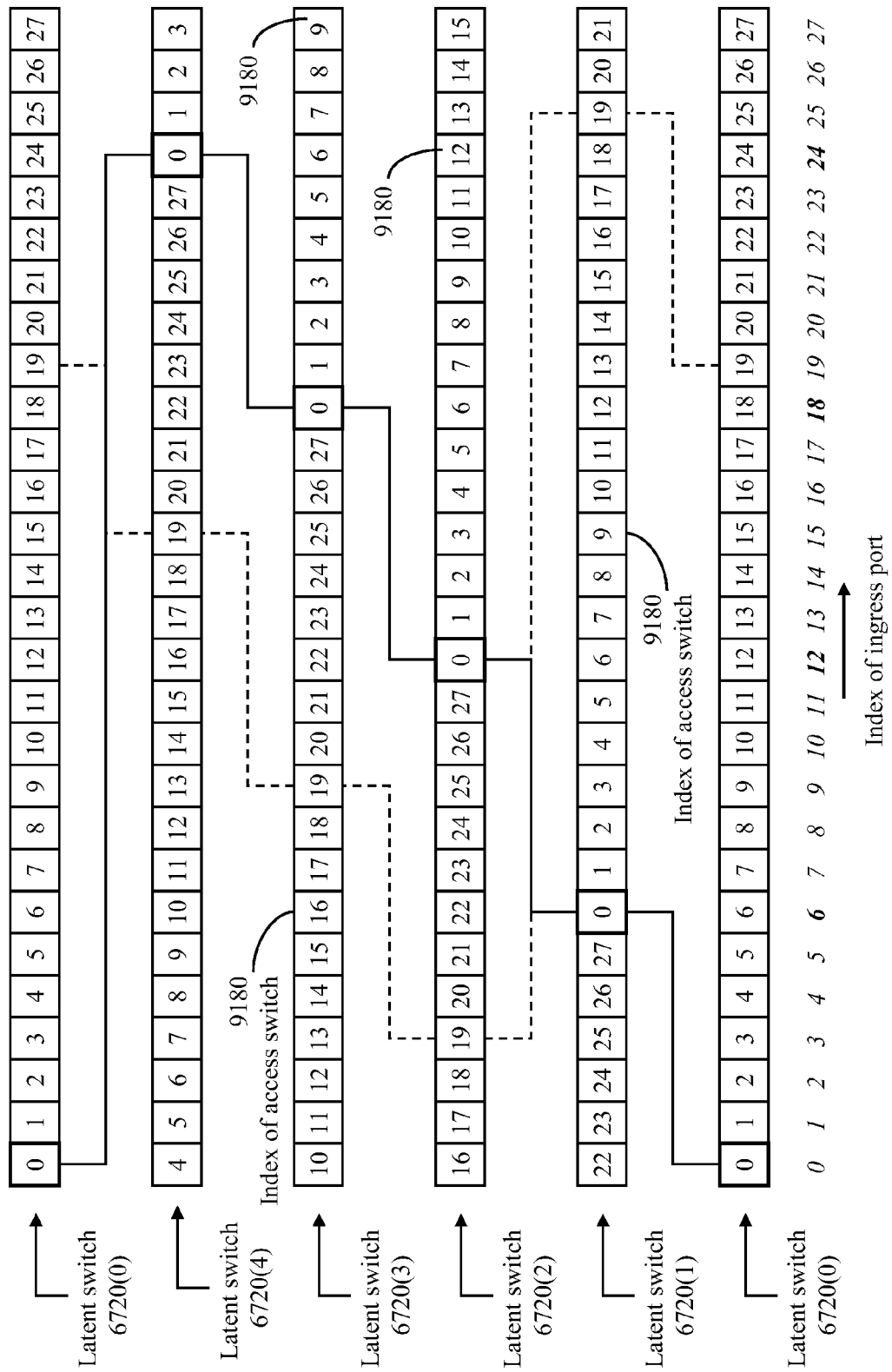
FIG. 91 illustrates connectivity of access switches to central switches of a switching system having five central switches, each implemented as a latent switch employing a transposing rotator, and 28 access switches according to the first connectivity scheme.

FIG. 91 illustrates connectivity of access switches 6710 to central switches 6720 of a switching system 6700 having five central switches 6720(0) to 6720(4) and 28 access switches according to the first connectivity scheme where an access switch of index j, $0 \le j < N$, connects to an ingress port of index $(j+p \times H)_{modulo\ N}$ of central switch 6720($p$) and an egress port of index j in each central switch 6720. Each entry 9180 is an index of an access switch 6710 connecting to an ingress port of a respective central switch 6720. Each central switch is implemented as a latent switch employing a transposing rotator. As illustrated, an access switch of index 0 connects to ingress ports of indices 0, 6, 12, 18, and 24 of central switches 6720(0) to 6720(4), respectively. An access switch of index 27 connects to ingress ports of indices 27, 5, 11, 17, and 23 of central switches 6720(0) to 6720(4), respectively.

Selection of a Preferred Central Switch

Ascending Rotators, First Connectivity Scheme

A central switch implemented as a latent switch having an ascending transposing rotator incurs a normalized systematic delay of $(y-x)_{modulo\ N}$ for a path from an ingress port of index x to an egress port of index y, $0 \le x < N$, $0 \le y < N$.

In a switching system 6700 where the central switches 6720 are latent switches employing ascending transposing rotators, each central switch having N ingress ports and N egress ports, and the access switches 6710 are connected to the central switches according to the first connectivity scheme, an access controller coupled to an access switch 6710 of index j may select a central switch for establishing a path to an access switch of index k, $0 \le j < N$, $0 \le k < N$, starting with a central switch of index $\pi = \lfloor (k-j-1)_{modulo\ N}/H \rfloor$, followed by central switches of indices $(\pi-q)_{modulo\ G}$, $1 \le q < G$. The central switch of index $\pi$ incurs the least systematic delay for paths between access switch 6710($j$) and access switch 6710($k$).

In a switching system 6700 having 64 central switches 6720 (G=64) implemented as latent switches, each central switch 6720 having 2048 ingress ports and 2048 egress ports (N=2048), the spacing between indices of ingress ports, in successive central switches, to which $H=\lfloor (2 \times N+G)/(2 \times G) \rfloor = 32$. The least systematic delay $\Delta_{min}$ through central switch 6720($\pi$) varies between $\delta$ and $H \times \delta$ depending on the indices of the originating and destination access switches, $\delta$ being the duration of a time slot, which depends on memory access time. With $\delta$=20 nanoseconds, for example, $\Delta_{min}$ varies between 20 nanoseconds and 0.64 microseconds ($\mu$s). A path through central switch 6720 of index $(\pi-q)_{modulo\ G}$, $0 \le q < G$, incurs a systematic delay $\Delta_q = (\Delta_{min}+0.64 \times q)$ $\mu$s. Thus, the systematic delay of a path through the preferred central switch 6720($\pi$) is $\Delta_0 \le 0.64$ $\mu$s, the systematic delay of paths through central switches 6720($\pi-1$)$_{modulo\ G}$, 6720($\pi-2$)$_{modulo\ G}$, etc. are $\Delta_1 \le 1.28$ $\mu$s, $\Delta_2 \le 1.92$ $\mu$s, etc. With spatially balanced distribution of data traffic, i.e., with small variations of the data flow rates from each access switch 6710 to the other access switches 6710, the bulk of the flows may be switched through respective central switches 6720 incurring the least systematic delay. With larger spatial variations of the data flow rates, a proportion of flows may be switched through central switches incurring higher delays.

Ascending Rotators, Second Connectivity Scheme

With the second connectivity scheme, an access controller coupled to an access switch of index j may select a central switch for establishing a path to an access switch of index k, $0 \le j < N$, $0 \le k < N$, starting with a central switch of index $\pi = (G - \lfloor (k-j-1)_{modulo\ N}/H \rfloor)_{modulo\ G}$ followed by central switches of indices $(\pi+q)_{modulo\ G}$, $1 \le q < G$. The central switch of index $\pi$ incurs the least delay. With N=2048, G=64, $\Delta_{min}$ varies between $\delta$ and $H \times \delta$ depending on the indices of the originating and destination access switches. With $\delta$=20 nanoseconds, $\Delta_{min}$ varies between 20 nanoseconds and 0.64 microseconds and the systematic delay through a central switch 6720 of index $(\pi+q)_{modulo\ G}$ is $\Delta_q = (\Delta_{min}+0.64 \times q)$ $\mu$s.

Descending Rotators, First Connectivity Scheme

A central switch having a descending transposing rotator incurs a normalized systematic delay of $(x-y)_{modulo\ N}$ for a path from an ingress port of index x to an egress port of index y, $0 \le x < N$, $0 \le y < N$. With the first connectivity scheme of access switches to central switches, an access controller coupled to an access switch of index j may select a central switch for establishing a path to an access switch of index k, $0 \le j < N$, $0 \le k < N$, starting with a central switch of index $\pi = (G - \lfloor (j-k-1)_{modulo\ N}/H \rfloor)_{modulo\ G}$ followed by central switches of indices $(\pi+q)_{modulo\ G}$, $1 \le q < G$. The central switch of index $\pi$ incurs the least delay. With N=2048, G=64, $\Delta_{min}$ varies between $\delta$ and $H \times \delta$ depending on the indices of the originating and destination access switches. With $\delta$=20 nanoseconds, $\Delta_{min}$ varies between 20 nanoseconds and 0.64 microseconds, and the systematic delay through a central switch 6720($\pi+q$) is $\Delta_q = (\Delta_{min}+0.64 \times q)$ $\mu$s.

Descending Rotators, Second Connectivity Scheme

With the second connectivity scheme, an access controller coupled to an access switch of index j may select a central switch for establishing a path to an access switch of index k, $0 \le j < N$, $0 \le k < N$, starting with a central switch of index $\pi = \lfloor (j-k-1)_{modulo\ N}/H \rfloor$ followed by central switches of indices $(\pi-q)_{modulo\ G}$, $1 \le q < G$. The central switch of index $\pi$ incurs the least delay. With N=2048, G=64, $\Delta_{min}$ varies between $\delta$ and $H \times \delta$ depending on the indices of the originating and destination access switches. With $\delta$=20 nanoseconds, the systematic delay through a central switch 6720($\pi-q$) is $\Delta_q = (\Delta_{min}+0.64 \times q)$ $\mu$s.

Table-11 summarizes the selection of a central switch 6720 for a connection from an access switch 6710 of index j to an access switch 6710 of index k, $0 \le j < N$, $0 \le k < N$, for the first and second connectivity schemes and with a central switch employing a transposing ascending rotator or a transposing descending rotator. A path through a central switch 6720 of index $\pi$ incurs the least systematic delay. The table provides an expression relating the index $\pi$ to indices j and k, and to parameters G and H, for each of four configurations defined according to a connectivity scheme and rotators' direction. If the path of minimum systematic delay, through central switch 6720($\pi$), does not have sufficient vacancy, other paths selected according to a respective sequence as indicated in Table-11 may be sought. As indicated in the table, the central switches considered for routing a path from access switch

6710(j) to access switch 6710(k) start with a central switch of index π followed by central switches of indices:

(π−1)$_{modulo\ G}$, (π−2)$_{modulo\ G}$, etc, for a switching system 6700 configured according to the first connectivity scheme with an ascending transposing rotator or the second configuration scheme with a descending transposing rotator;

or (π+1)$_{modulo\ G}$, (π+2)$_{modulo\ G}$, etc, for a switching system 6700 configured according to the first connectivity scheme with a descending transposing rotator or the second configuration scheme with an ascending transposing rotator.

TABLE 11

Central switch of least delay for a path from an access switch of index j to an access switch of index k, 0 ≤ j < N, 0 ≤ k < N

| | First connectivity scheme | Second connectivity scheme |
|---|---|---|
| Ascending Rotator | π = ⌊(k − j − 1)$_{modulo\ N}$/H⌋<br>Sequence: (π − q)$_{modulo\ G}$, 0 ≤ q < G | π = (G − ⌊(k − j − 1)$_{modulo\ N}$/H⌋)$_{modulo\ G}$<br>Sequence: (π + q)$_{modulo\ G}$, 0 ≤ q < G |
| Descending Rotator | π = (G − ⌊(j − k − 1)$_{modulo\ N}$/H⌋)$_{modulo\ G}$<br>Sequence: (π + q)$_{modulo\ G}$, 0 ≤ q < G | π = ⌊(j − k − 1)$_{modulo\ N}$/H⌋<br>Sequence: (π − q)$_{modulo\ G}$, 0 ≤ q < G |

Table-12 indicates preferred central switches for transferring data from a specific originating access switch 6710 to all access switches 6710 in a switching system 6700 having five central switches 6720, each configured as a latent switch having 20 ingress ports and 20 egress ports (G=5, N=20). The parameter H is determined as: H=⌊(2×N+G)/(2×G)⌋=4.

In Table-12, j is an index of an originating access switch, k is an index of a destination access switch, π is an index of a preferred central switch 6720 for a path from an access switch 6710(j) to an access switch 6710(k), x is an index of an ingress port of a central switch, y is an index of an egress port of a central switch, Δ is a normalized systematic delay; 0≤j<N, 0≤k<N, 0≤π<G, 0≤x<N, 0≤y<N, 1≤Δ≤N. The absolute value of the systematic delay is Δ×δ, δ being the duration of a time slot—20 nanoseconds for example—which depends on memory access time.

Table-12 corresponds to an originating access switch 6710(11) of a switching system 6700 having 5 central switches (G=5), with N=20. For each destination access node 6710(k), the index π of a preferred central switch for transferring data from access switch 6710(j) to access switch 6710(k) is determined using a corresponding expression from Table-11. The indices x ad y of the ingress port and egress port of central switch 6720(π) to which the originating access switch connects are determined as {x=|j+π×H|$_N$, y=k} for the first connectivity scheme or {x=j, y=|k+π×H|$_N$} for the second connectivity scheme.

A path from an ingress port of index x to an egress port of index y incurs a systematic delay having a normalized value Δ of |y−x|$_N$ if the rotator of the latent switch is an ascending transposing rotator or |x−y|$_N$ if the rotator is a descending transposing rotator. The systematic delay of a path from an ingress port of index x to an egress port of an index y within a central switch of index p, 0≤p<G, is independent of p and depends only on x and y. The systematic delay of a path from an access switch of index j to an access switch of an index k through a central switch of index p, 0≤p<G, depends on j, k, and p. The normalized systematic delay of a path through any single central switch is in the range of 1 to N depending on the indices j and k.

TABLE 12

Preferred central switches for connections from access switch of index j = 11 to access switches of indices k = 0 to k = 19 in a switching system where N = 20 and G = 5 (H = 4)

| | First connectivity scheme:<br>y = k, x = |j + π × H|$_N$ | | | | | | Second connectivity scheme:<br>x = j, y = |k + π × H|$_N$ | | | | | | |
|---|---|---|---|---|---|---|---|---|---|---|---|---|---|
| | Δ = |y − x|$_N$<br>(Ascending rotators) | | | Δ = |x − y|$_N$<br>(Descending rotators) | | | Δ = |y − x|$_N$<br>(Ascending rotators) | | | Δ = |x − y|$_N$<br>(Descending rotators) | | |
| k | π | x | Δ | k | π | x | Δ | k | π | y | Δ | k | π | y | Δ |
| 0 | 2 | 19 | 1 | 0 | 3 | 3 | 3 | 0 | 3 | 12 | 1 | 0 | 2 | 8 | 3 |
| 1 | | 2 | 1 | | | | 2 | 1 | | 13 | 2 | 1 | | 9 | 2 |
| 2 | | 3 | 2 | | | | 1 | 2 | | 14 | 3 | 2 | | 10 | 1 |
| 3 | | 4 | 3 | 4 | | 7 | 4 | 3 | | 15 | 4 | 3 | 1 | 7 | 4 |
| 4 | 3 | 3 | 1 | 4 | | | 3 | 4 | 2 | 12 | 1 | 4 | | 8 | 3 |
| 5 | | 2 | 5 | | | | 2 | 5 | | 13 | 2 | 5 | | 9 | 2 |
| 6 | | 3 | 6 | | | | 1 | 6 | | 14 | 3 | 6 | | 10 | 1 |
| 7 | | 4 | 7 | 0 | | 11 | 4 | 7 | | 15 | 4 | 7 | 0 | 7 | 4 |
| 8 | 4 | 7 | 1 | 8 | | | 3 | 8 | 1 | 12 | 1 | 8 | | 8 | 3 |
| 9 | | 2 | 9 | | | | 2 | 9 | | 13 | 2 | 9 | | 9 | 2 |
| 10 | | 3 | 10 | | | | 1 | 10 | | 14 | 3 | 10 | | 10 | 1 |
| 11 | | 4 | 11 | 1 | | 15 | 4 | 11 | | 15 | 4 | 11 | 4 | 7 | 4 |
| 12 | 0 | 11 | 1 | 12 | | | 3 | 12 | 0 | 12 | 1 | 12 | | 8 | 3 |
| 13 | | 2 | 13 | | | | 2 | 13 | | 13 | 2 | 13 | | 9 | 2 |
| 14 | | 3 | 14 | | | | 1 | 14 | | 14 | 3 | 14 | | 10 | 1 |
| 15 | | 4 | 15 | 2 | | 19 | 4 | 15 | | 15 | 4 | 15 | 3 | 7 | 4 |
| 16 | 1 | 15 | 1 | 16 | | | 3 | 16 | 4 | 12 | 1 | 16 | | 8 | 3 |

TABLE 12-continued

Preferred central switches for connections from access switch
of index j = 11 to access switches of indices k =
0 to k = 19 in a switching system where N = 20 and G = 5 (H = 4)

| First connectivity scheme: y = k, x = \| j + π × H\|$_N$ | | | | | | | Second connectivity scheme: x = j, y = \|k + π × H\|$_N$ | | | | | | |
|---|---|---|---|---|---|---|---|---|---|---|---|---|---|
| Δ = \|y − x\|$_N$ (Ascending rotators) | | | Δ = \|x − y\|$_N$ (Descending rotators) | | | Δ = \|y − x\|$_N$ (Ascending rotators) | | | Δ = \|x − y\|$_N$ (Descending rotators) | | | | |
| k | π | x | Δ | k | π | x | Δ | k | π | y | Δ | k | π | y | Δ |
| 17 | 2 | | | 17 | | | 2 | 17 | | 13 | 2 | 17 | | 9 | 2 |
| 18 | 3 | | | 18 | | | 1 | 18 | | 14 | 3 | 18 | | 10 | 1 |
| 19 | 4 | | | 19 | 3 | 3 | 4 | 19 | | 15 | 4 | 19 | 2 | 7 | 4 |

The normalized systematic delay of a path through any single central switch is in the range of 1 to N depending on the indices j and k. The normalized systematic delay of path through a preferred central switch $6720(\pi)$, where π is a function of j and k, varies between 1 and H. With N=20 and G=5, H=4 and the maximum systematic delay through a preferred central switch is 4×δ. With N=4096 and G=128, H=32 and the maximum systematic delay through a preferred central switch is 32×δ; if the access switches have the same connectivity to all central switches, the maximum systematic delay through any central switch would be 4096×δ.

As indicated in Table-12, in a switching system 6700 of the first connectivity scheme with a transposing ascending rotator, connections from the access switch 6710 of index j=11 to access switches 6710 of indices 0 to 3 (k=0, 1, 2, or 3) are preferably routed through the central switch of index π=2, encountering systematic delays of normalized values of 1, 2, 3, and 4, respectively. Connections from the same access switch 6710(11) to access switches of indices 4 to 7 (k=4, 5, 6, or 7) are preferably routed through the central switch of index 3, encountering systematic delays of normalized values of 1, 2, 3, and 4, respectively.

In a switching system 6700 of the first connectivity scheme with a transposing descending rotator, connections from access switch 6710(11) to access switches of indices 19, 0, 1, and 2 are preferably routed through the central switch of index 3, encountering normalized systematic delays of 4, 3, 2, and 1, respectively. Connections from access switch 6710(11) to access switches of indices 3 to 6 (k=3, 4, 5, or 6) are preferably routed through the central switch of index 4, encountering normalized systematic delays of 4, 3, 2, and 1, respectively.

In a switching system 6700 with the second connectivity scheme and a transposing ascending rotator, connections from access switch 6710(11) to access switches of indices 0 to 3 (k=0, 1, 2, or 3) are preferably routed through the central switch of index 3, encountering normalized systematic delays of 1, 2, 3, and 4, respectively. Connections from access switch 6710(11) to access switches of indices 4 to 7 (k=4, 5, 6, or 7) are preferably routed through the central switch of index 2, encountering normalized systematic delays of 1, 2, 3, and 4, respectively.

In a switching system 6700 with the second connectivity scheme and a transposing descending rotator, connections from access switch 6710(11) to access switches of indices 19, 0, 1, and 2 (k=19, 0, 1, or 2) are preferably routed through the central switch of index 2, encountering normalized systematic delays of 4, 3, 2, and 1, respectively. Connections from access switch 6710(11) to access switches of indices 3 to 6 (k=3, 4, 5, or 6) are preferably routed through the central switch of index 1, encountering normalized systematic delays of 4, 3, 2, and 1, respectively.

FIG. 92 illustrates systematic delays, for a connection from an originating access switch 6710 of index 1100 (j=1100) to a destination access switch 6710 of index 20 (k=20) in a switching system having 64 central switches (G=64), each implemented as a latent switch employing a transposing rotator having 2048 ingress ports and 2048 egress ports (N=2048). The parameter H is determined as 32.

With the first connectivity scheme, originating access switch 6710(j) connects to an ingress port of index $x=(j+p \times H)_{modulo\ N}$, and destination access switch 6710(k) connects to an egress port of index y=k of a central switch 6720(p), 0≤p<G. Using transposing ascending rotators, the normalized systematic delay is $(y-x)_{modulo\ N}$ which is $(k-j-p \times H)_{modulo\ N}$. The central switch incurring the least delay is 6720(π), $\pi = \lfloor (k-j-1)_{modulo\ N}/H \rfloor$ as indicated in Table-11. For j=1100 and k=20, π=30. The central switch 6720(30) incurs the least delay of 8 time slots. If a path through the preferred central switch is not available, subsequent central switches may be attempted in a descending order (the order of indices of central switches being $(\pi-q)_{modulo\ G}$, 0≤q<G) as indicated by a respective arrow. Thus, the central switch of index p=29, incurring a systematic delay of 40 time slots, is attempted next if the path traversing the central switch of index p=π=30 does not have a sufficient vacancy, followed by central switch of index p=28, if the path traversing the central switch of index p=29 does not have a sufficient vacancy and so on.

With the first connectivity scheme and transposing descending rotators, the normalized systematic delay is $(x-y)_{modulo\ N}$ which is $(j+p \times H-k)_{modulo\ N}$. The central switch incurring the least delay is 6720(π), $\pi = (G - \lfloor (j-k-1)_{modulo\ N}/H \rfloor)_{modulo\ G}$ as indicated in Table-11. For j=1100 and k=20, π=31. The central switch 6720(31) incurs the least delay of 24 time slots. Neighboring central switches (of indices p=32, p=33, . . . ) may be attempted, where necessary in an ascending order (the order of indices of central switches being $(\pi+q)_{modulo\ G}$, 0≤q<G) as indicated by a respective arrow.

With the second connectivity scheme, originating access switch 6710(j) connects to an ingress port of index x=j, and destination access switch 6710(k) connects to an egress port of index $y=(k+p \times H)_{modulo\ N}$, of a central switch 6720(p), 0≤p<G. Using transposing ascending rotators, the normalized systematic delay is $(y-x)_{modulo\ N}$ which is $(k+p \times H-j)_{modulo\ N}$. The central switch incurring the least delay is 6720(π), where $\pi = (G - \lfloor (k-j-1)_{modulo\ N}/H \rfloor)_{modulo\ G}$ as indicated in Table-11. For j=1100 and k=20, π=34. The central switch 6720(34) incurs the least delay of 8 time slots. Neighboring central switches (of indices p=35, p=36, . . . ) may be attempted, where necessary, in an ascending order (the order of indices of central switches being $(\pi+q)_{modulo\ G}$, $0 \le q<G$) as indicated by a respective arrow.

With the second connectivity scheme and transposing descending rotators, the normalized systematic delay is $(x-y)_{modulo\ N}$ which is $(j-k-p \times H)_{modulo\ N}$. The central switch incurring the least delay is $6720(\pi)$, $\pi = \lfloor (j-k-1)_{modulo\ N}/H \rfloor$ as indicated in Table-11. For j=1100 and k=20, $\pi=33$. The central switch 6720(33) incurs the least delay of 24 time slots. Neighboring central switches (p=32, p=31, . . . ) may be attempted, where necessary, in a descending order (the order of indices of central switches being $(\pi-q)_{modulo\ G}$, $0 \le q<G$) as indicated by a respective arrow.

As described above, each central switch 6720 of a switching system 6700 is coupled to a respective master controller. A master controller may have a structure similar to that of master controller 3280 illustrated in FIG. 40 FIG. 50 illustrates an arrangement of coupling a master controller 5080 to port controllers of any of the latent switches disclosed in the present application. The arrangement may be applied to each central switch 6720 of switching system 6700. FIG. 75 illustrates another arrangement of coupling a master controller having multiple input ports and multiple output ports to the transposing rotator of a latent switch having a large number of ingress ports and egress ports. The master controllers of the central switches are independent of each other and each has a respective master time indicator which provides a reference time to be distributed to access controllers of the access switches 6710.

An access controller of an access switch 6710 receives requests from external data sources to route data packets of arbitrary sizes to data sinks coupled to any of the access switches. Each access controller has a processor and a storage medium storing a routing table identifying a preferred central switch 6720 for data transfer to each destination access switch. An access switch stores an index, $\pi$, of a preferred central switch (Table-11), and indices of preferred subsequent central switches corresponding to each destination access switch. Table-12 illustrates four routing tables, one for each of four configurations of a switching system 6700. For a specific configuration, an originating access switch may store indices of preferred central switches 6720 corresponding to N destination access switches 6710. The routing table stored at an originating access switch may provide, for each destination access switch, an index, $\pi$, of a preferred central switch and an indication of whether to consider subsequent (G−1) central switches in an ascending order or a descending order as described above and indicated in Table-11 and FIG. 92. The routing tables stored at the access switches may be individually computed by access controllers or computed at a system-management processing facility and distributed to individual access controllers. The routing tables need be modified only in response to configuration changes.

A master controller of each central switch stores processor-executable instructions which cause a respective master processor to receive routing requests for data transfer from originating access switches to destination access switches and schedule data transfer through the each central switch accordingly. The processor-executable instructions cause the respective master processor to produce schedules for data transfer from each originating access switch to a respective destination access switch and communicate data-transfer schedules to respective originating access switches.

In view of the description above, it will be understood that modifications and variations of the described and illustrated embodiments may be made within the scope of the inventive concepts. The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A switching system comprising:
    a plurality of identical central switches, each central switch configured as a single-rotator latent switch having N ingress ports and N egress ports, N>2, and coupled to a respective master controller having multiple dual control ports receiving upstream control data from said N ingress ports and transmitting downstream control data to said N egress ports;
    and
    a plurality of access switches, each access switch connecting to a respective ingress port and a respective egress port of said each central switch so that:
        a circular difference between indices of successive ingress ports to which any access switch connects equals a predetermined constant; and
        all egress ports to which said any access switch connects have a same index;
    said each access switch comprising a respective access controller having a processor and a storage medium storing a routing table identifying a preferred central switch for data transfer to each other access switch.

2. The switching system of claim 1 wherein said each central switch comprises:
    a plurality of memory devices;
    a transposing rotator having N inlets and N outlets, said transposing rotator configured to cyclically connect, during a time frame organized into N time slots, each inlet to each outlet, starting with a transposed outlet of said each inlet, wherein during each time slot said N ingress ports and said N egress ports alternately connect to said N inlets and said N outlets, respectively.

3. The switching system of claim 2 wherein said respective master controller alternately connects to multiple outlets and multiple inlets of said transposing rotator.

4. The switching system of claim 1 wherein said predetermined constant, denoted H, is determined as $H = \lfloor (2 \times N + G)/(2 \times G) \rfloor$, G being a number of central switches of said plurality of central switches, G>1.

5. The switching system of claim 1 wherein said plurality of access switches contains N access switches, indexed as 0 to (N−1), and an access switch of index j, $0 \le j < N$, connects to:
    an egress port of index j in said each central switch; and
    an ingress port of index $(j + p \times H)_{modulo\ N}$, in a central switch of index p, $0 \le p < G$, H being said predetermined constant, and G being a number of central switches of said plurality of central switches, G>1;
    said N ingress ports being indexed as 0 to (N−1) and said N egress ports being indexed as 0 to (N−1).

6. The switching system of claim 5 wherein:
    said each central switch incurs a normalized delay of $(y-x)_{modulo\ N}$ for a path from an ingress port of index x to an egress port of index y, $0 \le x < N$, $0 \le y < N$; and
    an access controller coupled to an access switch of index j is configured to select a central switch of index $\pi = \lfloor (k-j-1)_{modulo\ N}/H \rfloor$ for establishing a path to an access switch of index k, $0 \le j < N$, $0 \le k < N$, followed by central switches of indices $(\pi-q)_{modulo\ G}$, $1 \le q < G$.

7. The switching system of claim 5 wherein:
    said each central switch incurs a normalized delay of $(x-y)_{modulo\ N}$ for a path from an ingress port of index x to an egress port of index y, $0 \le x < N$, $0 \le y < N$; and an access controller coupled to an access switch of index j is configured to select a central switch of index $\pi = (G - \lfloor (j-k-1)_{modulo\ N}/H \rfloor)_{modulo\ G}$ for establishing a path to an access switch of index k, $0 \leq j < N$, $0 \leq k < N$, followed by central switches of indices $(\pi+q)_{modulo\ G}$, $1 \leq q < G$.

8. The switching system of claim 1 wherein said each access switch comprises:
an ingress switching mechanism configured as an instantaneous space switch having ν input ports and G output ports, $G > 1$, $ν \geq 1$; and
an egress switching mechanism configured as an instantaneous space switch having G input ports and ν output ports.

9. The switching system of claim 1 wherein said each access switch comprises:
an ingress switching mechanism configured as a rotating-access switch having ν input ports and G output ports, $G > 1$, $ν \geq 1$; and
an egress switching mechanism configured as a rotating-access switch having G input ports and ν output ports.

10. The switching system of claim 1 wherein said respective master controller is configured to:
receive routing requests for data transfer among said plurality of access switches;
schedule data transfer among said plurality of access switches through said respective central switch; and
communicate data-transfer schedules to respective access switches.

11. A switching system comprising:
a plurality of identical central switches, each central switch configured as a single-rotator latent switch having N ingress ports and N egress ports, $N > 2$, and coupled to a respective master controller having multiple dual control ports receiving upstream control data from said N ingress ports and transmitting downstream control data to said N egress ports;
and
a plurality of access switches, each access switch connecting to a respective ingress port and a respective egress port of said each central switch so that:
all ingress ports to which any access switch connects have a same index; and
a circular difference between indices of successive egress ports to which said any access switch connects equals a predetermined constant
said each access switch comprising a respective access controller having a processor and a storage medium storing a routing table identifying a preferred central switch for data transfer to each other access switch.

12. The switching system of claim 11 wherein each said central switch comprises:
a transposing rotator having a plurality of inlets and a plurality of outlets, said transposing rotator cyclically connecting each inlet to each outlet during a rotation cycle, starting with a transposed outlet of said each inlet; and
a plurality of memory devices, each memory device alternately connecting to a respective inlet and a peer outlet of said respective inlet;
said N ingress ports alternately connecting to:
upstream channels from said plurality of access switches; and
said plurality of inlets;
and
said N egress ports alternately connecting to:
said plurality of outlets; and
downstream channels directed to said plurality of access switches.

13. The switching system of claim 11 wherein said predetermined constant, denoted H, is determined as $H = \lfloor (2 \times N + G)/(2 \times G) \rfloor$, G being a number of central switches of said plurality of central switches, $G > 1$.

14. The switching system of claim 11 wherein said plurality of access switches contains N access switches, indexed as 0 to (N−1), and an access switch of index j, $0 \leq j < N$, connects to:
an ingress port of index j in each central switch of said plurality of central switches; and
an egress port of index $(j + p \times H)_{modulo\ N}$, in central switch of index p, $0 \leq p < G$, H being said predetermined constant, and G being a number of central switches of said plurality of central switches, $G > 1$;
said N ingress ports being indexed as 0 to (N−1) and said N egress ports being indexed as 0 to (N−1).

15. The switching system of claim 14 wherein:
said each central switch incurs a normalized delay of $(y-x)_{modulo\ N}$ for a path from an ingress port of index x to an egress port of index y, $0 \leq x < N$, $0 \leq y < N$; and
an access controller coupled to an access switch of index j is configured to select a central switch of index $\pi = (G - \lfloor (k-j-1)_{modulo\ N}/H \rfloor)_{modulo\ G}$ for establishing a path to an access switch of index k, $0 \leq j < N$, $0 \leq k < N$, followed by central switches of indices $(\pi+q)_{modulo\ G}$, $1 \leq q < G$.

16. The switching system of claim 14 wherein:
said each central switch incurs a normalized delay of $(x-y)_{modulo\ N}$ for a path from an ingress port of index x to an egress port of index y, $0 \leq x < N$, $0 \leq y < N$; and
an access controller coupled to an access switch of index j is configured to select a central switch of index $\pi = \lfloor (j-k-1)_{modulo\ N}/H \rfloor$ for establishing a path to an access switch of index k, $0 \leq j < N$, $0 \leq k < N$, followed by central switches of indices $(\pi-q)_{modulo\ G}$, $1 \leq q < G$.

17. A switching system comprising:
a plurality of access switches;
and
a plurality of central switches, each central switch configured as a latent switch having N ingress ports and N egress ports, $N > 2$, and coupled to a respective master controller having multiple dual control ports receiving upstream control data from said N ingress ports and transmitting downstream control data to said N egress ports;
wherein:
a path through any central switch of said plurality of central switches from a specific ingress port to a specific egress port incurs a same delay;
ingress ports, of said plurality of central switches, of a same index connect to different access switches; and
egress ports, of said plurality of central switches, of a same index connect to a same access switch;
each access switch comprising a respective access controller having a processor and a storage medium storing a routing table identifying a preferred central switch for data transfer to each other access switch.

18. The switching system of claim 17 wherein said plurality of access switches contains N access switches, indexed as 0 to (N−1), and wherein:
an ingress port of index x, $0 \leq x < N$, in central switch of index p, $0 \leq p < G$, connects to an access switch of index $(x - p \times H)_{modulo\ N}$, H being a predetermined constant and G being a number of central switches of said plurality of central switches, $G > 1$; and an egress port of index y, 0≤y<N, in any central switch of said plurality of central switches connects to an access switch of index y;

said N ingress ports being indexed as 0 to (N−1) and said N egress ports being indexed as 0 to (N−1).

19. A switching system comprising:

a plurality of access switches; and a plurality of central switches, each central switch configured as a latent switch having N ingress ports and N egress ports, N>2, and coupled to a respective master controller having multiple dual control ports receiving upstream control data from said N ingress ports and transmitting downstream control data to said N egress ports;

wherein:

a path through any central switch of said plurality of central switches from a specific ingress port to a specific egress port incurs a same delay;

ingress ports, of said plurality of central switches, of a same index connect to a same access switch; and egress ports, of said plurality of central switches, of a same index connect to different access switches;

each access switch comprising a respective access controller having a processor and a storage medium storing a routing table identifying a preferred central switch for data transfer to each other access switch.

20. The switching system of claim 19 wherein said plurality of access switches contains N access switches, indexed as 0 to (N−1), and wherein:

an ingress port of index x, 0≤x<N, in any central switch of said plurality of central switches connects to an access switch of index x; and an egress port of index y, 0≤y<N, in a central switch of index p, 0≤p<G, connects to an access switch of index $(y-p \times H)_{modulo\ N}$, H being a predetermined constant and G being a number of central switches of said plurality of central switches, G>1;

said N ingress ports being indexed as 0 to (N−1) and said N egress ports being indexed as 0 to (N−1).

* * * * *